US011067698B2

(12) United States Patent
Zhou et al.

(10) Patent No.: US 11,067,698 B2
(45) Date of Patent: Jul. 20, 2021

(54) MESSAGE BROADCAST APPARATUS AND METHOD FOR ENHANCED PARAMETER IN SATELLITE NAVIGATION SYSTEM

(71) Applicants: Shanghai Astronomical Observatory, Chinese Academy of Sciences, Shanghai (CN); Jianhua Zhou, Beijing (CN); Jinxian Zhao, Beijing (CN)

(72) Inventors: Jianhua Zhou, Beijing (CN); Jinxian Zhao, Beijing (CN); Junping Chen, Shanghai (CN); Xiuqiang Gong, Shanghai (CN)

(73) Assignees: Shanghai Astronomical Observatory, Chinese Academy of Sciences, Shanghai (CN); Jianhua Zhou, Beijing (CN); Jinxian Zhao, Beijing (CN)

( * ) Notice: Subject to any disclaimer, the term of this patent is extended or adjusted under 35 U.S.C. 154(b) by 230 days.

(21) Appl. No.: 16/221,932

(22) Filed: Dec. 17, 2018

(65) Prior Publication Data
US 2019/0257952 A1  Aug. 22, 2019

(30) Foreign Application Priority Data

Dec. 20, 2017  (CN) .......................... 201711385570.7

(51) Int. Cl.
*G01S 19/07* (2010.01)
*G01S 19/23* (2010.01)
(Continued)

(52) U.S. Cl.
CPC .............. *G01S 19/07* (2013.01); *G01S 19/02* (2013.01); *G01S 19/05* (2013.01); *G01S 19/072* (2019.08); *G01S 19/23* (2013.01); *G01S 19/256* (2013.01)

(58) Field of Classification Search
CPC ........ G01S 19/07; G01S 19/072; G01S 19/02; G01S 19/05; G01S 19/23; G01S 19/256;
(Continued)

(56) References Cited

U.S. PATENT DOCUMENTS

| 8,473,210 B2 | 6/2013 | Trautenberg | |
|---|---|---|---|
| 2015/0247928 A1* | 9/2015 | Waters | G01S 19/09 342/357.4 |
| 2016/0282469 A1* | 9/2016 | Liu | G01S 19/05 |

OTHER PUBLICATIONS

China Satellite Navigation Office: "BeiDou Navigation Satellite System Signal in Space Interface Control Document Open Service Signal B1C (Version 1.0), China Satellite Navigation Office," Dec. 1, 2007, pp. 1-81.

(Continued)

*Primary Examiner* — Harry K Liu
(74) *Attorney, Agent, or Firm* — McDonnell Boehnen Hulbert & Berghoff LLP

(57) ABSTRACT

The present invention provides a message broadcast apparatus and method for enhanced parameters in a satellite navigation system. The apparatus includes: a processor, which determines the insertion position of the enhanced parameter in the reserved space in the navigation message frame structure model according to the byte size and the broadcast frequency of the enhanced parameter that needs to be broadcast, so as to perform the message arrangement of the enhanced parameter; and a transmitter, which uploads the arranged message to the broadcast satellite for broadcasting the message.

20 Claims, 81 Drawing Sheets

(51) Int. Cl.
  *G01S 19/25* (2010.01)
  *G01S 19/02* (2010.01)
  *G01S 19/05* (2010.01)
(58) Field of Classification Search
  CPC .......... G01S 19/41; G01S 19/20; G01S 19/08; G01S 5/009
  USPC .................................................. 342/357.44
  See application file for complete search history.

(56) References Cited

OTHER PUBLICATIONS

GPS Navastar: "Global Positioning System Standard Positioning Service Signal Specification (2nd Edition)," Jun. 2, 1995, 26 pages.
Montenbruck et al., "The BeiDou Navigation Message," Journal of Global Positioning Systems, Jun. 30, 2013, pp. 1-12, vol. 12, No. 1.
European Patent Office, Extended European Search Report dated Oct. 18, 2019, issued in connection with European Patent Application No. EP 18213481, 10 pages.
Jun Ping Chen et al., Preliminary Evaluation of Performance of BeiDou Satellite-base Augmentation System, Journal of TongJi University (natural science), Jul. 2017, 8 pages, vol. 45, No. 7 (English Abstract).
Yuan Luo, Software Design of BD2 User Computer Data Processing Module, Chinese Master's Theses Full-text Database Basic Sciences, 2010, 10 pages, vol. 5 (Partial Machine Translation).
China Satellite Navigation Office: "BeiDou Navigation Satellite System Signal in Space Interface Control Document Open Service Signal (Version 2.1), China Satellite Navigation Office," Nov. 2016, pp. 1-29.

* cited by examiner

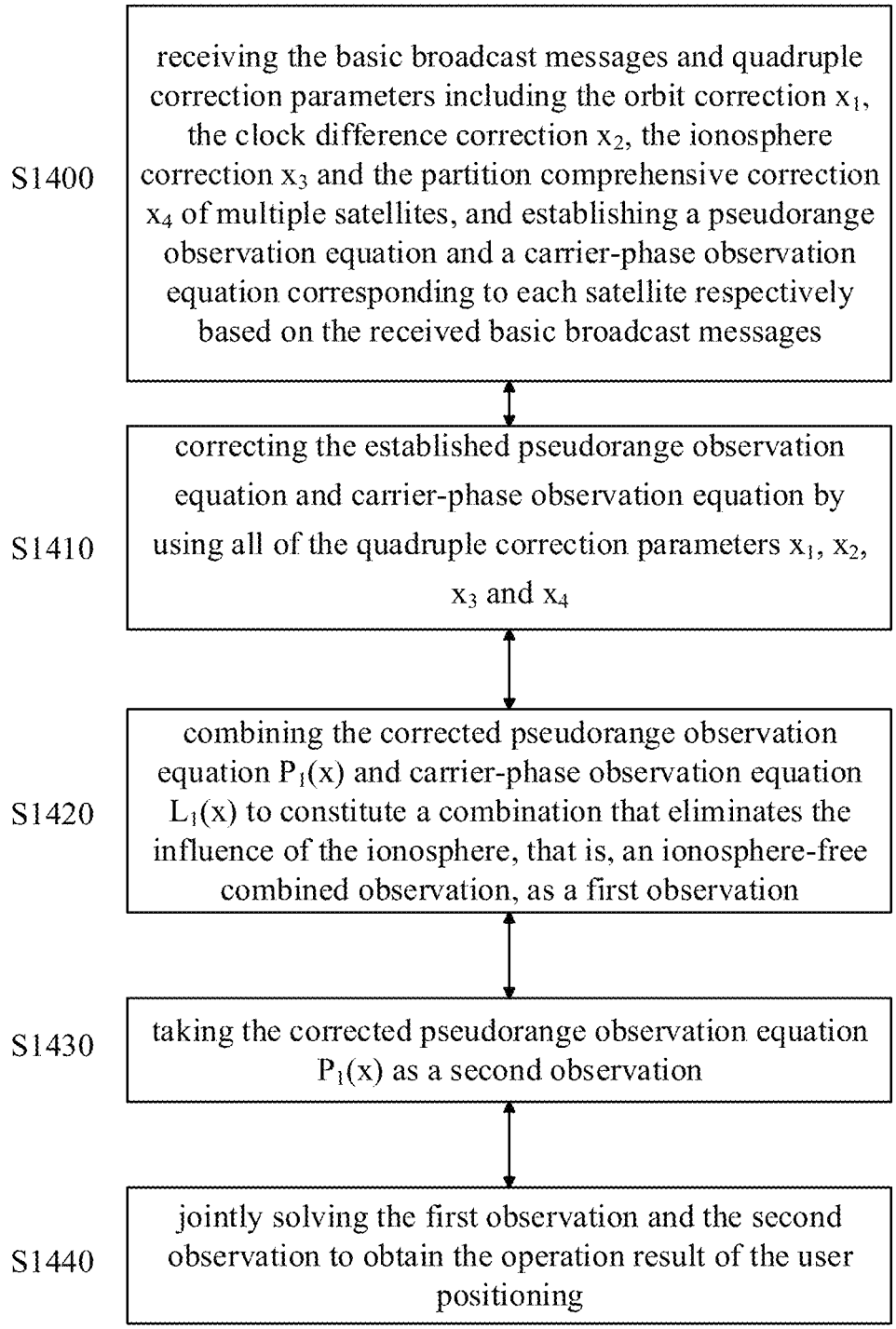

S1400 — receiving the basic broadcast messages and quadruple correction parameters including the orbit correction $x_1$, the clock difference correction $x_2$, the ionosphere correction $x_3$ and the partition comprehensive correction $x_4$ of multiple satellites, and establishing a pseudorange observation equation and a carrier-phase observation equation corresponding to each satellite respectively based on the received basic broadcast messages S1410 — correcting the established pseudorange observation equation and carrier-phase observation equation by using all of the quadruple correction parameters $x_1$, $x_2$, $x_3$ and $x_4$ S1420 — combining the corrected pseudorange observation equation $P_i(x)$ and carrier-phase observation equation $L_i(x)$ to constitute a combination that eliminates the influence of the ionosphere, that is, an ionosphere-free combined observation, as a first observation S1430 — taking the corrected pseudorange observation equation $P_i(x)$ as a second observation S1440 — jointly solving the first observation and the second observation to obtain the operation result of the user positioning

Fig.14

| | |
|---|---|
| S2400 | receiving the basic broadcast messages and the partition comprehensive correction $x_4$ of multiple satellites, selecting any two frequencies $f_1$ and $f_2$ from three different frequencies $f_1$, $f_2$ and $f_3$, and establishing pseudorange observation equations and carrier-phase observation equations corresponding to the two frequencies respectively |
| S2410 | correcting the established pseudorange observation equations and carrier-phase observation equations by using the partition comprehensive correction $x_4$ to obtain the pseudorange observation equation $P_1(x)$ and carrier-phase observation equation $L_1(x)$ corresponding to the first frequency $f_1$ corrected by $x_4$ as well as the pseudorange observation equation $P_2(x)$ and carrier-phase observation equation $L_2(x)$ corresponding to the second frequency $f_2$ corrected by $x_4$ |
| S2420 | combining the carrier-phase observation equation $L_1(x)$ and the carrier-phase observation equation $L_2(x)$ to construct a carrier-phase ionosphere-free combination, that is, a first observation |
| S2430 | combining the pseudorange observation equation $P_1(x)$ and the pseudorange observation equation $P_2(x)$ to construct a pseudorange ionosphere-free combination, that is, a second observation |
| S2440 | jointly solving the first observation and the second observation to obtain the operation result of the user positioning |

Fig.24

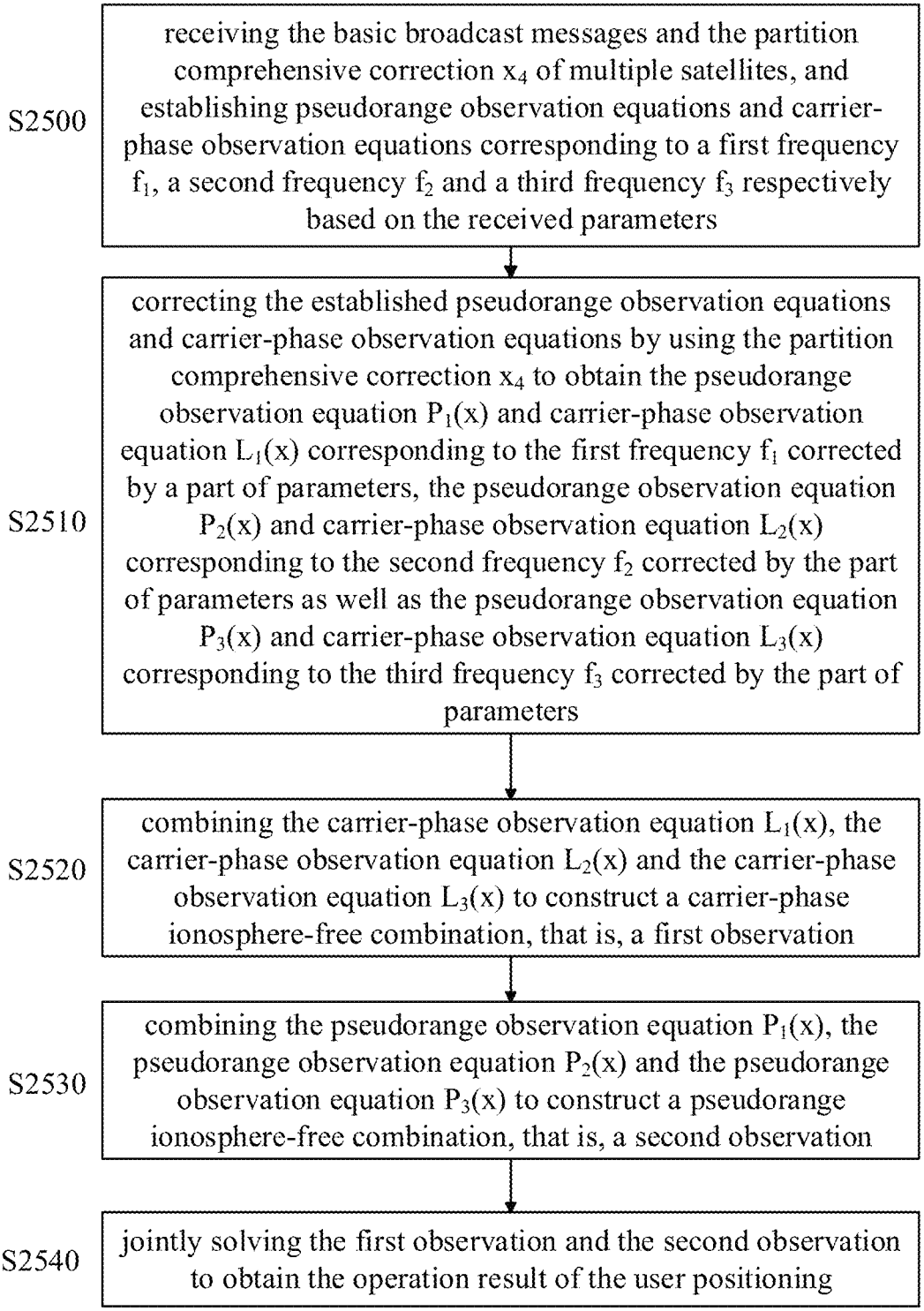

| | |
|---|---|
| S2500 | receiving the basic broadcast messages and the partition comprehensive correction $x_4$ of multiple satellites, and establishing pseudorange observation equations and carrier-phase observation equations corresponding to a first frequency $f_1$, a second frequency $f_2$ and a third frequency $f_3$ respectively based on the received parameters |
| S2510 | correcting the established pseudorange observation equations and carrier-phase observation equations by using the partition comprehensive correction $x_4$ to obtain the pseudorange observation equation $P_1(x)$ and carrier-phase observation equation $L_1(x)$ corresponding to the first frequency $f_1$ corrected by a part of parameters, the pseudorange observation equation $P_2(x)$ and carrier-phase observation equation $L_2(x)$ corresponding to the second frequency $f_2$ corrected by the part of parameters as well as the pseudorange observation equation $P_3(x)$ and carrier-phase observation equation $L_3(x)$ corresponding to the third frequency $f_3$ corrected by the part of parameters |
| S2520 | combining the carrier-phase observation equation $L_1(x)$, the carrier-phase observation equation $L_2(x)$ and the carrier-phase observation equation $L_3(x)$ to construct a carrier-phase ionosphere-free combination, that is, a first observation |
| S2530 | combining the pseudorange observation equation $P_1(x)$, the pseudorange observation equation $P_2(x)$ and the pseudorange observation equation $P_3(x)$ to construct a pseudorange ionosphere-free combination, that is, a second observation |
| S2540 | jointly solving the first observation and the second observation to obtain the operation result of the user positioning |

Fig.25

MESSAGE BROADCAST APPARATUS AND METHOD FOR ENHANCED PARAMETER IN SATELLITE NAVIGATION SYSTEM

TECHNICAL FIELD OF THE DISCLOSURE

The present disclosure relates to the field of satellite navigation, and in particular to a message broadcast apparatus and method for an enhanced parameter in a satellite navigation system.

BACKGROUND

At present, the application of satellite navigation systems is becoming more and more widespread. However, in actual practice, satellite navigation systems have at least one of the following shortcomings: the satellite navigation system's message broadcast is not flexible enough, and its resource utilization is low.

SUMMARY

In view of the above circumstances, the present invention provides a message broadcast apparatus and method for an enhanced parameter in a satellite navigation system.

According to one aspect of the present invention, there is provided a message broadcast apparatus for an enhanced parameter in a satellite navigation system, comprising: a processor, which determines an insertion position of the enhanced parameter in a reserved space in a navigation message frame structure model according to the byte size and the broadcast frequency of the enhanced parameter that needs to be broadcast, so as to perform the message arrangement of the enhanced parameter; and a transmitter, which uploads the arranged message to a broadcast satellite for broadcasting the message, wherein the navigation message frame structure model is defined by a superframe, a main frame and a sub-frame, with each of superframes containing 120 main frames, each of main frames containing 5 sub-frames, each of sub-frames containing 10 words and each of words containing 30 bits and lasting 0.06 second, and wherein among the 5 sub-frames, sub-frame 1 is used to broadcast the present satellite's basic navigation information of the satellite navigation system and transmitted by 10 pages in a time division manner, sub-frame 2 to sub-frame 4 are used to broadcast the integrity and differential information of the satellite navigation system and transmitted respectively by 6 pages in a time division manner, and sub-frame 5 is used to broadcast all the satellite almanacs, ionosphere information and time synchronization information with other systems of the satellite navigation system and transmitted by 120 pages in a time division manner.

According to another aspect of the present invention, there is provided a message broadcast method for an enhanced parameter in a satellite navigation system, comprising: determining an insertion position of the enhanced parameter in a reserved space in a navigation message frame structure model according to the byte size and the broadcast frequency of the enhanced parameter that needs to be broadcast, so as to perform the message arrangement of the enhanced parameter; and uploading, by a ground base station, the arranged message to a broadcast satellite for broadcasting the message, wherein the navigation message frame structure model is defined by a superframe, a main frame and a sub-frame, with each of superframes containing 120 main frames, each of main frames containing 5 sub-frames, each of sub-frames containing 10 words and each of words containing 30 bits and lasting 0.06 second, and wherein among the 5 sub-frames, sub-frame 1 is used to broadcast the present satellite's basic navigation information of the satellite navigation system and transmitted by 10 pages in a time division manner, sub-frame 2 to sub-frame 4 are used to broadcast the integrity and differential information of the satellite navigation system and transmitted respectively by 6 pages in a time division manner, and sub-frame 5 is used to broadcast all the satellite almanacs, ionosphere information and time synchronization information with other systems of the satellite navigation system and transmitted by 120 pages in a time division manner.

In the message broadcast apparatus and method for an enhanced parameter in the satellite navigation system of an embodiment of the present invention, there is at least one of the following beneficial effects: by combining a frame and a data block in a navigation message structure, the satellite-and-earth-integrated flexible broadcast of the navigation message is realized, the basic navigation information and the enhanced information can be uniformly broadcast, the scalability of the navigation message is improved, the flexibility of message broadcasting is improved, the user's use performance is improved, and the utilization of channel link resources is improved.

BRIEF DESCRIPTION OF THE DRAWINGS

In order to more clearly explain the technical schemes of the embodiments of the present invention, the attached drawings of the embodiments will be briefly introduced below. Obviously, the attached drawings in the following description merely relate to some embodiments of the present invention, they do not limit the present invention.

FIG. 14 shows a flowchart of a navigation and positioning method of a single-frequency receiver using correction parameters including a partition comprehensive correction $x_4$, an orbit correction $x_1$, a clock difference correction $x_2$ and an ionosphere correction $x_3$ according to another embodiment of the present application;

FIG. 24 shows a flowchart of a navigation and positioning method of a tri-frequency receiver using correction parameters including a partition comprehensive correction $x_4$ according to another embodiment of the present application;

FIG. 25 shows a flowchart of a navigation and positioning method of a tri-frequency receiver using correction parameters including a partition comprehensive correction $x_4$ according to another embodiment of the present application.

Figure 1:
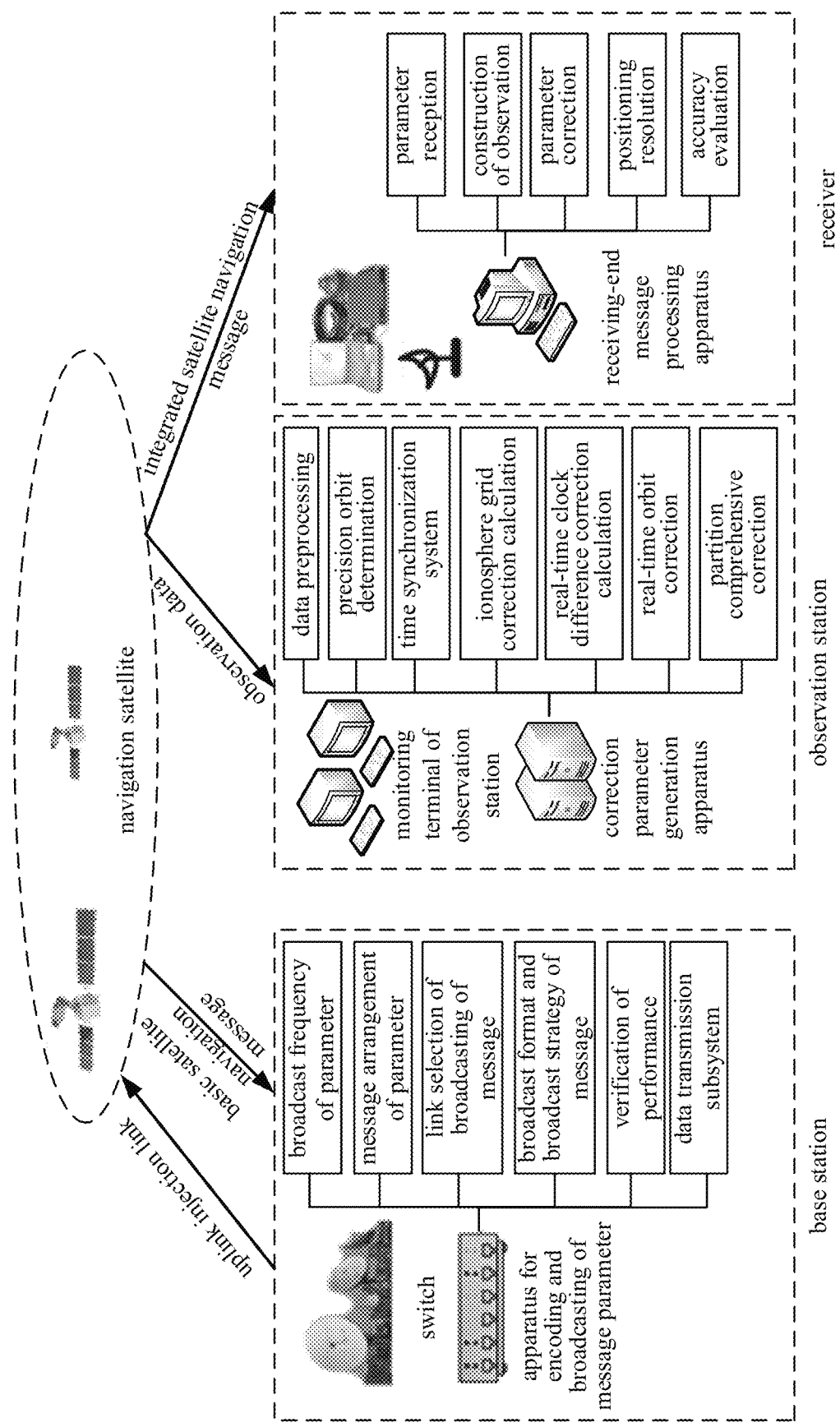
FIG. 1 shows a satellite positioning system according to an embodiment of the present invention.

In the following specification, reference is made to attached drawings that form a part thereof and in which it is shown by way of setting forth specific exemplary embodiments in which the disclosure is practiced. These embodiments are described in sufficient detail to enable those skilled in the art to practice the concepts disclosed herein, and it should be understood that modifications to various embodiments disclosed may be made and other embodiments may be used without departing from the scope of the present disclosure. Therefore, the following detailed description shall not to be considered as with a limiting implication.

DETAILED DESCRIPTION

In order to make the objectives, technical schemes and advantages of embodiments of the present invention clearer, the technical schemes of the embodiments of the present invention will be described clearly and completely in conjunction with the attached drawings of the embodiments of the present invention in the following. Obviously, the described embodiments are a part of the embodiments of the present invention, not all of the embodiments. All other embodiments obtained by those ordinary skills in the art based on the described embodiments of the present invention without creative efforts are within the scope of protection of the present invention.

Unless otherwise defined, technical terms or scientific terms used herein should be of general meanings as understood by those ordinary skills in the art to which the present invention belongs. The terms "first", "second" and the like, as used in the specification and claims of the present invention patent application, do not denote any order, quantity or importance, but rather are used to distinguish between different components. Similarly, "a" or "an" or the like does not mean a quantitative limitation but means that at least one exists.

A navigation satellite usually broadcasts only basic navigation message to meet the user's requirement for 10-meter-level basic navigation and positioning. In order to improve the accuracy of positioning, the correction parameters are usually supplied to the user terminal (receiver) via a communication satellite or through a network. That is to say, the user terminal (receiver) employs the received basic navigation message and correction parameters to determine its own position, so that the accuracy of positioning can be improved. However, the accuracy of positioning in the prior art can only reach meter-level, still cannot meet the requirements for accuracy of positioning of certain industries, for example, industries such as precision agriculture, high-accuracy measurement and the like, which require achieving decimeter-level accuracy of positioning to meet the needs of daily work.

The aforementioned correction parameters can also be broadcast through an independent satellite navigation enhancement system. For example, the current navigation enhancement systems mainly include the WAAS (Wide Area Augmentation System) system in the United States, the EGNOS (European Geostationary Navigation Overlay Service) system in Europe, the MSAS (Multi-functional Satellite Augmentation System) in Japan, and the SDCM (Differential Corrections and Monitoring) system in Russia, etc. These systems are operational control systems independent of GPS or GLONASS.

Correction parameters is for the purpose of improving the accuracy of the system's real-time service, the basic idea is to distinguish between the main error sources such as satellite orbit error, satellite clock difference and ionosphere delay, establish a model of each error source, and generate corrections for correcting the errors of these parameters (clock difference, orbit, etc.) in the basic navigation. The calculated corrections are referred to as correction parameters (or enhanced parameters, enhanced corrections, enhancement information), the correction parameters are broadcast to the user terminal (user end, receiver) via a satellite communication link or through a network.

In view of this, according to a satellite positioning method and a satellite positioning system of an embodiment of the present invention, by designing a high-accuracy wide-area differential parameter model, correction parameters are broadcast in a satellite navigation message, and a method of protocol superimposition is employed to achieve the integrated design of the basic navigation message plus correction parameters, for example, the correction parameters are broadcast on the basis of the basic navigation message, the correction parameters include the orbit correction, the satellite clock difference correction, the ionosphere correction and the partition comprehensive correction, etc. and the superimposed fusion matching of the correction parameters can be realized, then the correction parameters are directly broadcast uniformly by the navigation satellite of the satellite navigation system. Through the wide-area difference model, an integrated service based on the basic navigation, navigation enhancement and precision positioning of the satellite navigation system itself can be realized, and wide-area navigation and positioning of the decimeter-level accuracy can be realized without adding other communication channels.

In addition, existing navigation systems, such as GPS, have a basic navigation message structure employing a fixed frame structure, and the scalability thereof is poor; and the basic navigation information and correction parameters are not uniformly broadcast, but are broadcast separately by two systems, a satellite navigation system and a satellite navigation enhancement system (e.g., GPS and WAAS), resource consumption is large, the link resource occupation is large, not the combination of fast and slow, and the flexibility is low.

According to the satellite positioning method and the satellite positioning system of the embodiment of the present invention, it is also possible to realize the message arrangement and the message broadcasting for various error corrections (for example, clock difference correction, orbit correction, partition comprehensive correction, etc.) in the satellite navigation system. For example, in accordance with the byte sizes and the update frequencies of respective parameters involved in the error correction that needs to be broadcast, their respective insertion positions (page positions of a sub-frame) in the reserved space in the original navigation message frame structure model (including the basic navigation information) is determined to perform the message arrangement, and a ground station uploads the arranged message via an uplink injection link to a satellite for broadcasting.

According to the satellite positioning method and the satellite positioning system of the embodiment of the present invention, it is further possible to provide a method for navigation and positioning of a receiver, a receiver and a computer readable medium. According to the type of parameters received by the receiver and the specific conditions of the receiver, the receiver can provide matching strategies of different algorithms to properly process the received parameters to correct the obtained observation values of pseudoranges and carrier-phases, thereby realizing the positioning calculation which improves accuracy.

FIG. 1 shows a satellite positioning system according to an embodiment of the present invention. As shown in FIG. 1, the satellite positioning system includes navigation satellites, a base station, an observation station, and may also include a receiver.

The observation station includes a monitoring terminal and a correction parameters information generating apparatus. The monitoring terminal receives the observation data transmitted from the navigation satellites, and the correction parameters information generating apparatus generates correction parameters based on the received observation data, then these correction parameters are transmitted by the monitoring terminal to the base station. For example, the correction parameters information generating apparatus first performs preprocessing, precise orbit determination and time synchronization processing on the satellite observation data, then calculates one or more of the following parameters: the ionosphere correction, the real-time clock difference correction, the real-time orbit correction, the partition comprehensive correction, etc. according to specific requirements.

The correction parameters generated by the correction parameters information generating apparatus at the observation station are transmitted by the observation station monitoring terminal to the base station.

A switch and an apparatus for superimposing, encoding, and broadcasting of message parameters are provided at the base station. The switch receives the basic navigation message from the satellites, the apparatus for superimposing, encoding and broadcasting of message parameters encodes the correction parameters for enhancement into the basic navigation message through protocol superimposition to realize the integration of the message, and set the broadcasting. For example, the apparatus for superimposing, encoding and broadcasting of message parameters may also set the broadcast frequencies of the correction parameters, select the link for the message broadcasting, set the broadcast format and the broadcast strategy of the message, verify the message broadcast performance, and transmit the data message to be injected to the satellite in the uplink to the switch. The switch of the satellite base station transmits the integrated-coded message to the satellite via the uplink injection link, with the satellite being a satellite (i.e., a navigation satellite) for providing navigation and positioning which may belong to different satellite navigation systems, for example, may be a GPS satellite, a Beidou satellite, or the like.

The navigation satellite broadcasts the integrated satellite navigation message, that it receives from the base station, in which the correction parameters is added, and it can be received by the receiver. The receiver includes a receiving-end message processing apparatus which decodes the integrated satellite navigation message received by the receiver, decodes correction parameters for enhancement therefrom, and constructs observations, performs parameter correction (embodiments of the present invention have no limitation on the order of constructing observations and performing parameter correction), the positioning solution, etc., to obtain the positioning information based on the correction parameters, and may also perform the accuracy evaluation.

Next, the above-described signal and data processing procedures performed at the observation station, the base station and the receiver are separately described.

As described above, there is provided at the observation station a correction parameters information generating apparatus which may generate correction parameters such as an ionosphere correction, a real-time clock difference correction, a real-time orbit correction, and a partition comprehensive correction, to enhance the satellite navigation (positioning) accuracy, then multiple parameters therein are superimposed at the base station.

In order to achieve the superimposition of the correction parameters, a model of a correction parameters is first established and a correction parameters is generated based on the model.

According to the satellite positioning method and the satellite positioning system of the embodiment of the present invention, not only the correction parameters can be realized through being broadcast only by a navigation satellite, but the correction parameters may also be broadcast through a ground-based network.

The satellite orbit in the basic navigation message generally needs to be forecasted for 1~2 hours, and its forecast error will increase over time. The satellite orbit correction parameters is to make use of the observation data of the ground observation station network and resolve the error of the satellite orbit forecast in real time so as to correct the satellite orbit in the basic navigation message in real time, it may include satellite identifiers, satellite orbit corrections and the equivalent distance error status identifiers of the satellite orbit corrections.

For example, for orbit corrections, a model may be established as follows:

Orbit corrections of n Beidou satellites and m GPS satellites at time t0 may be expressed as:

$$dORB_{t_0} = \begin{bmatrix} dx_1^{BDS} & dy_1^{BDS} & dz_1^{BDS} & d\dot{x}_1^{BDS} & d\dot{y}_1^{BDS} & d\dot{z}_1^{BDS} \\ dx_2^{BDS} & dy_2^{BDS} & dz_2^{BDS} & d\dot{x}_2^{BDS} & d\dot{y}_2^{BDS} & d\dot{z}_2^{BDS} \\ \vdots & \vdots & \vdots & \vdots & \vdots & \vdots \\ dx_n^{BDS} & dy_n^{BDS} & dz_n^{BDS} & d\dot{x}_n^{BDS} & d\dot{y}_n^{BDS} & d\dot{y}_n^{BDS} \\ dx_1^{GPS} & dy_1^{GPS} & dz_1^{GPS} & d\dot{x}_1^{GPS} & d\dot{y}_1^{GPS} & d\dot{z}_1^{GPS} \\ dx_2^{GPS} & dy_2^{GPS} & dz_2^{GPS} & d\dot{x}_2^{GPS} & d\dot{y}_2^{GPS} & d\dot{z}_2^{GPS} \\ \vdots & \vdots & \vdots & \vdots & \vdots & \vdots \\ dx_m^{GPS} & dy_m^{GPS} & dz_m^{GPS} & d\dot{x}_m^{GPS} & d\dot{y}_m^{GPS} & d\dot{z}_m^{GPS} \end{bmatrix}_{t_0}$$

In the above equation, dx, dy, dz, dẋ, dẏ, dż each represents the corrections and the rates of change of the three-dimensional vector value XYZ of the satellite orbit correction, and the superscript indicates whether the satellite is a GPS or BDS satellite, the subscript is a satellite number.

From time t0 to time t1, within the effective time of the satellite orbit correction, the satellite orbit corrections dx, dy, dz may be calculated by the following equation:

$$\begin{bmatrix} dx \\ dy \\ dz \end{bmatrix}_{t_i} = \begin{bmatrix} dx \\ dy \\ dz \end{bmatrix}_{t_0} + (t_i - t_0) \cdot \begin{bmatrix} d\dot{x} \\ d\dot{y} \\ d\dot{z} \end{bmatrix}_{t_0}$$

Through the above-mentioned orbit correction model, the satellite orbit correction may be calculated by using different methods. By accurately correcting spatial signals, satellite orbit corrections represent an orbit normal error correction, an orbit radial error correction and an orbit tangential error correction in different viewing directions. For example, the satellite orbit correction (correction value) may be comprehensively resolved by using a pseudorange observation value and a carrier-phase observation value.

As mentioned before, the satellite clock difference in the basic navigation message generally needs to be forecasted for 1~2 hours, its forecast error will increase over time. The satellite clock difference correction is to make use of the observation data of the ground observation station network and resolve the error of the satellite clock difference forecast in real time so as to correct the satellite clock difference parameters in the basic navigation message in real time, it may include satellite identifiers, satellite clock difference corrections, the satellite clock difference correction truncation errors and the satellite differential equivalent distance error status identifiers.

For example, for a clock difference correction, a model may be established as follows:

Clock difference corrections of n Beidou satellites and m GPS satellites at time t0 may be expressed as:

$$dt_{t_0} = [dt_1^{BDS} \ dt_2^{BDS} \ \ldots \ dt_n^{BDS} \ dt_1^{GPS} \ dt_2^{GPS} \ \ldots \ dt_m^{GPS}]_{t_0}$$

From time t0 to time t1, within the effective time of the satellite clock difference correction, the satellite clock difference correction dt may be calculated by the following equation:

$$dt_{t_i} = dt_{t_0}$$

The satellite clock difference correction $dt_{t_i}$ indicates the comprehensive influence of the satellite ephemeris error and the satellite star clock error on the user distance error for the i-th satellite, and is used to correct the comprehensive error of the satellite ephemeris and the satellite clock difference in the navigation message. In addition, the satellite clock difference correction residue $dt_{resi}$ may be further calculated and used. The satellite clock difference correction residue represents the part of the i-th satellite star clock difference correction that below 0.1 m, and is used to correct the error of the satellite clock difference correction below 0.1 m, thereby the performance of the parameters is further improved and spatial signals are accurately corrected.

The basic navigation message provides model parameters for ionosphere delay correction, but it is a function that fits the measured results into 8 or 14 parameters, resulting in the loss of accuracy, and generally its update frequency is low and the forecast time is long. The ionosphere correction is suitable for the correction of the real-time ionosphere delay.

For example, for an ionosphere correction, a model dI may be established as follows:

$$dI_{t_0} = \begin{bmatrix} I_1^1 & I_2^1 & \cdots & I_{ln}^1 \\ I_1^2 & I_2^2 & \cdots & I_{ln}^2 \\ \vdots & \vdots & \ddots & \vdots \\ I_1^{bn} & I_2^{bn} & \cdots & I_{ln}^{bn} \end{bmatrix}_{t_0}$$

wherein, $I_{ln}^{bn}$ is the vertical ionosphere delay on the pierce grid and is divided into [1, ln] intervals in the longitude direction and [1, bn] intervals in the latitude direction according to the defined area. From time t0 to time t1, within the effective time of the ionosphere correction, the ionosphere correction is a function of the ionosphere delay with the latitude and the longitude of the pierce point being b and l respectively. Further, the ionosphere delay function with the latitude and the longitude of the pierce point being (b, l) can be regarded as the bilinear difference of ionosphere delays off our adjacent grid points.

The environment segment area comprehensive correction is mainly used to correct the orbit clock difference residual error and the common residual error of the space environment segment error in the area.

The partition comprehensive correction parameters according to the embodiment of the present invention is further improved on the basis of the environment segment area comprehensive correction parameters (including troposphere and space segment compensation). Due to the high-accuracy orbit correction, clock difference correction and ionosphere correction, and correction of the troposphere empirical model, the rest of the error is relatively stable. Therefore, the partition setting is added, that is, partition is performed according to the observation areas, one correction is designed per area (region) and per satellite, so as to form a partition comprehensive correction parameters model to further improve the effect of the error improvement.

For example, the design of the partition comprehensive correction is based on the assumption that within a certain distance, the errors of the user (receiver) on the satellite side and the propagation path are relevant. Therefore, the observation area may be divided into multiple partitions (regions), the partition comprehensive correction is obtained by integrating the first result calculated in real time using the observation data from observation stations in each partition with the first result from observation stations in one partition, and is broadcast to the user in real time, thus realizing real-time high-accuracy positioning of the navigation user. The first result may include a carrier-phase observation residual.

For example, for a partition comprehensive correction, a model dΦ may be established as follows:

$$d\Phi_{t_0} = \begin{bmatrix} d\Phi_{1,1}^{BDS} & d\Phi_{1,2}^{BDS} & \cdots & d\Phi_{1,n}^{BDS} & d\Phi_{1,1}^{GPS} & d\Phi_{1,2}^{GPS} & \cdots & d\Phi_{1,m}^{GPS} \\ d\Phi_{2,1}^{BDS} & d\Phi_{2,2}^{BDS} & \cdots & d\Phi_{2,n}^{BDS} & d\Phi_{2,1}^{GPS} & d\Phi_{2,2}^{GPS} & \cdots & d\Phi_{2,m}^{GPS} \\ \vdots & \vdots & \ddots & \vdots & \vdots & \vdots & \ddots & \vdots \\ d\Phi_{k,1}^{BDS} & d\Phi_{k,2}^{BDS} & \cdots & d\Phi_{k,n}^{BDS} & d\Phi_{k,1}^{GPS} & d\Phi_{k,2}^{GPS} & \cdots & d\Phi_{k,m}^{GPS} \end{bmatrix}_{t_0}$$

wherein, each row represents a partition, and different columns represent partition comprehensive corrections of GPS satellites and BDS satellites in each partition. From time t0 to time t1, within the effective time of the partition comprehensive correction, the partition comprehensive correction of each satellite may be calculated by the following equation:

$$d\Phi_{ti} = d\Phi_{t0}$$

The above correction parameters generated by the correction parameters information generating apparatus at the observation station side are transported to the apparatus for superimposing, encoding and broadcasting of message parameters at the base station side. The apparatus for superimposing, encoding and broadcasting of message parameters superimposes one or more of these correction parameters with the basic navigation message as needed by way of protocol superimposition.

Figure 1A:
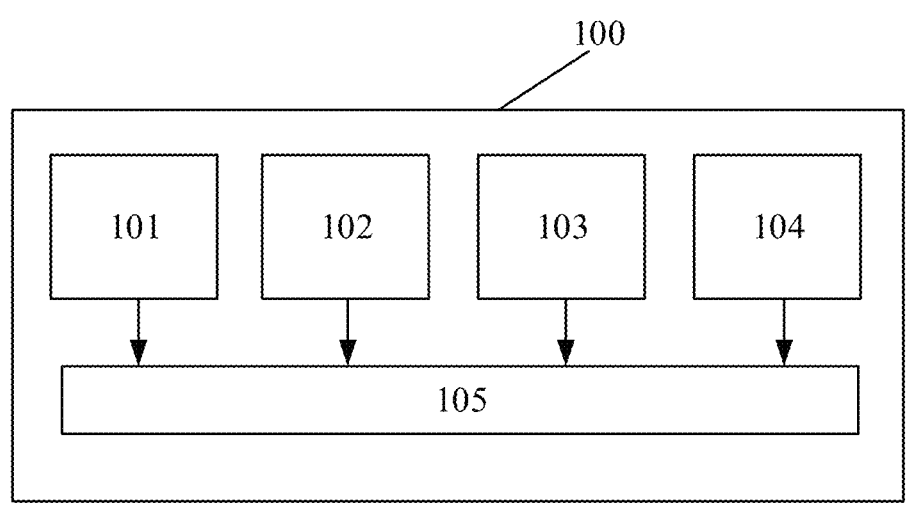
FIG. 1A schematically shows the structure of a correction parameters information generating apparatus 100.

FIG. 1A schematically shows the structure of a correction parameters information generating apparatus 100. As shown in FIG. 1A, the correction parameters information generating apparatus 100 includes an orbit correction generation unit 101, a clock difference correction generation unit 102, an ionosphere correction generation unit 103, a partition comprehensive correction generation unit 104 and a correction parameters output unit 105.

The orbit correction generation unit 101, the clock difference correction generation unit 102, the ionosphere correction generation unit 103 and the partition comprehensive correction generation unit 104 respectively generate an orbit correction, a clock difference correction, an ionosphere correction and a partition comprehensive correction as needed, the generated correction parameters are input to the correction parameters output unit 105, and the correction parameters output unit 105 outputs these correction parameters to the base station as needed for performing subsequent processes such as protocol superimposition, encoding, broadcasting and the like.

Figure 2:
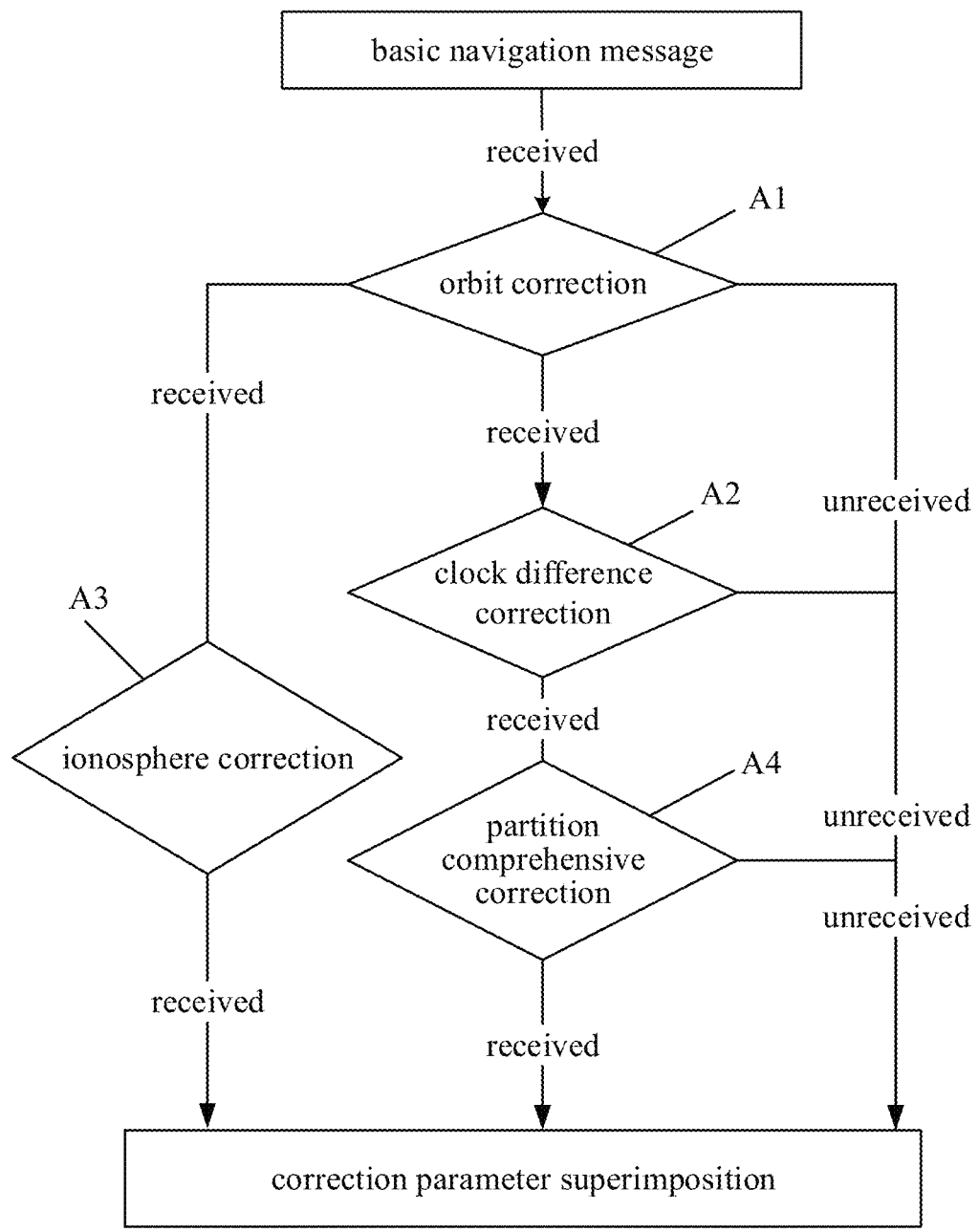
FIG. 2 schematically shows the flow of superimposing a correction parameters with a basic navigation message protocol.

FIG. 2 schematically shows the flow of protocol superimposition. In FIG. 2, A1 represents the superimposed orbit correction $x_1$, A2 represents the superimposed clock difference correction $x_2$, A3 represents the superimposed ionosphere correction $x_3$, and A4 represents the superimposed partition comprehensive correction $x_4$.

The protocol superimposition can be a combination of multiple superimpositions of different correction parameters, for example:

(1) The clock difference correction, the partition comprehensive correction (or the partition correction, the comprehensive correction) are superimposed on the basis of the basic navigation message. For example, the clock difference correction and the partition comprehensive correction may be solved accordingly by way of iteration. The specific steps of the protocol superimposition include:

S11 of generating a clock difference correction $x_2$: superimposing the clock difference correction on the basis of the basic navigation message, its observation equation is abbreviated as follows:

$$f(x_2)=\rho+c\cdot\delta t-c\cdot(\delta t^s-x_2)+T \qquad (a)$$

wherein $\rho$ is the theoretical satellite-earth distance, and $\delta t, \delta t^s$ are the clock difference of the observation station and the satellite clock difference in the basic navigation message respectively, T is the troposphere delay, $x_2$ is the satellite clock difference correction, and c is the speed of light. In equation (a), the satellite clock difference correction $x_2$ can be obtained by way of iterative calculation;

S12 of generating a partition comprehensive correction $x_4$: on the basis of step S11, superimposing the partition comprehensive correction, the observation equation is abbreviated as follows:

$$f(x_4|x_2)=\rho+c\cdot\delta t-c\cdot(\delta t^s-x_2)+T+x_4 \qquad (b)$$

wherein $x_4$ is the partition comprehensive correction, $x_4|x_2$ represents that the partition comprehensive correction $x_4$ is solved on the basis of $x_2$ (that is, on the basis of the satellite clock difference correction $x_2$ having been obtained). In equation (b), the partition comprehensive correction $x_4$ can be obtained by way of iterative calculation.

(2) The orbit correction, the clock difference correction and the partition comprehensive correction are superimposed on the basis of the basic navigation message, the orbit correction (or satellite orbit correction), the clock difference correction and the partition comprehensive correction are solved accordingly by way of iteration. The specific steps of the protocol superimposition include:

S21 of generating an orbit correction $x_1$: superimposing the orbit correction on the basis of the basic navigation message, its observation equation is abbreviated as follows:

$$f(x_1)=\rho+\Delta\rho(x_1)+c\cdot\delta t-c\cdot\delta t^s+T \qquad (c)$$

wherein $\Delta\rho(x_1)$ is the correction for the theoretical satellite-earth distance and is a function of the satellite orbit correction $x_1$. The meanings of other variables are the same as above, and will no longer be described here. In equation (c), the satellite orbit correction $x_1$ can be obtained by way of iterative calculation;

S22 of generating a clock difference correction $x_2$: on the basis of step S21, superimposing the clock difference correction $x_2$, the observation equation is abbreviated as follows:

$$f(x_2|x_1)=\rho+\Delta\rho(x_1)+c\cdot\delta t-c\cdot(\delta t^s-x_2)+T \qquad (d)$$

wherein $x_2|x_1$ represents that clock difference correction $x_2$ is solved on the basis of $x_1$ (that is, on the basis of the satellite orbit correction $x_1$ having been obtained). The meanings of other variables are the same as above, and will no longer be described here. In equation (d), the clock difference correction $x_2$ can be obtained by way of iterative calculation;

S23 of generating a partition comprehensive correction $x_4$: on the basis of step S22, further superimposing the partition comprehensive correction, the observation equation is abbreviated as follows:

$$f(x_4|x_{1,2})=\rho+\Delta\rho(x_1)+c\cdot\delta t-c\cdot(\delta t^s-x_2)+T+x_4 \qquad (e)$$

wherein $x_4$ represents the partition comprehensive correction, $x_4|x_{1,2}$ represents the partition comprehensive correction $x_4$ is solved on the basis of $x_1$ and $x_2$ (that is, on the basis of the satellite orbit correction $x_1$ and the satellite clock difference correction $x_2$ having been obtained). The meanings of other variables are the same as above, and will no longer be described here. In equation (e), the partition comprehensive correction $x_4$ can be obtained by way of iterative calculation.

(3) The orbit correction and the partition comprehensive correction are superimposed on the basis of the basic navigation message, and the orbit correction and the partition comprehensive correction are solved accordingly by way of iteration. The specific steps of the protocol superimposition include:

S31 of generating an orbit correction $x_1$: it is the same as step S21, and therefore will no longer be described here;

S32 of generating a partition comprehensive correction $x_4$: on the basis of step S31, superimposing the partition comprehensive correction, the observation equation is abbreviated as follows:

$$f(x_4|x_1)=\rho+\Delta\rho(x_1)+c\cdot\delta t-c\cdot\delta t^s+T+x_4 \qquad (g)$$

wherein $x_4|x_1$ represents the partition comprehensive correction $x_4$ is solved on the basis of $x_1$ (that is, on the basis of the satellite orbit correction $x_1$ having been obtained). The meanings of other variables are the same as above, and will no longer be described here. In equation (g), the partition comprehensive correction $x_4$ can be obtained by way of iterative calculation.

(4) The ionosphere correction and the partition comprehensive correction are superimposed on the basis of the basic navigation message, and the ionosphere correction and the partition comprehensive correction are solved accordingly. The specific steps of the protocol superimposition include:

S41 of generating an ionosphere correction $x_3$: superimposing the ionosphere correction on the basis of the basic navigation message, the observation equation is abbreviated as follows:

$$f(x_3)=\rho+c\cdot\delta t-c\cdot\delta t^s+T+x_3(b,l) \qquad (h)$$

wherein $x_3$ (b,l) represents that the ionosphere correction $x_3$ is a function of latitude and longitude (b, l), and the meanings of other variables are the same as above and will no longer be described here. Multiple observation stations obtain the ionosphere delay amount by using pseudorange observation values (the pseudorange observation value may be the original pseudorange observation value P, or may be the pseudorange observation value P(x) corrected by the correction parameters, which is not limited by the embodiment of the present invention) of multiple frequency points within a certain period of time, and generates an ionosphere grid model or an 8-parameter model or a 14-parameter model by modeling to obtain an ionosphere correction $x_3$ (b,l), so as to generate an ionosphere correction $x_3$;

S42 of generating a partition comprehensive correction $x_4$: on the basis of step S41, further superimposing the partition comprehensive correction, the observation equation is abbreviated as follows:

$$f(x_4|x_3)=\rho+c\cdot\delta t-c\cdot\delta t^s+T+x_3(b,l)+x_4 \qquad (e)$$

wherein $x_4|x_3$ represents that the partition comprehensive correction $x_4$ is solved on the basis of $x_3$ (that is, on the basis of the ionosphere correction $x_3$ having been obtained). The meanings of other variables are the same as above, and will no longer be described here. In equation (e), the partition comprehensive correction $x_4$ can be obtained by way of iterative calculation;

(5) The orbit correction, the ionosphere correction and the partition comprehensive correction are superimposed on the basis of the basic navigation message, and the orbit correction, the ionosphere correction and the partition comprehensive correction are solved accordingly. The specific steps of the protocol superimposition include:

S51 of generating an orbit correction $x_1$: it is the same as step S21, and therefore will no longer be described here;

S52 of generating an ionosphere correction $x_3$: on the basis of step S51, superimposing the ionosphere correction, the observation equation is abbreviated as follows:

$$f(x_3|x_1)=\rho+\Delta\rho(x_1)+c\cdot\delta t-c\cdot\delta t^s+T+x_3(b,l) \qquad (i)$$

wherein $x_3|x_1$ represents that the ionosphere correction $x_3$ is solved on the basis of $x_1$ (that is, on the basis of the orbit correction $x_1$ having been obtained) and the meanings of other variables are the same as above and will no longer be described here;

S53 of generating a partition comprehensive correction $x_4$: on the basis of step S52, further superimposing the partition comprehensive correction, the observation equation is abbreviated as follows:

$$f(x_4|x_{1,3})=\rho+\Delta\rho(x_1)+c\cdot\delta t-c\cdot\delta t^s+T+x_3(b,l)+x_4 \qquad (b)$$

wherein $x_4|x_{1,3}$ represents that the partition comprehensive correction $x_4$ is solved on the basis of $x_1$ and $x_3$ (that is, on the basis of the satellite orbit correction $x_1$ and the ionosphere correction $x_3$ having been obtained). The meanings of other variables are the same as above, and will no longer be described here. In equation (j), the partition comprehensive correction $x_4$ can be obtained by way of iterative calculation.

(6) The clock difference correction, the ionosphere correction and the partition comprehensive correction are superimposed on the basis of the basic navigation message, and the clock difference correction, the ionosphere correction and the partition comprehensive correction are solved accordingly. The specific steps of the protocol superimposition include: S61 of generating a clock difference correction $x_2$: it is the same as step S11, and therefore will no longer be described here;

S62 of generating an ionosphere correction $x_3$: on the basis of step S61, superimposing the ionosphere correction, the observation equation is abbreviated as follows:

$$f(x_3|x_2)=\rho+c\cdot\delta t-c\cdot(\delta t^s-x_2)+T+x_3(b,l) \qquad (k)$$

wherein $x_3|x_2$ represents that the ionosphere correction $x_3$ is solved on the basis of $x_2$ (that is, on the basis of the clock difference correction $x_2$ having been obtained) and the meanings of other variables are the same as above and will no longer be described here;

S63 of generating a partition comprehensive correction $x_4$: on the basis of step S62, further superimposing the partition comprehensive correction, the observation equation is abbreviated as follows:

$$f(x_4|x_{2,3})=\rho+c\cdot\delta t-c\cdot(\delta t^s-x_2)+T+x_3(b,l)+x_4 \qquad (m)$$

wherein $x_4|x_{23}$ represents that the partition comprehensive correction $x_4$ is solved on the basis of $x_2$ and $x_3$ (that is, on the basis of the clock difference correction $x_2$ and the ionosphere correction $x_3$ having been obtained). The meanings of other variables are the same as above, and will no longer be described here. In equation (m), the partition comprehensive correction $x_4$ can be obtained by way of iterative calculation.

(7) The orbit correction, the clock difference correction, the ionosphere correction and the partition comprehensive correction are superimposed on the basis of the basic navigation message, and the orbit correction, the clock difference correction, the ionosphere correction and the partition comprehensive correction are solved accordingly. The specific steps of the protocol superimposition include:

S71 of generating an orbit correction $x_1$: it is the same as step S21, and therefore will no longer be described here;

S72 of generating a clock difference correction $x_2$: it is the same as step S22, and therefore will no longer be described here;

S73 of generating an ionosphere correction $x_3$: on the basis of step S72, further superimposing the ionosphere correction, the observation equation is abbreviated as follows:

$$f(x_3|x_{1,2})=\rho+\Delta\rho(x_1)+c\cdot\delta t-c\cdot(\delta t^s-x_2)+T+x_3(b,l) \qquad (n)$$

wherein $x_3|x_{1,2}$ represents that the ionosphere correction $x_3$ is solved on the basis of $x_1$ and $x_2$ (that is, on the basis of the satellite orbit correction $x_1$ and the clock difference correction $x_2$ having been obtained), and the meanings of other variables are the same as above and will no longer be described here;

S74 of generating a partition comprehensive correction $x_4$: on the basis of step S73, further superimposing the partition comprehensive correction, the observation equation is abbreviated as follows:

$$f(x_4|x_{1,2,3})=\rho+\Delta\rho(x_1)+c\cdot\delta t-c\cdot(\delta t^s-x_2)+T+x_3(b,l)+x_4 \qquad (y)$$

wherein $x_4|x_{1,2,3}$ represents that the partition comprehensive correction $x_4$ is solved on the basis of $x_1$, $x_2$ and $x_3$ (that is, on the basis of the satellite orbit correction $x_1$, the clock difference correction $x_2$ and the ionosphere correction $x_3$ having been obtained). The meanings of other variables are the same as above, and will no longer be described here. In equation (y), the partition comprehensive correction $x_4$ can be obtained by way of iterative calculation.

It should be noted that the above examples (1)-(7) can all be applied to a single-frequency receiver and a multi-frequency receiver (such as a dual-frequency receiver and a tri-frequency receiver), which is not limited by the embodiment of the present invention. It should be further noted that: 1. the partition comprehensive correction $x_4$ includes, but is not limited to, at least one of a Beidou partition comprehensive correction or a GPS partition comprehensive correction; the ionospheric correction $x_3$ uses models including, but being not limited to, a grid ionosphere model, an 8-parameter model or a 14-parameter model, etc., preferably uses the grid ionosphere model; 2. the orbit correction is also called the satellite orbit correction, and the clock difference correction is also called the satellite clock difference correction, which will no longer be described throughout the description; 3. the way of iteration or the way of iterative calculation mentioned in the embodiment of the present invention is only an example and not a limitation, and in other embodiments, a numerical calculation method such as recursion may be used, and a calculation method such as integration may further be used, on which the embodiment of the present invention does not impose any limitation, and in actual practice, those skilled in the art can reasonably make a choice as needed.

According to an embodiment of the present invention, in order to improve the accuracy of positioning, correction parameters (for example, including an orbit correction, a clock difference correction, an ionosphere correction, or a partition comprehensive correction (including a troposphere correction, a space segment correction and an environment segment correction)) are defined and modeled, and correction parameters can provide multiple types of user error correction modes such as DGNSS1 (clock difference correction), DGNSS2 (orbit correction, clock difference correction), DGNSS3 (orbit correction, clock difference correction, ionosphere correction), D+PPGNSS1 (clock difference correction, comprehensive correction or partition comprehensive correction), D+PPGNSS2 (orbit correction, clock difference correction, comprehensive correction or partition comprehensive correction), D+PPGNSS3 (orbit correction, clock difference correction, ionosphere correction, comprehensive correction or partition comprehensive correction), D+PPGNSS3 (clock difference correction, comprehensive correction or partition comprehensive correction), including single-frequency, dual-frequency, tri-frequency receiver positioning, and including, but not limited to, GNSS single Beidou, single GPS and Beidou-GPS combined positioning. By superimposing the partition comprehensive correction, the decimeter-level positioning can be realized.

After determining the correction parameters such as the orbit correction, the clock difference correction, the ionosphere correction and the partition comprehensive correction, the apparatus for superimposing, encoding and broadcasting of message parameters further set the broadcast frequencies and the broadcast strategies of respective parameters based on, on one hand, the consideration of the resource limitation of the message and the resource limitation of the satellite communication link Additionally, on the other hand, the consideration of the accuracy attenuations in respective update periods of respective correction parameters.

By employing the aforementioned correction parameters, the improved accuracy of positioning can be achieved in a wide range. The corresponding representation symbols of respective parameters (including correction parameters) in the message and the specific design typical values of respective parameters can be seen in the following table. The specific design values can also be adjusted suitably in conjunction with the communication capability.

| Parameter name | | Representation symbol | Number of bits | Quantization unit | Range | Unit |
|---|---|---|---|---|---|---|
| Satellite clock difference correction | | $\Delta t_i$ | 13* | 0.1 | ±409.6 | meter |
| Satellite clock difference correction residue | | $\Delta t_{resi}$ | 4* | $2^{-7}$ | ±0.0625 | meter |
| User distance accuracy identifier | | RURAI | 4 | 1 | 0-15 | — |
| User differential distance accuracy identifier | | UDREI | 4 | 1 | 0-15 | — |
| Orbit correction | Satellite broadcast ephemeris correction | $\Delta X$ | 12* | $2^{-5}$ | ±64 | meter |
| | | $\Delta Y$ | 12* | $2^{-5}$ | ±64 | meter |
| | | $\Delta Z$ | 12* | $2^{-5}$ | ±64 | meter |
| | Equivalent distance error status identifier of the ephemeris correction | EFFEI | 4 | 1 | 0-15 | — |
| Ionosphere grid correction | | $d\tau_i$ | 9 | $2^{-3}$ | 0-63.625 | meter |
| Grid point ionosphere vertical delay correction error flag | | GIVEI | 4 | 1 | 0-15 | — |
| Partition comprehensive correction | | $\Delta T_{ij}$ | 8* | $2^{-4}$ | ±8 | nanosecond |
| GPS partition comprehensive correction | | $\Delta TG_{ij}$ | 8* | $2^{-4}$ | ±8 | nanosecond |
| Other auxiliary information | Area identifier | AREAI | 30 | 1 | — | — |
| | Satellite identifier | BDIDI | 63 | 1 | — | — |
| | GPS area identifier | AREAGI | 30 | 1 | — | — |
| | GPS satellite identifier | GPSI | 36 | 1 | — | — |

Note:
The parameters with * are represented by two's complements, and the highest bit is the sign bit.

The GPS partition comprehensive correction ($\Delta TG1j$) is the same as the partition comprehensive correction ($\Delta Tij$) in terms of definition and usage. The partition comprehensive correction $\Delta TG1j$ of each satellite in each area indicates the comprehensive correction value of the j-th GPS satellite in the i-th area at an epoch time. The area identifier (AREAI) indicates the area where the broadcast partition comprehensive correction is located. The number of area identifiers broadcast by the system corresponds to the defined integer number of partitions. When the corresponding information bit is "1", it indicates that the corresponding partition comprehensive correction parameters is broadcast; when it is "0", it indicates that broadcasting is not performed. Each satellite broadcasts partition comprehensive corrections of a certain number of partitions. The correspondence between the specific satellite code and the broadcast partition code can use the typical broadcast strategy shown in the following table. The execution of superimposition of correction parameters is not limited thereto, and the user perform identification according to identification bits.

Typical example of broadcast strategy for partition comprehensive corrections

| Satellite code | Partition code | Description |
| --- | --- | --- |
| SAT1 | 1~8, 11 | 140-degree GEOsatellite |
| SAT2 | 1, 9, 12~18 | 80-degree GEO satellite |
| SAT3 | 1, 7~14 | 110.5-degree GEO satellite |
| SAT4 | 1~8, 11 | 160-degree GEO satellite |
| SAT5 | 9, 10, 12~18 | 58.75-degree GEO satellite |

The satellite identifier (BDIDI) indicates the satellite corresponding to the broadcast satellite orbit correction and partition comprehensive correction. The system broadcasts a total of 63 bits of satellite identifiers, corresponding to 63 Beidou satellites. When the corresponding information bit is "1", it indicates that the correction parameters of the corresponding satellite is broadcast; when it is "0", it indicates that broadcasting is not performed.

The user may decide to perform the positioning resolution using the correction parameters of a certain satellite in a certain area based on the above-mentioned auxiliary information such as area identifiers, satellite identifiers and the like.

The GPS area identifier (AREAGI) indicates the area where the broadcast GPS partition comprehensive correction is located. The definition of area identifiers broadcast by the system corresponds to the defined integer number of partitions. When the corresponding information bit is "1", it indicates that the corresponding partition comprehensive correction parameters is broadcast; when it is "0", it indicates that broadcasting is not performed.

The GPS satellite identifier (GPSI) indicates the satellite corresponding to the broadcast GPS partition comprehensive correction. The system broadcasts a total of 36 bits of satellite identifiers, corresponding to 36 GPS satellites. When the corresponding information bit is "1", it indicates that the correction parameters of the corresponding satellite is broadcast; when it is "0", it indicates that broadcasting is not performed.

According to the scheme of the embodiment of the present invention, the broadcast quantity of correction parameters can be controlled to be less than 100 bps on average, so that broadcasting of correction parameters can be implemented in the 250-500 bps navigation message. Higher or lower broadcast frequencies of parameters may also be used, thus reducing the initialization time, or controlling the acceptable initial usage time extension.

In addition, considering the broadcast capabilities of the system and the communication link, the broadcast frequencies thereof cannot be too high. However, the broadcast frequency being low will cause the loss of accuracy of corrections. On the basis of the accurate calculation of corrections, the accuracy of user positioning and the broadcast efficiency of the system are compared under different broadcast frequencies, thereby determining the appropriate broadcast frequency of the correction parameters, and the smooth control is performed in combination with the different fast or slow broadcast frequencies of the correction parameters. Thus, fast speed, fast frequency and high accuracy can all be achieved.

Based on the above correction parameters model, the broadcast frequencies of the parameters can be designed as: the orbit correction parameters being 3~6 minutes; the clock difference correction parameters being 18 seconds-2 minutes; the ionosphere correction parameters being 3~6 minutes; the comprehensive correction parameters or the partition comprehensive correction parameters being 30~180 seconds.

For example, the specific broadcast frequencies selected according to the performance requirements may be as follows: the orbit correction is of the frequency of 6 minutes; the error of the clock difference correction within the frequency of 2 minutes can be controlled at 0.2 meters; and the error of the partition correction of the frequency of 3 minutes can be controlled at about 0.06 meters, as the meanings of the numbers in the above table.

The broadcast strategy only has to ensure that a predetermined accuracy can obtain within this range when it is broadcast to the user for reception and use. The accuracies of respective correction parameters are reduced within their respective update periods: therefore, if the frequency of the clock difference correction is within 2 minutes and the frequency of the partition correction is within 3 minutes, the performance can be guaranteed. Generally, the higher the broadcast frequency, the better the performance. Typical values are like that the orbit correction is of frequency of 6 minutes, the clock difference correction is of frequency of 18 seconds, and the partition correction is of frequency of 36 seconds. In this way, while the quantity of broadcast is small, the performance can be guaranteed (meeting the accuracy requirement), and the initialization time for the user to enter the substantially high-accuracy working state will not be made too long, and the user receives the measurement with high accuracy, the processing time is basically matched, and the user's use area is large, so as to achieve wide-area differential performance improvement.

The update of the correction parameters can be combined with the aforementioned protocol superimposition (protocol superimposition is the superimposition of correction parameters, for example, example (1)-example (7) are also various superimposition combinations of different correction parameters). Details are as follows.

Figure 3A:
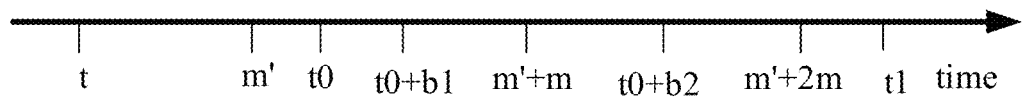
FIG. 3A is a timing matching schematic diagram of superimposing an orbit correction and a partition comprehensive correction on the basis of a basic navigation message.

For example, FIG. 3A is a timing matching schematic diagram of superimposing an orbit correction and a partition comprehensive correction on the basis of a basic navigation message, corresponding to the above example (3). As shown in FIG. 3A, the update period of the orbit correction is m minutes, where m is a positive number and $3 \leq m \leq 6$. Within the period of time between the previous broadcast ephemeris update time t and the current broadcast ephemeris update time t0: the time m' is the update time point of the last orbit correction; within the period of time between the current broadcast ephemeris update time to and the next broadcast ephemeris update time t1: the time t0+b1 is the update time point of one partition comprehensive correction, the time t0+b2 is the update time point of another partition comprehensive correction, and the time m'+m is the update time point of the first orbit correction (one valid period of time is from m' to m'+m, the next valid period of time is from m'+m to m'+2m, and so on, which will no longer be described), the time m'+2m is the update time point of the second orbit correction, where b1 and b2 are both positive numbers, and t0+b1<m'+m<t0+b2<m'+2m; specific examples are as follows:

For example, at the time t0+b1, superimposing the orbit correction and the partition comprehensive correction on the basis of the basic navigation message corresponding to the above example (3) comprises: 1. based on the basic navigation message generated at the previous broadcast ephemeris update time t, solving the orbit correction at the time m' through the above equation (c); 2. based on the basic navigation message generated at the current broadcast ephemeris update time t0 and the orbit correction at time m' obtained by solution, solving the partition comprehensive correction through the above equation (g).

As in another example, at the time t0+b2, superimposing the orbit correction and the partition comprehensive correction on the basis of the basic navigation message corresponding to the above example (3) comprises: 1. based on the basic navigation message generated at the current broadcast ephemeris update time t0, solving the orbit correction at the time m'+m through the above equation (c); 2. based on the basic navigation message generated at the current broadcast ephemeris update time t0 and the orbit correction at the time m'+m obtained by solution, solving the partition comprehensive correction through the above equation (g).

It should be noted as follows:

1. The time t0+b1, the time m', the time t0+b2 and the time m'+m mentioned in the embodiment of the present invention are merely examples and not limitation. In the actual practice, it is sufficient to meet the following requirements: within the period of time between the current broadcast ephemeris update time t0 and the next broadcast ephemeris update time t1, for the time t0+d, superimposing the orbit correction and the partition comprehensive correction on the basis of the basic navigation message comprises:

1) if t0+d<m'+m, at first, based on the basic navigation message generated at the previous broadcast ephemeris update time t, solving the orbit correction at the time m' through the above equation (c); then, based on the basic navigation message generated at the current broadcast ephemeris update time to and the orbit correction at the time m' obtained by solution, solving the partition comprehensive correction through the above equation (g);

2) if m'+(n)*m≤t0+d<m'+(n+1)*m, at first, based on the basic navigation message generated at the current broadcast ephemeris update time to, solving the orbit correction at the time m'+n*m through the above equation (c); then, based on the basic navigation message generated at the current broadcast ephemeris update time t0 and the orbit correction at the time m'+n*m obtained by solution, solving the partition comprehensive correction through the above equation (g); wherein d is a positive number and n is a positive integer.

2. The times such as time t0+b1, the time m', the time t0+b2 and the time m'+m for the identification shown in FIG. 3A are all used to only describe the embodiment instead of the actual time identification, and the length of the identification in FIG. 3A does not represent the actual length of the identification.

Figure 3B:
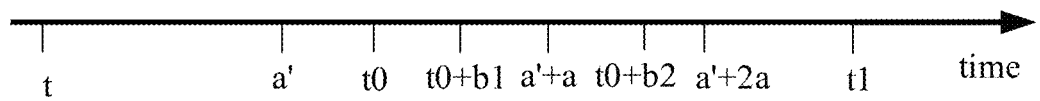
FIG. 3B is a timing matching schematic diagram of superimposing a clock difference correction and a partition comprehensive correction on the basis of a basic navigation message.

For example, FIG. 3B is a timing matching schematic diagram of superimposing a clock difference correction and a partition comprehensive correction on the basis of a basic navigation message, corresponding to the above example (1). In one implementation, the update frequency of the partition comprehensive correction is faster than the update frequency of the clock difference correction. As shown in FIG. 3B, the update period of the clock difference correction is a minutes, where a is a positive number and $0.3 \leq a \leq 2$. With the period of time between the previous broadcast ephemeris update time t and the current broadcast ephemeris update time t0: the time a' is the update time point of the last clock difference correction; within the period of time between the current broadcast ephemeris update time t0 and the next broadcast ephemeris update time t1: the time t0+b1 is the update time point of one partition comprehensive correction, the time t0+b2 is the update time point of another partition comprehensive correction, the time a'+a is the update time point of the first clock difference correction (one valid period of time is from a' to a'+a, the next valid period of time is from a'+a to a'+2a and so on, which will no longer be described), the time a'+2a is the update time point of the second clock difference correction, wherein b1 and b2 are both positive numbers, and $t0+b1<a'+a \leq t0+b2<a'+2a$. Specific examples are as follows:

For example, at the time t0+b1, superimposing the orbit correction and the partition comprehensive correction on the basis of the basic navigation message corresponding to the above example (1) comprises: 1. based on the basic navigation message generated at the previous broadcast ephemeris update time t, solving the clock difference correction at time a' through the above equation (a); 2. based on the basic navigation message generated at the current broadcast ephemeris update time t0 and the clock difference correction at the time a' obtained by solution, solving the partition comprehensive correction through the above equation (b).

As in another example, at the time t0+b2, superimposing the clock difference correction and the partition comprehensive correction on the basis of the basic navigation message corresponding to the above example (1) comprises: 1. based on the basic navigation message generated at the current broadcast ephemeris update time to, solving the clock difference correction at the time a'+a through the above equation (a); 2. based on the basic navigation message generated at the current broadcast ephemeris update time t0 and the clock difference correction at the time a'+a obtained by solution, solving the partition comprehensive correction through the above equation (b).

It should be noted as follows:

1. The time identifiers such as the time t0+b1, the time a', the time t0+b2 and the time a'+a mentioned in the embodiment of the present invention are only examples and not limitation. In the actual practice, it is sufficient to meet the following requirements: within the period of time between the current broadcast ephemeris update time t0 and the next broadcast ephemeris update time t1, for the time t0+d, superimposing the clock difference correction and the partition comprehensive correction on the basis of the basic navigation message comprises: 1) if t0+d<a'+a, at first, based on the basic navigation message generated at the previous broadcast ephemeris update time t, solving the clock difference correction at the time a' through the above equation (a); then, based on the basic navigation message generated at the current broadcast ephemeris time t0 and the clock difference correction at the time a' obtained by solution, solving the partition comprehensive correction through the above equation (b); 2) if a'+(n)*a≤t0+d<a'+(n+1)*a, at first, based on the basic navigation message generated at the current broadcast ephemeris update time to, solving the clock difference correction at the time a'+(n)*a through the above equation (a); then, based on the basic navigation message generated at the current broadcast ephemeris update time to and the clock difference correction at the time a'+(n)*a obtained by solution, solving the partition comprehensive correction through the above equation (b), wherein d is a positive number and n is a positive integer.

2. The time identifiers such as the time t0+b1, the time a', the time t0+b2 and the time a'+a for the identification shown in FIG. 3B are all used to only describe the embodiment, but not the actual time identifiers, and the length of the identification in FIG. 3B does not represent the actual length of the identification.

3. The update period of the clock difference correction can be, for example, 18 seconds. For the Beidou system, the satellite clock difference corrections of the frequency points B1 and B2 are different, and each frequency point only broadcasts the satellite clock difference correction corresponding to the frequency point.

Figure 3C:
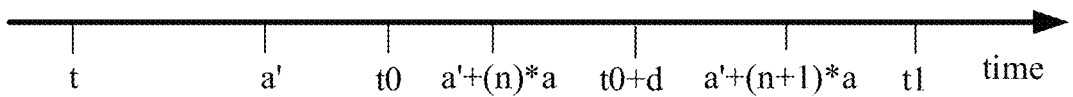
FIG. 3C is another timing matching schematic diagram of superimposing a clock difference correction and a partition comprehensive correction on the basis of a basic navigation message.

For example, in another implementation, the update frequency of the partition comprehensive correction may be slower than the update frequency of the clock difference correction: FIG. 3C is another timing matching schematic diagram of superimposing a clock difference correction and a partition comprehensive correction on the basis of a basic navigation message, corresponding to the above example (1). As shown in FIG. 3C, the update period of the clock difference correction is a minutes, where a is a positive number and $0.3 \leq a \leq 2$. Within the period of time between the previous broadcast ephemeris update time t and the current broadcast ephemeris update time t0: the time a' is the update time point of the last clock difference correction; within the period of time between the current broadcast ephemeris update time t0 and the next broadcast ephemeris update time t1: the time t0+d is the update time point of one partition comprehensive correction, and meantime $a'+(n)*a \leq t0+d < a'+(n+1)*a$ is met, where d is a positive number and n is a positive integer. Specific examples are as follows:

At the time t0+d, superimposing the clock difference correction and the partition comprehensive correction on the basis of the basic navigation message corresponding to the above example (1) comprises: at first, based on the basic navigation message generated at the current broadcast ephemeris update time to, solving the clock difference correction at time $a'+(n)*a$ through the above equation (a); then, based on the basic navigation message generated at the current broadcast ephemeris update time to and the clock difference correction at the time $a'+(n)*a$ obtained by solution, solving the partition comprehensive correction through the above equation (b).

It should be noted that the time identifiers such as the time t0+b1 and the time a'+a for the identification shown in FIG. 3C are all used to only describe the embodiment, but not the actual time identifiers, and the length of the identification in FIG. 3B does not represent the actual length of the identification.

Figure 3D:
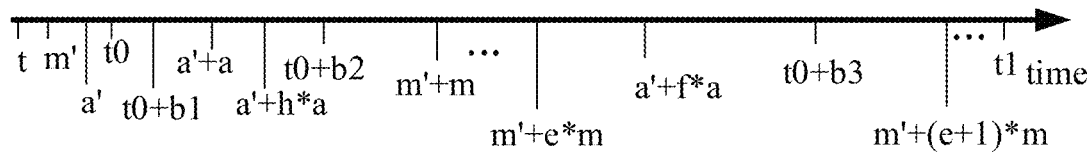
FIG. 3D is a timing matching schematic diagram of superimposing an orbit correction, a clock difference correction and a partition comprehensive correction on the basis of a basic navigation message.
Figure 3E:
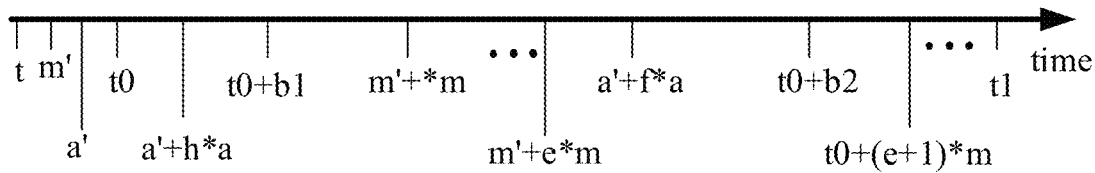
FIG. 3E is another timing matching schematic diagram of superimposing an orbit correction, a clock difference correction and a partition comprehensive correction on the basis of a basic navigation message.

For example, in one embodiment, the update frequency of the partition comprehensive correction is faster than the update frequency of the clock difference correction, and the update frequency of the clock difference correction is faster than the update frequency of the orbit correction, as shown in FIG. 3D. FIG. 3D is a timing matching schematic diagram of superimposing an orbit correction, a clock difference correction and a partition comprehensive correction on the basis of a basic navigation message corresponding to the above example (2). As shown in FIG. 3D, the update period of the orbit correction is m minutes, and the update period of the clock difference correction is a minutes, where m and a are positive numbers, and $3 \leq m \leq 6$, $0.3 \leq a \leq 2$, $a < m$. Within the period of time between the previous broadcast ephemeris update time t and the current broadcast ephemeris update time t0: the time m' is the update time point of the last orbit correction, and the time a' is the update time point of the last clock difference correction; within the period of time between the current broadcast ephemeris update time t0 and the next broadcast ephemeris update time t1: the time t0+b1 is the update time point of one partition comprehensive correction, the time t0+b2 is the update time point of another partition comprehensive correction, the time t0+b3 is the update time point of yet another partition comprehensive correction, the time m'+m is the update time point of the first orbit correction, and the time a'+a is the update time of the first clock difference correction, wherein b1, b2 and b3 are all positive numbers, and $t0+b1 < a'+a < m'+m$, $a'+h*a < t0+b2 < m'+m$, $(t0+b2)-(a'+h*a) < a$, $m'+e*m < a'+f*a < t0+b3 < m'+(e+1)*m$, $(t0+b3)-(a'+f*a) < a$, where h, e and f are all positive integers. Specific examples are as follows:

For example, at the time t0+b1, superimposing the orbit correction, the clock difference correction and the partition comprehensive correction on the basis of the basic navigation message corresponding to the above example (2) comprises: 1. based on the basic navigation message generated at the previous broadcast ephemeris update time t, solving the orbit correction at the time m' is through the above equation (c); 2. based on the basic navigation message generated the previous broadcast ephemeris update time t and the orbit correction at the time m' obtained by solution, solving the clock difference correction at the time a' through the above equation (d); 3. based on the basic navigation message generated at the current broadcast ephemeris update time t0 and the orbit correction at the time m' obtained by solution, solving the partition comprehensive correction through the above equation (e);

For example, at the time t0+b2, superimposing the orbit correction, the clock difference correction and the partition comprehensive correction on the basis of the basic navigation message corresponding to the above example (2) comprises: 1. based on the basic navigation message generated at the previous broadcast ephemeris update time t, solving the orbit correction at the time m' through the above equation (c); 2. based on the basic navigation message generated at the current broadcast ephemeris update time t0 and the orbit correction at the time m' obtained by solution, solving the clock difference correction at the time $a'+(h)*a$ through the above equation (d); 3. based on the basic navigation message generated at the current broadcast ephemeris update time t0 and the orbit correction at the time m' and the clock difference correction at the time $a'+(h)*a$ obtained by solution, solving the partition comprehensive correction through the above equation (e);

For example, at the time t0+b3, superimposing the orbit correction, the clock difference correction and the partition comprehensive correction on the basis of the basic navigation message corresponding to the above example (2) comprises: 1. based on the basic navigation message generated at the current broadcast ephemeris update time t0, solving the orbit correction at the time $m'+(e)*m$ through the above equation (c); 2. based on the basic navigation message generated at the current broadcast ephemeris update time t0 and the orbit correction at the time $m'+(e)*m$ obtained by solution, solving the clock difference correction at the time $a'+(f)*a$ through the above equation (d); 3. based on the basic navigation message generated at the current broadcast ephemeris update time t0 and the orbit correction at the time $m'+(e)*m$ and the clock difference correction at the time $a'+(f)*a$ obtained by solution, solving the partition comprehensive correction through the above equation (e);

For example, in one embodiment, the update frequency of the clock difference correction is faster than the update frequency of the partition comprehensive correction, and the update frequency of the partition comprehensive correction is faster than the update frequency of the orbit correction. FIG. 3E is another timing matching schematic diagram of superimposing an orbit correction, a clock difference correction and a partition comprehensive correction on the basis of a basic navigation message, corresponding to the above example (2). As shown in FIG. 3E, the update period of the orbit correction is m minutes, and the update period of the clock difference correction is a minutes, where m and a are positive numbers, and $3 \leq m \leq 6$, $0.3 \leq a \leq 2$. Within the period of time between the previous broadcast ephemeris update time t and the current broadcast ephemeris update time t0: the time m' is the update time point of the last orbit correction, and the time a' is the update time point of the last clock difference correction; within the period of time between the current broadcast ephemeris update time t0 and the next broadcast ephemeris update time t1: the time t0+b1 is the update time point of one partition comprehensive correction, and the time t0+b2 is the update time point of another partition comprehensive correction, where a'+h*a<t0+b1<m'+m, m'+e*m<a'+f*a<t0+b2<(e+1)*m, (t0+b1)−(e+h*a)<a, (t0+b2)−(a'+f*a)<a, where b1, b2 are positive numbers, and h, f, e are positive integer. Specific examples are as follows:

For example, at the time t0+b1, superimposing the orbit correction, the clock difference correction and the partition comprehensive correction on the basis of the basic navigation message corresponding to the above example (2) comprises: at first, based on the basic navigation message generated at the previous broadcast ephemeris update time t, solving the orbit correction at the time m' through the above equation (c); then, based on the basic navigation message generated at the current broadcast ephemeris update time t0 and the orbit correction at the time m' obtained by solution, solving the clock difference correction at time a'+h*a through the above equation (d), and finally, based on basic navigation message generated at the current navigation ephemeris update time t0 and the orbit correction at the time m' and the clock difference correction at the time a'+h*a obtained by solution, solving the partition comprehensive correction through the above equation (e);

For example, at the time t0+b2, superimposing the orbit correction, the clock difference correction and the partition comprehensive correction on the basis of the basic navigation message corresponding to the above example (2) comprises: at first, based on the basic navigation message generated at the current broadcast ephemeris update time to, solving the orbit correction at the time m'+(e)*m through the above equation (c); then, based on the basic navigation message generated at the current broadcast ephemeris update time to and the orbit correction at the time m'+(e)*m obtained by solution, solving the clock difference correction at the time a'+(f)*a through the above equation (d), and finally, based on the basic navigation message generated at the current broadcast ephemeris update time t0 and the orbit correction at time m'+(e)*m and the clock correction at time a'+(f)*a obtained by solution, solving the partition comprehensive correction through the above equation (e).

For the ionosphere correction, the update period can be, for example, 3~6 minutes. The ionosphere correction is the correction for the propagation segment (or environment segment) error. As mentioned before, multiple observation stations obtain the ionosphere delay amount by using pseudorange observation values (the pseudorange observation value may be the original pseudorange observation value P, or may be the pseudorange observation value P(x) corrected by the correction parameters, which is not limited by the embodiment of the present invention) of multiple frequency points within a certain period of time, and generates an ionosphere grid model or an 8-parameter model or a 14-parameter model by modeling to obtain an ionosphere correction $x_3$ (b,l). Therefore, there is no need to perform the timing matching for the ionosphere correction.

Therefore, for the example (5), the same parts between its timing matching procedure and the timing matching procedure of the example (3) will no longer be described, the difference thereof is as follows:

For example, at the time t0+b1, superimposing the orbit correction, the ionosphere correction and the partition comprehensive correction on the basis of the basic navigation message corresponding to the above example (5) comprises: 2. based on the basic navigation message generated at the current broadcast ephemeris update time t0 and the orbit correction at the time m' obtained by solution, solving the ionosphere correction through the above equation (i); 3. based on the basic navigation message generated at the current broadcast ephemeris update time t0 and the orbit correction at the time m' obtained by solution and the ionosphere correction, solving the partition comprehensive correction through the above equation (j).

As another example, at the time t0+b2, superimposing the orbit correction, the ionosphere correction and the partition comprehensive correction on the basis of the basic navigation message corresponding to the above example (5) comprises: 2. based on the basic navigation message generated at the current broadcast ephemeris update time t0 and the orbit correction at the time m'+m obtained by solution, solving the ionosphere correction through the above equation (i); 3. based on the basic navigation message generated at the current broadcast ephemeris update time t0 and the orbit correction at the time m'+m obtained by solution and the ionosphere correction, solving the partition comprehensive correction through the above equation (j).

For the example (6), the same parts between its timing matching procedure and the timing matching procedure of the example (1) will no longer be described:

1) When the update frequency of the partition comprehensive correction is faster than the update frequency of the clock difference correction, the difference thereof is as follows:

For example, at the time t0+b1, superimposing the orbit correction, the ionosphere correction and the partition comprehensive correction on the basis of the basic navigation message corresponding to the above example (6) comprises: 2. based on the basic navigation message generated at the current broadcast ephemeris update time t0 and the clock difference correction at the time a' obtained by solution, solving the ionosphere correction through the above equation (k); 3. based on the basic navigation message generated at the current broadcast ephemeris update time t0 and the clock difference correction at the time a' obtained by solution and the ionosphere correction, solving the partition comprehensive correction through the above equation (m);

For example, at the time t0+b1, superimposing the orbit correction, the ionosphere correction and the partition comprehensive correction on the basis of the basic navigation message corresponding to the above example (6) comprises: 2. based on the basic navigation message generated at the current broadcast ephemeris update time t0 and the clock difference correction at time a'+a obtained by solution, solving the ionosphere correction through the above equation (k); 3. based on the basic navigation message generated at the current broadcast ephemeris update time to and the clock difference correction at time a'+a obtained by solution and the ionosphere correction, solving the partition comprehensive correction through the above equation (m).

2) When the update frequency of the partition comprehensive correction is slower than the update frequency of the clock difference correction, the difference thereof is as follows:

At the time t0+d, superimposing the clock difference correction, the ionosphere correction and the partition comprehensive correction on the basis of the basic navigation message corresponding to the above example (6) comprises: further based on basic navigation generated at the current broadcast ephemeris update time t0 and the clock difference correction at the time a'+(n)*a obtained by solution, solving the ionosphere correction through the above equation (k); finally, based on the basic navigation message generated at the current broadcast ephemeris update time t0 and the clock difference correction at the time a'+(n)*a obtained by solution and the ionosphere correction, solving the partition comprehensive correction through the above equation (b).

For the example (7), the same parts between its timing matching procedure and the timing matching procedure of the example (3) will no longer be described:

1) When the update frequency of the partition comprehensive correction is faster than the update frequency of the clock difference correction and the update frequency of the clock difference correction is faster than the update frequency of the orbit correction, the difference thereof is as follows:

For example, at the time t0+b1, superimposing the orbit correction, the clock difference correction, the ionosphere correction and the partition comprehensive correction based on the basic navigation message corresponding to the above example (7) comprises: 3. then, based on the basic navigation message generated at the current broadcast ephemeris update time t0 and the orbit correction at the time m' and the clock difference correction time at the time a' obtained by solution, solving the ionosphere correction through the above equation (n); 4. finally, based on the basic navigation message generated at the current broadcast ephemeris update time t0 and the orbit correction at the time m' and the clock difference correction at the time a' obtained by solution and the ionosphere correction, solving the partition comprehensive correction through the above equation (y);

For example, at the time t0+b2, superimposing the orbit correction, the clock difference correction, the ionosphere correction and the partition comprehensive correction on the basis of the basic navigation message corresponding to the above example (7) comprises: 3. then, based on the basic navigation message generated at the current broadcast ephemeris update time t0 and the orbit correction at the time m' and the clock difference correction at the time a'+h*a obtained by solution, solving the ionosphere correction through the above equation (n); 4. finally, based on the basic navigation message generated at the current broadcast ephemeris update time t0 and the orbit correction at the time m' and the clock difference correction at the time a'+h*a obtained by solution and the ionosphere correction, solving the partition comprehensive correction through the above equation (y).

For example, at the time t0+b3, superimposing the orbit correction, the clock difference correction, the ionosphere correction and the partition comprehensive correction on the basis of the basic navigation message corresponding to the above example (7) comprises: 3. then, based on the basic navigation message generated at the current broadcast ephemeris update time t0 and the orbit correction at the time m'+(e)*m and the clock difference correction at the time a'+(f)*a obtained by solution, solving the ionosphere correction through the above equation (n); 4. finally, based on the basic navigation message generated at the current broadcast ephemeris update time t0 and the orbit correction at the time m'+(e)*m and the clock difference correction at the time a'+(f)*a and the ionosphere correction, solving the partition comprehensive correction through the above equation (y).

2) When the update frequency of the clock difference correction is faster than the update frequency of the partition comprehensive correction and the update frequency of the partition comprehensive correction is faster than the update frequency of the orbit correction, the difference thereof is as follows:

For example, at the time t0+b1, superimposing the orbit correction, the clock difference correction, the ionosphere correction and the partition comprehensive correction on the basis of the basic navigation message corresponding to the above example (7) comprises: then, based on the basic navigation message generated at the current broadcast ephemeris update time t0 and the orbit correction at the time m' and the clock difference correction at the time a'+h*a, solving the ionosphere correction through the above equation (n); and finally, based on the basic navigation message generated at the current broadcast ephemeris update time t0 and the orbit correction at the time m' and the clock difference correction at the time a'+h*a and the ionosphere correction, solving the partition comprehensive correction through the above equation (y);

For example, at the time t0+b2, superimposing the orbit correction, the clock difference correction, the ionosphere correction and the partition comprehensive correction on the basis of the basic navigation message corresponding to the above example (7) comprises: then, based on the basic navigation message generated at the current broadcast ephemeris update time t0 and the orbit correction at the time m'+(e)*m and the clock difference correction at the time a'+(f)*a obtained by solution, solving the ionosphere correction by the above equation (n); and finally, based on the basic navigation message generated at the current broadcast ephemeris update time t0 and the orbit correction at the time m'+(e)*m and the clock difference correction at the time a'+(f)*a and the ionosphere correction, solving the partition comprehensive correction through the above equation (y).

It should be noted that when receiving and/or using the correction parameters, the user end (receiver) needs to perform matching with the received correction parameters (including, but not limited to, matching in time and matching on the type of correction parameters).

The partition comprehensive correction is the comprehensive correction of a satellite currently observed in each partition. Limited by the satellite-earth interface resources, and considering the impact of the update frequency of the partition comprehensive correction on the performance, when the update time is less than 2 minutes, there is no significant difference in the accuracy of user positioning; after the update time exceeds 2 minutes, the accuracy of positioning drops significantly.

In order to meet the requirements of the broadcasting, the embodiments of the present invention describe a procedure and a method of correction parameters superimposition, and a matching procedure between them.

The use of multiple superimposition combinations of different correction parameters (i.e., multiple protocol superimpositions) may enable the user to achieve positioning requirements of different levels of accuracy under different hardware and software environments. For example, after the protocol superimposes the partition comprehensive correction, the positioning requirement of decimeter-accuracy can be realized.

When the protocol superimposition is applied to a satellite positioning system, it is required to broadcast the correction parameters to the user in the form of a navigation message through a navigation satellite. Therefore, the satellite navigation system proposed by the present invention must consider the method and strategy of parameter arrangement. The message arrangement of the correction parameters needs to consider the following factors:

(1) the design of the message frame structure of the navigation message in a compatible satellite navigation system;
(2) the use of unused fields (reserved bits) of the message resources to perform the arrangement;
(3) the loss of the message expression accuracy of the correction parameters is less.

In view of the above factors, the present invention also provides a message arrangement and broadcast method for an enhanced parameter in a satellite navigation system, which can fully utilize the remaining resources in the navigation message of the satellite navigation system, Additionally, in accordance with the repetition periods of respective pages, superframes, main frames and sub-frames of the remaining resources, arrange the different correction parameters according to their respective characteristics to be integrated with the navigation message and broadcast to the user. The message arrangement and broadcast method can be implemented by the above apparatus for superimposing, encoding and broadcasting of message parameters set at the base station, where the enhanced parameter is the correction parameters, and will no longer be described throughout the description.

Figure 4:
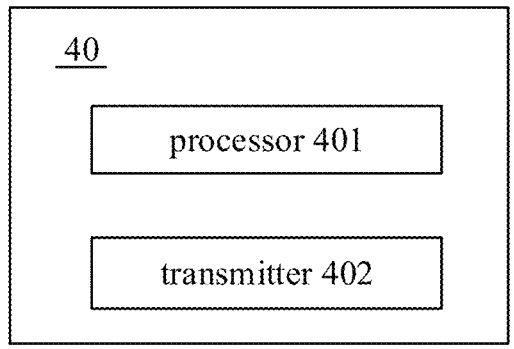
FIG. 4 shows a block diagram of the configuration of main units of a message broadcast apparatus for an enhanced parameter in a satellite navigation system according to an embodiment of the present invention.

For example, the message broadcast apparatus 40 shown in FIG. 4 may implement functions of message encoding (arrangement) and broadcast setting of the above apparatus for superimposing, encoding and broadcasting of message parameters, and the message broadcast apparatus 40 may also include a transmitter to implement the function of transmitting a signal by the switch of the base station to satellites.

FIG. 4 shows a block diagram of the configuration of main units of a message broadcast apparatus 40 for an enhanced parameter in a satellite navigation system according to an embodiment of the present invention.

As shown in FIG. 4, the message broadcast apparatus 40 include a processor 401 and a transmitter 402. The processor 401 determines an insertion position of the enhanced parameter in a reserved space in a navigation message frame structure model according to the byte size and the broadcast frequency of the enhanced parameter that needs to be broadcast, so as to perform the message arrangement of the enhanced parameter. The transmitter 402 uploads the arranged message to a broadcast satellite for broadcasting the message.

In the message broadcast apparatus 40, the navigation message frame structure model is defined by a superframe, a main frame and a sub-frame, with each of superframes containing 120 main frames, each of main frames containing 5 sub-frames, each of sub-frames containing 10 words and each of words containing 30 bits and lasting 0.06 second. Additionally, among the 5 sub-frames, sub-frame 1 is used to broadcast the present satellite's basic navigation information of the satellite navigation system, and information in a group of sub-frames 1 is transmitted by 10 pages in a time division manner, that is, one transmission of the present satellite's basic navigation information is accomplished by 10 pages composed of 10 sub-frames 1 (that is, a group of sub-frames 1 constitutes a group of pages); sub-frame 2 to sub-frame 4 are used to broadcast the integrity and differential information of the satellite navigation system, and information in respective groups of sub-frames 2-4 is transmitted by 6 pages respectively in a time division manner, that is, the transmission of the integrity and differential information of the satellite navigation system at one time is accomplished respectively by 6 pages composed of 6 sub-frames 2-4 (that is, a group of sub-frames 2-4 constitutes a group of pages respectively); and sub-frame 5 is used to broadcast all the satellite almanacs, ionosphere information and time synchronization information with other systems of the satellite navigation system, and information in a group of sub-frames 5 is transmitted by 120 pages in a time division manner, that is, one transmission of all the satellite almanacs, ionosphere information and time synchronization information with other systems of the satellite navigation system is accomplished by 120 pages composed of 120 sub-frames 5.

As described above, a satellite-based enhanced parameter is for improving the accuracy of the system's real-time service, and it differentiates the main error sources such as satellite orbit error, satellite clock difference and ionosphere delay, and establishes a model for each type of error source for correcting errors of these parameters in the basic navigation. For example, taking the Beidou system as an example, the satellite-based enhanced parameter may include satellite clock difference correction parameters, satellite orbit correction parameters, ionosphere correction parameters and partition comprehensive correction parameters, which will be described in detail hereinafter. It should be understood that the above-described satellite-based enhanced parameter is merely one example of an enhanced parameter for ease of explanation, rather than limiting the present invention thereto. The invention can also be applied to ground-based enhanced parameters.

Figure 5:
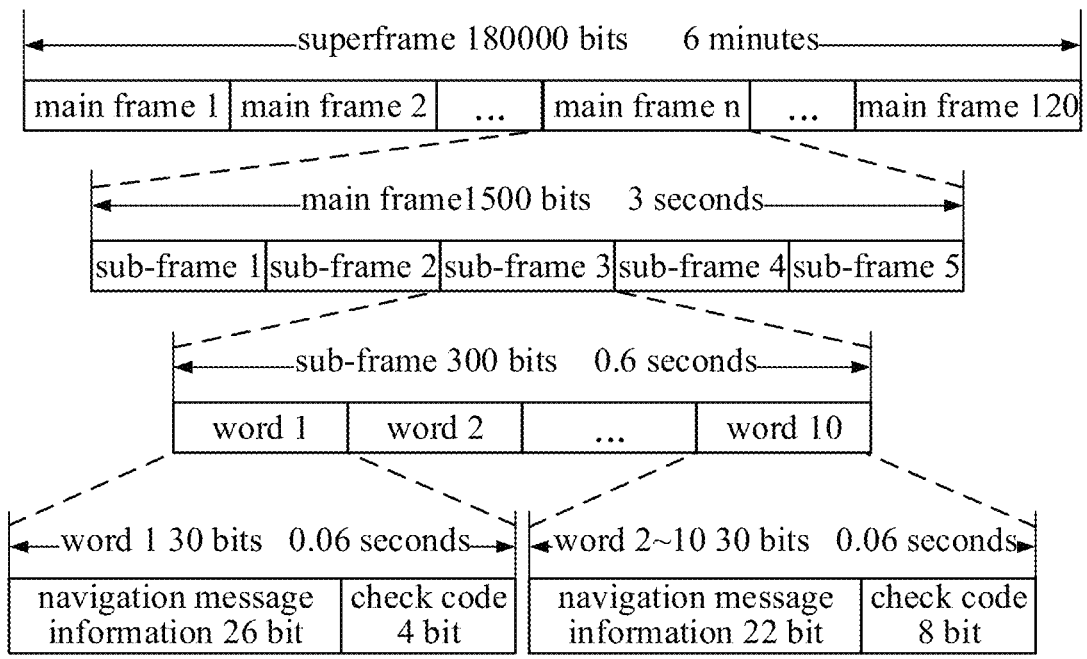
FIG. 5 is a schematic diagram illustrating a navigation message frame structure model according to an embodiment of the present invention.

In order to facilitate the understanding of the navigation message frame structure model as described above, the description will be made in conjunction with FIG. 5 in the following. FIG. 5 is a schematic diagram illustrating a navigation message frame structure model according to an embodiment of the present invention. As shown in FIG. 5, the navigation message frame structure is defined by a superframe, a main frame and a sub-frame. Each of superframes is 180000 bits and lasts 6 minutes. Each of superframes includes 120 main frames, as shown by main frame 1, main frame 2 . . . main frame n . . . main frame 120 in FIG. 5. Each of main frames is 1500 bits and lasts 3 seconds. Each of main frames includes 5 sub-frames, as shown by sub-frame 1, sub-frame 2, sub-frame 3, sub-frame 4 and sub-frame 5 in FIG. 5. Each of sub-frames is 300 bits and lasts 0.6 seconds. Each of sub-frames further includes 10 words, as shown by word 1, word 2, . . . , word 10 in FIG. 5. Each of words is 30 bits and lasts 0.06 seconds. Each of words includes two portions, i.e., navigation message information (or data) and a check code. No error-correction coding is performed on the first 15 bits of the first word (i.e., word 1) of each sub-frame, and the last 11 bits of the information are error-corrected by employing the BCH (15, 11, 1) manner. As shown in FIG. 5, word 1 contains 26-bit information bits and a 4-bit check code. The other 9 words (i.e., words 2-10) of each sub-frame are error-correction coded by employing the BCH(15, 11, 1) plus interleaving manner. As shown in FIG. 5, each of words 2-10 contains 22-bit information bits and an 8-bit check code.

Figure 6:
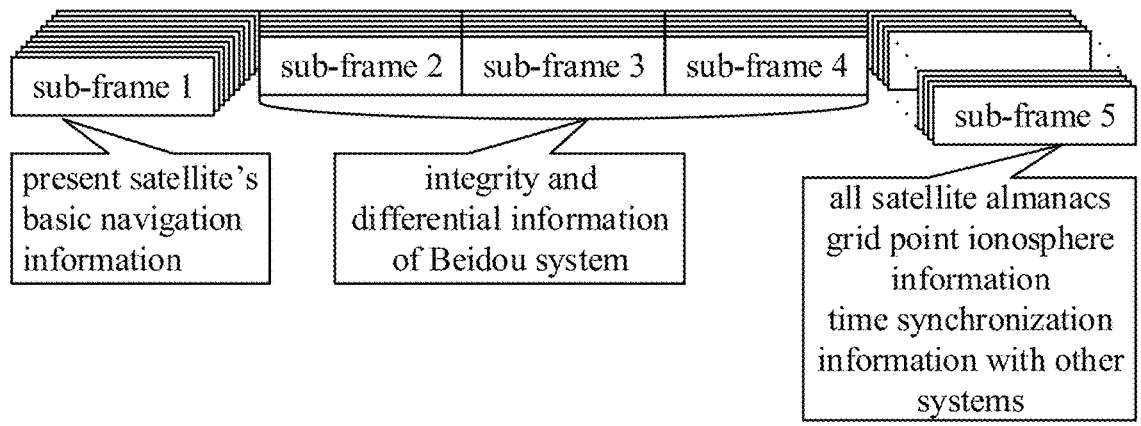
FIG. 6 is a schematic diagram illustrating navigation message information contents in a navigation message frame structure model according to an embodiment of the present invention.

To illustrate the message arrangement in the navigation message frame structure model, refer to FIG. 6. FIG. 6 is a schematic diagram illustrating navigation message information contents in a navigation message frame structure model according to an embodiment of the present invention. Taking the Beidou system as an example, the navigation message includes the present satellite's basic navigation information, all the satellite almanacs, the time synchronization information with other systems, the integrity and differential information of the Beidou system and ionosphere information. Specifically, as shown in FIG. 6, sub-frame 1 is used to broadcast the present satellite's basic navigation information, sub-frames 2-4 are used to broadcast the integrity and differential information of the Beidou system, and sub-frame 5 is used to broadcast all the satellite almanacs, the ionosphere information and the time synchronization information with other systems.

Since the broadcast frequencies (or update periods) of these navigation information are different, different broadcast frequencies can be achieved by making the sub-frames broadcasting them respectively constitute separate pages. As shown in FIG. 6, completing one transmission of the present satellite's basic navigation information requires a group of pages of sub-frame 1 to broadcast, in which a group of pages of sub-frame 1 consists of 10 pages (that is, transmitted in a time division manner), that is, one transmission of the present satellite's basic navigation information is completed by ten continuous sub-frames 1 in the time domain. It can be seen that the update period of the present satellite's basic navigation information is 30 seconds (each sub-frame 1 is 1 page, therefore 10 pages are 10 sub-frames 1, and the update period of 1 sub-frame 1 is 3 seconds, so the update period of a group of pages of sub-frame 1 is 3 seconds*10=30 seconds). Completing one transmission of the integrity and differential information of the Beidou system requires a group of pages of sub-frames 2-4 to broadcast, in which a group of pages of sub-frames 2-4 consists of 6 pages (that is, transmitted in a time division manner) respectively, that is, one transmission of the integrity and differential information of the Beidou system is completed by 6 consecutive sub-frames 2-4 in the time domain respectively. It can be seen that the update period of the integrity and differential information of the Beidou system is 18 seconds (each of sub-frames 2-4 is 1 page respectively, therefore 6 pages are 6 sub-frames 2-4 respectively, and the update period of a group of pages of sub-frames 2-4 is 3 seconds*6=18 seconds). A group of pages of sub-frame 5 consists of 120 pages (that is, transmitted in a time division manner), that is, one transmission of all the satellite almanacs, the ionosphere information and the time synchronization information with other systems is completed by continuous 120 sub-frames 5 in the time domain. It can be seen that the update period of all the satellite almanacs, the ionosphere information and the time synchronization information with other systems is 6 minutes (each sub-frame 5 is 1 page, therefore 120 pages are 120 sub-frames 5, and the update period of a group of pages of sub-frame 5 is 3 seconds*120=360 seconds=6 minutes).

Figure 7:
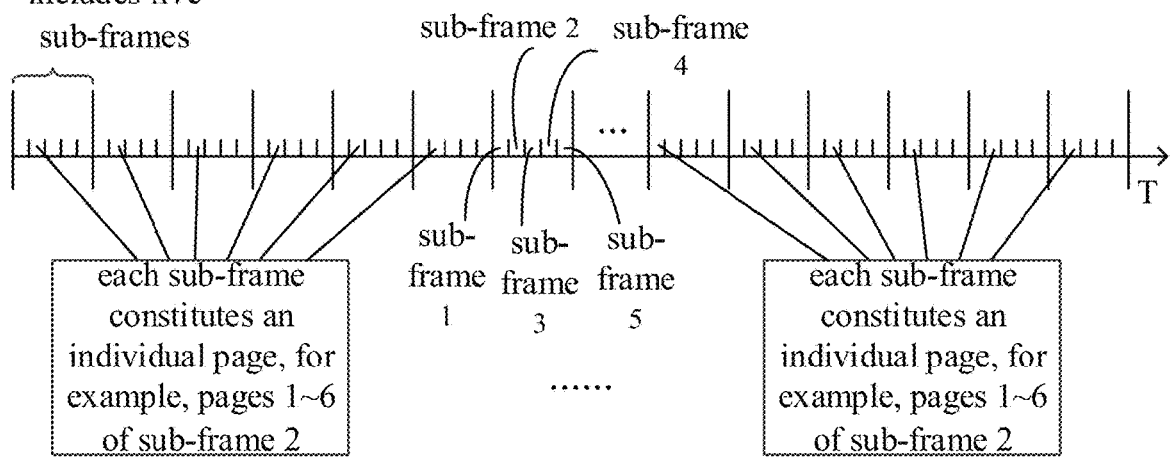
FIG. 7 is a schematic diagram illustrating an arrangement relationship in time of pages of a sub-frame in a navigation message frame structure model according to an embodiment of the present invention.

A page reflects the sequential changes of each sub-frame in the time domain. In order for easier understanding of the concept of a page, refer to FIG. 7. FIG. 7 is a schematic diagram illustrating an arrangement relationship in time of pages of a sub-frame in a navigation message frame structure model according to an embodiment of the present invention. As shown in FIG. 7, along a time axis T, main frames each including 5 sub-frames are sequentially broadcast. That is to say, after sub-frame 1, sub-frame 2, sub-frame 3, sub-frame 4 and sub-frame 5 of the first main frame are broadcast in sequence, the followed is sub-frame 1, sub-frame 2, sub-frame 3, sub-frame 4 and sub-frame 5 of the second main frame, and so on. It can be seen that the repetition period of the same sub-frame is equivalent to the length of one main frame, that is, 3 seconds.

In FIG. 7, taking sub-frame 2 as an example, sub-frame 2 of the first main frame is page 1 of sub-frame 2, sub-frame 2 of the second main frame is page 2 of sub-frame 2, sub-frame 2 of the third main frame is page 3 of sub-frame 2, sub-frame 2 of the fourth main frame is page 4 of sub-frame 2, sub-frame 2 of the fifth main frame is page 5 of sub-frame 2, and sub-frame 2 of the sixth main frame is page 6 of sub-frame 2. That is to say, sub-frames 2 of the six main frames consecutive in time constitute 6 pages of sub-frame 2, and the message information broadcast by these 6 pages (that is, 6 sub-frames 2) is different between each other. Therefore, the broadcast frequency (that is, update frequency) of the message information broadcast by the 6 pages of sub-frame 2 is 18 seconds. Similarly, sub-frames 2 of the seventh to twelfth main frames may constitute 6 pages of the next group (that is, the next update period) of sub-frame 2 for broadcasting the updated message information.

In the navigation message frame structure model as described above, in addition to information bits for broadcasting the present satellite's basic navigation information, all the satellite almanacs, the time synchronization information with other systems, the integrity and differential information of the Beidou system and the ionosphere information, unused information bits are usually reserved. Specifically, in the navigation message frame structure model shown in FIG. 5, the lower 150 bits of pages 1-10 of sub-frame 1, pages 1-6 of sub-frame 4 and pages 14~34, pages 74-94, pages 103~120 of sub-frame 5 are reserved information bits. In addition, it can be known according to the usage case of the navigation message link resource that, currently, the lower 120 bits of sub-frame 3, sub-frame 4 and pages 117~120 of sub-frame 5 are reserved information bits (that is, free resource bits). Therefore, satellite-level enhanced parameters can be further broadcast by using these reserved information bits.

Considering the page setting of each sub-frame shown in FIG. 5 and the case of reserved information bits of each sub-frame as described above synthetically, the message information broadcast by sub-frame 3 and sub-frame 4 can implement an update period of 3 seconds and an integral multiple thereof while the message information broadcast by sub-frame 5 may implement an update period of 6 minutes. Therefore, the processor 401 may determine into which reserved information bit in which page of which sub-frame the enhanced parameter is inserted to be broadcast according to the byte size and the broadcast frequency of the enhanced parameter (e.g., a satellite-based enhanced parameter) that needs to be broadcast. For example, according to the use requirement of the satellite clock difference correction, its update period is 18 seconds. Therefore, the satellite clock difference correction can be inserted into reserved information bits of sub-frame 2/3 to be broadcast, so as to achieve the broadcast frequency of 18 seconds. The update period of the satellite orbit correction is 6 minutes, thus it can be inserted into reserved information bits of sub-frame 5 to be broadcast, so as to achieve the broadcast frequency of 6 minutes.

After the processor 401 completes the message arrangement of the enhanced parameter, the transmitter 402 may upload the arranged message to a broadcast satellite (e.g., the I-branch of the GEO satellite) for broadcasting the message. Thereby, a user terminal can receive the broadcast message, thus obtain the enhanced parameter so as to correct the error in the basic navigation information to improve the navigation accuracy.

It should be noted that although the navigation message frame structure model given in FIG. 5 and FIG. 6 takes the Beidou system as an example, the present invention is not limited thereto, and those skilled in the art can employ the navigation message frame structure model of any other suitable navigation system.

In the message broadcast apparatus 40 for the enhanced parameter in the satellite navigation system according to the embodiment of the present invention, by making the basic navigation information and enhanced information be uniformly broadcast, the scalability of the navigation message is improved, the satellite-and-earth-integrated flexible broadcast of the navigation message is realized, the flexibility of message broadcasting is improved, the user performance is improved, and the utilization of channel link resources is improved.

Optionally, in the above message broadcast apparatus 40 for the enhanced parameter in the satellite navigation system, the processor 401 may determine the byte size and the broadcast frequency of the enhanced parameter according to a quantization range and a quantization accuracy of the enhanced parameter respectively.

Specifically, the accuracy of basic navigation satellite broadcast ephemeris is usually better than 10 meters. The URE (User Range Error) increases when orbit maneuvers. When the URE is greater than a certain numerical value, this satellite may be regarded as being unavailable in the short term, and the orbital radial error is classified as a clock difference. For this reason, the range of an orbit correction may be set as a range of 3 times, that is, ±30 meters can meet the requirements. Taking into account further abnormal cases, this range can be appropriately enlarged, for example, the typical value is set to ±64 meters. Taking into account the need for decimeter-level wide-area differential accuracy, the quantization accuracy of this parameter can be designed on the centimeters-level.

The existing clock difference can represent ±409 meters with a quantization error of 0.1 meters. In order to improve the accuracy of the clock difference correction, the clock difference correction residue is increased, and the range of the residue is ±0.0625 meters. Taking into account the need for decimeter-level wide-area differential accuracy, the quantization accuracy can be designed on the centimeters-level.

The partition correction is made on the basis of the correction of the clock difference. The calculation of the highest accuracy of positioning needs using such correction. The accuracy of the resolving and the parameter fitting of the clock difference is usually better than 1 nanosecond, and the accuracy of the orbit correction is also better than 2 nanoseconds. Therefore, the range of the partition correction is set at ±5 nanoseconds so as to satisfy the representation requirement of the parameter. This range can be set as ±8 nanoseconds in consideration of further abnormal cases. Other cases beyond the representation range will be uniformly classified into the clock difference parameter. Taking into account the requirement of high accuracy, the quantization unit of this parameter can be 0.0625 nanoseconds, and the truncation error at this time is 1 cm.

Ionosphere correction parameters use models including, but being not limited to, grid ionosphere models, 8-parameter models, or 14-parameter models, and preferably use grid ionosphere models. The accuracy of the resolving of the grid ionosphere is about 0.5 meters and the quantization accuracy of too high is a waste for resources. The design for the quantization accuracy of 0.1 meter can meet the requirement. The maximum delay is generally no more than 50 meters, and larger delays can be marked as unavailable. Therefore, the value of this parameter can be designed in the range of tens of meters, with a typical value being 63 meters.

According to the above design considerations for the quantization range and the quantization accuracy of each enhanced parameter, the byte size and the update period of each enhanced parameter may be determined. For example, the update period of the satellite clock difference correction parameters is preferably 18 seconds, the update period of the satellite orbit correction parameters is preferably 6 minutes, the update period of the partition comprehensive correction parameters is preferably 36 seconds, and the update period of the ionosphere correction parameter is preferably 3 minutes. As another example, each partition comprehensive correction occupies 8 bits of information bits, and each satellite's satellite orbit correction occupies 40 bits of information bits, and so on. As described above, the message arrangement scheme of each enhanced parameter in the navigation message frame structure model may be determined according to the byte size and update period of each enhanced parameter.

Optionally, in the above message broadcast apparatus 40 for the enhanced parameter in the satellite navigation system, the enhanced parameter may include satellite clock difference correction parameters and partition comprehensive correction parameters, and the processor 401 may insert the satellite clock difference correction parameters into a first group of predetermined positions in the reserved space of sub-frame 2 and sub-frame 3 and transmits the satellite clock difference correction parameters by 6 pages in a time division manner (that is, one broadcast of the satellite clock difference correction parameters is completed by 6 pages), and insert the partition comprehensive correction parameters into a second group of predetermined positions in the reserved space of sub-frame 2 to sub-frame 4 and transmits the partition comprehensive correction parameters by the 12 pages in a time division manner (that is, one broadcast of the partition comprehensive correction parameters is completed by 12 pages in sub-frame 2 to sub-frame 4 respectively).

Specifically, as described above, the update period of the satellite clock difference correction is 18 seconds. As shown in FIG. 5, the update period of the integrity and differential information of the Beidou system broadcast by sub-frames 2-4 via 6 pages is also 18 seconds. Therefore, the satellite clock difference correction parameters may be inserted into certain information bits in the reserved space in sub-frames 2-4 to achieve the update period of 18 seconds. Here, it should be understood that choosing to insert the satellite clock difference correction parameters into the first group of predetermined positions in the reserved space of sub-frame 2 and sub-frame 3 is only as an example, and the present invention is not limited thereto. Those skilled in the art may select other suitable reserved information bits according to the teachings of the present invention.

As described above, the update period of the partition comprehensive correction is 36 seconds. Although, as shown in FIG. 5, the update period of the integrity and differential information of the Beidou system broadcast by sub-frames 2-4 via 6 pages is 18 seconds, if two groups of 6 pages (i.e., 12 pages) of sub-frames 2-4 are used to broadcast, an update period of 36 seconds can also be achieved. For example, taking FIG. 7 as an example, the partition comprehensive correction parameters may be broadcast through certain information bits in the reserved space of sub-frames 2-4 in the first to twelfth main frames, and thereby one broadcast of the partition comprehensive correction parameters may be achieved.

It should be understood that the first group of predetermined positions and the second group of predetermined positions described herein is in order for distinguishing a set of reserved information bits for broadcasting the satellite clock difference correction parameters from a set of reserved information bits for broadcasting the partition comprehensive correction parameters. However, it is possible that a part of the positions in the first group of predetermined positions coincide with a part of positions in the second group of predetermined positions, that is, the broadcasting of the satellite clock difference correction parameters and the broadcasting of the partition comprehensive correction parameters may share some reserved information bits. The message arrangements of the satellite clock difference correction parameters and the partition comprehensive correction parameters will be further described in detail by way of examples hereinafter.

As described above, sub-frames 2-4 may not be fixed to be composed of 6 pages respectively, that is, the update period of the message broadcast may not be fixed at 18 seconds, but may be implemented as an update period of a multiple of 3 seconds. Therefore, by flexibly arranging pages of a sub-frame, the dynamic adjustment, the flexible allocation and the combination of the rapid and slow update frequencies of the message arrangement are realized, thereby saving resources.

Optionally, in the above message broadcast apparatus 40 for the enhanced parameter in the satellite navigation system, the enhanced parameter includes partition comprehensive correction parameters, and the partition comprehensive correction parameters include partition comprehensive corrections, area identifiers and satellite identifiers. Additionally, the area identifiers are used for, for each of areas in the satellite navigation system, employing a 1-bit information bit respectively to identify whether there is a partition comprehensive correction that needs to be broadcast, and the processor 401 inserts the area identifiers into a third group of predetermined positions in the reserved space of page 1 of sub-frame 2. Additionally, the satellite identifiers are used for, for each of satellites in the satellite navigation system, employing a 1-bit information bit respectively to identify whether there is a partition comprehensive correction that needs to be broadcast, and the processor 401 inserts the satellite identifiers into a fourth group of predetermined positions in the reserved space of page 2 to page 4 of sub-frame 2. Additionally, the processor 401 inserts partition comprehensive corrections, which correspond to different areas and different satellites respectively and needs to be broadcast, into a fifth group of predetermined positions in the reserved space of page 1 to page 6 of sub-frame 3 and sub-frame 4 sequentially. Wherein. the broadcast period of the partition comprehensive correction parameters is 30 seconds to 3 minutes, and preferably 36 seconds. The embodiment of the present invention takes 36 seconds as an example, but is merely an example, not a limitation.

Specifically, the satellite navigation system can be divided into multiple areas, and each of areas broadcasts one partition comprehensive correction. Limited by satellite downlink navigation signal link resources, different satellites may broadcast different partition comprehensive corrections. Here, for the sake of easily understanding, the Beidou satellite navigation system is still taken as an example for illustration by way of examples. In the Beidou satellite navigation system, for example, if the system is divided into 30 areas, there are a total of 63 satellites. Therefore, for combinations of different areas and different satellites, there may be a total of 30×63=1890 partition comprehensive corrections. However, usually only a part of the areas and a part of satellites need to broadcast the corresponding partition comprehensive corrections. Therefore, if information bits are allocated for all possible partition comprehensive corrections for broadcasting them, excessive channel link resources will be occupied, resulting in a waste of resources.

In order to save resources, the present invention dynamically adjusts the information resource mode and broadcasts partition comprehensive corrections by employing a shared identification bit. In order to facilitate understanding of the specific message arrangement manner of the present invention, a detailed description will be made in conjunction with FIGS. 8A to 8L below. FIGS. 8A to 8L are schematic diagrams respectively illustrating examples of message arrangements of pages 1-6 of sub-frames 2-4 for broadcasting partition comprehensive correction parameters according to an embodiment of the present invention. As shown on the far left of each figure, a sub-frame number and page number i are shown. The numbers above the information bit sequence indicate the bit numbers of the corresponding information bits in the page, MSB represents the most significant bit, and LSB represents the least significant bit.

Figures 1, 8A:
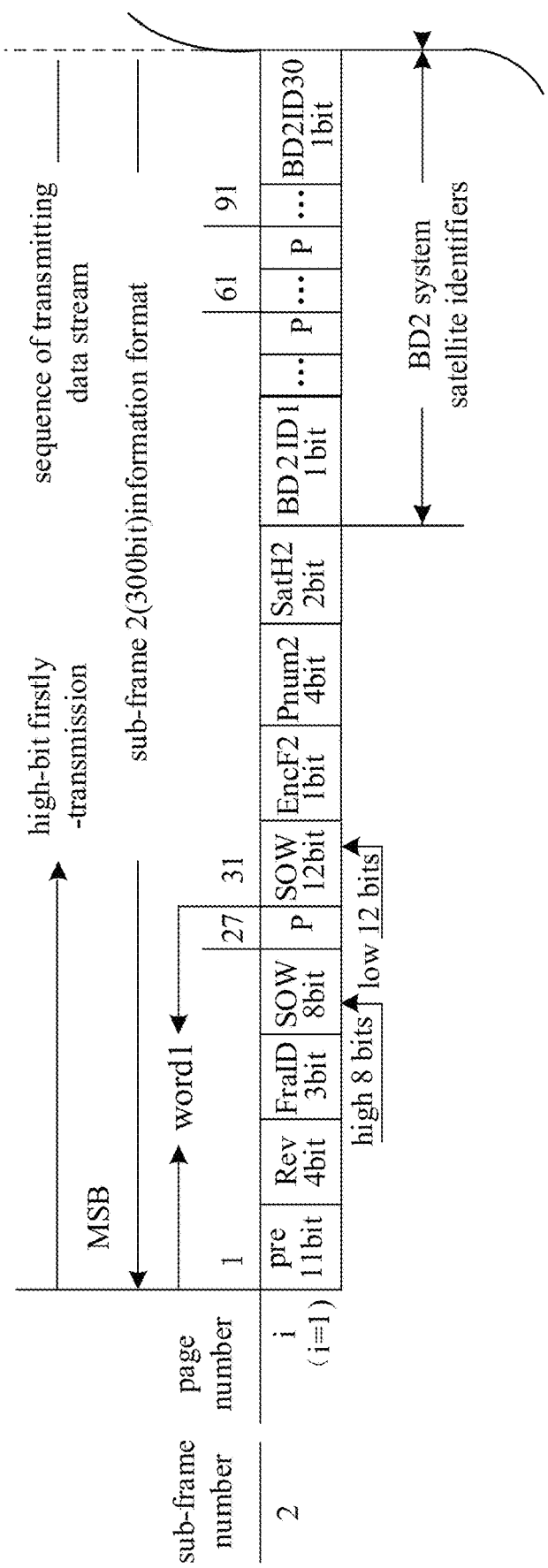
FIGS. 8A to 8L are schematic diagrams respectively illustrating examples of message arrangements of pages 1-6 of sub-frames 2-4 for broadcasting partition comprehensive correction parameters according to an embodiment of the present invention.
Figures 2, 8A:
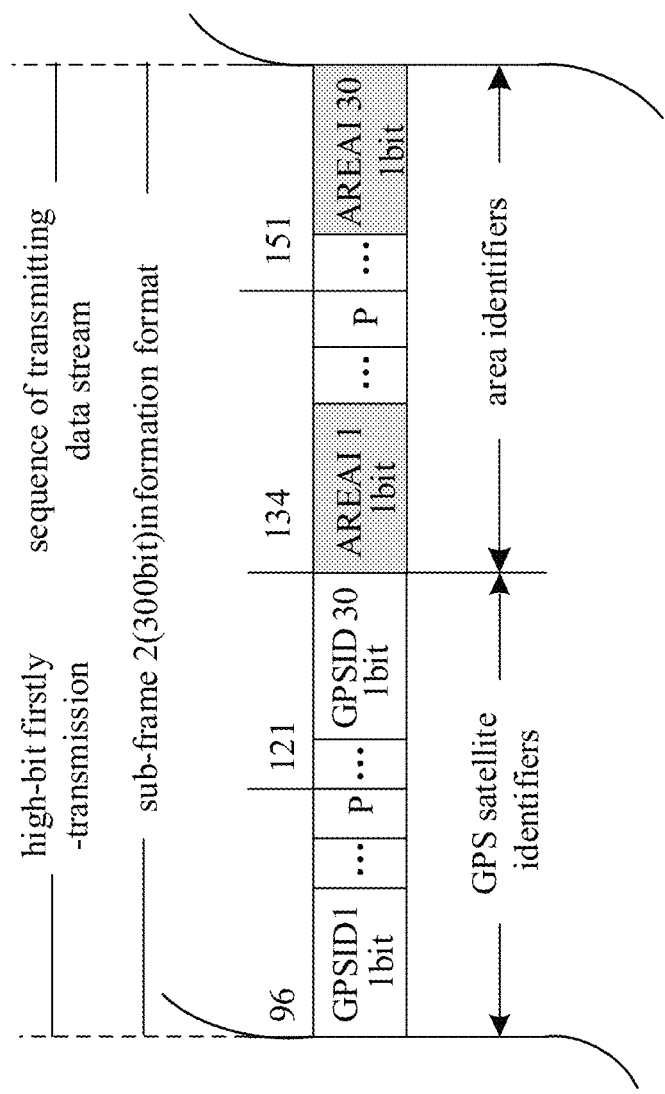
Figures 3, 8A:
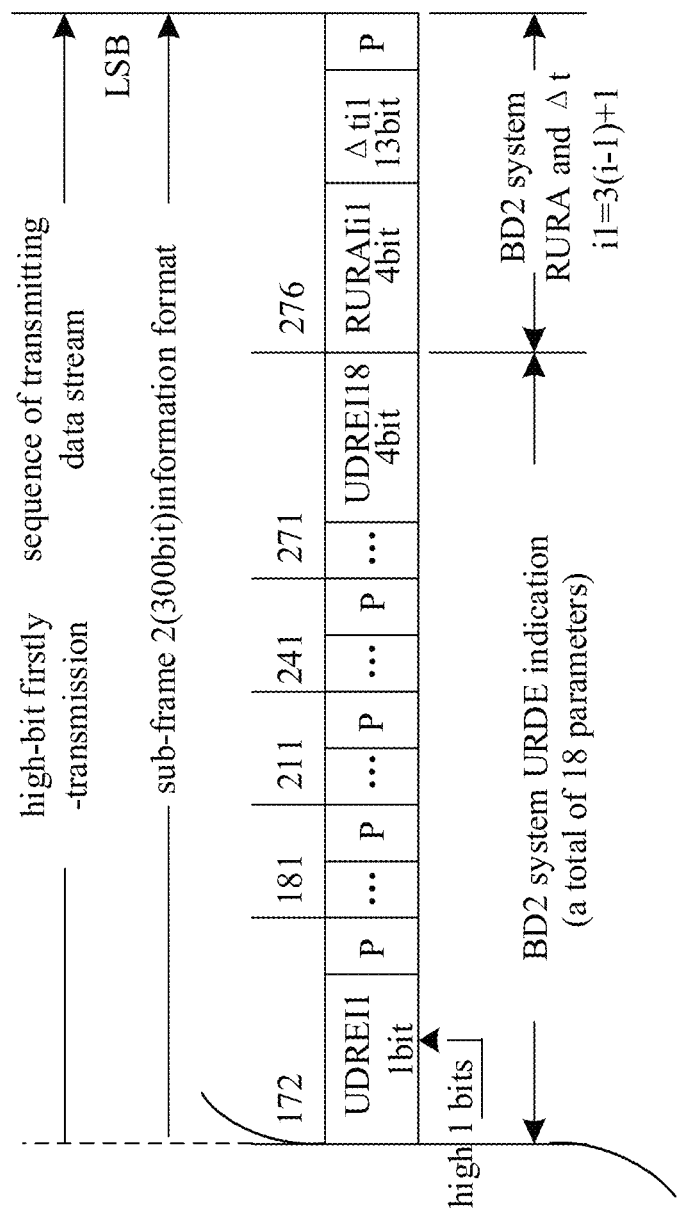

Firstly, area identifiers are set to be used for, for each of 30 areas, employing a 1-bit information bit respectively to identify whether there is a partition comprehensive correction that needs to be broadcast. FIG. 8A shows the message arrangement of page 1 of sub-frame 2. As shown in FIG. 8A, the 134th bit is used to broadcast the area identifier AREAI1 of area 1, and when this identification bit is "1", it indicates that there is a partition comprehensive correction that needs to be broadcast in area 1, and when this identification bit is "0", it indicates that there is no partition comprehensive correction that needs to be broadcast in area 1. Similarly, although not shown in FIG. 8A, the 135th bit is used to broadcast the area identifier AREAI2 of area 2, and when this identification bit is "1", it indicates that there is a partition comprehensive correction that needs to be broadcast in area 2, and when this identification bit is "0", it indicates that there is no partition comprehensive correction that needs to be broadcast in area 2, and so on. Finally, the 171th bit is used to broadcast the area identifier AREAI30 of area 30, and when this identification bit is "1", it indicates that there is a partition comprehensive correction that needs to be broadcast in area 30, and when this identification bit is "0", it indicates that there is no partition comprehensive correction that needs to be broadcast in area 30. It should be noted that "P" in the figure represents 8 bits of check bits. It can be understood that, here, the 134th bit to the 142th bit and the 151th bit to the 170th bit may correspond to the third group of predetermined positions as described above, for broadcasting the area identifiers AREI1 to AREI30 of 30 areas.

Figures 1, 8B:
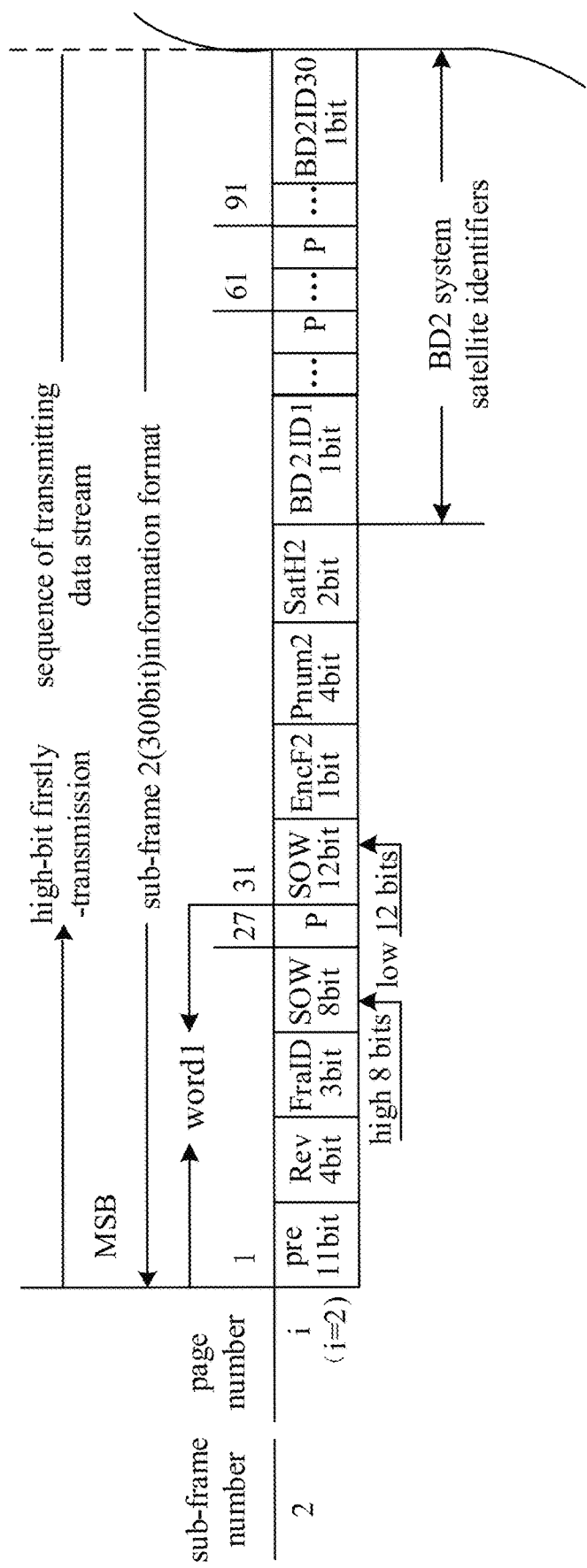
Figures 2, 8B:
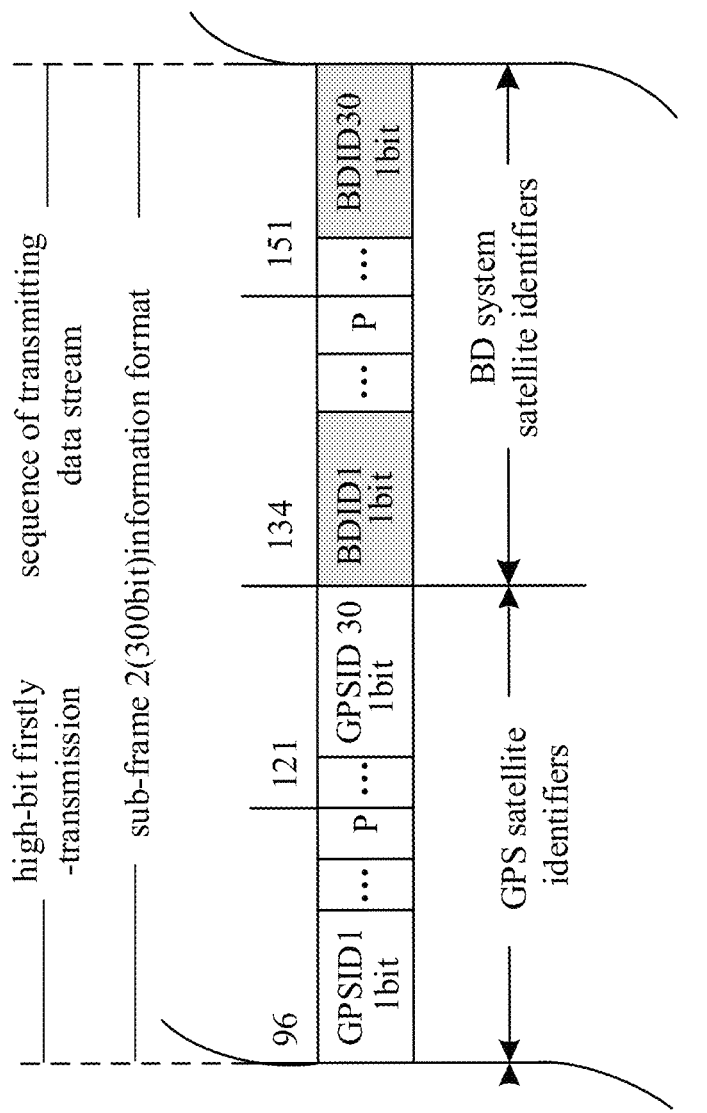
Figures 3, 8B:
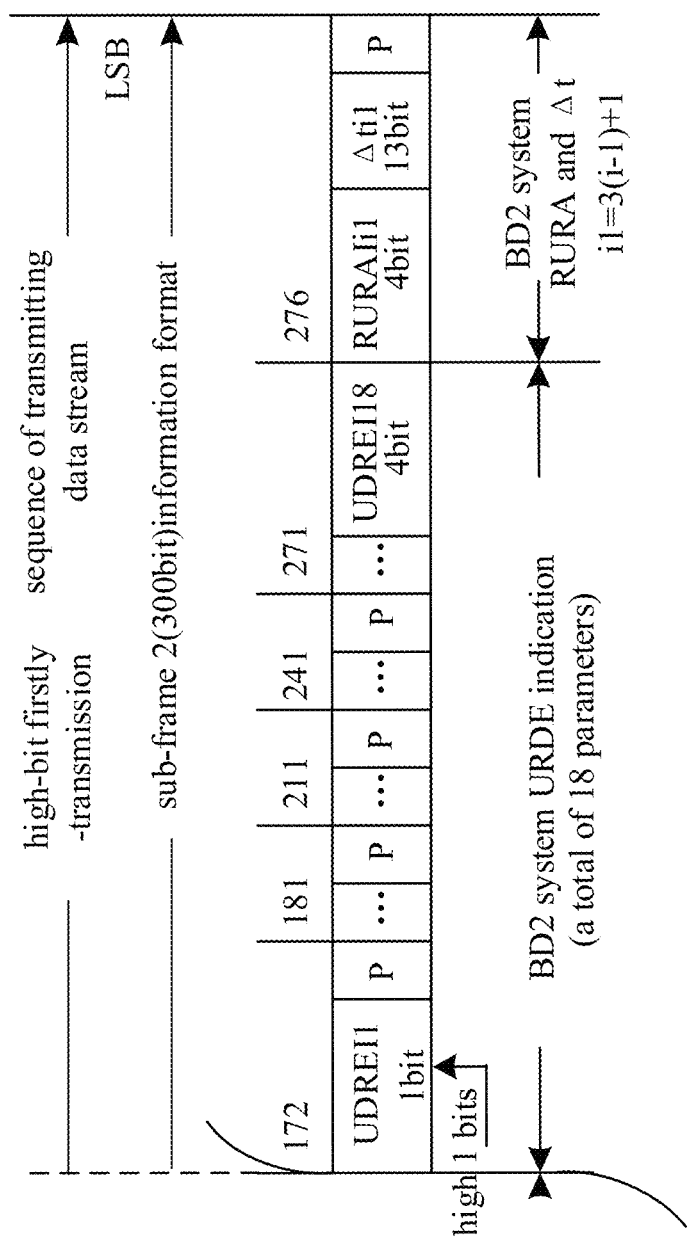
Figures 1, 8C:
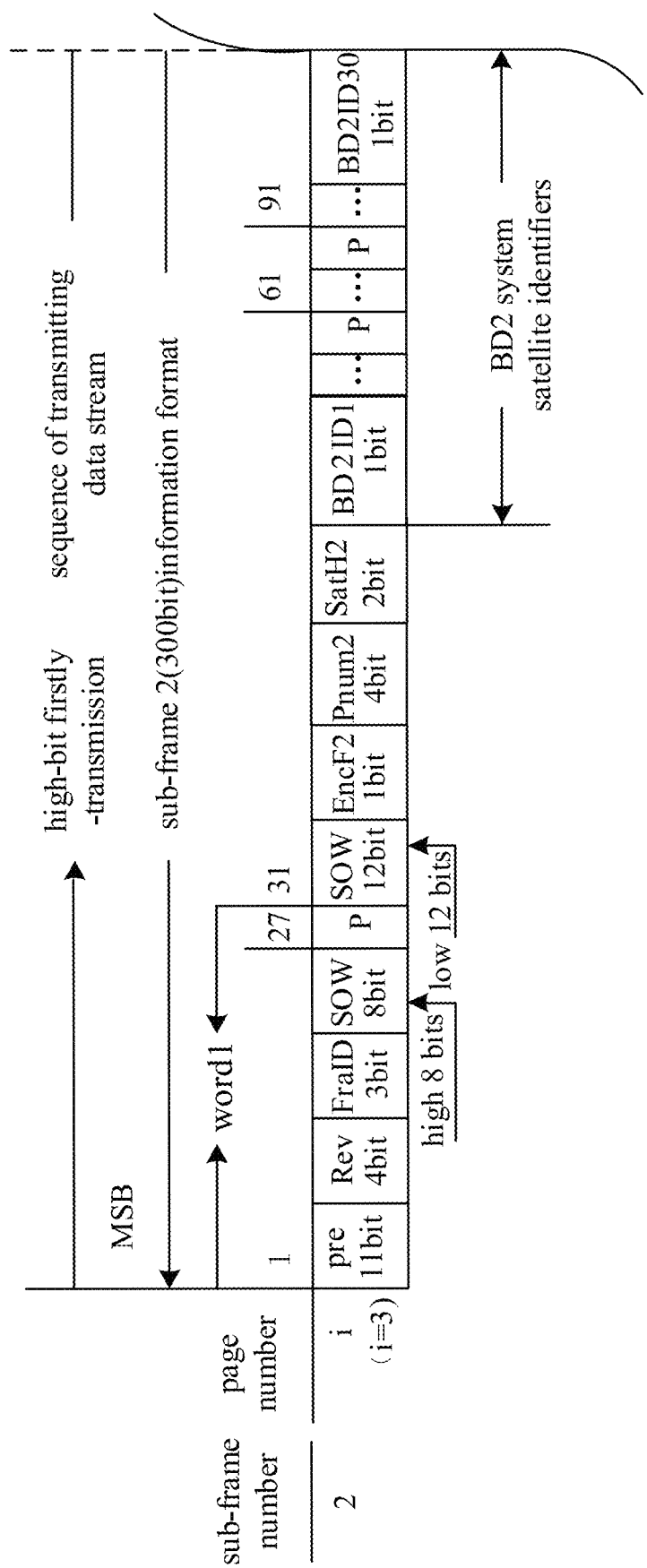
Figures 2, 8C:
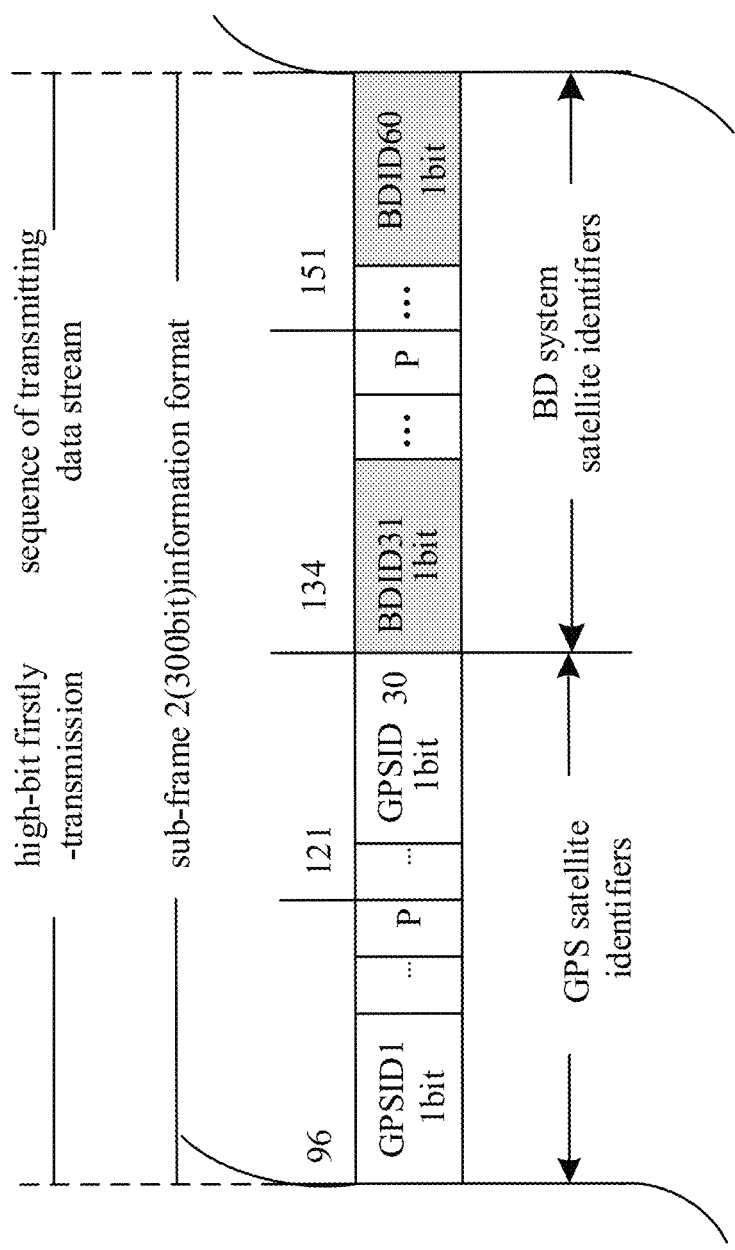
Figures 3, 8C:
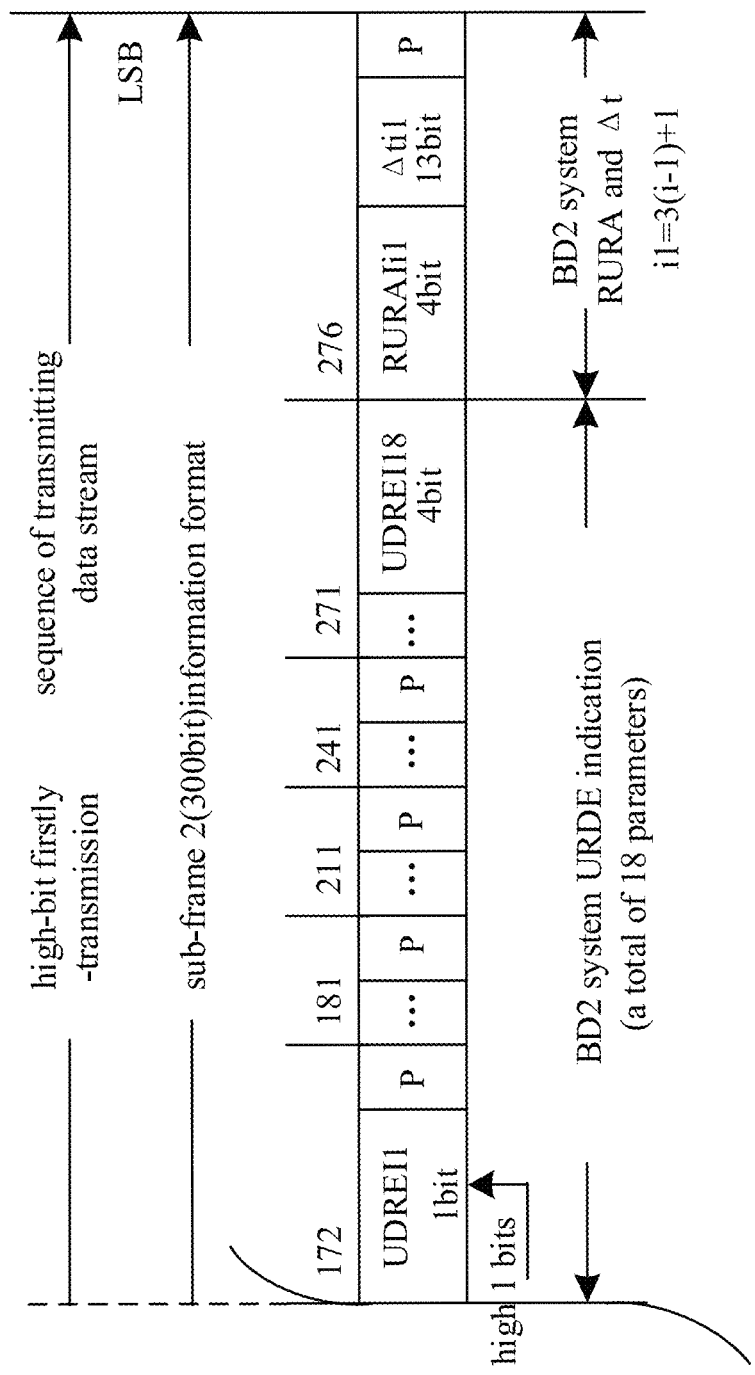
Figures 1, 8D:
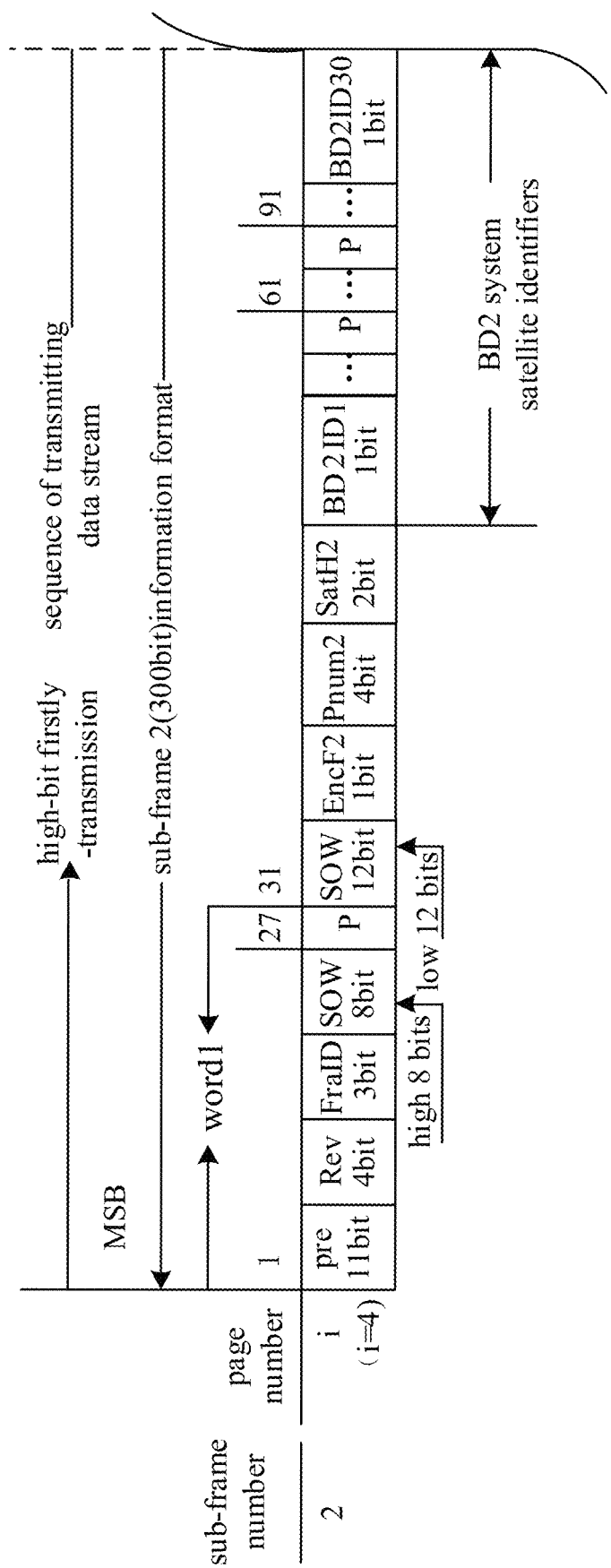
Figures 2, 8D:
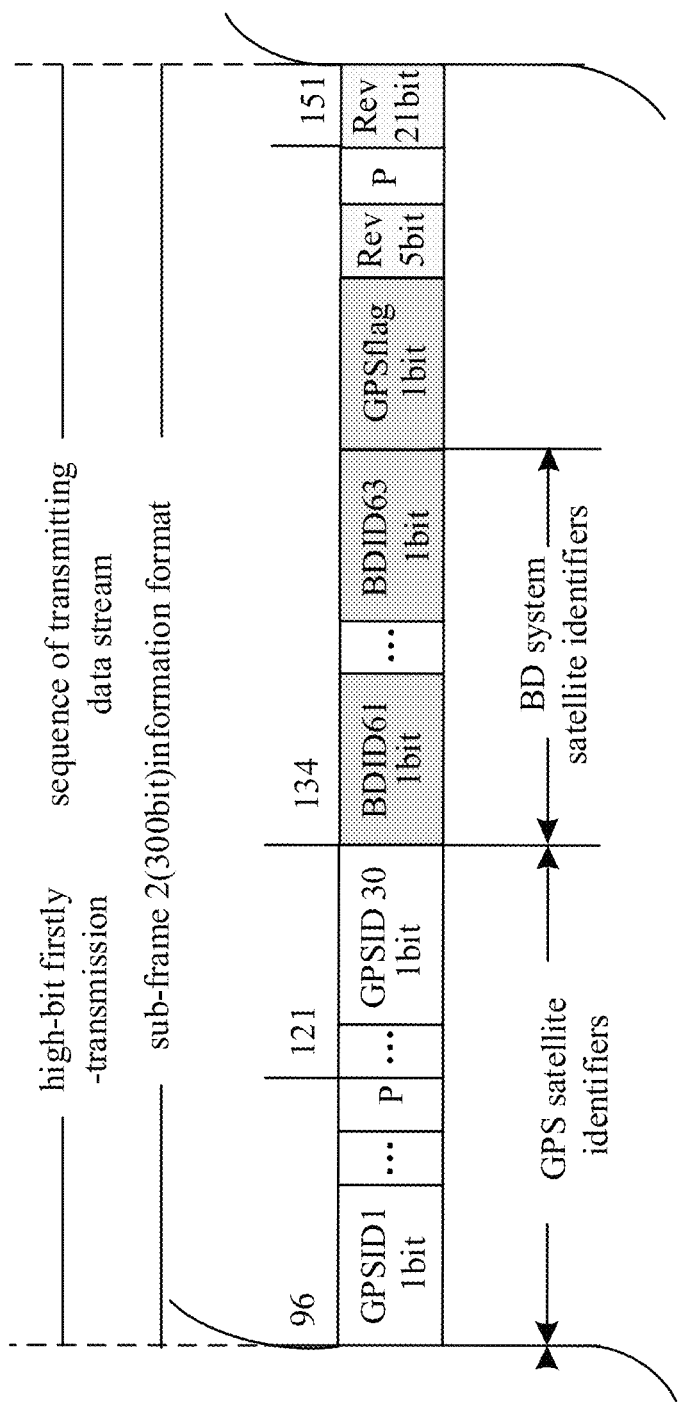
Figures 3, 8D:
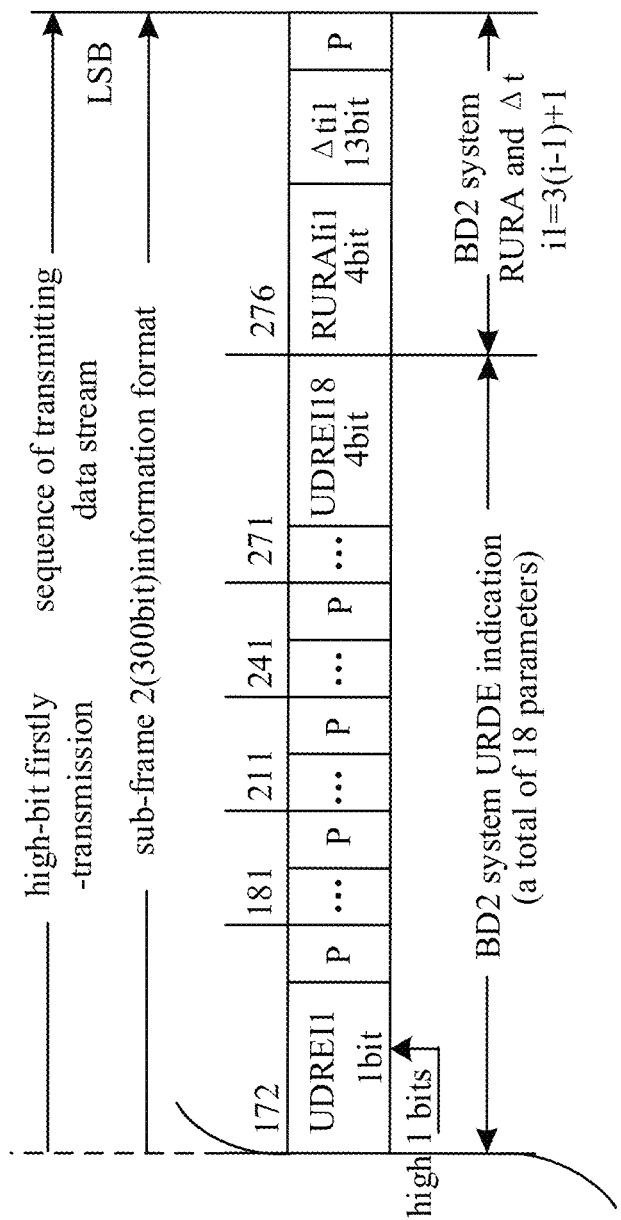

Secondly, satellite identifiers are set to be used for, for each of the 63 satellites, employing a 1-bit information bit respectively to identify whether there is a partition comprehensive correction that needs to be broadcast. FIGS. 8B to 8D show the message arrangements of pages 2-4 of the sub-frame 2 respectively. As shown in FIG. 8B, the 134th bit in page 2 of sub-frame 2 is used to broadcast the satellite identifier BDID1 of satellite 1, and when this identification bit is "1", it indicates that there is a partition comprehensive correction that needs to be broadcast for satellite 1, and when this identification bit is "0", it indicates that there is no partition comprehensive correction that needs to be broadcast for satellite 1. Similarly, although not shown in FIG. 8B, the 135th bit is used to broadcast the area identifier BDID2 of satellite 2, and when this identification bit is "1", it indicates that there is a partition comprehensive correction that needs to be broadcast for satellite 2, and when this identification bit is "0", it indicates that there is no partition comprehensive correction that needs to be broadcast for satellite 2, and so on. Finally, the 171st bit is used to broadcast the satellite identifier BDID30 of satellite 30, and when this identification bit is "1", it indicates that there is a partition comprehensive correction that needs to be broadcast for satellite 30, and when this identification bit is "0", it indicates that there is no partition comprehensive correction that needs to be broadcast for satellite 30. As mentioned before, "P" in the figure represents 8 bits of check bits. It can be understood that, here, the 134th bit to the 142th bit and the 151th bit to the 170th bit are used to broadcast the satellite identifiers BDID1 to BDID30 of the 30 satellites of satellites 1-30.

FIG. 8C shows the message arrangement of page 3 of sub-frame 2. As shown in FIG. 8C, the 134th bit to the 142th bit and the 151th bit to the 170th bit of page 3 of sub-frame 2 are used to broadcast the satellite identifiers BDID31 to BDID60 of the 30 satellites of satellites 31~60, details thereof is similar with those of FIG. 8B and will no longer be described here. FIG. 8D shows the message arrangement of page 4 of sub-frame 2. As shown in FIG. 8D, the 134th bit to 136th bit of page 4 of sub-frame 2 are used to broadcast the satellite identifiers BDID61 to BDID63 of the three satellites of satellites 61~63. The 137th bit to the 142th bit and the 151th bit to the 170th bit can be used to broadcast other information or remain reserved. It can be understood that, here, the 134th bits to the 142th bits and the 151th bits to the 170th bits of pages 2-3 of sub-frame 2 and the 134th bit to the 136th bit of page 4 of sub-frame 2 may correspond to the fourth group of predetermined positions as described above, for broadcasting the satellite identifiers BDID1 to BDID63 of 63 satellites.

Figures 1, 8E:
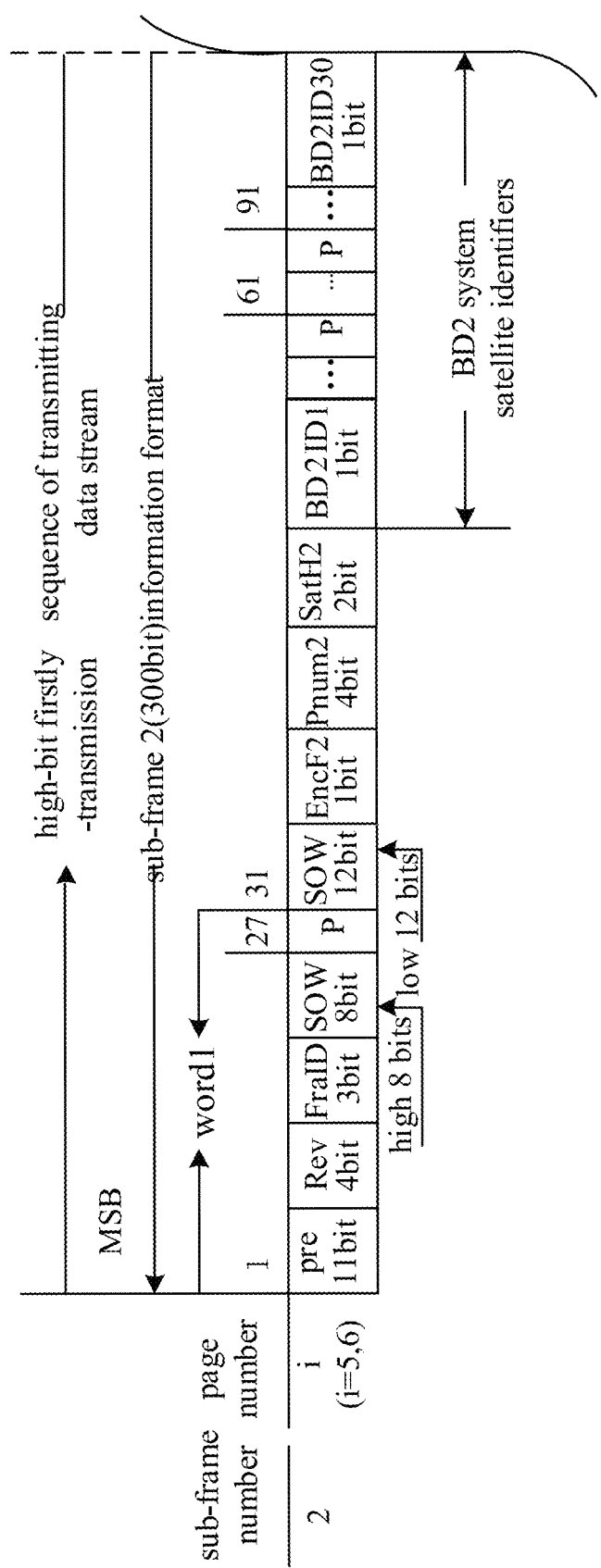
Figures 2, 8E:
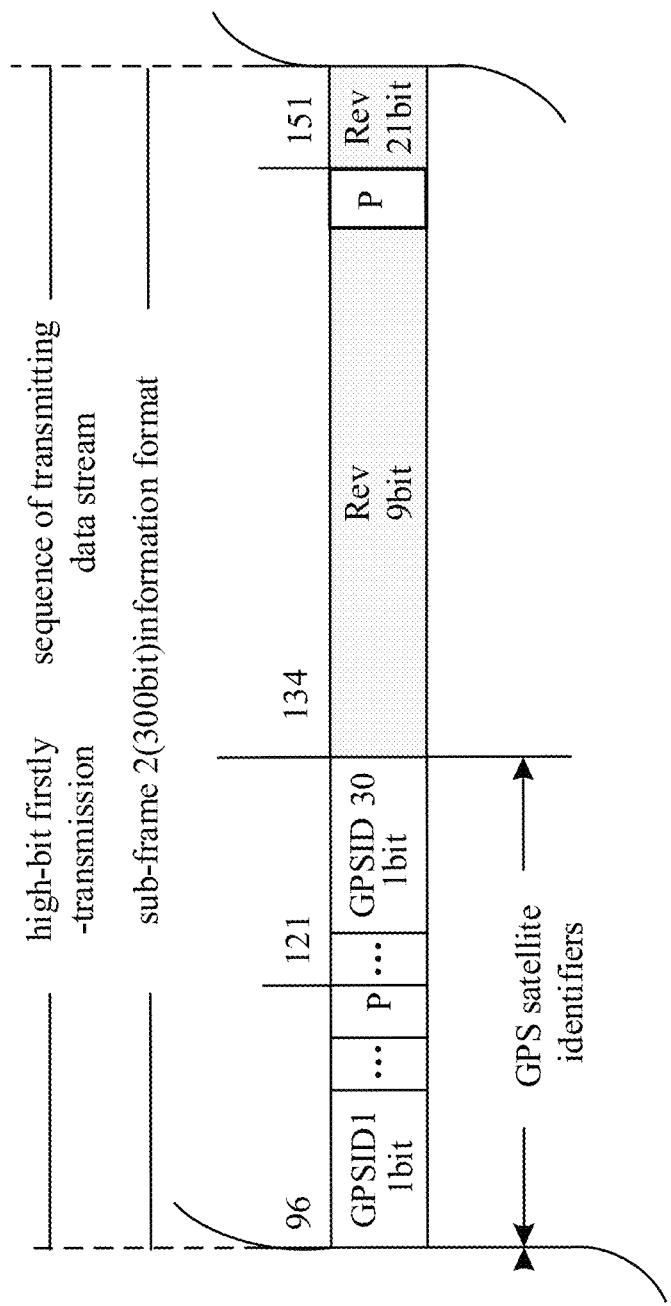
Figures 3, 8E:
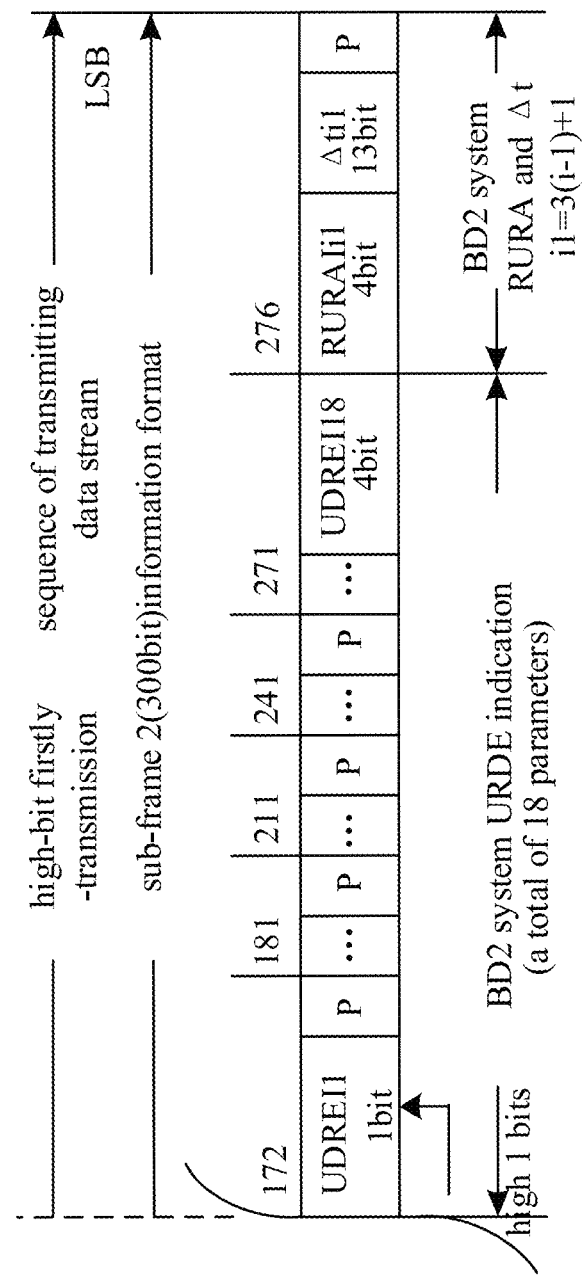

FIG. 8E shows the message arrangements of pages 5-6 of sub-frame 2. As shown in FIG. 8E, the 134th bits to the 142th bits and the 151th bits to the 170th bits of pages 5-6 of sub-frame 2 are still reserved (as indicated by Rev) for future use.

Figures 1, 8F:
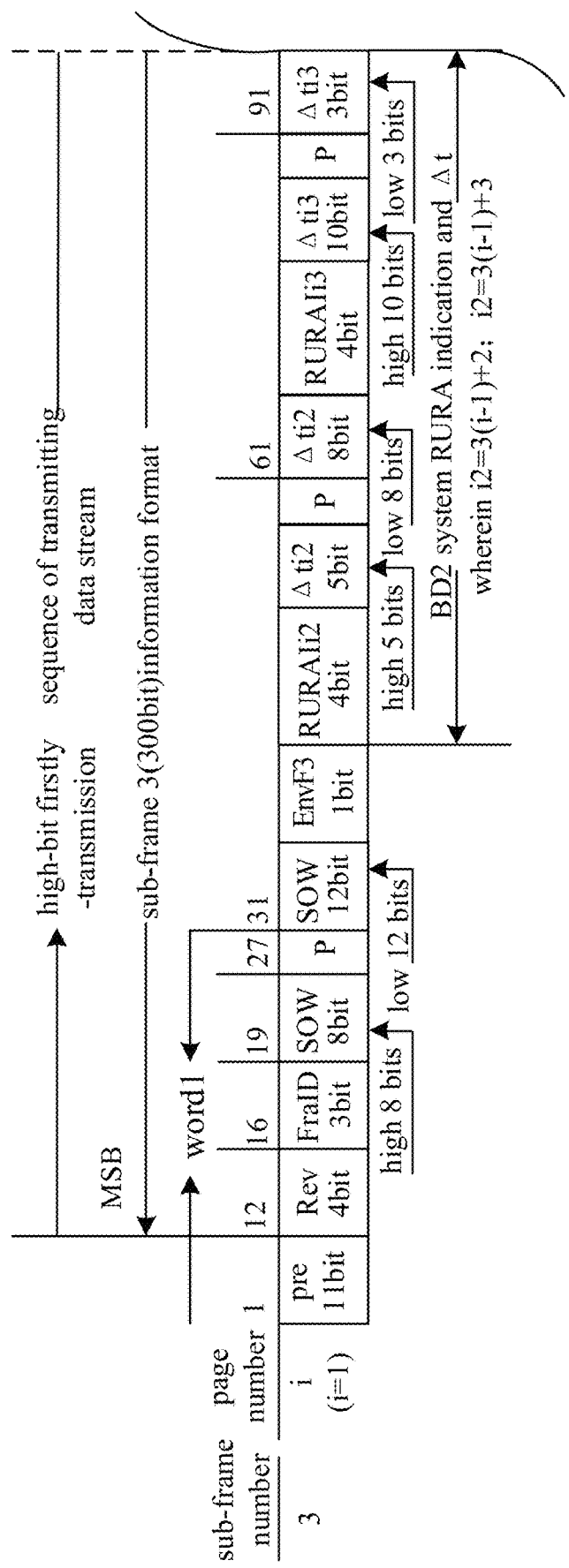
Figures 2, 8F:
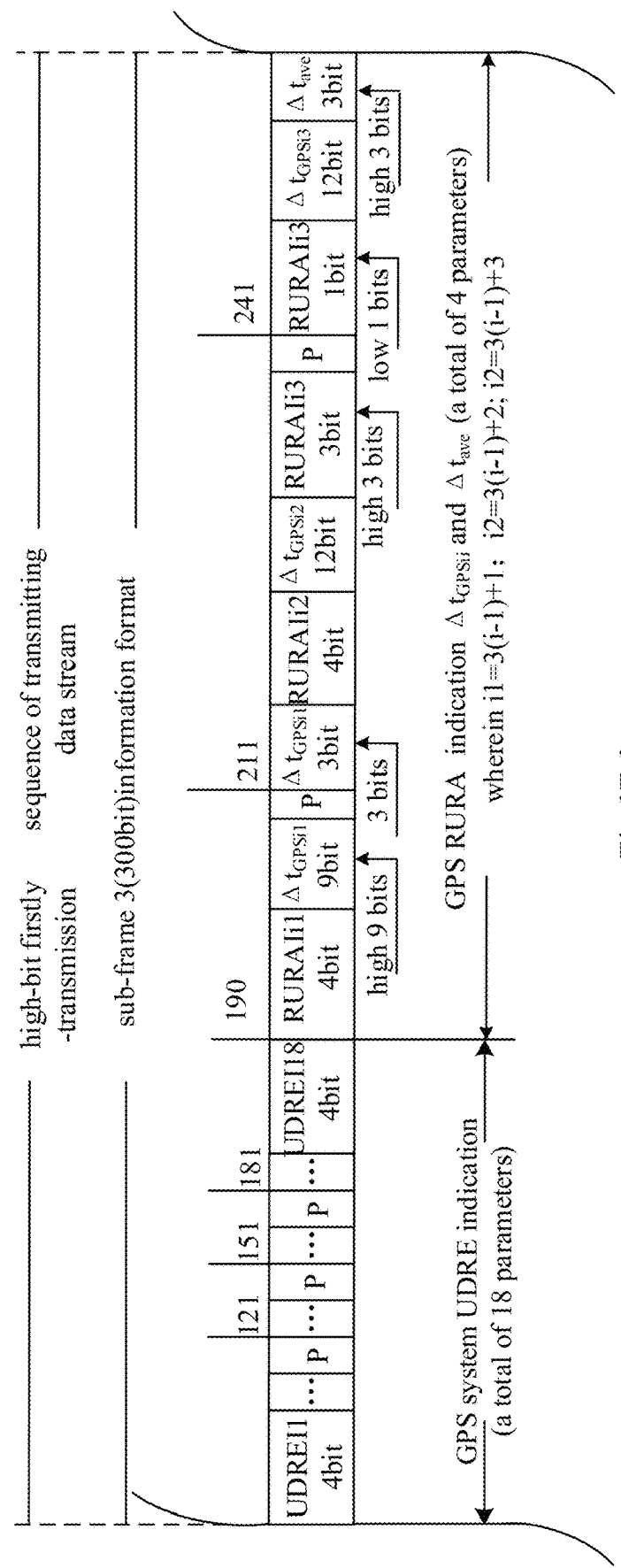
Figures 3, 8F:
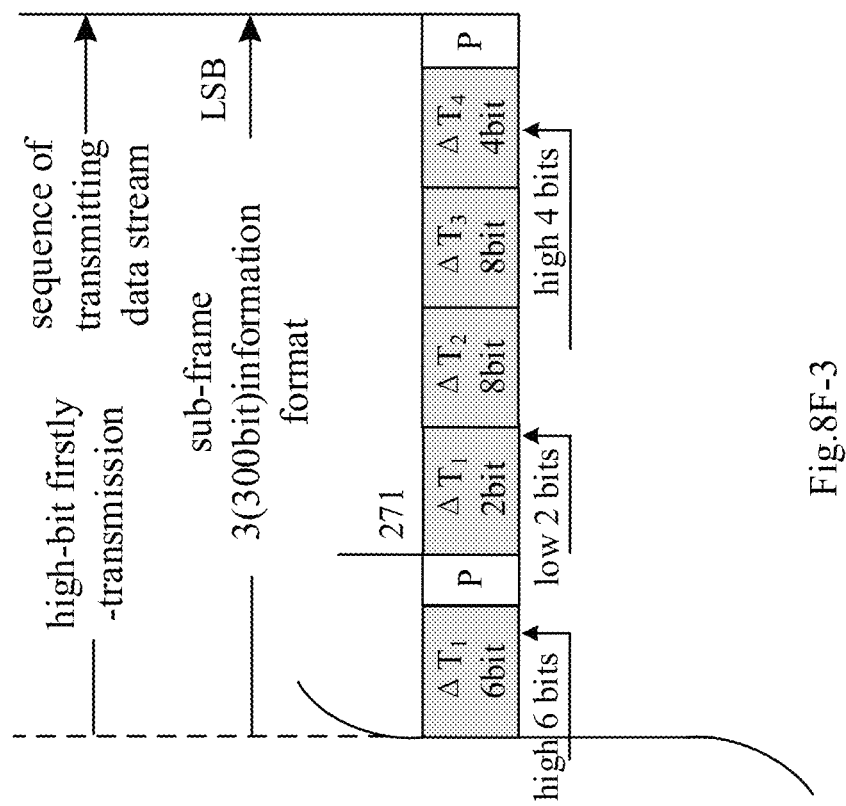
Figures 1, 8G:
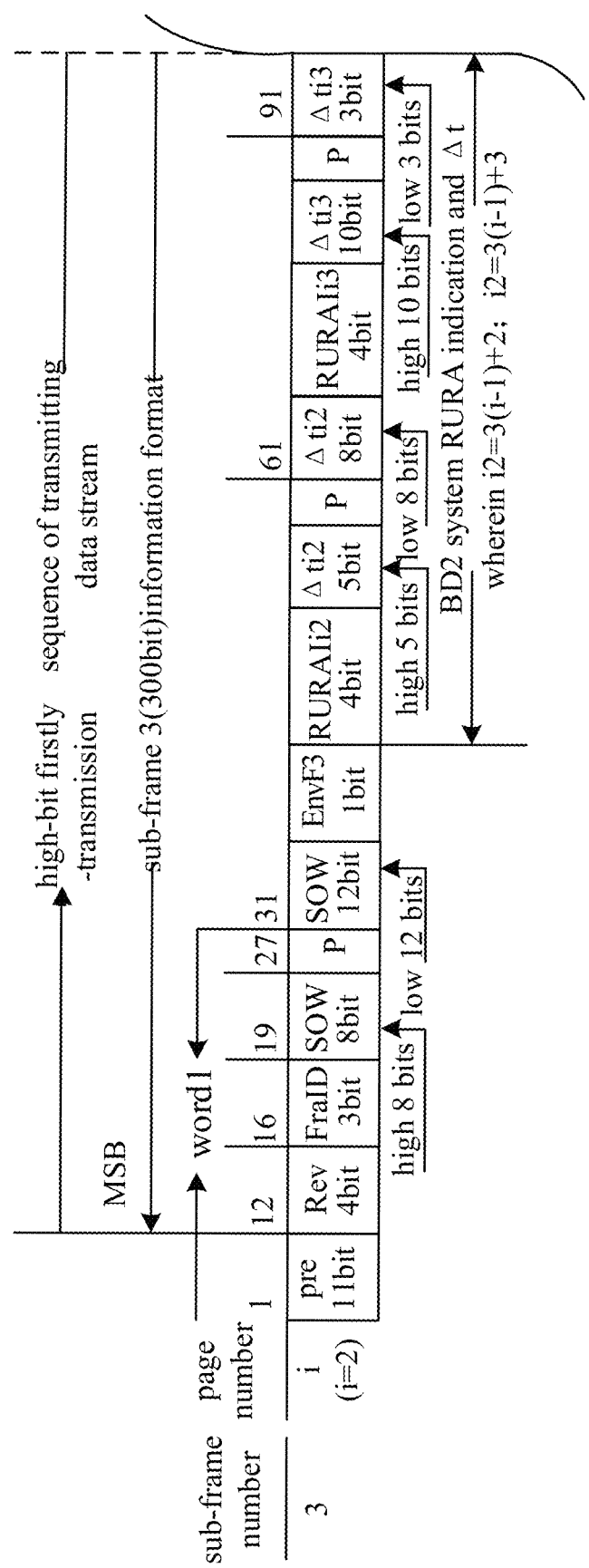
Figures 2, 8G:
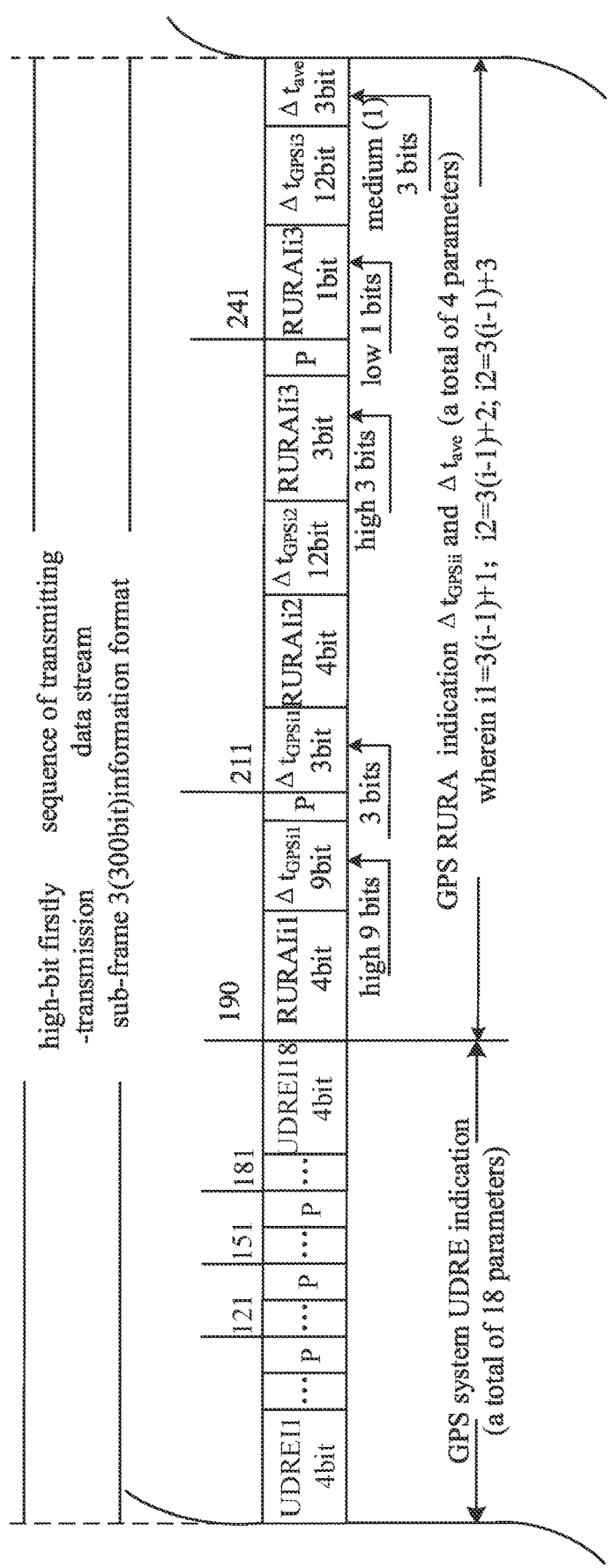
Figures 3, 8G:
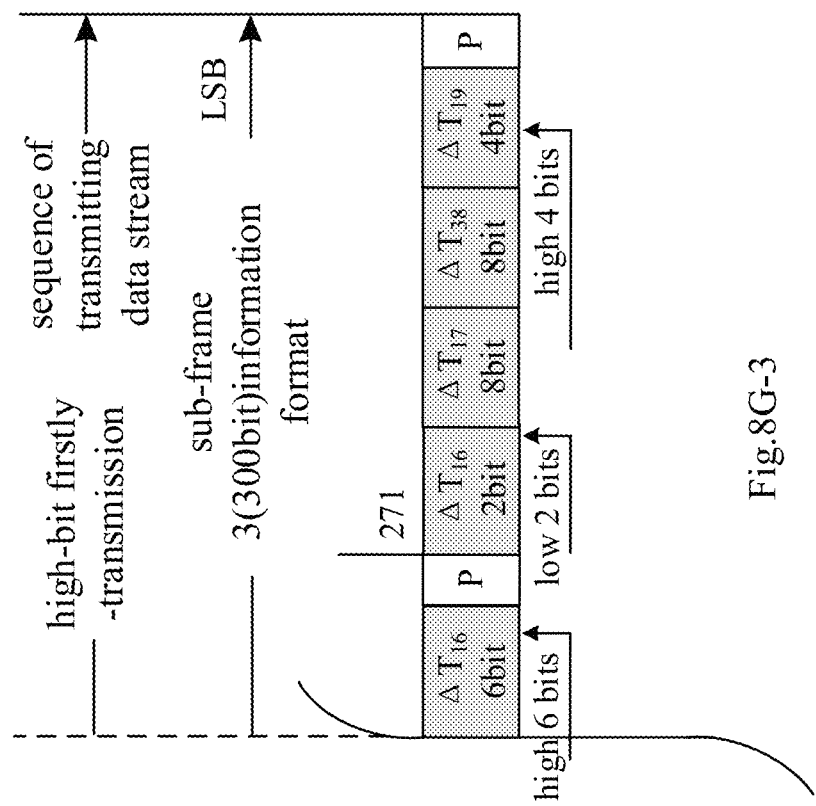
Figures 1, 8H:
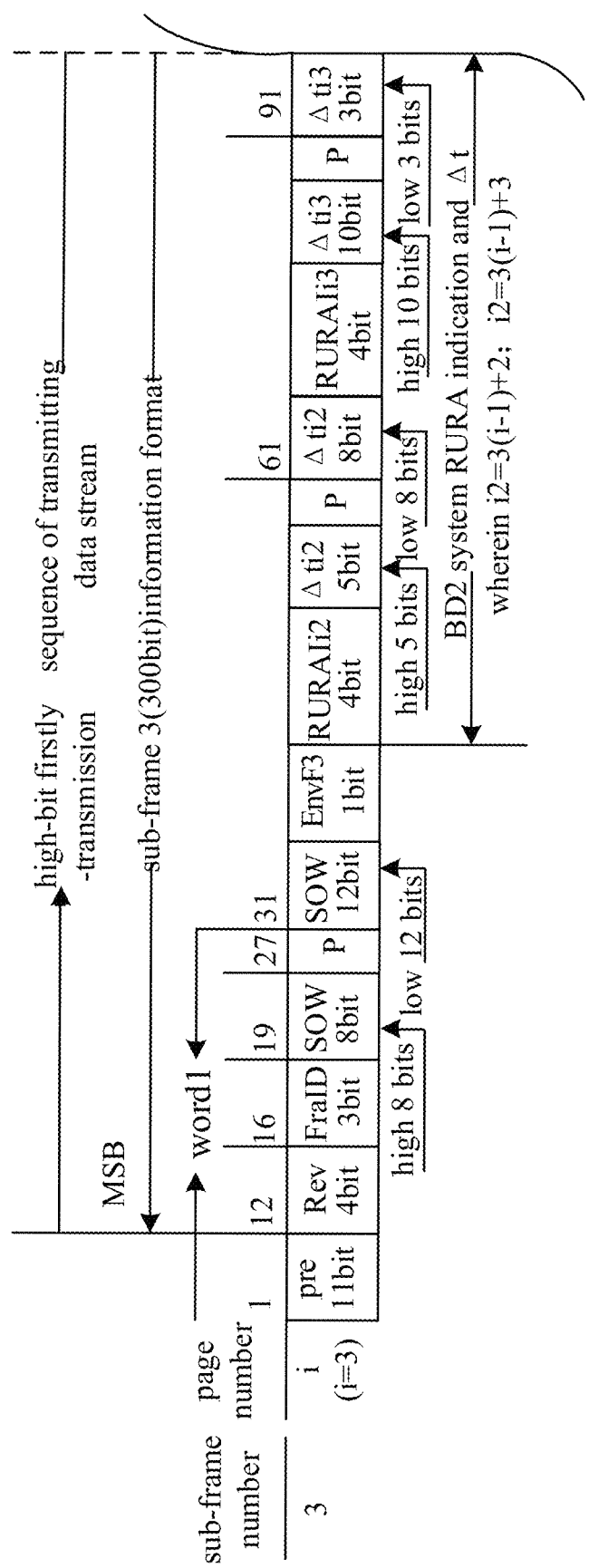
Figures 2, 8H:
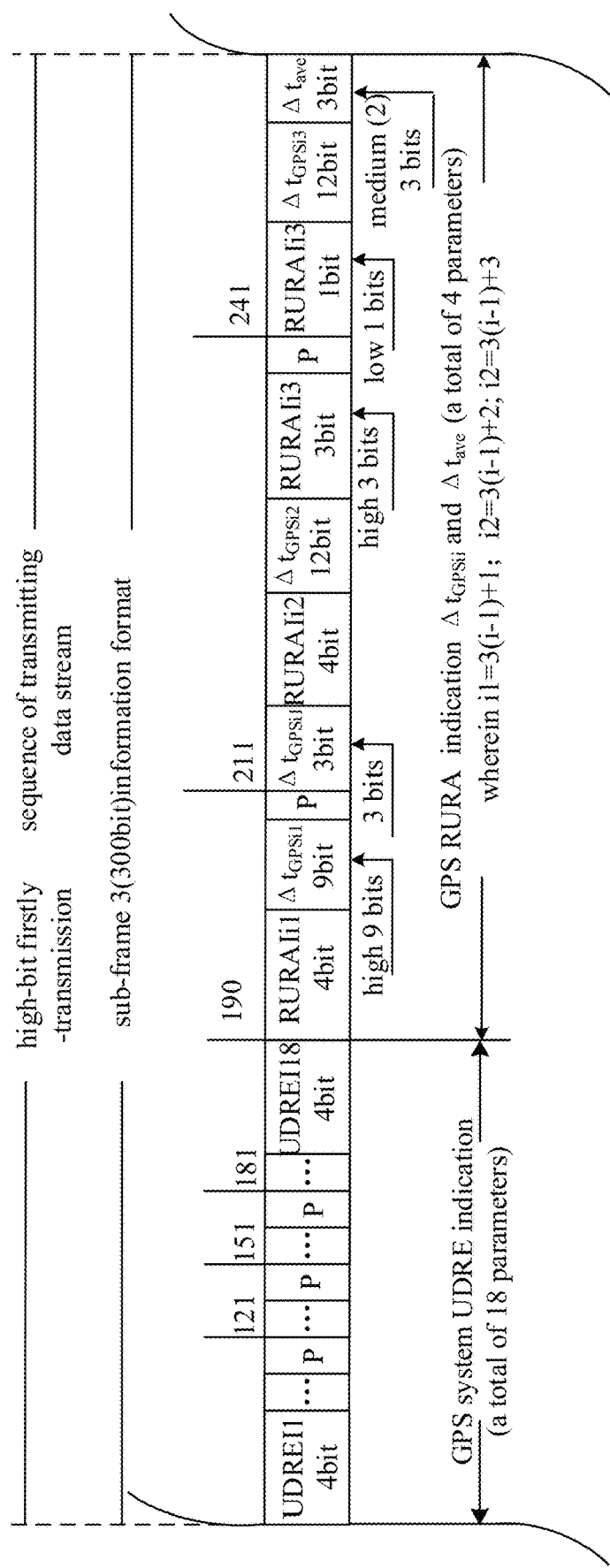
Figures 3, 8H:
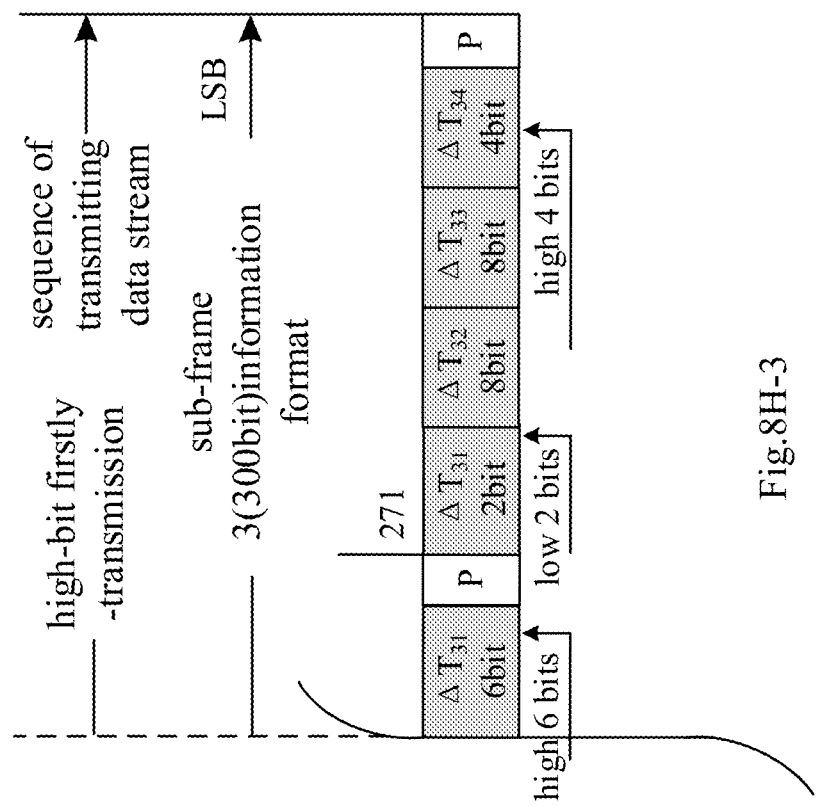
Figures 1, 8I:
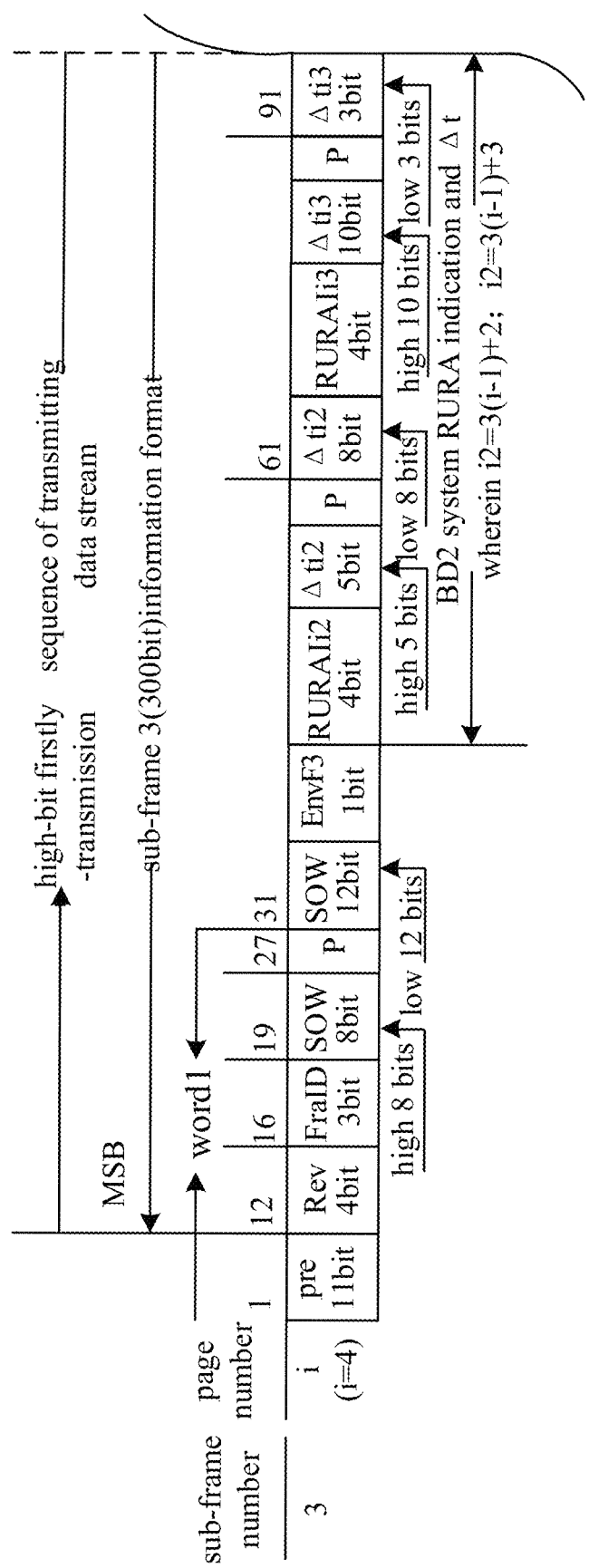
Figures 2, 8I:
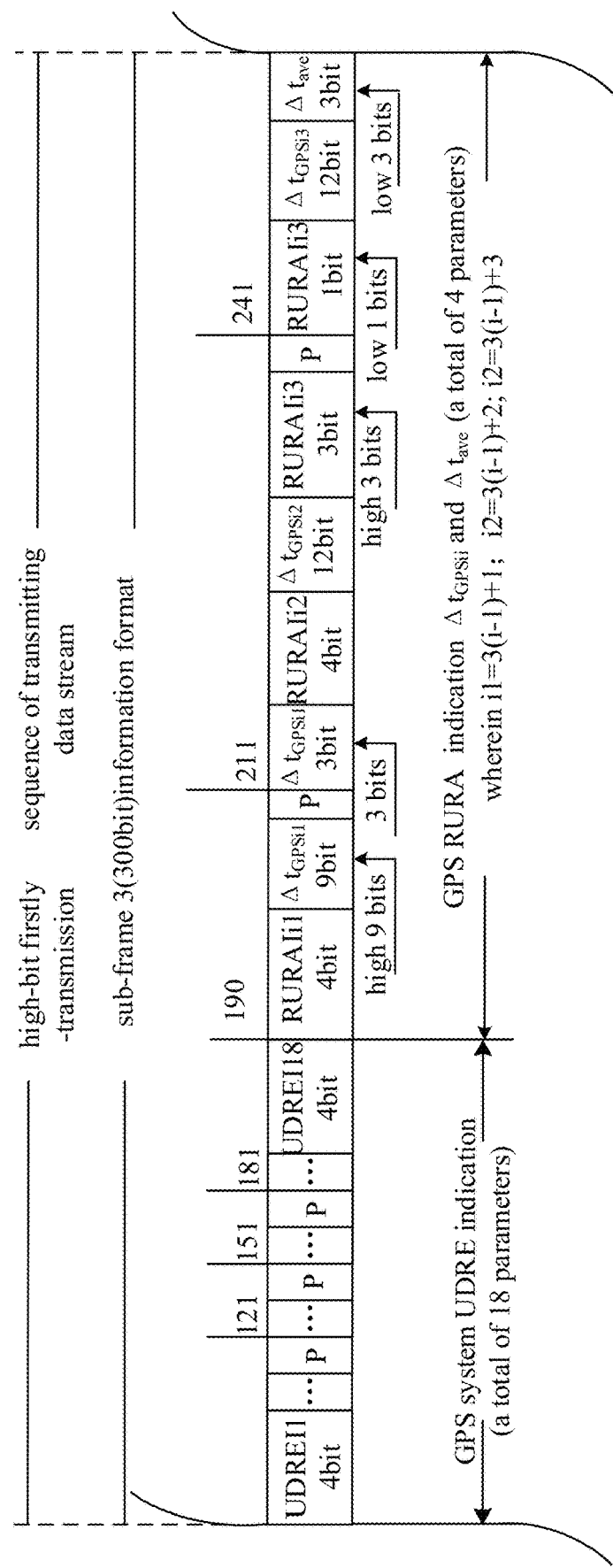
Figures 3, 8I:
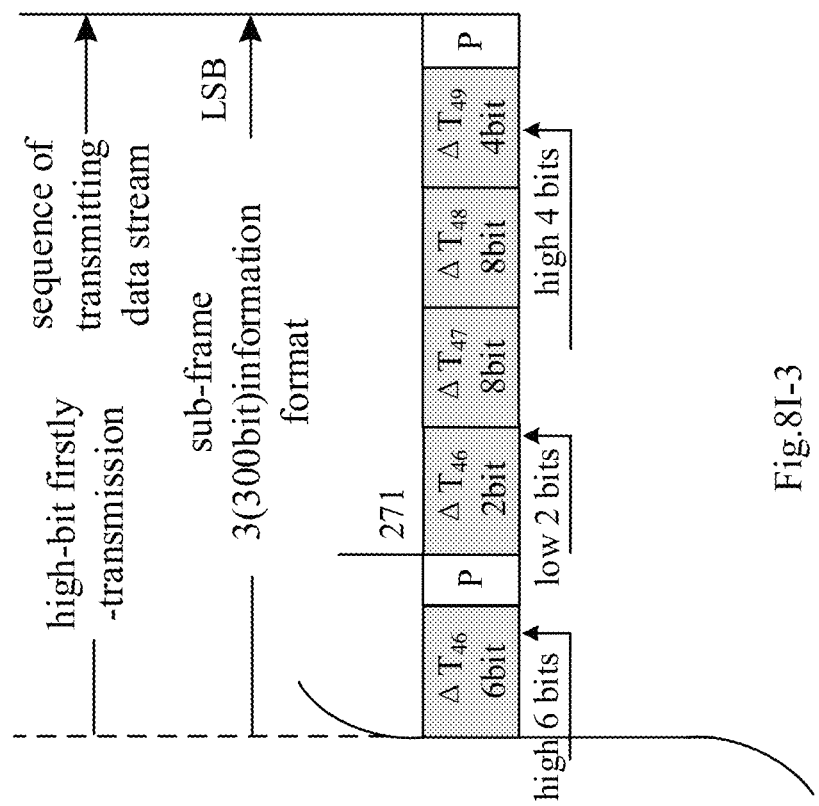

Finally, partition comprehensive corrections, which correspond to different areas and different satellites respectively and needs to be broadcast, are inserted into a fifth group of predetermined positions in the reserved space of page 1 to page 6 of sub-frame 3 and sub-frame 4 sequentially. Specifically, FIG. 8F to FIG. 8K respectively show the message arrangements of pages 1-6 of sub-frame 3. As shown in FIG. 8F, each partition comprehensive correction occupies 8 bits of information bits, and the 257th to 262th bits of page 1 of sub-frame 3 are used to broadcast the upper 6 bits of the first partition comprehensive correction ($\Delta T_1$), while the 271th bit to the 272th bit of page 1 of sub-frame 3 are used to broadcast the lower 2 bits of the first partition comprehensive correction ($\Delta T_1$). The 273th bit to the 280th bit of page 1 of sub-frame 3 are used to broadcast the second partition comprehensive correction ($\Delta T_2$), the 281th bit to the 288th bit of page 1 of sub-frame 3 are used to broadcast the third partition comprehensive correction ($\Delta T_3$), and the 289th bit to the 292th bit of page 1 of sub-frame 3 are used to broadcast the upper 4 bits of the fourth partition comprehensive correction ($\Delta T_4$). It can be seen that 3.5 partition comprehensive corrections can be broadcast through the 28 information bits of the 257th bit to the 262th bit and the 271th bit to the 292th bit of page 1 of sub-frame 3.

Similarly, as shown in FIG. 8G to FIG. 8K, each page of pages 2-6 of sub-frame 3 may broadcast 3.5 the partition comprehensive corrections respectively by employing the 28 information bits of the 257th bit to the 262th bit and the 271th bit to the 292th bit. The details thereof are similar with those of FIG. 8F and thus will no longer be described here.

Figures 1, 8J:
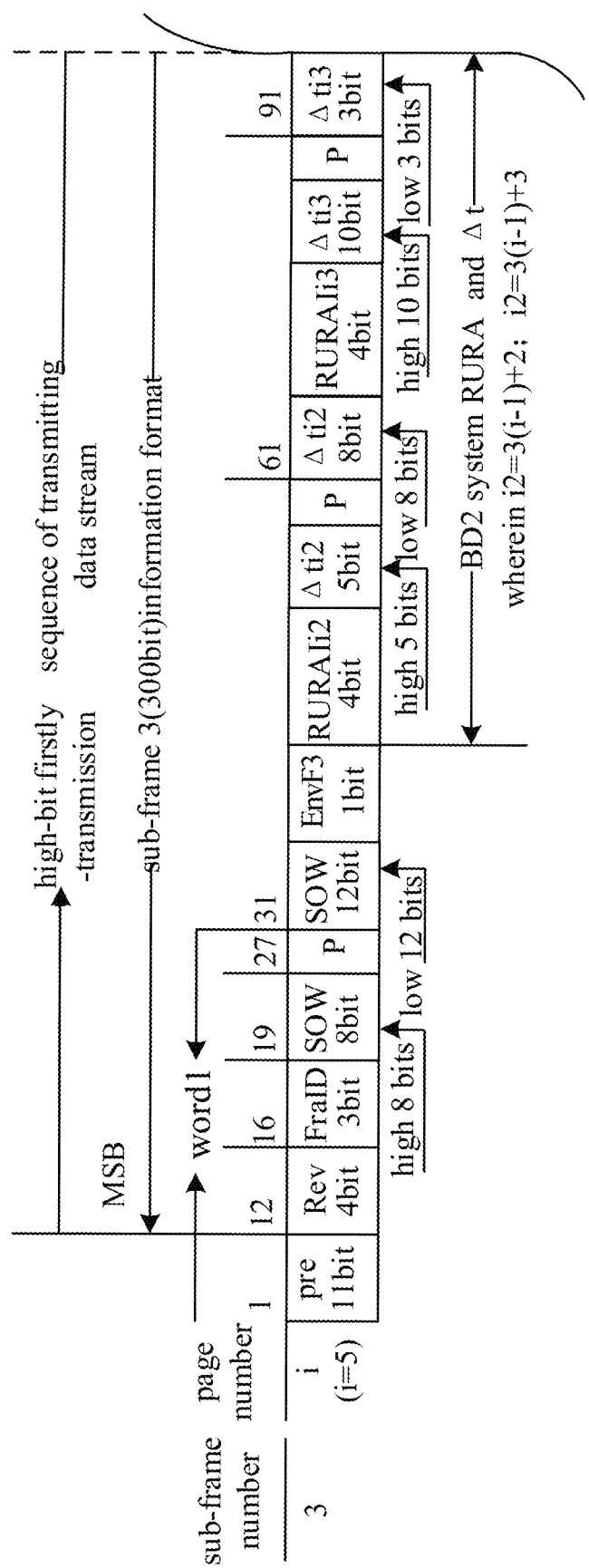
Figures 2, 8J:
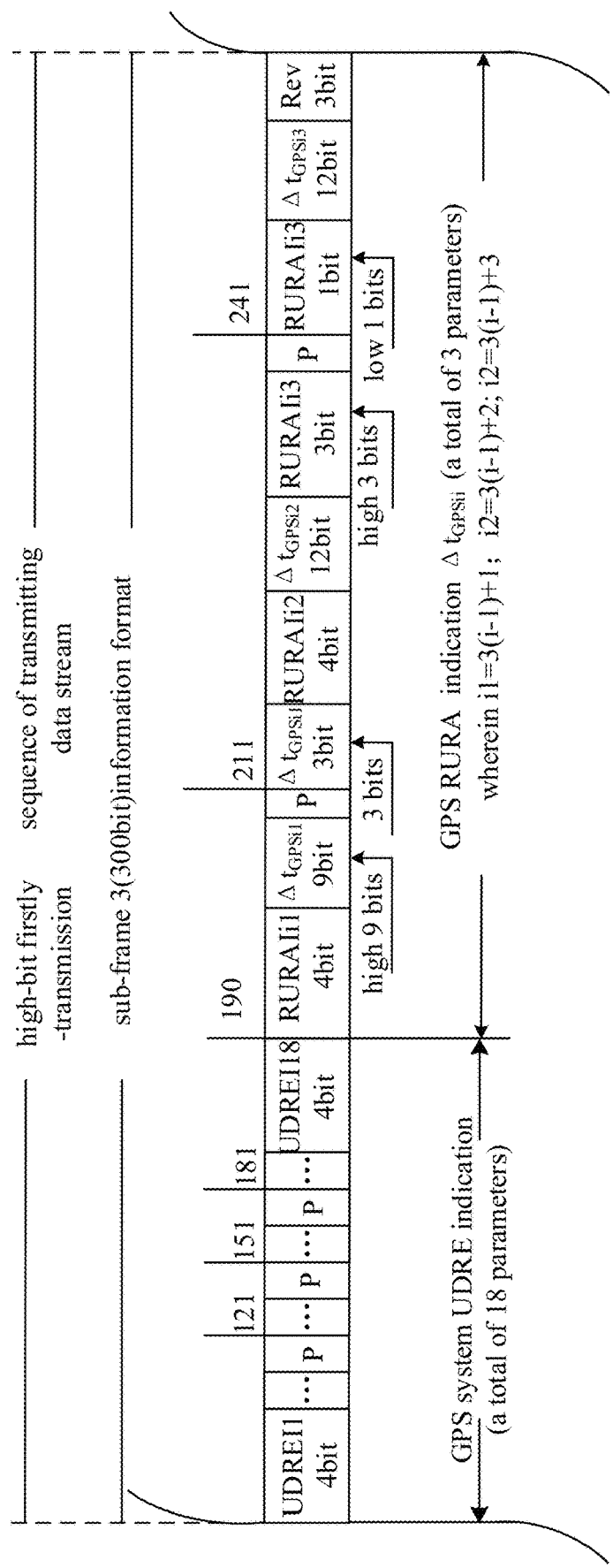
Figures 3, 8J:
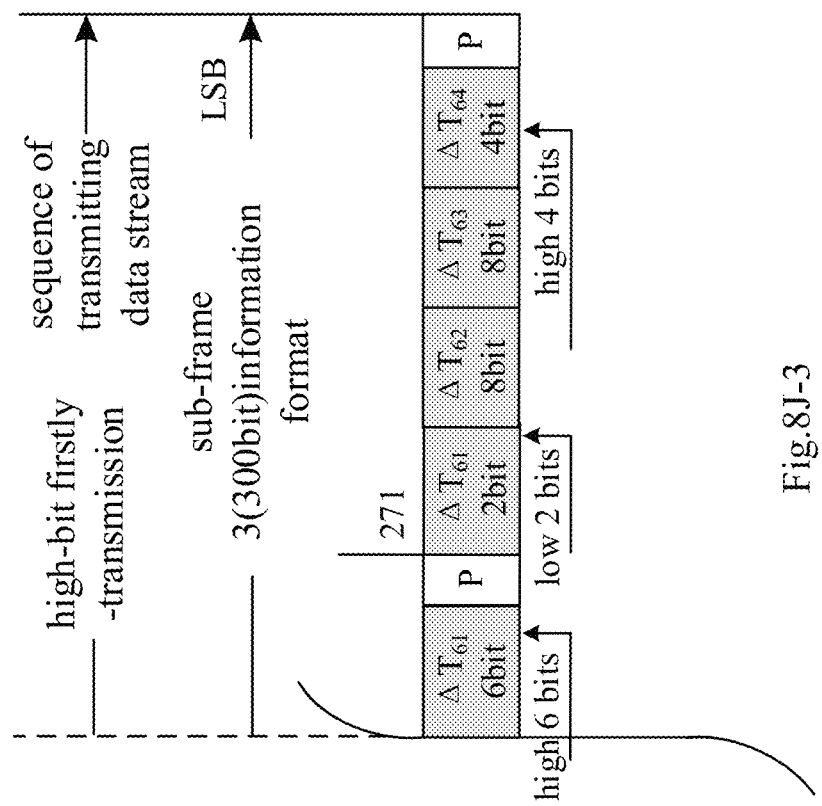
Figures 1, 8K:
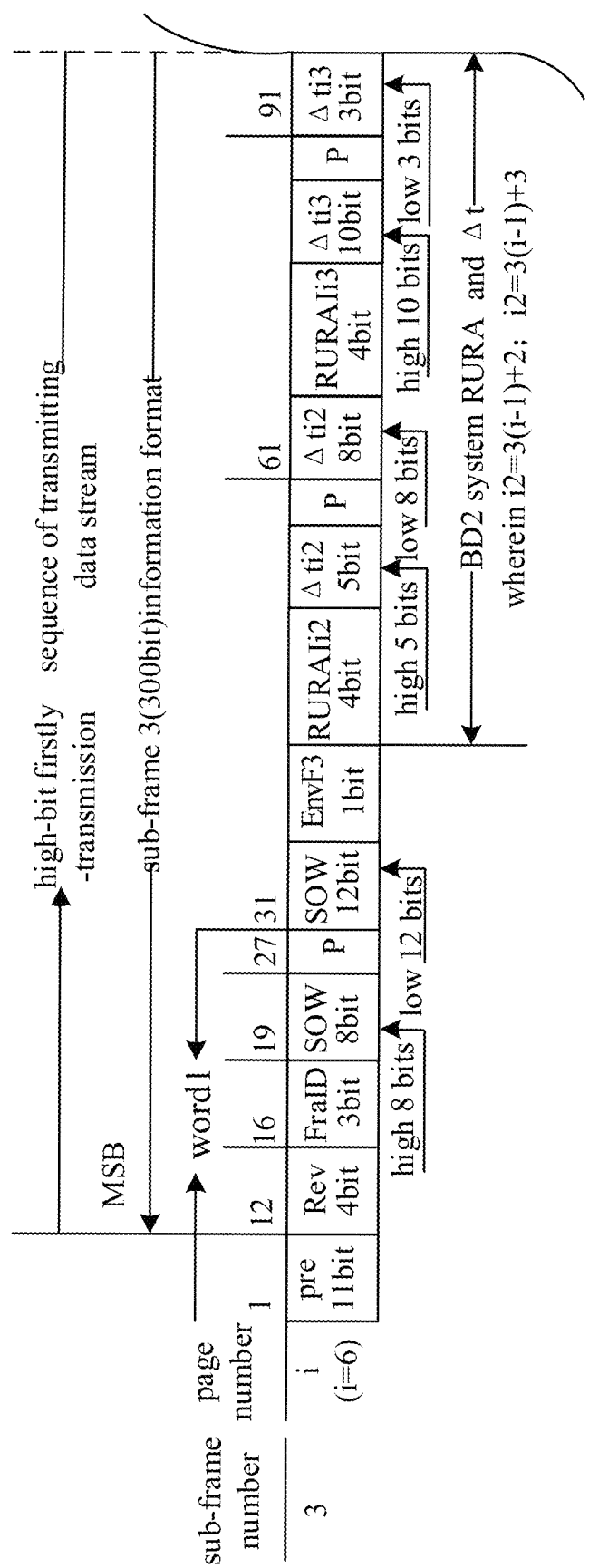
Figures 2, 8K:
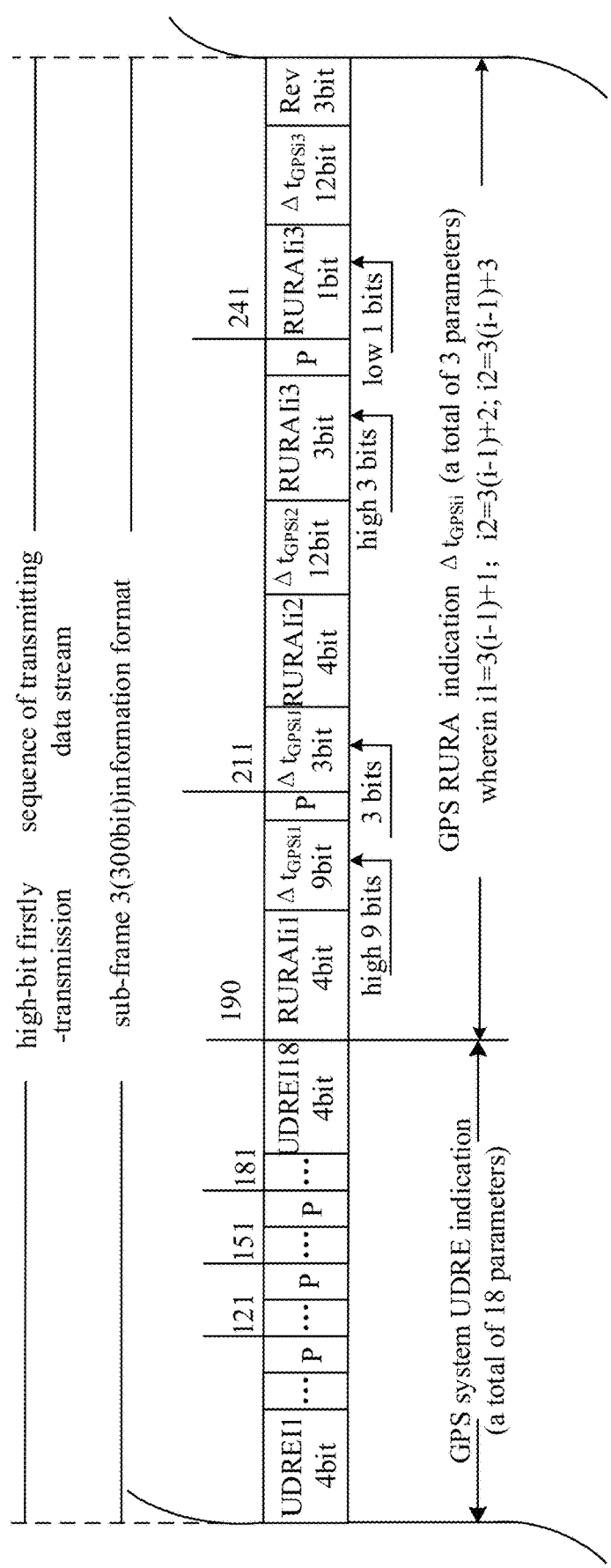
Figures 3, 8K:
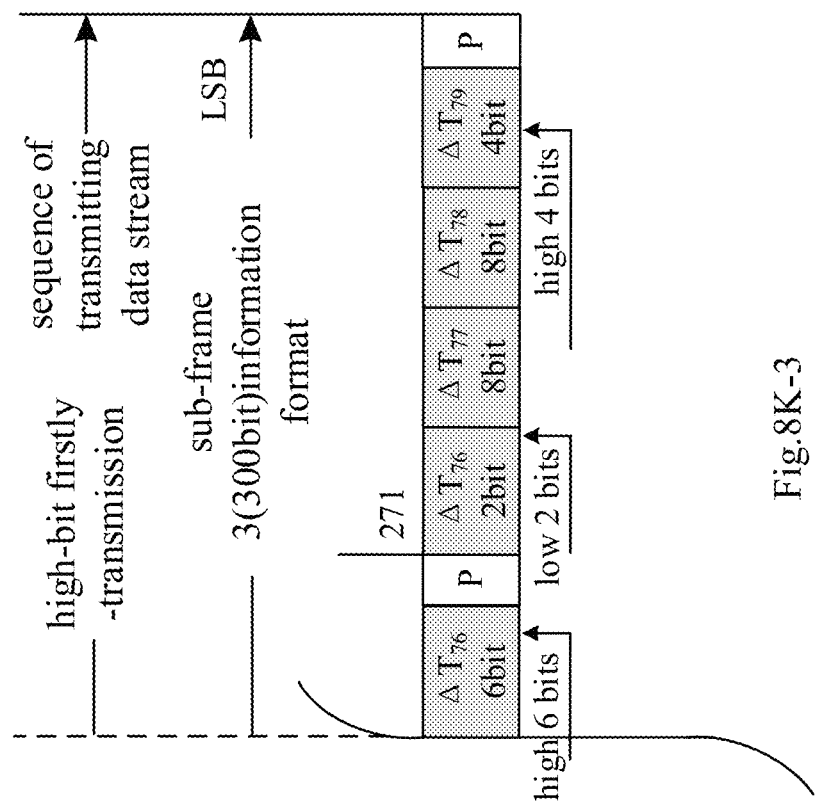
Figures 1, 8L:
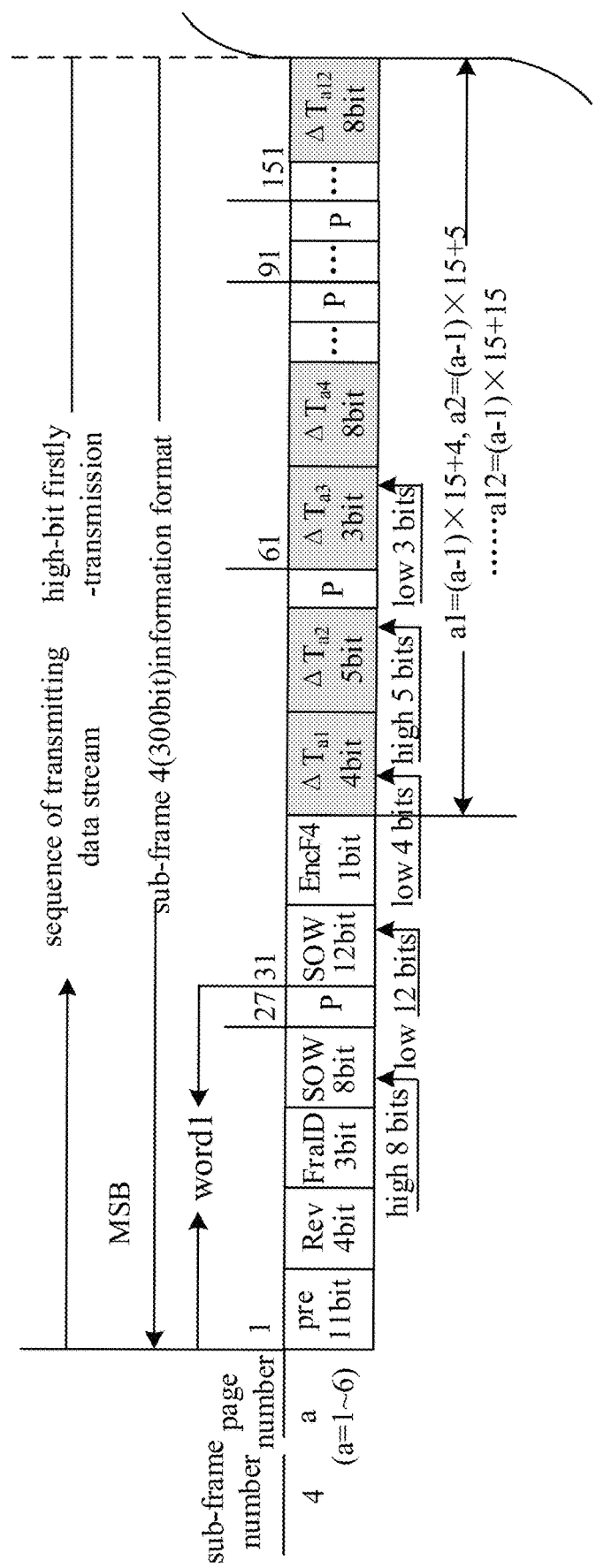
Figures 2, 8L:
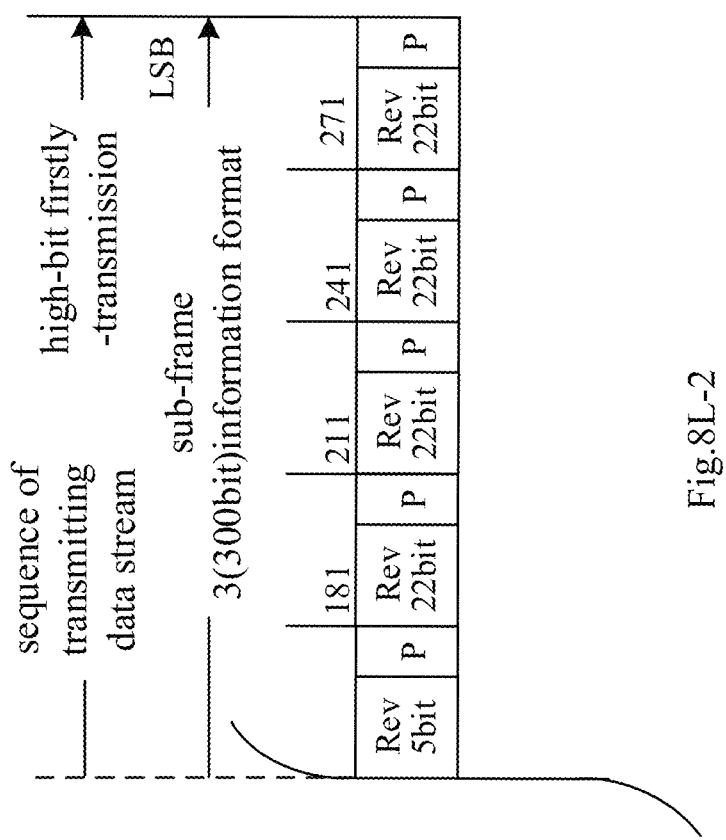

FIG. 8L shows the message arrangement of pages 1-6 of sub-frame 4. As shown in FIG. 8L, the 44th bit to the 47th bit are used to broadcast the lower 4 bits of the last partition comprehensive correction broadcast by the preceding sub-frame 3. For example, the 44th bit to the 47th bit of page 1 of sub-frame 4 are used to broadcast the lower 4 bits of the fourth partition comprehensive correction ($\Delta T_4$). The 48th bits to the 52th bits, the 61th bits to the 82th bits, the 91th bits to the 142th bits and the 151th bits to the 167th bits of pages 1-6 of sub-frame 4 are used to broadcast 11 partition comprehensive corrections. That is to say, each of pages 1-6 of sub-frame 4 can broadcast 11.5 partition comprehensive corrections. Therefore, a total of 90 partition comprehensive corrections can be broadcast by pages 1-6 of sub-frame 3 and sub-frame 4, and a total of 180 partition comprehensive corrections can be broadcast by two groups of pages 1-6.

It can be understood that, here, the 257th bits to the 262th bits and the 271th bits to the 292th bits of pages 1-6 of sub-frame 3 and the 48th bits to the 52th bits, the 61th bits to the 82th bits, the 91th bits to the 142th bits and the 151th bits to the 167th bits of pages 1-6 of sub-frame 4 may correspond to the fifth group of predetermined positions as described above, for sequentially broadcasting the existing partition comprehensive corrections.

It should be noted that since the update period of the partition comprehensive correction parameters is 36 seconds, that is, updating is performed once every 12 pages. Specifically, in the time domain, for example, in the first period of 36 seconds, the number of partition comprehensive corrections that need to be broadcast by sub-frames 3 and sub-frames 4 in the first to twelfth main frames and which area and which satellite each of the partition comprehensive corrections corresponds to are determined according to the area identifiers and the satellite identifiers broadcast in sub-frames 2 in the first to sixth main frames in the time domain. Similarly, in the second period of 36 seconds, the number of partition comprehensive corrections that need to be broadcast by sub-frames 3 and sub-frames 4 in the 13th to 24th main frames and which area and which satellite each of the partition comprehensive corrections corresponds to are determined according to the updated area identifiers and the updated satellite identifiers broadcast in sub-frames 2 in the 13th to 18th main frames in the time domain, and so on.

It should be understood that although at most 180 partition comprehensive corrections can be broadcast as described above, if only 100 partition comprehensive corrections for example need to be broadcast in a certain period of 36 seconds, remaining information bits, after the 100 partition comprehensive corrections are sequentially broadcast, in the fifth group of predetermined positions of sub-frame 3 and sub-frame 4 may be empty or as reserved bits.

Since the area identifiers and the satellite identifiers are used to identify which areas and which satellites have partition comprehensive corrections that need to be broadcast as described above, the fifth group of predetermined positions in sub-frame 3 and sub-frame 4 can be used only for broadcasting the partition comprehensive corrections that need to be broadcast without allocating fixed information bits for partition comprehensive corrections that do not need to be broadcast, thus saving channel link resources. Moreover, after each of update periods, since the area identifiers and the satellite identifiers may change, partition comprehensive corrections that need to be broadcast will also change, so the fifth group of predetermined positions of sub-frame 3 and sub-frame 4 may broadcast the updated partition comprehensive corrections corresponding to different areas and different satellites. It can be seen that all satellites in the satellite navigation system can share identification bits and perform dynamic adjustment, thus saving resources and realizing fast uploading.

Further optionally, in the above message broadcast apparatus 40 for the enhanced parameter in the satellite navigation system, an area index i and a satellite index j corresponding to each of the broadcast partition comprehensive corrections may be respectively defined as follows:

$$i=\text{INT}(n,x)+1;$$

$$j=\text{MOD}(n,x).$$

Wherein n denotes the number of the broadcast partition comprehensive correction, and x denotes the total number of satellites that needs to broadcast partition comprehensive corrections.

Specifically, as described above, partition comprehensive corrections that need to be broadcast are sequentially inserted into all pages of sub-frame 3 and sub-frame 4, that is, the messages of these partition comprehensive corrections are sequentially arranged. For example, the value of n corresponding to the first partition comprehensive correction ($\Delta T_1$) broadcast in page 1 of sub-frame 3 is "1", the value of n corresponding to the second partition comprehensive correction ($\Delta T_2$) broadcast in page 1 of sub-frame 3 is "2". . . . The value of n corresponding to the first partition comprehensive correction broadcast in page 1 of sub-frame 4 is "4", the value of n corresponding to the second partition comprehensive correction broadcast in page 1 of sub-frame 4 is "5", and so on.

As mentioned before, although there are a total of 63 satellites, not every satellite has a partition comprehensive correction that needs to be broadcast. For example, it is assumed that x=10, that is, when the total number of satellites broadcasting the partition comprehensive corrections is 10, for the first partition comprehensive correction $\Delta T_{76}$ in page 6 of sub-frame 3, n=76, so its corresponding area index i=INT(76, 10)+1=8, and its corresponding satellite index j=MOD (76, 10)=6. That is to say, the partition comprehensive correction $\Delta T_{76}$ corresponds to area 8 and satellite 6.

Through the above formula, specific area and satellite corresponding to each of the broadcast partition comprehensive corrections may be derived. Therefore, by combining area identifiers, satellite identifiers and partition comprehensive corrections, it is possible to achieve the accurate broadcast of the partition comprehensive corrections and to save resources.

Optionally, in the above message broadcast apparatus 40 for the enhanced parameter in the satellite navigation system, the enhanced parameter includes satellite clock difference correction parameters, and the satellite clock difference correction parameters include satellite identifiers and satellite clock difference correction residues. Additionally, the satellite identifiers are used for, for each of satellites in the satellite navigation system, employing a 1-bit information bit respectively to identify whether there is a satellite clock difference correction residue that needs to be broadcast, and the processor 401 inserts the satellite identifiers into a third group of predetermined positions in the reserved space of page 1 of sub-frame 2. Additionally, the processor 401 inserts the satellite clock difference correction residues, which correspond to different satellites respectively and need to be broadcast, into a sixth group of predetermined positions in the reserved space of page 5 and page 6 of sub-frame 4 sequentially. Additionally, the broadcast period of the satellite clock difference correction parameters is 18 seconds to 2 minutes, and preferably 18 seconds. The 18 seconds of the embodiment of the present invention is merely an example, not a limitation.

Specifically, for convenience of explanation, the Beidou satellite navigation system is still taken as an example. As mentioned before, the Beidou satellite navigation system has a total of 63 satellites. However, similar to the aforementioned partition comprehensive corrections, not every satellite has a satellite clock difference correction residue that needs to be broadcast. Therefore, it is also possible to set satellite identifiers for employing, for each of 63 satellites, a 1-bit information bit respectively to identify whether there is a satellite clock difference correction residue that needs to be broadcast. For the satellite identifier of each satellite, when this identification bit is "1", it indicates that there is a satellite clock difference correction residue that needs to be broadcast forth is satellite, and when this identification bit is "0", it indicates that there is no satellite clock difference correction residue that needs to be broadcast forth is satellite.

Here, the satellite identifiers used for the satellite clock difference correction residues are different from the satellite identifiers used for the partition comprehensive corrections, but their effects are similar with each other and will no longer be described here.

Figures 1, 9A:
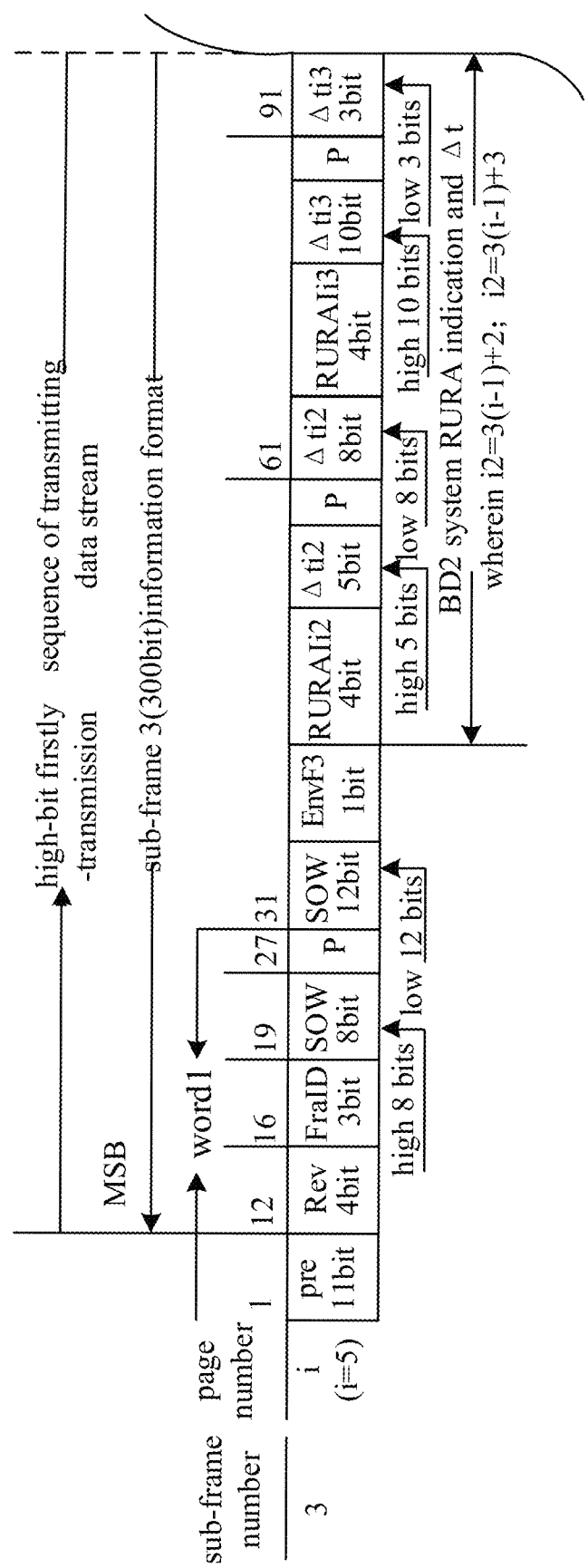
FIGS. 9A to 9B are schematic diagrams respectively illustrating examples of message arrangements of pages 5-6 of sub-frame 3 for broadcasting satellite clock difference correction parameters according to an embodiment of the present invention.
Figures 2, 9A:
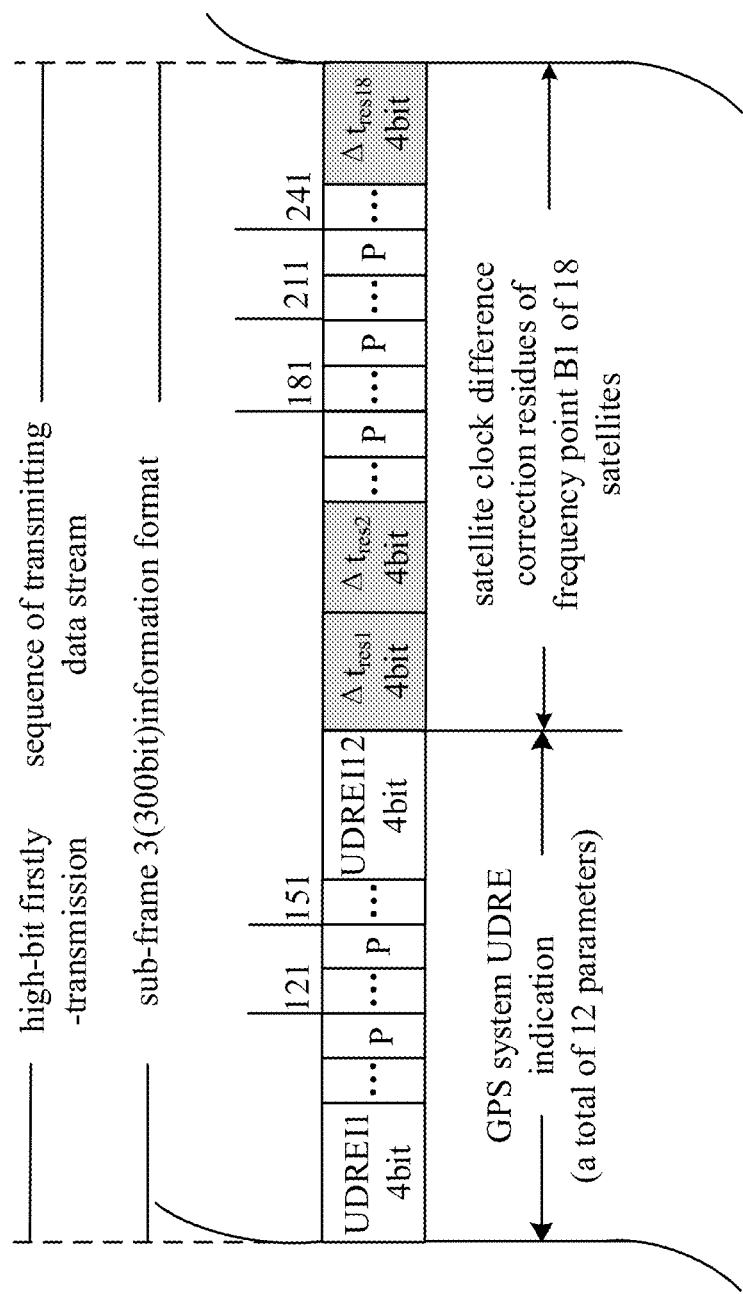
Figures 3, 9A:
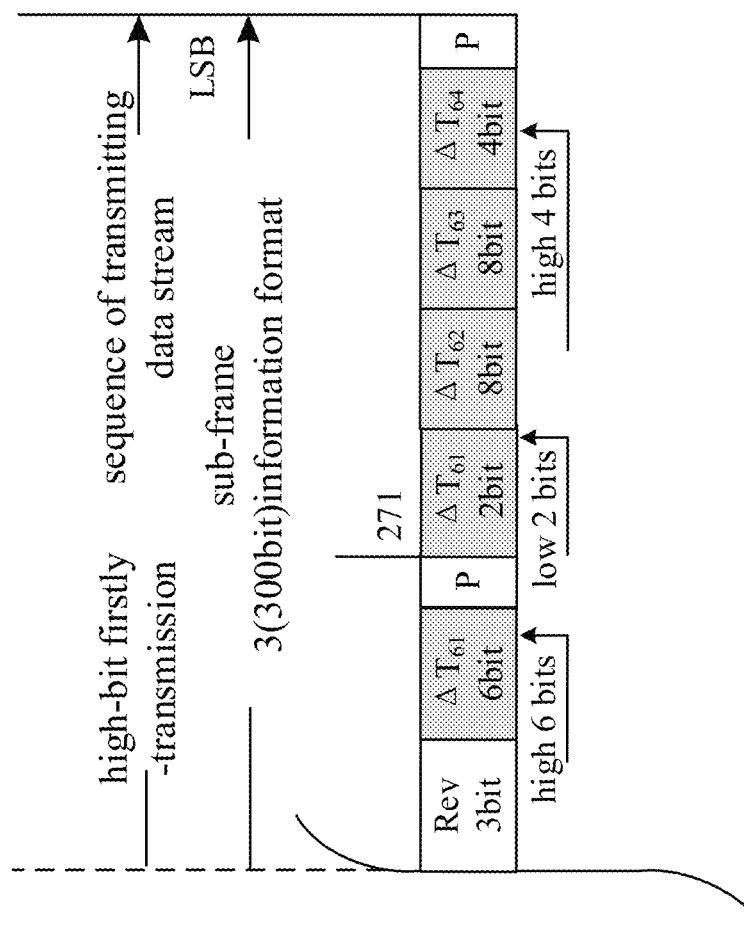
Figures 1, 9B:
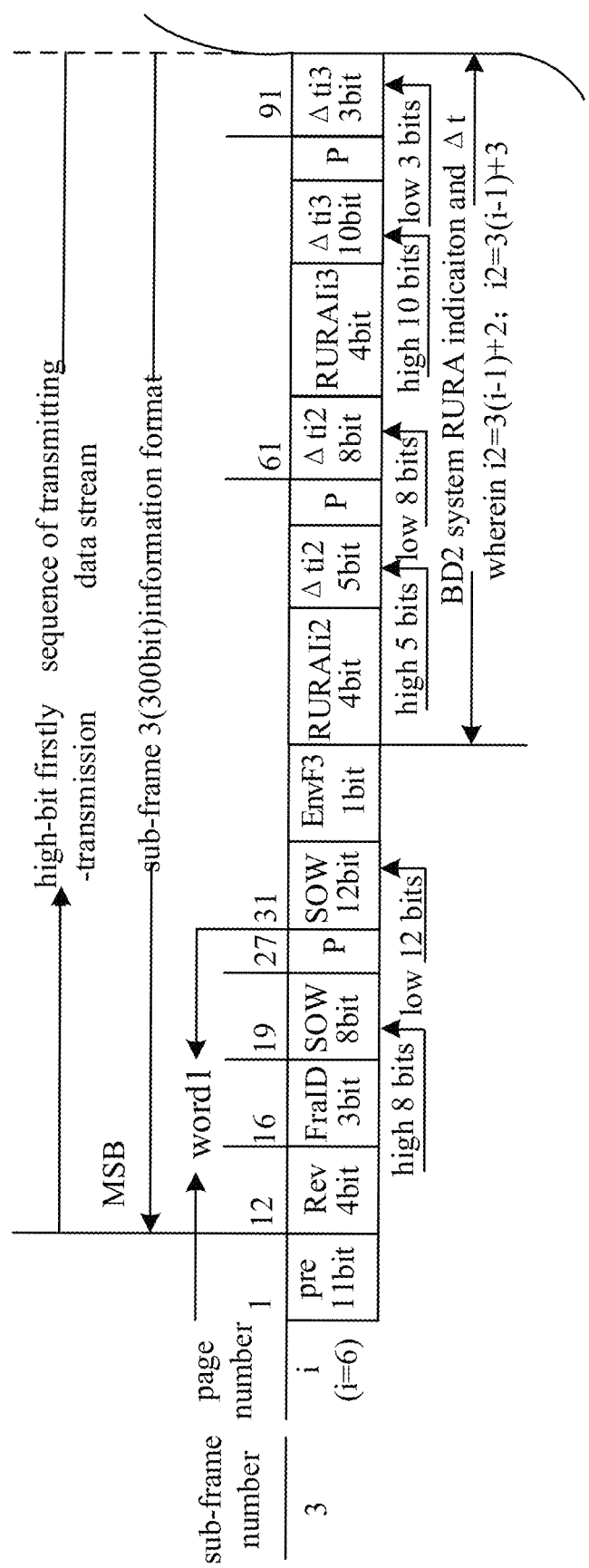
Figures 2, 9B:
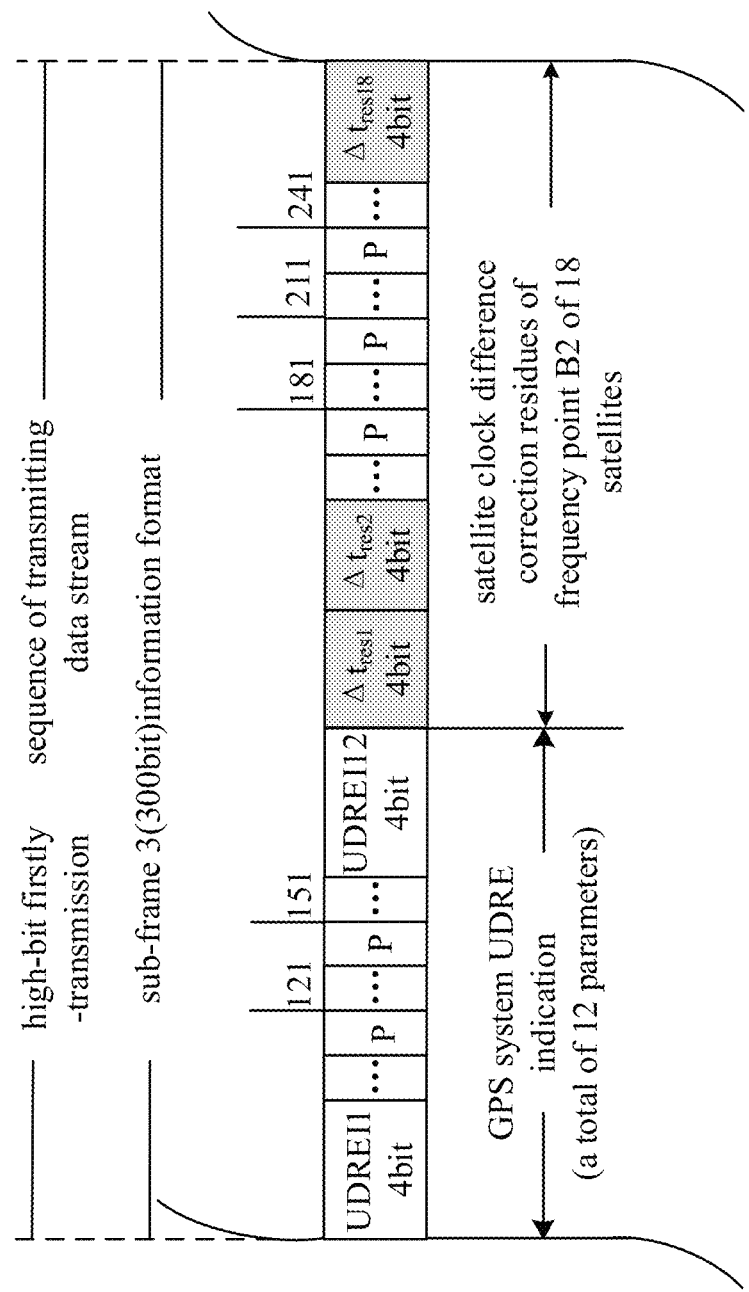
Figures 3, 9B:
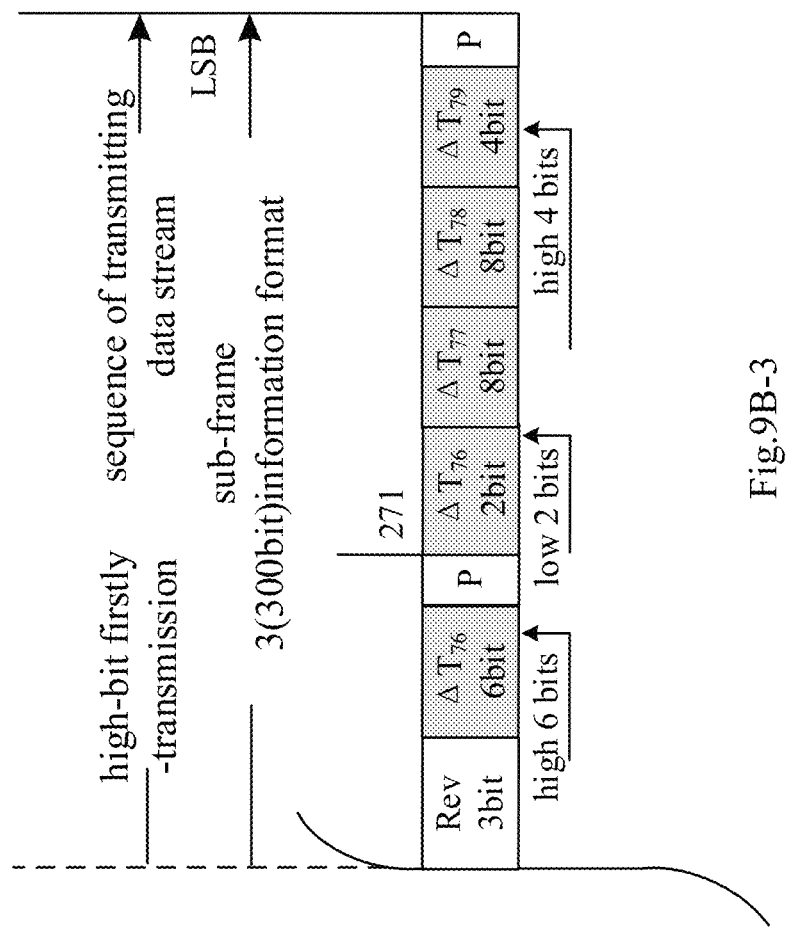

Each of satellite clock difference correction residues consists of 4 bits of information bits. Usually, each GEO satellite can broadcast satellite clock difference correction residues of 18 satellites. FIGS. 9A to 9B are schematic diagrams respectively illustrating examples of message arrangements of pages 5-6 of sub-frame 3 for broadcasting satellite clock difference correction parameters according to an embodiment of the present invention. As shown on the far left of each figure, a sub-frame number and page number i are shown. Numbers above the information bit sequence indicates the bit numbers of the corresponding information bits in the page, MSB represents the most significant bit, and LSB represents the least significant bit. As shown in FIG. 9A, information bits different from those broadcasting partition comprehensive corrections in page 5 of sub-frame 3 broadcast satellite clock difference correction residues of the frequency point B1 of the 18 satellites, as shown by $\Delta t_{res1}$, $\Delta t_{res2}$ . . . $\Delta t_{res18}$. Similarly, as shown in FIG. 9B, information bits different from those broadcasting partition comprehensive corrections in page 6 of sub-frame 3 broadcast satellite clock difference correction residues of the B2 frequency point of the 18 satellites, as shown by $\Delta t_{res1}$, $\Delta t_{res2}$ . . . $\Delta t_{res18}$.

It should be understood that if the total number of satellites that there are satellite clock difference correction residues that need to be broadcast is less than 18, some information bits in the predetermined positions for broadcasting satellite clock difference correction residues shown in FIG. 9A and FIG. 9B may be empty or as reserved information bits.

As described above, the update period of the satellite clock difference correction residues is 18 seconds while the update period of the partition comprehensive corrections is 36 seconds. With flexible message arrangement, it is possible to realize the rapid-slow combination of different broadcast frequencies between the satellite clock difference correction residues and the partition comprehensive corrections.

Further optionally, in the above message broadcast apparatus 40 for the enhanced parameter in the satellite navigation system, the processor 401 inserts a broadcast information category identifier into a predetermined 1-bit information bit in the reserved space of page 4 of sub-frame 2, and the satellite clock difference correction residues are broadcast in the sixth group of predetermined positions when the broadcast information category identifier is one of 1 and 0, and GPS satellite differential fast change information is broadcast in the sixth group of predetermined positions when the broadcast information category identifier is the other of 1 and 0.

Specifically, still referring to FIG. 8D, after BDID63, a 1-bit information bit may be used to broadcast the information category identifier, as shown by GPS flag. For example, when this identification bit GPS flag is "1", it indicates that the sixth group of predetermined positions as described above is used to broadcast satellite clock difference correction residues, and the message arrangement is as shown in FIGS. 9A and 9B. When this identification bit GPS flag is "0", it indicates that the sixth group of predetermined positions as described above is used to broadcast the GPS satellite differential fast change information, as shown in FIGS. 8J and 8K. Specifically, RUAI11~RUAI13 and $\Delta t_{GPSi1} \sim \Delta t_{GPSi3}$ in FIGS. 8J and 8K represent the GPS satellite differential fast change information.

It should be understood that, obviously, the meanings of "1" and "0" of the identification bit GPS flag are not limited to the above-described exemplary case, but may be interchanged.

By setting the information category identifier, resource sharing between different satellite navigation systems can be realized, channel link resources are saved, and the message arrangement can be flexibly and dynamically adjusted.

Optionally, in the above message broadcast apparatus 40 for the enhanced parameter in the satellite navigation system, the enhanced parameter includes GPS partition comprehensive correction parameters, and the GPS partition comprehensive correction parameters include GPS partition comprehensive corrections, GPS area identifiers and GPS satellite identifiers. Additionally, the GPS area identifiers are used for, for each of GPS areas, employing a 1-bit information bit respectively to identify whether there is a GPS partition comprehensive correction that needs to be broadcast, and the processor 401 inserts the GPS area identifiers into a seventh group of predetermined positions in the reserved space of page 23 and page 83 of sub-frame 5. Additionally, the GPS satellite identifiers are used for, for each of GPS satellites, employing a 1-bit information bit respectively to identify whether there is a GPS partition comprehensive correction that needs to be broadcast, and the processor 401 inserts the GPS satellite identifiers into an eighth group of predetermined positions in the reserved space of page 23 and page 83 of sub-frame 5. Additionally, the processor 401 inserts the GPS partition comprehensive corrections, which correspond to different GPS areas and different GPS satellites respectively and need to be broadcast, into a ninth group of predetermined positions in the reserved space of page 23 to page 30 and page 83 to page 90 of sub-frame 5 sequentially. Additionally, the broadcast period of the GPS partition comprehensive correction parameters is 30 seconds to 3 minutes, and preferably 36 seconds. The 36 seconds mentioned in the embodiment of the present invention is merely an example, not a limitation.

Specifically, although the current GPS satellite navigation system are not divided by regions like the Beidou system, in practice, regional division may be conducted on the GPS satellite navigation system and the GPS partition comprehensive corrections may be further applied. FIGS. 10A to 10E are schematic diagrams respectively illustrating examples of message arrangements of pages 23~30, 83~90 of sub-frame 5 for broadcasting GPS partition comprehensive correction parameters according to an embodiment of the present invention. As shown on the far left of each figure, a sub-frame number and page number i are shown. Numbers above the information bit sequence indicate the bit numbers of the corresponding information bits in the page, MSB represents the most significant bit, and LSB represents the least significant bit.

Figures 1, 10A:
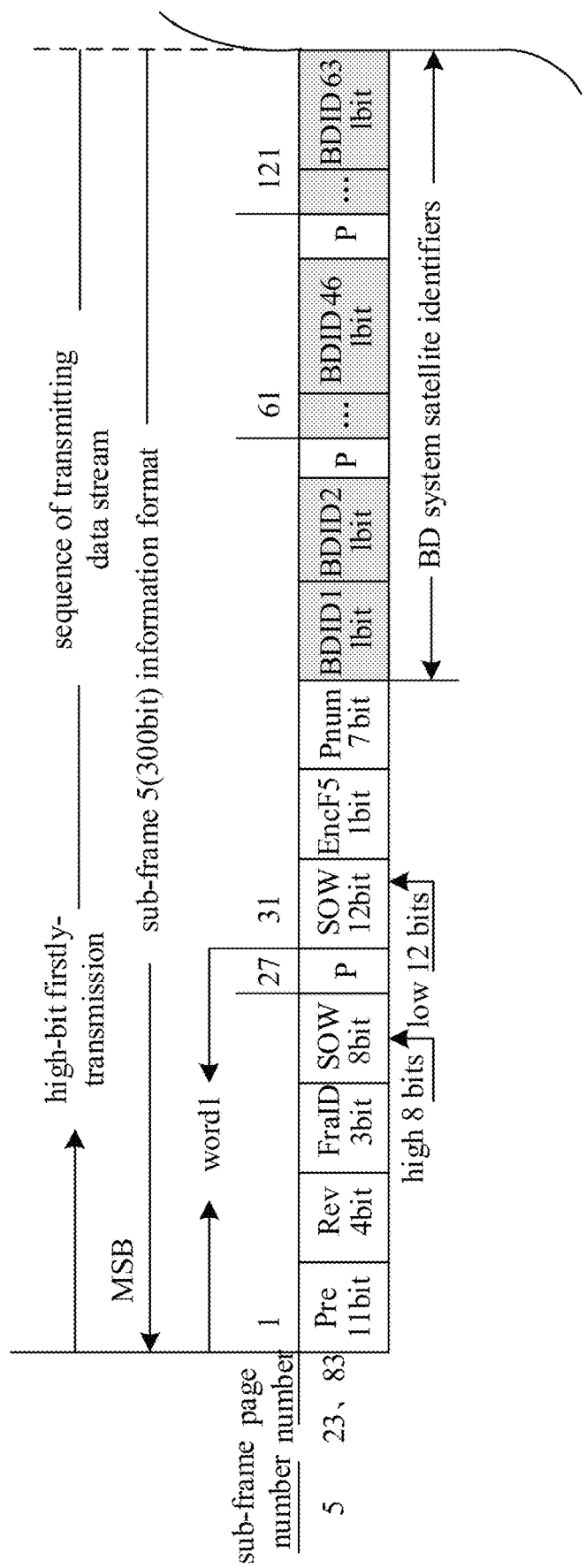
FIGS. 10A to 10E are schematic diagrams respectively illustrating examples of message arrangements of pages 23~30, 83~90 of sub-frame 5 for broadcasting GPS partition comprehensive correction parameters according to an embodiment of the present invention.
Figures 2, 10A:
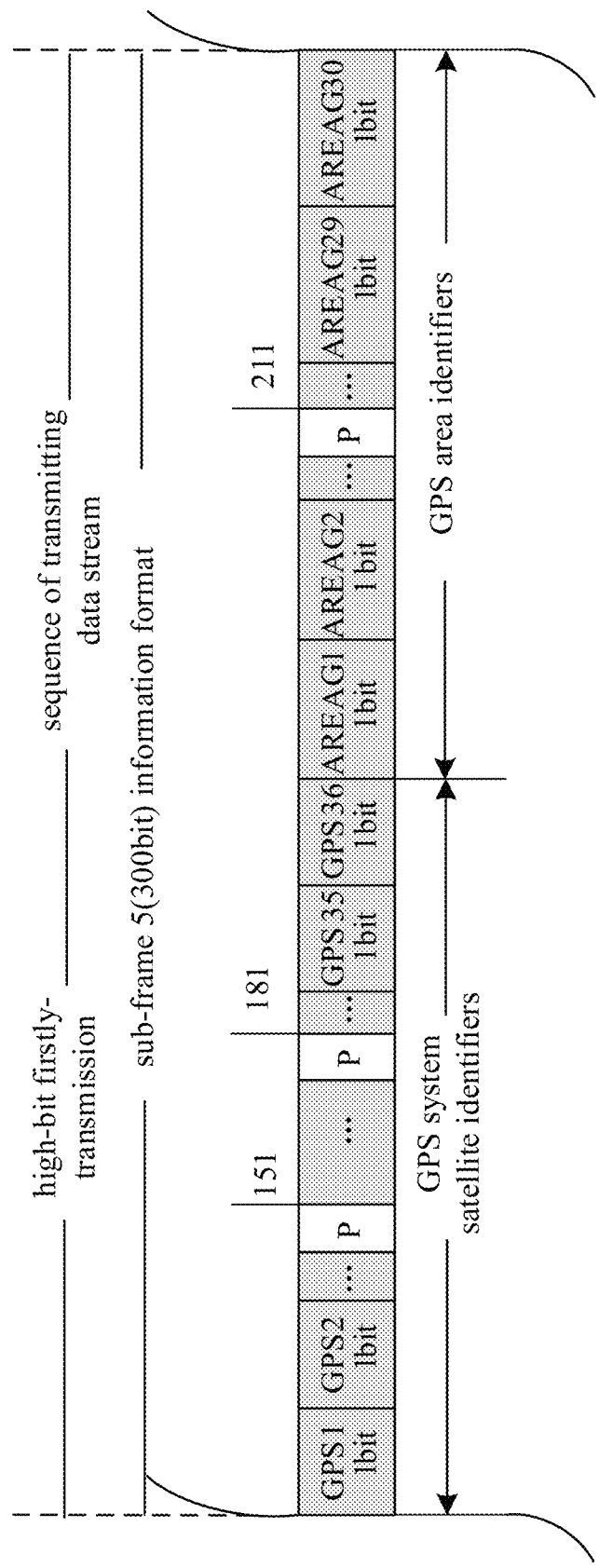
Figures 3, 10A:
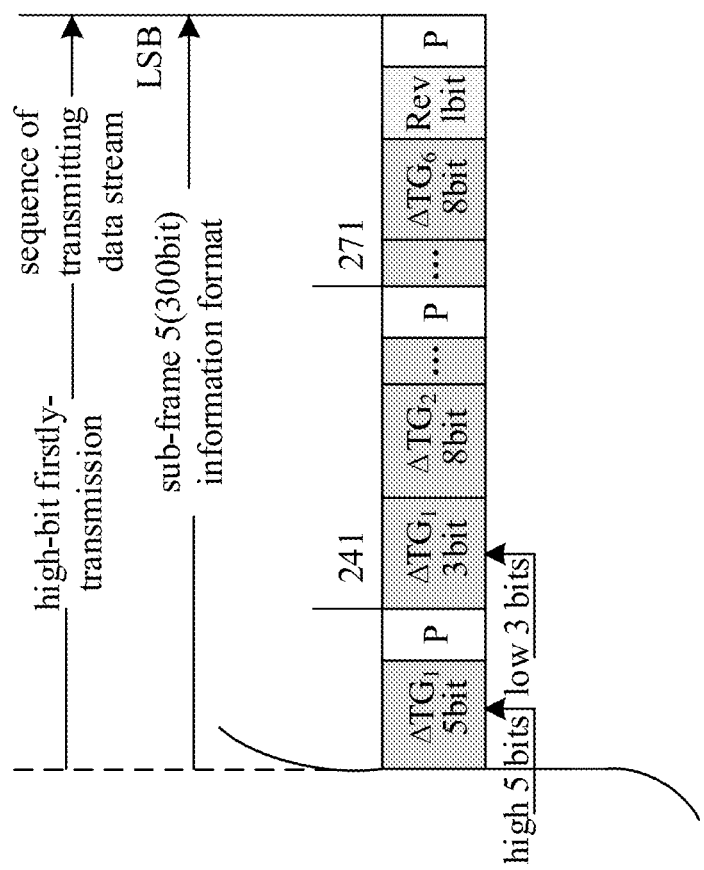

Similarly with the aforementioned partition comprehensive corrections for the Beidou system, for example, the GPS satellite navigation system is divided into 30 GPS areas, and each of GPS areas broadcasts one GPS partition comprehensive correction. Correspondingly, the GPS area identifiers are set for employing, for each of 30 GPS areas, a 1-bit information bit respectively to identify whether there is a GPS partition comprehensive correction that needs to be broadcast. FIG. 10A shows the message arrangement of pages 23, 83 of sub-frame 5. As shown in FIG. 10A, AREAI1, AREAI2, . . . , AREAI30 respectively represent the GPS area identifiers of the 30 GPS areas. When a certain identification bit is "1", it indicates that there is a GPS partition comprehensive correction that needs to be broadcast for the GPS area identified by it, and when this identification bit is "0", it indicates that there is no GPS partition comprehensive correction that needs to be broadcast for the GPS area identified by it. It can be understood that, here, the 30 bits of information bits for broadcasting the GPS area identifiers AREI1 to AREI30 of the 30 GPS areas in pages 23, 83 of sub-frame 5 may correspond to the seventh group of predetermined positions as described above.

Unlike the Beidou satellite navigation system, the GPS satellite navigation system has a total of 36 GPS satellites. The GPS satellite identifiers are set for employing, for each of 36 GPS satellites, a 1-bit information bit respectively to identify whether there is a GPS partition comprehensive correction that needs to be broadcast. As shown in FIG. 10A, GPS1, GPS2, . . . , GPS36 respectively indicate the GPS satellite identifiers of the 36 GPS satellites. When a certain identification bit is "1", it indicates that there is a GPS partition comprehensive correction that needs to be broadcast for the GPS satellite identified by it, and when this identification bit is "0", it indicates that there is no GPS partition comprehensive correction that needs to be broadcast for the GPS satellite identified by it. It can be understood that, here, the 36 bits of information bits for broadcasting the GPS satellite identifiers GPS1 to GPS36 of the 36 GPS satellites in pages 23, 83 of sub-frame 5 may correspond to the eighth group of predetermined positions as described above.

Figure 10B:
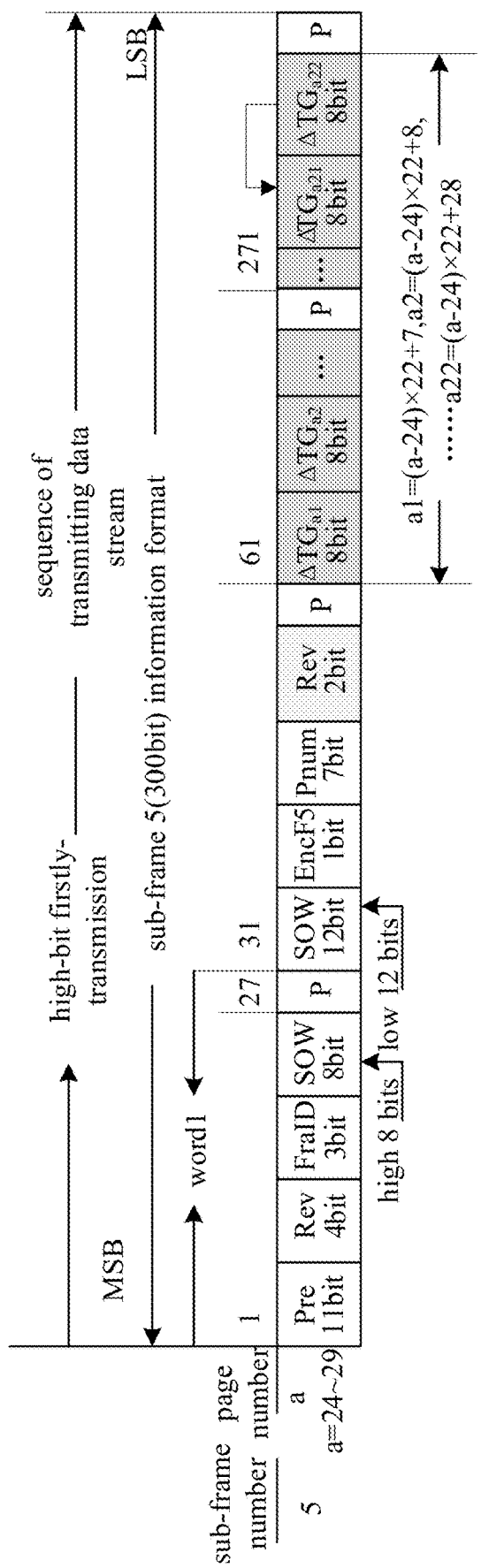
Figure 10C:
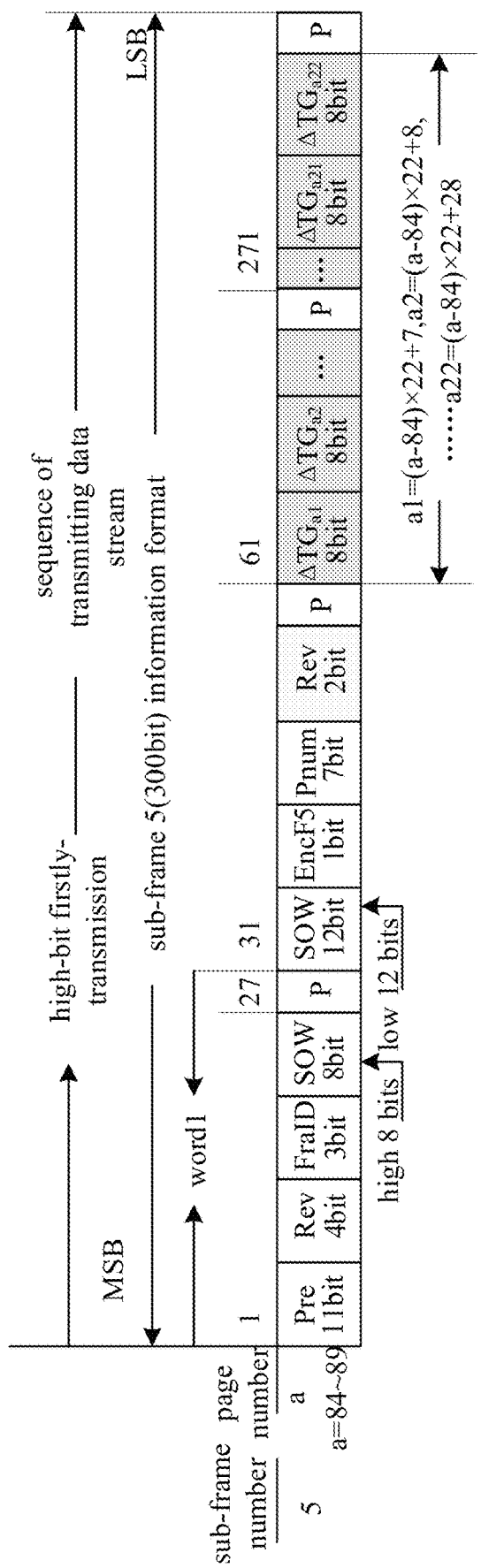
Figures 1, 10D:
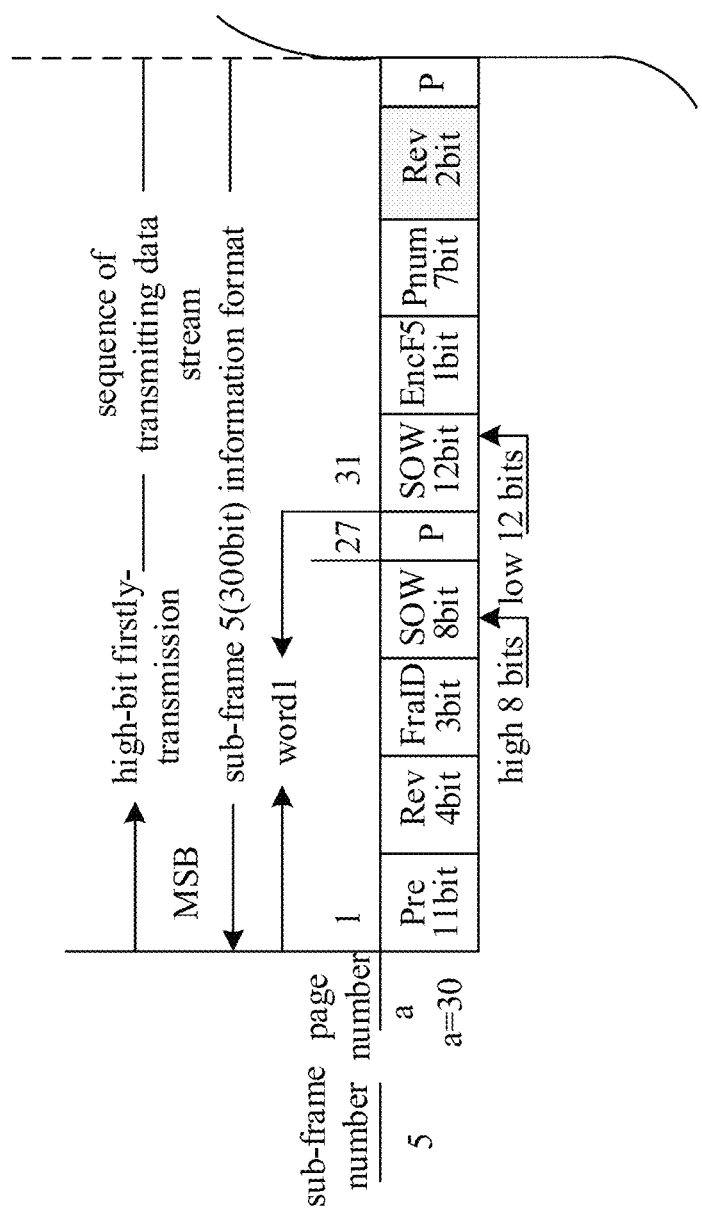
Figures 2, 10D:
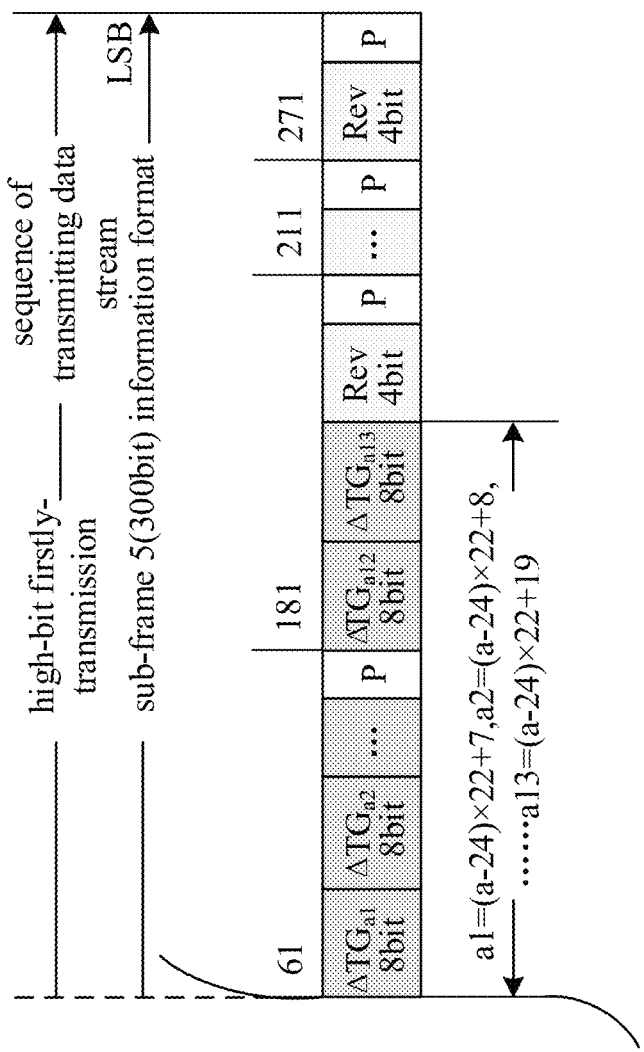
Figures 1, 10E:
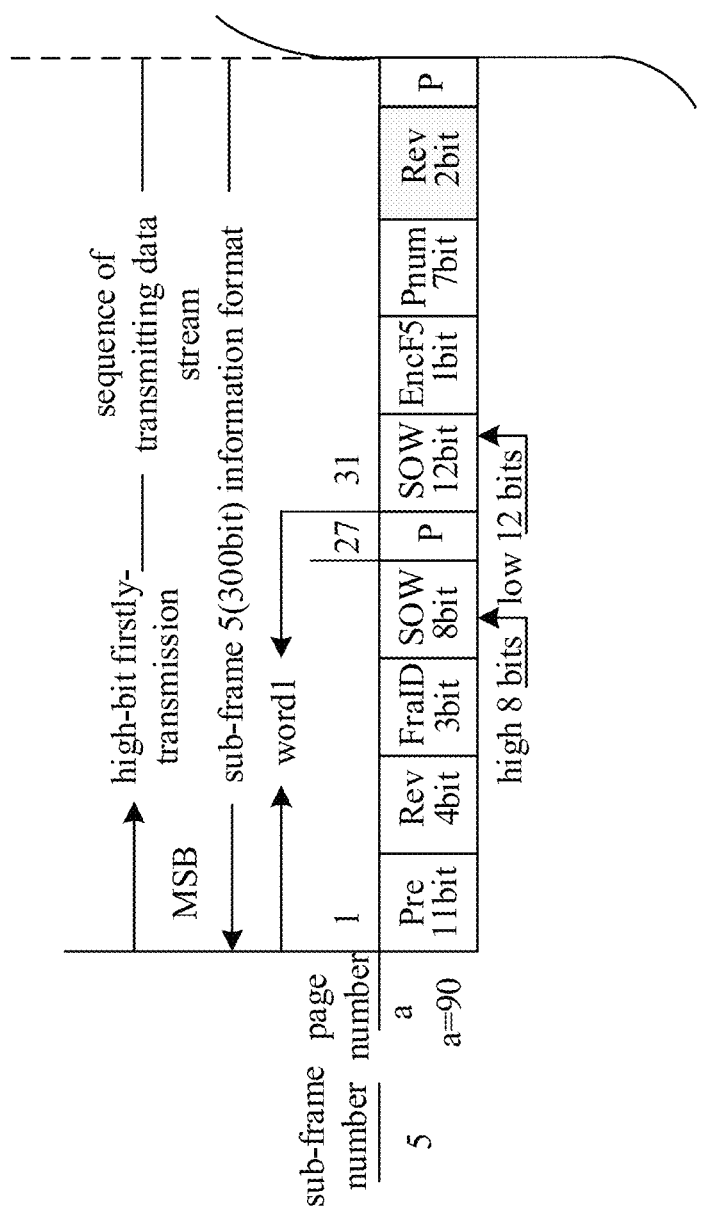
Figures 2, 10E:
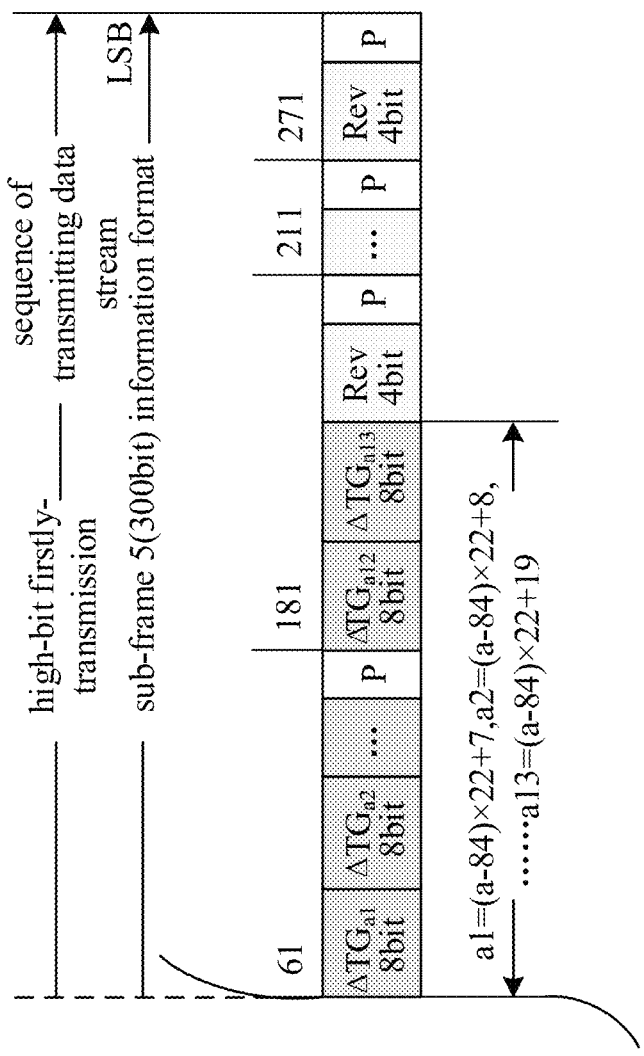

The GPS partition comprehensive corrections, which correspond to different GPS areas and different GPS satellites respectively and need to be broadcast, are inserted into a ninth group of predetermined positions in the reserved space of pages 23~30, 83~90 of sub-frame 5 sequentially. Specifically, similarly with the Beidou system, each GPS partition comprehensive correction is composed of 8 bits. Referring to FIG. 10A, the 228th bits to the 232th bits, the 241th bits to the 262th bits and the 271th bits to the 291th bits of pages 23, 83 of sub-frame 5 are used to broadcast 6 GPS partition comprehensive corrections, as shown by $\Delta TG_1$ to $\Delta TG_6$. FIG. 10B shows the message arrangement of pages 24~29 of sub-frame 5. As shown by $\Delta TG_{a1}$ to $\Delta TG_{a22}$, 22 GPS partition comprehensive corrections can be broadcast per page. FIG. 10C shows the message arrangement of pages 84~89 of sub-frame 5. Similarly with FIG. 10B, as shown by $\Delta TG_{a1}$ to $\Delta TG_{a22}$, 22 GPS partition comprehensive corrections can be broadcast per page. FIGS. 10D and 10E show the message arrangements of page 30 and page 90 of sub-frame 5, respectively. As shown by $\Delta TG_{a1}$ to $\Delta TG_{a13}$ in FIGS. 10D and 10E, each of page 30 and page 90 can broadcast 13 GPS partition comprehensive corrections. Therefore, a total of 151 GPS partition comprehensive corrections can be broadcast by pages 23~30 of sub-frame 5, and similarly, a total of 151 GPS partition comprehensive corrections can be broadcast by pages 83~90 of sub-frame 5.

As described above in conjunction with FIG. 5, sub-frame 5 in the navigation message frame structure model is composed of 120 pages, and can achieve the broadcast frequency of 6 minutes. Here, since pages 23~30 differ from pages 83~90 by 60 pages, the update period of the GPS partition comprehensive corrections can be implemented as 3 minutes. That is to say, based on the GPS area identifiers and the GPS satellite identifiers in page 23 of sub-frame 5, the corresponding GPS partition comprehensive corrections can be broadcast in pages 23~30; the GPS area identifiers and the GPS satellite identifiers broadcast in page 83 of sub-frame 5 may be different from those in page 23, that is, the GPS area identifiers and the GPS satellite identifiers are updated after 3 minutes, therefore, the GPS partition comprehensive corrections broadcast in pages 83~90 of sub-frame 5 are based on the GPS area identifiers and the GPS satellite identifiers broadcast in page 83 of sub-frame 5.

The GPS area index and the GPS satellite index corresponding to each GPS partition comprehensive correction may be determined similarly with the foregoing partition comprehensive correction for the Beidou system, and will no longer be described here.

It should be understood that although at most 151 GPS partition comprehensive corrections can be broadcast every 3-minute period as described above, if only 100 GPS partition comprehensive corrections need to be broadcast in a certain 3-minute period, remaining information bits, after the 100 partition comprehensive corrections are sequentially broadcast, in the ninth group of predetermined positions of sub-frame 5 may be empty or as reserved bits.

Since the GPS area identifiers and the GPS satellite identifiers are used to identify which GPS areas and which GPS satellites have GPS partition comprehensive corrections that need to be broadcast as described above, the ninth group of predetermined positions in sub-frame 5 can be used only for broadcasting the GPS partition comprehensive corrections that need to be broadcast without allocating fixed information bits for GPS partition comprehensive corrections that do not need to be broadcast, thus saving channel link resources. Moreover, after each of update periods, since the GPS area identifiers and the GPS satellite identifiers may change, GPS partition comprehensive corrections that need to be broadcast will also change, so the ninth group of predetermined positions of sub-frame 5 may broadcast the updated GPS partition comprehensive corrections corresponding to different GPS areas and different GPS satellites. It can be seen that all GPS satellites in the GPS satellite navigation system can share identification bits and perform dynamic adjustment, thus saving resources and realizing fast uploading. In addition, since the broadcast position of the GPS partition comprehensive correction parameters is different from the broadcast position of the partition comprehensive corrections for the Beidou system as described above, enhanced parameters of different satellite navigation systems can be simultaneously broadcast at different update frequencies in the same navigation message frame structure model, and thus the scalability of the navigation message is further improved.

Optionally, in the above message broadcast apparatus 40 for the enhanced parameter in the satellite navigation system, the enhanced parameter includes satellite orbit correction parameters, and the satellite orbit correction parameters include satellite identifiers, satellite broadcast ephemeris corrections and equivalent distance error status identifiers of satellite ephemeris corrections. Additionally, the satellite identifiers are used for, for each of satellites in the satellite navigation system, employing a 1-bit information bit respectively to identify whether there are a satellite broadcast ephemeris correction and an equivalent distance error status identifier of the satellite ephemeris correction that need to be broadcast, and the processor 401 inserts the satellite identifiers into a tenth group of predetermined positions in the reserved space of page 23 of sub-frame 5. Additionally, the processor 401 inserts the satellite broadcast ephemeris corrections and the equivalent distance error status identifiers of satellite ephemeris corrections, which correspond to different satellites respectively and need to be broadcast, into a eleventh group of predetermined positions in the reserved space of page 117 to page 120, page 31 and page 91 of sub-frame 5. Additionally, the broadcast period of the satellite orbit correction parameters is 3~6 minutes, and preferably 6 minutes. The embodiment of the present invention take the 6 minutes as an example, but it is merely an example, not a limitation.

Specifically, the Beidou satellite navigation system is still taken as an example for illustration by way of examples. As mentioned before, the Beidou satellite navigation system has a total of 63 satellites. However, not every satellite has a satellite broadcast ephemeris correction and an equivalent distance error status identifier of the satellite ephemeris correction that need to be broadcast. Usually, the GEO satellite broadcasts satellite broadcast ephemeris corrections and equivalent distance error status identifiers of the satellite ephemeris corrections of 18 satellites. As shown in FIG. 10A, the satellite identifiers of the Beidou system can be further broadcast in pages 23, 83 of sub-frame 5, as shown by BDID1 to BDID63. When a certain identification bit is "1", it indicates that there is a satellite broadcast ephemeris correction and an equivalent distance error status identifier of the satellite ephemeris correction that need to be broadcast for the satellite identified by it, and when this identification bit is "0", it indicates that there is no satellite broadcast ephemeris correction and equivalent distance error status identifier of the satellite ephemeris correction that need to be broadcast for the satellite identified by it.

Based on respective satellite identifiers broadcast in page 23 of sub-frame 5, satellite broadcast ephemeris corrections and equivalent distance error status identifiers of the satellite ephemeris corrections that need to be broadcast are sequentially broadcast in pages 117~120, 31, 91 of sub-frame 5. FIGS. 11A to 11E are schematic diagrams respectively illustrating examples of message arrangements of pages 117~120, 31, 91 of sub-frame 5 for broadcasting satellite orbit correction parameters according to an embodiment of the present invention. As shown on the far left of each figure, a sub-frame number and page number i are shown. Numbers above the information bit sequence indicate the bit numbers of the corresponding information bits in the page, MSB represents the most significant bit, and LSB represents the least significant bit.

Figures 1, 11A:
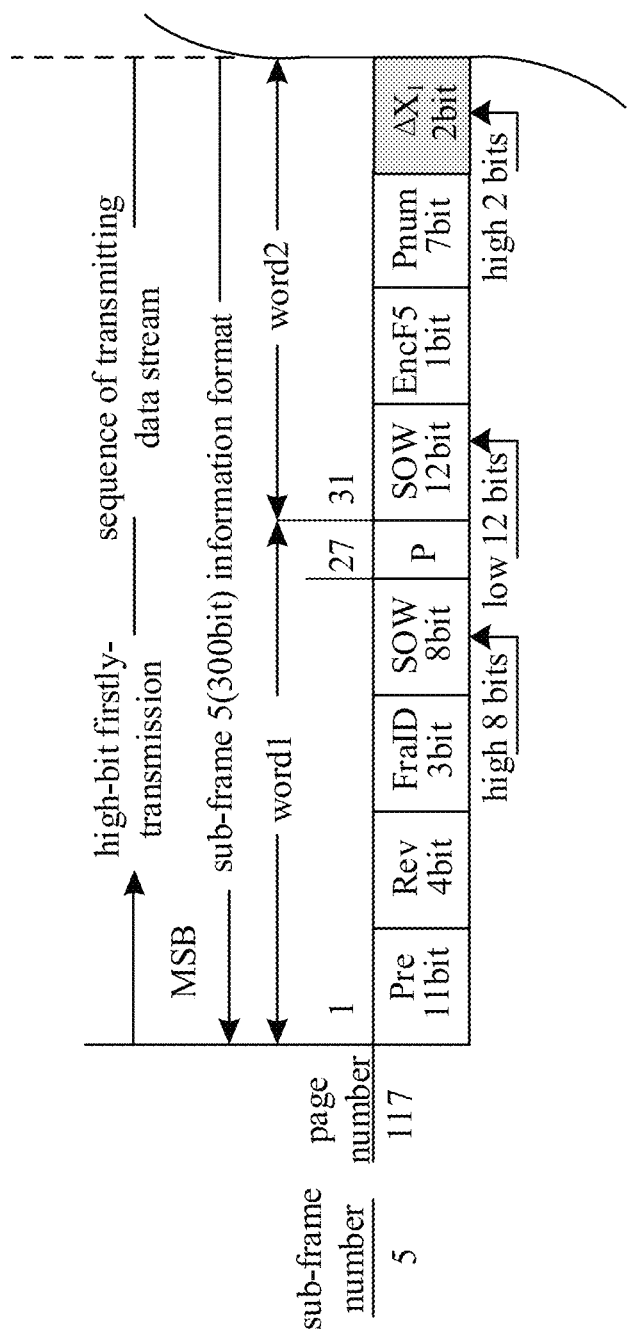
FIGS. 11A to 11E are schematic diagrams respectively illustrating examples of message arrangements of pages 117~120, 31, 91 of sub-frame 5 for broadcasting satellite orbit correction parameters according to an embodiment of the present invention.
Figures 2, 11A:
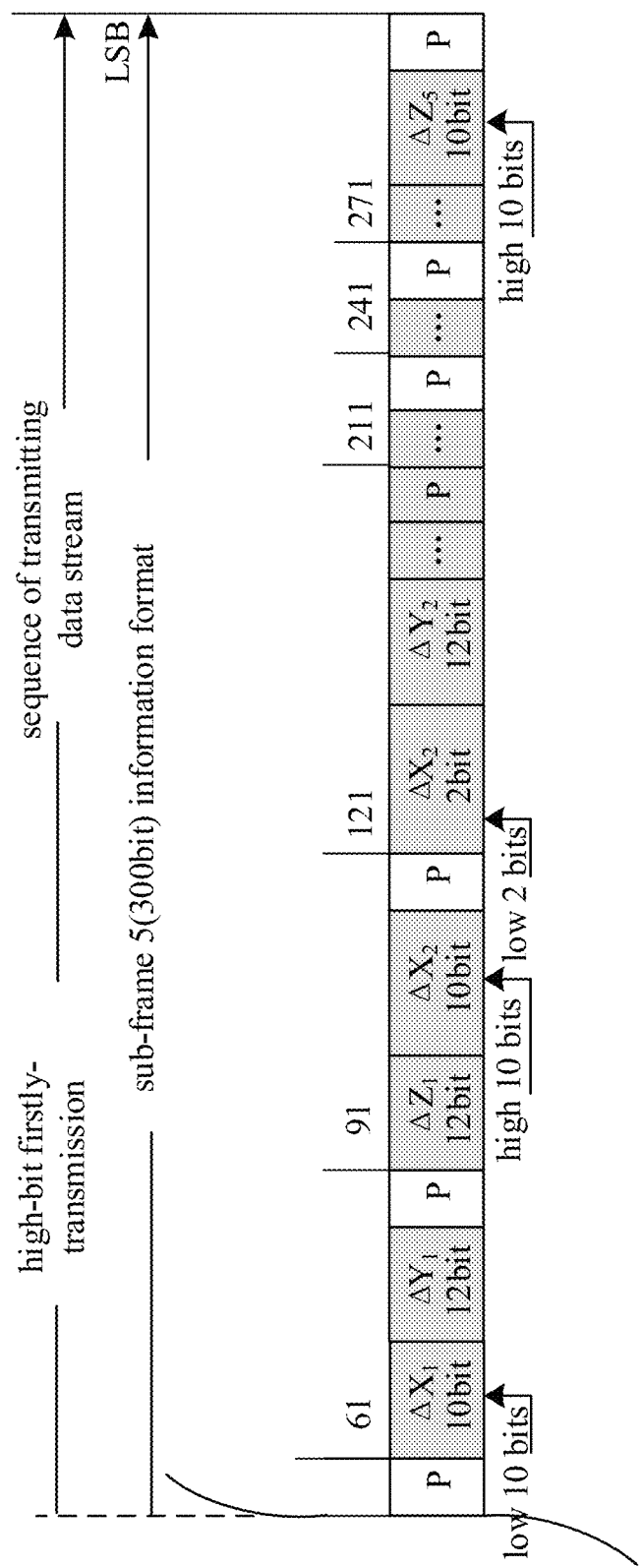
Figures 1, 11B:
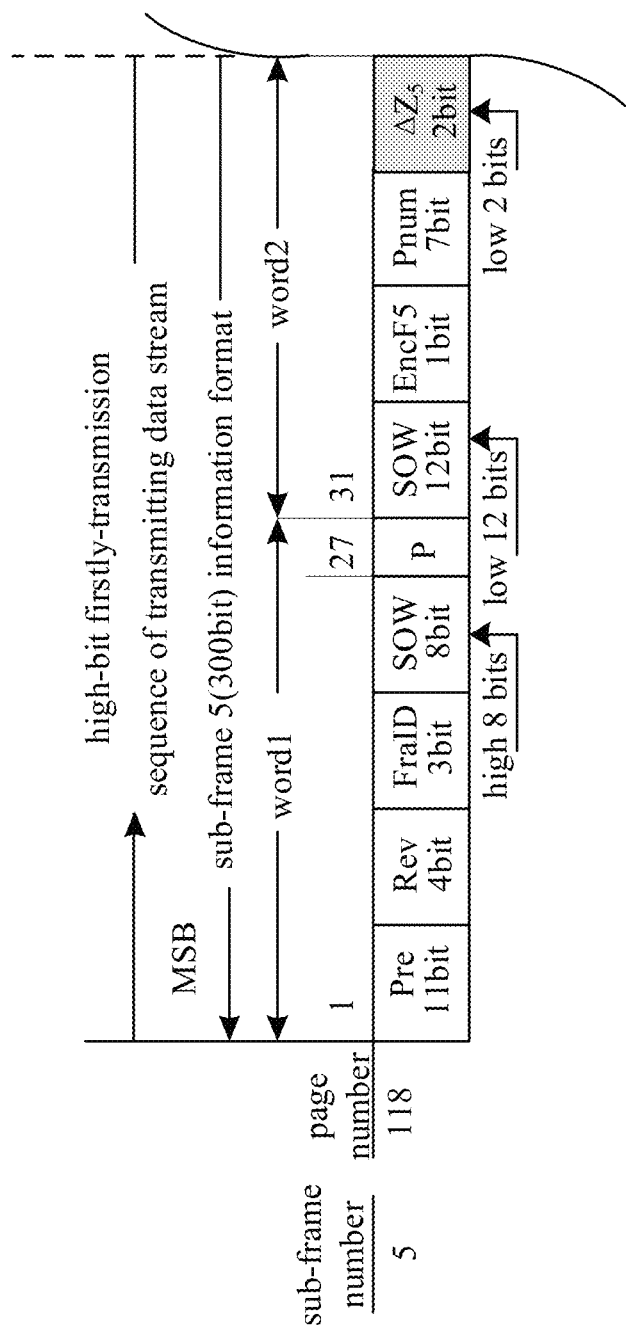
Figures 2, 11B:
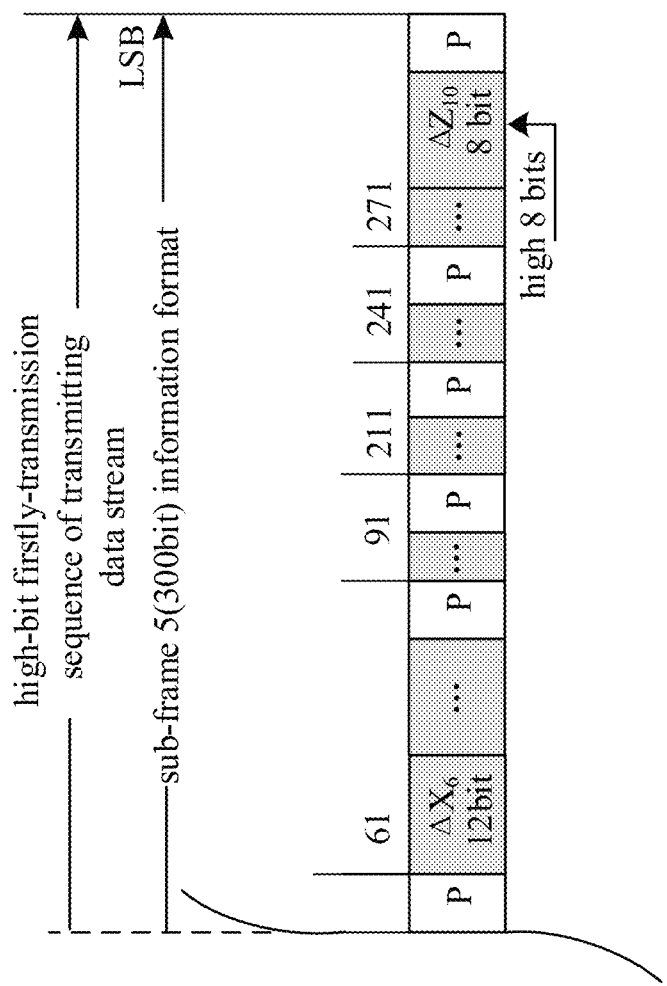
Figures 1, 11C:
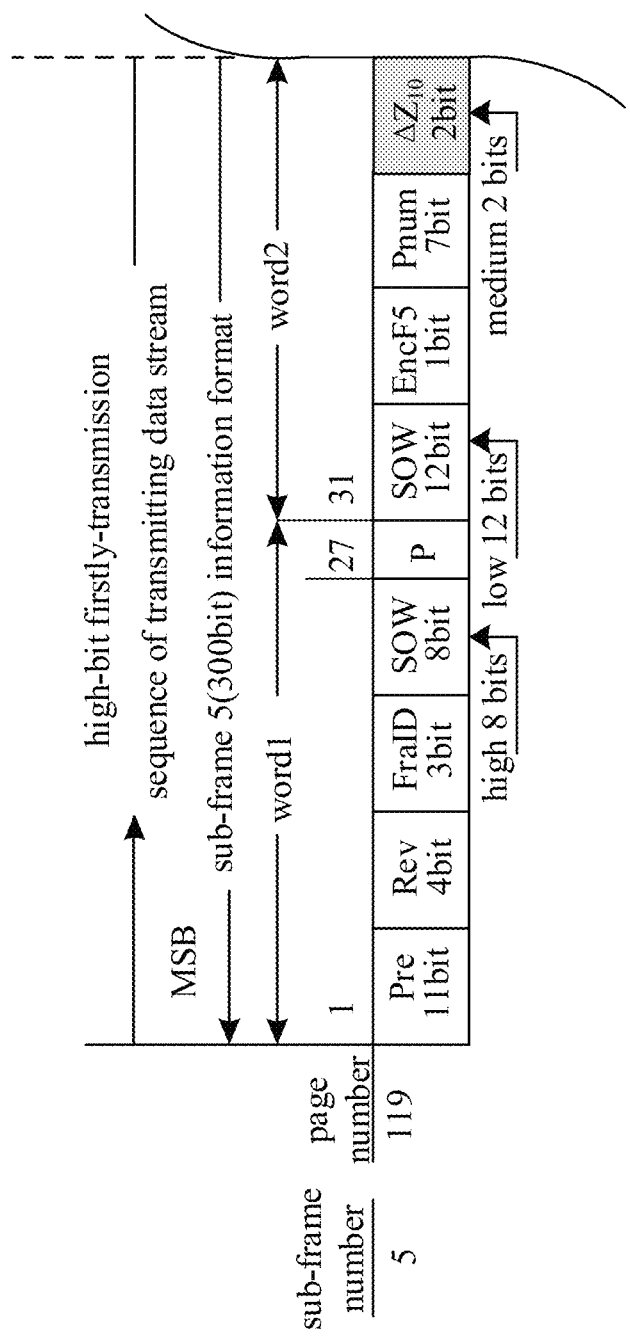
Figures 2, 11C:
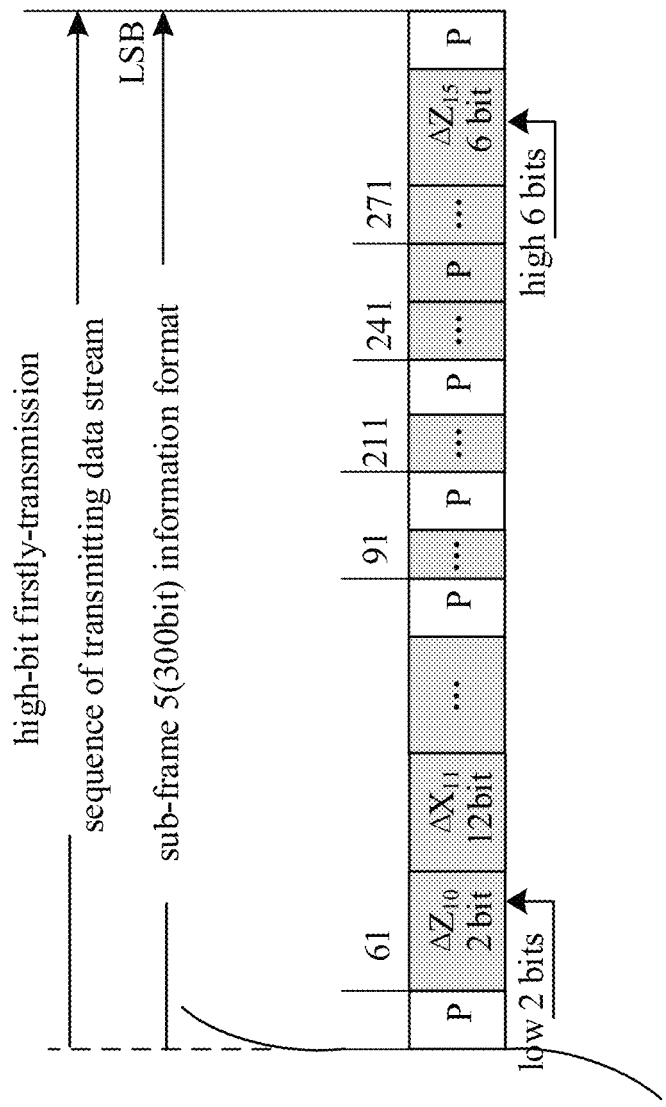
Figures 1, 11D:
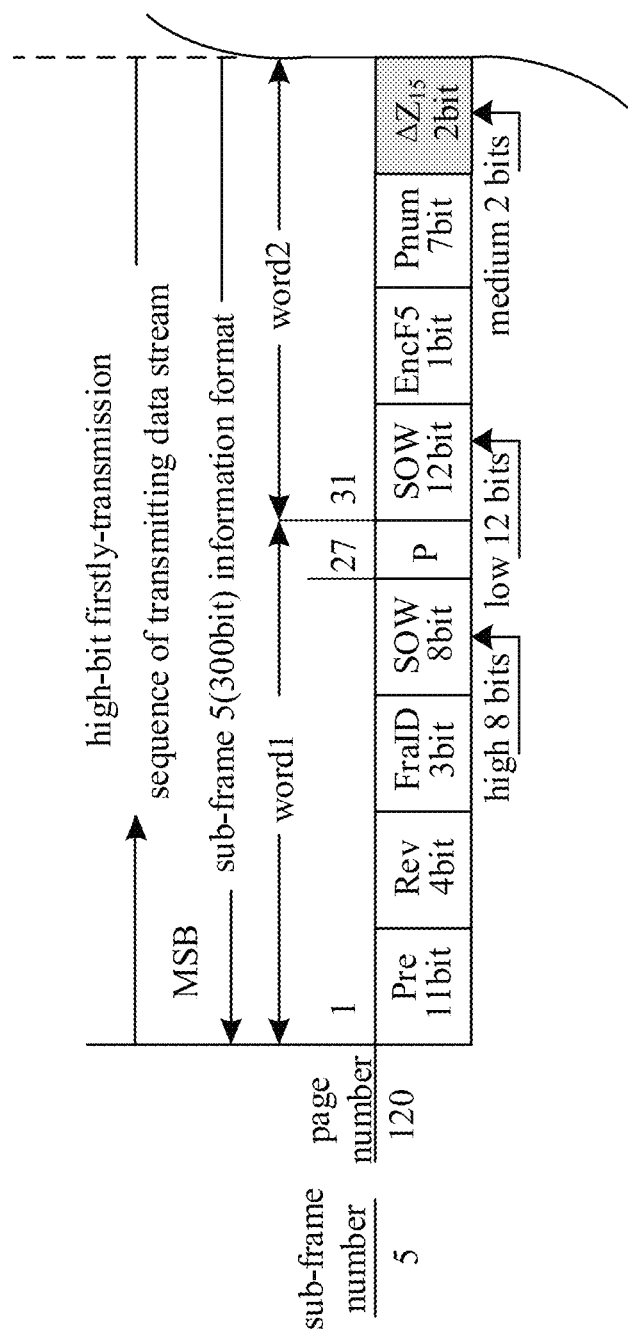
Figures 2, 11D:
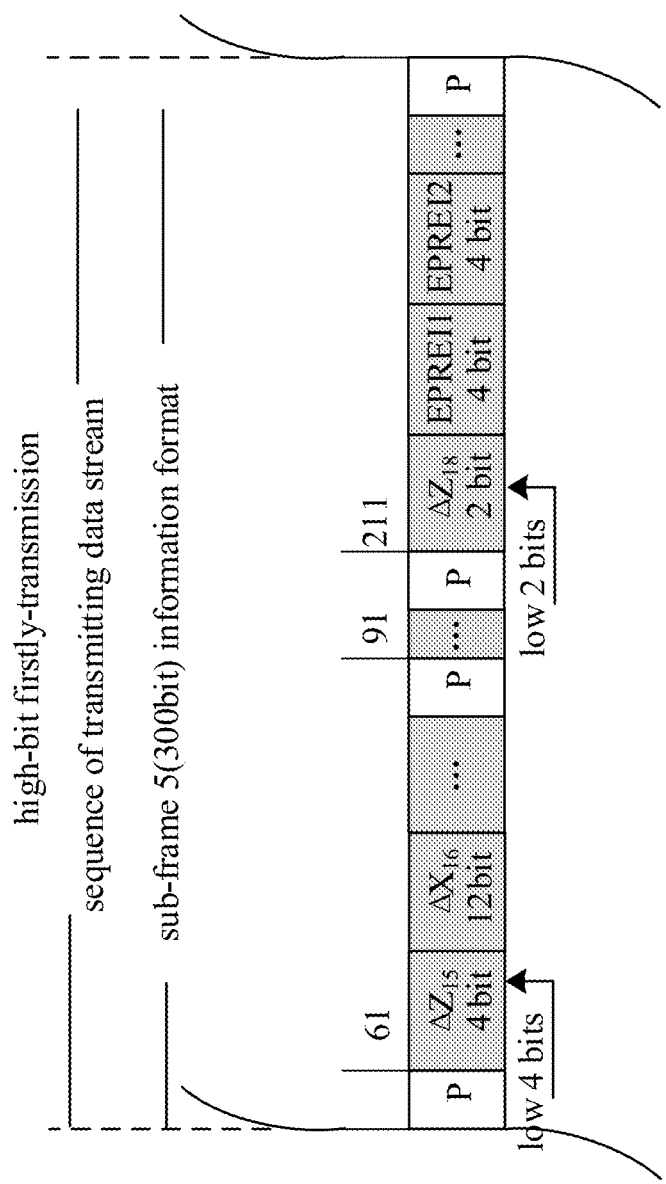
Figures 3, 11D:
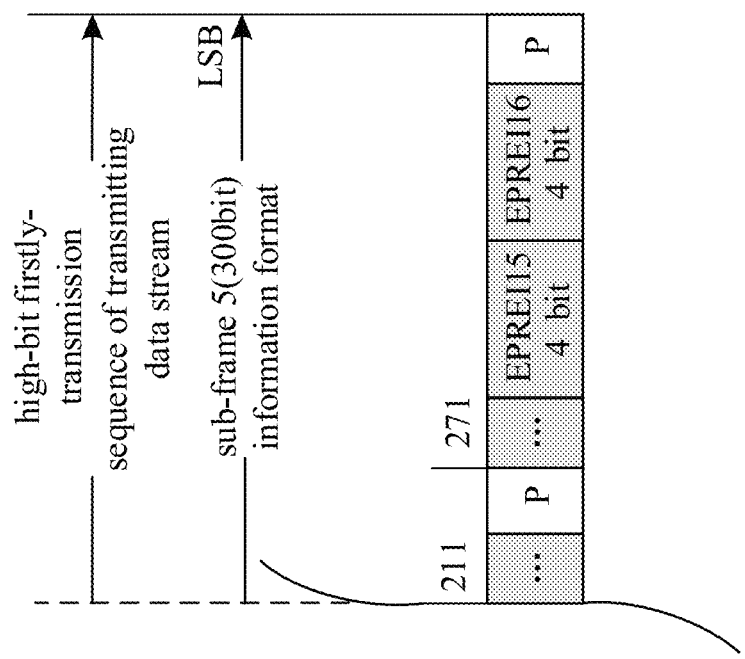
Figures 1, 11E:
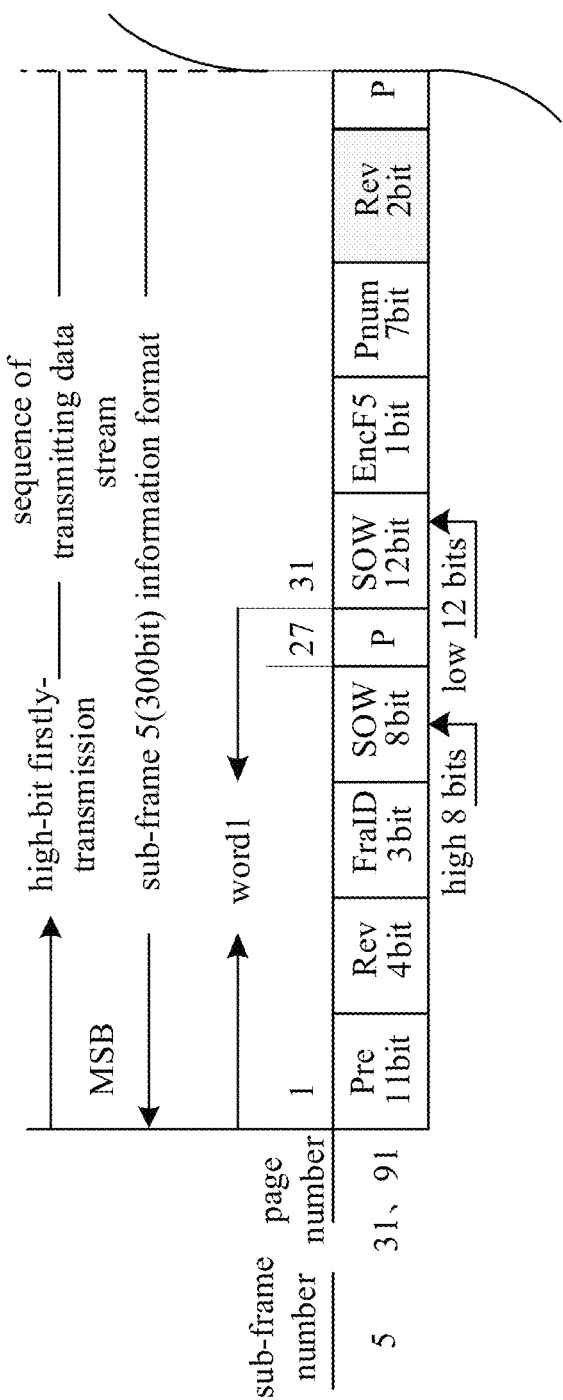
Figures 2, 11E:
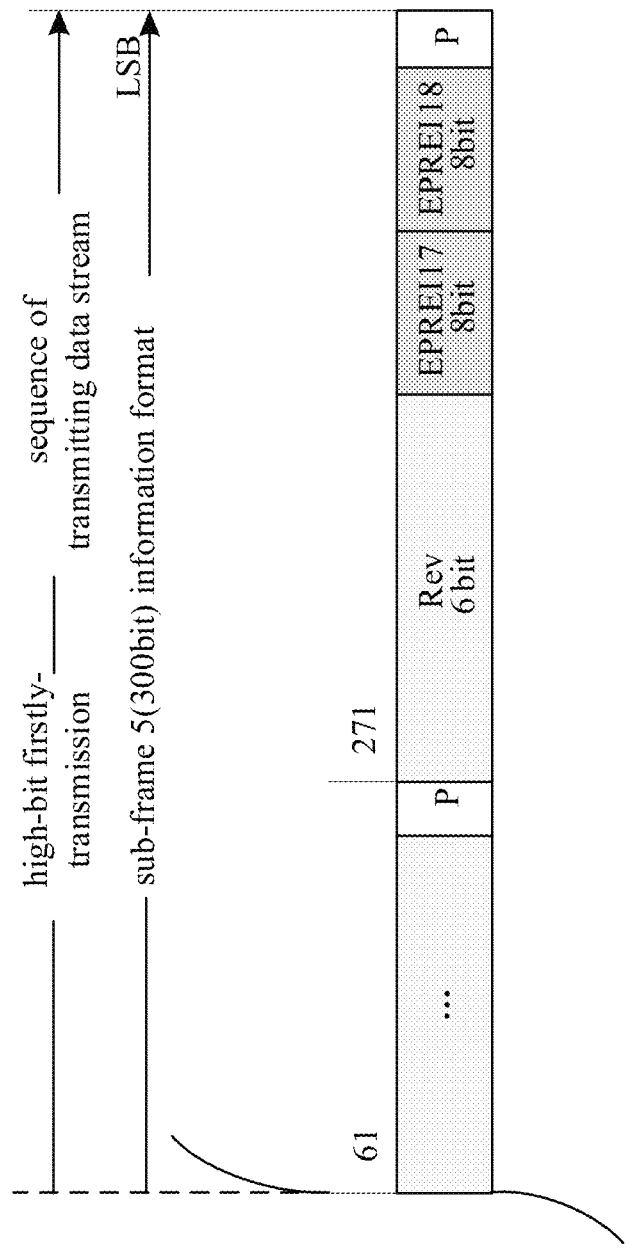

As shown in FIG. 11A, a group of $\Delta X$, $\Delta Y$, $\Delta Z$ represents one satellite broadcast ephemeris correction, and $\Delta X$, $\Delta Y$, $\Delta Z$ each occupy 12 bits. Page 117 of sub-frame 5 can broadcast 4 complete satellite broadcast ephemeris corrections and the complete $\Delta X$, $\Delta Y$ and the upper 10 bits of $\Delta Z$ in the 5th satellite broadcast ephemeris correction. As shown in FIG. 11B, page 118 of sub-frame 5 can broadcast the lower 2 bits of $\Delta Z$ in the 5th satellite broadcast ephemeris correction, the 6th to 9th complete satellite broadcast ephemeris corrections, and the complete $\Delta X$, $\Delta Y$ and the upper 8 bits of $\Delta Z$ in the 10th satellite broadcast ephemeris correction. As shown in FIG. 11C, page 119 of sub-frame 5 can broadcast the lower 4 bits of $\Delta Z$ in the 10th satellite broadcast ephemeris correction, the 11th to 14th complete satellite broadcast ephemeris corrections, and the complete $\Delta X$, $\Delta Y$ and the upper 6 bits of $\Delta Z$ in the 15th satellite broadcast ephemeris correction. As shown in FIG. 11D, page 120 of sub-frame 5 can broadcast the lower 6 bits of $\Delta Z$ in the 15th satellite broadcast ephemeris correction, the 16th to 18th complete satellite broadcast ephemeris corrections, and equivalent distance error status identifiers of 16 satellite ephemeris corrections (as shown by EPREI1 to EPREI16). As shown in FIG. 11E, page 31 and page 91 of sub-frame 5 are used to broadcast the equivalent distance error status identifiers of the 17th and 18th satellite ephemeris corrections (as shown by EPREI17 and EPREI18). The equivalent distance error status identifier of each satellite ephemeris correction occupies 4 bits.

Note that since the update period of the satellite orbit correction parameters is 6 minutes, EPREI17 and EPREI18 broadcast in page 31 and page 91 of sub-frame 5 are the same, that is, repeated; in addition, BDID1~BDID63 in page 83 of sub-frame 5 are not used for satellite broadcast ephemeris corrections and equivalent distance error status identifiers of the satellite ephemeris corrections.

In addition, it should be noted that in addition to the above-mentioned specific reserved information bits for broadcasting respective enhanced parameters, other information bits that have been used for broadcasting the basic navigation information currently are shown in FIGS. 8A to 11E. Specifically, for example, Pre represents a frame synchronization code, FraID represents a sub-frame count, SOW represents a second-of-week count, EncF2 to EncF5 represent system use bits, Pnum2 represents an integrity and differential information page number, SatH2 represents integrity and differential autonomic health information, BD2ID1 to BD2ID30 represent BD2 system satellite identifiers, GPSID1 to GPSID30 represent GPS satellite identifiers, UDREI1 to UDREI18 represent user differential distance error indexes, RURAI11 to RURAI13 represent area user distance accuracy indexes, $\Delta ti1$ to $\Delta ti3$ represent equivalent clock difference corrections, $\Delta t_{GPSi1}$ to $\Delta t_{GPSi3}$ and $\Delta t_{ave}$ represent GPS area user distance accuracy indexes, Pnum represents a page number. Since these already used information bits are well known to those skilled in the art, they will no longer be described in order to avoid obscuring the inventive points of the present invention.

The message broadcast apparatus 40 for the enhanced parameter in the satellite navigation system according to embodiments of the present invention is described above with reference to FIGS. 4-11E. In the message broadcast apparatus 40 for the enhanced parameter in the satellite navigation system, by combining a frame and a data block in a navigation message structure, the satellite-and-earth-integrated flexible broadcast of the navigation message is realized, the basic navigation information and the enhanced information can be uniformly broadcast, the scalability of the navigation message is improved, the flexibility of message broadcasting is improved, the user's use performance is improved, and the utilization of channel link resources is improved.

Note that since the ionosphere correction parameters can utilize the message arrangement of the existing ionosphere correction parameters in the navigation message frame structure model, it will no longer be described in detail here.

It should be understood that although the description is made above by taking the Beidou satellite navigation system and the GPS satellite navigation system as examples, the present invention is not limited thereto, and those skilled in the art can apply the present invention to any suitable satellite navigation system in accordance with the teachings of the present invention.

Figure 12:
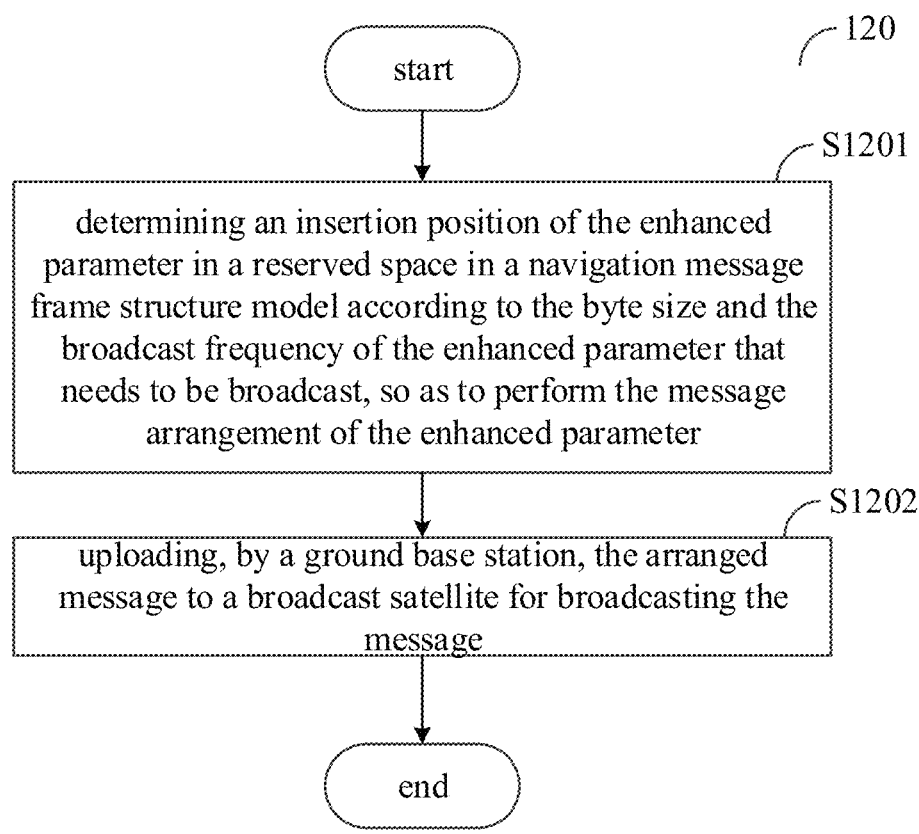
FIG. 12 is a flowchart illustrating a message broadcast method for an enhanced parameter in a satellite navigation system according to another embodiment of the present invention.

In the following, a message broadcast method 120 for an enhanced parameter in a satellite navigation system according to another embodiment of the present invention will be described with reference to FIG. 12. FIG. 12 is a flowchart illustrating a message broadcast method 120 for an enhanced parameter in a satellite navigation system according to an embodiment of the present invention.

As shown in FIG. 12, the message broadcast method 120 for the enhanced parameter in the satellite navigation system begins at step S1201. At step S1201, an insertion position of the enhanced parameter in a reserved space in a navigation message frame structure model is determined according to the byte size and the broadcast frequency of the enhanced parameter that needs to be broadcast, so as to perform the message arrangement of the enhanced parameter. Next, at step S1201, the arranged message is uploaded by a ground base station to a broadcast satellite for broadcasting the message. The navigation message frame structure model is defined by a superframe, a main frame and a sub-frame, with each of superframes containing 120 main frames, each of main frames containing 5 sub-frames, each of sub-frames containing 10 words and each of words containing 30 bits and lasting 0.06 second, and among the 5 sub-frames, sub-frame 1 is used to broadcast the present satellite's basic navigation information of the satellite navigation system and transmitted by 10 pages in a time division manner, sub-frame 2 to sub-frame 4 are used to broadcast the integrity and differential information of the satellite navigation system and transmitted respectively by 6 pages in a time division manner, and sub-frame 5 is used to broadcast all the satellite almanacs, ionosphere information and time synchronization information with other systems of the satellite navigation system and transmitted by 120 pages in a time division manner. After step S1202, the message broadcast method 120 for the enhanced parameter in the satellite navigation system is ended.

Optionally, although not shown in FIG. 12, the enhanced parameter comprises satellite clock difference correction parameters and partition comprehensive correction parameters, and the satellite clock difference correction parameters are inserted into a first group of predetermined positions in the reserved space of sub-frame 2 and sub-frame 3 and transmitted by 6 pages in a time division manner, and the partition comprehensive correction parameters are inserted into a second group of predetermined positions in the reserved space of sub-frame 2 to sub-frame 4 and transmitted by the 12 pages in a time division manner.

Optionally, although not shown in FIG. 12, the enhanced parameter comprises partition comprehensive correction parameters, and the partition comprehensive correction parameters comprise partition comprehensive corrections, area identifiers and satellite identifiers. Additionally, the area identifiers are used for, for each of areas in the satellite navigation system, employing a 1-bit information bit respectively to identify whether there is a partition comprehensive correction that needs to be broadcast, and the area identifiers are inserted into a third group of predetermined positions in the reserved space of page 1 of sub-frame 2. Additionally, the satellite identifiers are used for, for each of satellites in the satellite navigation system, employing a 1-bit information bit respectively to identify whether there is a partition comprehensive correction that needs to be broadcast, and the satellite identifiers are inserted into a fourth group of predetermined positions in the reserved space of page 2 to page 4 of sub-frame 2. Additionally, partition comprehensive corrections, which correspond to different areas and different satellites respectively and needs to be broadcast, are inserted into a fifth group of predetermined positions in the reserved space of page 1 to page 6 of sub-frame 3 and sub-frame 4 sequentially. Additionally, the broadcast period of the partition comprehensive correction parameters is 30 seconds to 3 minutes, preferably, it is 36 seconds. The embodiment of the present invention takes 36 seconds as an example, but is merely an example, not a limitation.

Optionally, although not shown in FIG. 12, a area index i and a satellite index j corresponding to each of the broadcast partition comprehensive corrections are respectively defined as follows: i=INT(n, x)+1;j=MOD(n, x). Wherein, n denotes the number of the broadcast partition comprehensive correction, and x denotes the total number of satellites where there are partition comprehensive corrections that needs to be broadcast.

Optionally, although not shown in FIG. 12, the enhanced parameter comprises satellite clock difference correction parameters, and the satellite clock difference correction parameters comprise satellite identifiers and satellite clock difference correction residues. Additionally, the satellite identifiers are used for, for each of satellites in the satellite navigation system, employing a 1-bit information bit respectively to identify whether there is a satellite clock difference correction residue that needs to be broadcast, and the satellite identifiers are inserted into a third group of predetermined positions in the reserved space of page 1 of sub-frame 2. Additionally, the satellite clock difference correction residues, which correspond to different satellites respectively and needs to be broadcast, are inserted into a sixth group of predetermined positions in the reserved space of page 5 and page 6 of sub-frame 4 sequentially. Additionally, the broadcast period of the satellite clock difference correction parameters is 18 seconds to 2 minutes, preferably 18 seconds. The embodiment of the present invention takes the 18 seconds as an example, but is merely an example, not a limitation.

Optionally, although not shown in FIG. 12, a broadcast information category identifier is inserted into a predetermined 1-bit information bit in the reserved space of page 4 of sub-frame 2, and the satellite clock difference correction residues are broadcast in the sixth group of predetermined positions when the broadcast information category identifier is one of 1 and 0, and GPS satellite differential fast change information is broadcast in the sixth group of predetermined positions when the broadcast information category identifier is the other of 1 and 0.

Optionally, although not shown in FIG. 12, the enhanced parameter comprises GPS partition comprehensive correction parameters, and the GPS partition comprehensive correction parameters comprise GPS partition comprehensive corrections, GPS area identifiers and GPS satellite identifiers. Additionally, the GPS area identifiers are used for, for each of GPS areas, employing a 1-bit information bit respectively to identify whether there is a GPS partition comprehensive correction that needs to be broadcast, and the GPS area identifiers are inserted into a seventh group of predetermined positions in the reserved space of page 23 and page 83 of sub-frame 5. Additionally, the GPS satellite identifiers are used for, for each of GPS satellites, employing a 1-bit information bit respectively to identify whether there is a GPS partition comprehensive correction that needs to be broadcast, and the GPS satellite identifiers are inserted into an eighth group of predetermined positions in the reserved space of page 23 and page 83 of sub-frame 5. Additionally, the GPS partition comprehensive corrections, which correspond to different GPS areas and different GPS satellites respectively and needs to be broadcast, are inserted into a ninth group of predetermined positions in the reserved space of page 23 to page 30 and page 83 to page 90 of sub-frame 5 sequentially. Additionally, the broadcast period of the GPS partition comprehensive correction parameters is 30 seconds to 3 minutes and preferably 36 seconds. The embodiment of the present invention takes 36 seconds as an example, but is merely an example, not a limitation.

Optionally, although not shown in FIG. 12, the enhanced parameter comprises satellite orbit correction parameters, and the satellite orbit correction parameters comprise satellite identifiers, satellite broadcast ephemeris corrections and equivalent distance error status identifiers of satellite ephemeris corrections. Additionally, the satellite identifiers are used for, for each of satellites in the satellite navigation system, employing a 1-bit information bit respectively to identify whether there are a satellite broadcast ephemeris correction and an equivalent distance error status identifier of the satellite ephemeris correction that need to be broadcast, and the satellite identifiers are inserted into a tenth group of predetermined positions in the reserved space of page 23 of sub-frame 5. Additionally, the satellite broadcast ephemeris corrections and the equivalent distance error status identifiers of satellite ephemeris corrections, which correspond to different satellites respectively and need to be broadcast, are inserted into a eleventh group of predetermined positions in the reserved space of page 117 to page 120, page 31 and page 91 of sub-frame 5. Additionally, the broadcast period of the satellite orbit correction parameters is 3-6 minutes and preferably 6 minutes. The 6 minutes mentioned by the embodiment of the present invention is merely an example, not a limitation.

Optionally, although not shown in FIG. 12, the byte size and the broadcast frequency of the enhanced parameter are determined according to the quantization range and the quantization accuracy of the enhanced parameter respectively.

Optionally, although not shown in FIG. 12, the satellite navigation system is Beidou satellite navigation system.

The specific operation of various steps of the message broadcast method 120 for the enhanced parameter in the satellite navigation system has been described in detail in message broadcast apparatus 40 for the enhanced parameter in the satellite navigation system described with reference to FIGS. 1-11E, and will not be repeated here.

With the message broadcast method 120 for the enhanced parameter in the satellite navigation system, by combining a frame and a data block in a navigation message structure, the satellite-and-earth-integrated flexible broadcast of the navigation message is realized, the basic navigation information and the enhanced information can be uniformly broadcast, the scalability of the navigation message is improved, the flexibility of message broadcasting is improved, the user's use performance is improved, and the utilization of channel link resources is improved.

In the above, the message broadcast apparatus and method for the enhanced parameter in the satellite navigation system according to embodiments of the present invention is described with reference to FIGS. 4-12.

Figure 13:
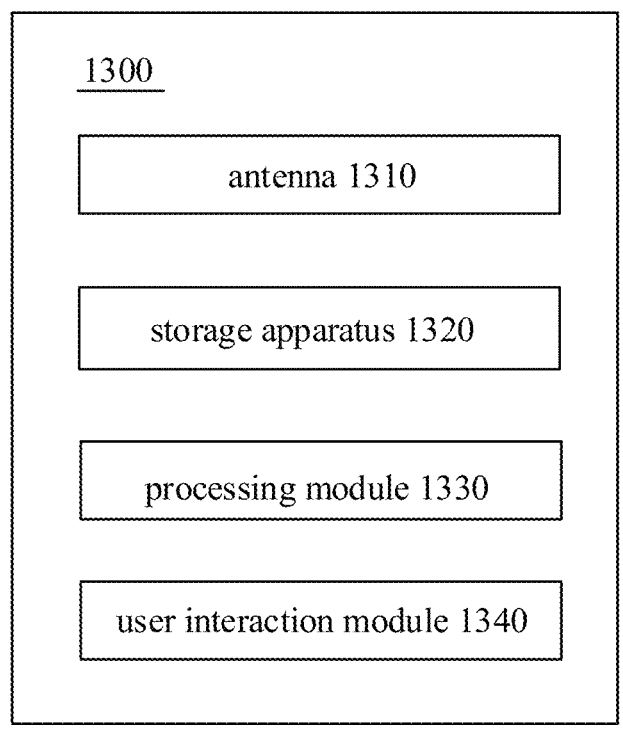
FIG. 13 shows a schematic structural block diagram of a receiver system according to an embodiment of the present application.

FIG. 13 is a block diagram of a receiver according to an embodiment of the present application. It should be noted that the receiver of the embodiment of the present invention includes but is not limited to a GNSS receiver, a handheld portable device, etc., and may be any module or apparatus with a function of navigation and positioning. Furthermore, the receiver of the embodiment of the present invention may be a single-mode receiver or a multimode receiver.

Referring to FIG. 13, a receiver 1300 is divided into an antenna 1310, a storage apparatus 1320, a processing module 1330 and a user interaction module 1340 according to functions.

The receiver 1300 receives basic broadcast messages and correction parameters broadcast by multiple satellites via the antenna 1310. In some embodiments, the correction parameters include a partition comprehensive correction $x_4$, and in other embodiments, the correction parameters include the partition comprehensive correction $x_4$ and further includes at least one parameter of an orbit correction $x_1$, a clock difference correction $x_2$ and an ionosphere correction $x_3$, wherein, the ionosphere correction $x_3$ uses modules including, but not limited to, a grid ionosphere model, an 8-parameter model or a 14-parameter model, and preferably uses the grid ionosphere model. The orbit correction is also called the satellite orbit correction, and the clock difference correction is also called the satellite clock difference correction, which will no longer be described below.

The storage apparatus 1320 is coupled with the antenna 1310, and stores the multiple basic broadcast messages and the above correction parameters received and transmits them to the processing module 1330.

The processing module 1330 further processes the received multiple basic broadcast messages and correction parameters to obtain a positioning position of the receiver by operation, then the receiver transmits the determined positioning position to the user interaction module 1340 so as to indicate the obtained positioning result to the user.

Specifically, the positioning operation performed by the processing module is different according to the difference of correction parameters that the receiver is able to receive and the difference of frequencies received by the receiver, wherein, the partition comprehensive correction $x_4$ is used to comprehensively correct multiple errors, the orbit correction $x_1$ is used to correct the orbit error, the clock difference correction $x_2$ is used to correct the clock difference error, and the ionosphere correction $x_3$ is used to correct the ionosphere delay error, which will no longer be described below.

The procedure of the method for performing navigation and positioning of a single-frequency, dual-frequency and tri-frequency receiver using a partition comprehensive correction or using the partition comprehensive correction in combination with other correction parameters will be described by way of example with further reference to FIGS. 14-25 below.

First, refer to FIG. 14, which shows a flowchart of a navigation and positioning method of a single-frequency receiver using correction parameters including a partition comprehensive correction $x_4$, an orbit correction $x_1$, a clock difference correction $x_2$ and an ionosphere correction $x_3$ according to an embodiment of the present application.

At step S1400, the processing module receives the basic broadcast messages and the correction parameters including the orbit correction $x_1$, the clock difference correction $x_2$, the ionosphere correction $x_3$ and the partition comprehensive correction $x_4$ of N satellites, and the processing module obtains a single-frequency pseudorange observation equation $P_1$ and a carrier-phase observation equation $L_1$ for each satellite based on the broadcast ephemeris:

$$P_1 = \rho + c \cdot \delta t - c \cdot \delta t^s + I_1 + T + \varepsilon_{P_1} \quad (1)$$

$$L_1 = \rho + c \cdot \delta t - c \cdot \delta t^s - I_1 + T + \lambda_1 \cdot N_1 + \frac{c}{f_1} W + \varepsilon_{L_1} \quad (2)$$

Wherein, $P_1$ and $L_1$ are pseudorange and carrier-phase observation functions respectively; $\rho$ is a satellite-earth geometric distance (the coordinate of the observation station); c is the speed of light, $\delta t$ is a clock difference of the observation station, and $\delta t^s$ is the satellite clock difference calculated by the broadcast ephemeris; $f_1$ is a first carrier frequency; $I_1$ is an ionosphere delay at the first frequency calculated using parameters of a broadcast ephemeris ionosphere model; T is a troposphere delay correction; $\lambda_1 \cdot N_1$ is an unknown ambiguity; $\lambda_1$ is a carrier wavelength, W is a carrier-phase winding correction in units of weeks; $\varepsilon_{P_1}$, $\varepsilon_{L_1}$ are observation noises of pseudorange and carrier-phase respectively.

In addition, the definition and generation of the orbit correction $x_1$, the clock difference correction $x_2$, the ionosphere correction $x_3$ and the partition comprehensive correction $x_4$ have been described in the specification, and thus will no longer be described herein.

At step S1410, the established pseudorange observation equation and carrier-phase observation equation are corrected by using all of the above quadruple correction parameters $x_1$, $x_2$, $x_3$ and $x_4$, so that the corrected pseudorange observation equation $P_1(x)$ and carrier-phase observation equation $L_1(x)$ may be obtained:

$$P_1(x_1, x_2, x_3, x_4) = \rho + \Delta\rho(x_1) + c \cdot \delta t - c \cdot (\delta t^s - x_2) + I_1(x_3) + T + x_4 + \varepsilon'_{P_1} \quad (3)$$

$$L_1(x_1, x_2, x_3, x_4) = \rho + \Delta\rho(x_1) + c \cdot \delta t - c \cdot (\delta t^s - x_2) - I_1(x_3) + T + \lambda_1 \cdot N_1 + \frac{c}{f_1} W + x_4 + \varepsilon'_{L_1} \quad (4)$$

In the above equation, $\Delta\rho(x_1)$ is the distance correction calculated based on the orbit correction $x_1$; $x_2$ is the clock difference correction; $I_1(x_3)$ is the ionosphere delay at the first frequency calculated using the ionosphere correction $x_3$; $\varepsilon_{L_1}'$ and $\varepsilon_{P_1}'$ are the parameter-corrected observation noises after combing pseudorange and carrier-phase, in which the partition comprehensive correction may use at least one or both of the GPS partition comprehensive correction and the Beidou partition comprehensive correction.

At step S1420, by combining the above-described corrected pseudorange observation equation $P_1(x)$ and carrier-phase observation equation $L_1(x)$, that is, in equations (3) and (4), it can constitute a combination that eliminates the influence of the ionosphere, that is, an ionosphere-free combined observation, as a first observation (the following equation (5)):

$$\frac{L_1(x_1, x_2, x_3, x_4) + P_1(x_1, x_2, x_3, x_4)}{2} = \rho + \Delta\rho(x_1) + c \cdot \delta t - c(\delta t^s - x_2) + T + \frac{\lambda_1 \cdot N_1}{2} + \frac{c}{2f_1} W + x_4 + \frac{\varepsilon'_{L_1} + \varepsilon'_{P_1}}{2} \quad (5)$$

At step S1430, the corrected pseudorange observation equation $P_1(x)$, that is, the above equation (3) is taken as a second observation.

At step S1440, by jointly solving the first observation and the second observation of each satellite of the N satellites, the operation result of the user positioning is obtained. In order to solve all the parameters, the number N of satellites observed needs to be greater than 4.

Specifically, the above equations (3) and (5) constitute observation equations for single-frequency navigation and positioning, and the corresponding observation equations are:

$$\begin{bmatrix} \frac{L_1(x_1, x_2, x_3, x_4) + P_1(x_1, x_2, x_3, x_4)}{2} - \rho_1 - D_{\frac{L_1+P_1}{2}} \\ P_1(x_1, x_2, x_3, x_4) - \rho_1 - D_{P_1} \\ \vdots \\ \frac{L_n(x_1, x_2, x_3, x_4) + P_n(x_1, x_2, x_3, x_4)}{2} - \rho_n - D_{\frac{L_n+P_n}{2}} \\ P_n(x_1, x_2, x_3, x_4) - \rho_n - D_{P_n} \end{bmatrix} =$$

$$\begin{bmatrix} \frac{X_0-X^1}{\rho} & \frac{Y_0-Y^1}{\rho} & \frac{Z_0-Z^1}{\rho} & 1 & M_{wet}^1 & 0 & \ldots & 0 \\ \frac{X_0-X^1}{\rho} & \frac{Y_0-Y^1}{\rho} & \frac{Z_0-Z^1}{\rho} & 1 & M_{wet}^1 & 1 & \ldots & 0 \\ & & & \vdots & & & & \\ \frac{X_0-X^n}{\rho} & \frac{Y_0-Y^n}{\rho} & \frac{Z_0-Z^n}{\rho} & 1 & M_{wet}^n & 0 & \ldots & 0 \\ \frac{X_0-X^n}{\rho} & \frac{Y_0-Y^n}{\rho} & \frac{Z_0-Z^n}{\rho} & 1 & M_{wet}^n & 0 & \ldots & 1 \end{bmatrix} \begin{bmatrix} dX \\ dY \\ dZ \\ c \cdot \delta t \\ dZTD_W \\ B_1 \\ \vdots \\ B_n \end{bmatrix}$$

wherein $$D_{\frac{L+P}{2}} = \Delta\rho(x_1) - c \cdot (\delta t^s - x_2) + T + \frac{c}{2f_1}W + x_4$$

$$D_P = \Delta\rho(x_1) - c \cdot (\delta t^s - x_2) + I_1(x_3) + T + x_4$$

In the equation, $[X_0, Y_0, Z_0]$ is the approximate coordinate of the observation station; $[X^1, Y^1, Z^1 \ldots X^n, Y^n, Z^n]$ is the coordinate of a satellite; $[dX, dY, dZ]$ is the coordinate correction parameters of the observation station; $M_{wet}$ is the troposphere wet delay mapping function; $dZTD_W$ is the troposphere wet zenith delay correction parameters; w is the carrier-phase winding correction; B is the carrier-phase ambiguity parameter in units of distance. According to the above observation equation, those skilled in the art can solve the final operation result of the user positioning.

In addition, because the accuracies of different observation equations are not uniform, it is necessary to perform weight determination on the observation equations (that is, configure the corresponding weighting ratios for the observations) and establish a stochastic model thereof. The observation equation noise is mainly composed of the errors of respective models:

$$\sigma^2 = \sigma_{eph}^2 + \sigma_{clk}^2 + \sigma_{ion}^2 + \sigma_{trop}^2 + \sigma_{mp}^2 + \sigma_{noise}^2$$

In the above equation, $\sigma$ is the observation equation noise, and $\sigma_{eph}$, $\sigma_{clk}$, $\sigma_{ion}$, $\sigma_{trop}$, $\sigma_{mp}$, $\sigma_{noise}$ indicate the satellite orbit accuracy, the satellite clock difference accuracy, the ionosphere model accuracy, the troposphere model accuracy, the multipath model accuracy, and the observation noise accuracy respectively. Further, in order to simplify the models, the above observation equation can be divided into components ($\sigma_{eph}, \sigma_{clk}$) that are independent of the elevation angle, and other parts are classified as components related to the elevation angle ($\sigma^2(ele)$), as follows:

$$\sigma^2 = \sigma_{eph}^2 + \sigma_{clk}^2 + \sigma^2(ele)$$

In the above equation, the weight of $\sigma^2(ele)$ is generally determined according to the elevation angle:

$$\begin{cases} \sigma(ele) = \sigma_0, & ele > 30° \\ \sigma(ele) = \frac{\sigma_0}{2\sin(ele)}, & ele \leq 30° \end{cases}$$

Therefore, the stochastic model is as follows:

$$Q = R^{-1} = \begin{bmatrix} \frac{1}{\sigma_1^2} & & \\ & \ddots & \\ & & \frac{1}{\sigma_n^2} \end{bmatrix}$$

In the above equation, Q is the weight matrix of the observation, R is the covariance matrix of the observation. Through the solution of the above-mentioned weight matrix of the observation, the empirical value of the weighting ratio of the observation can be obtained as: the amplitude range of the weighting ratio is from 1:0.01 to 1:0.05, and the optimal weighting ratio is preferably 1:0.05.

Figure 15:
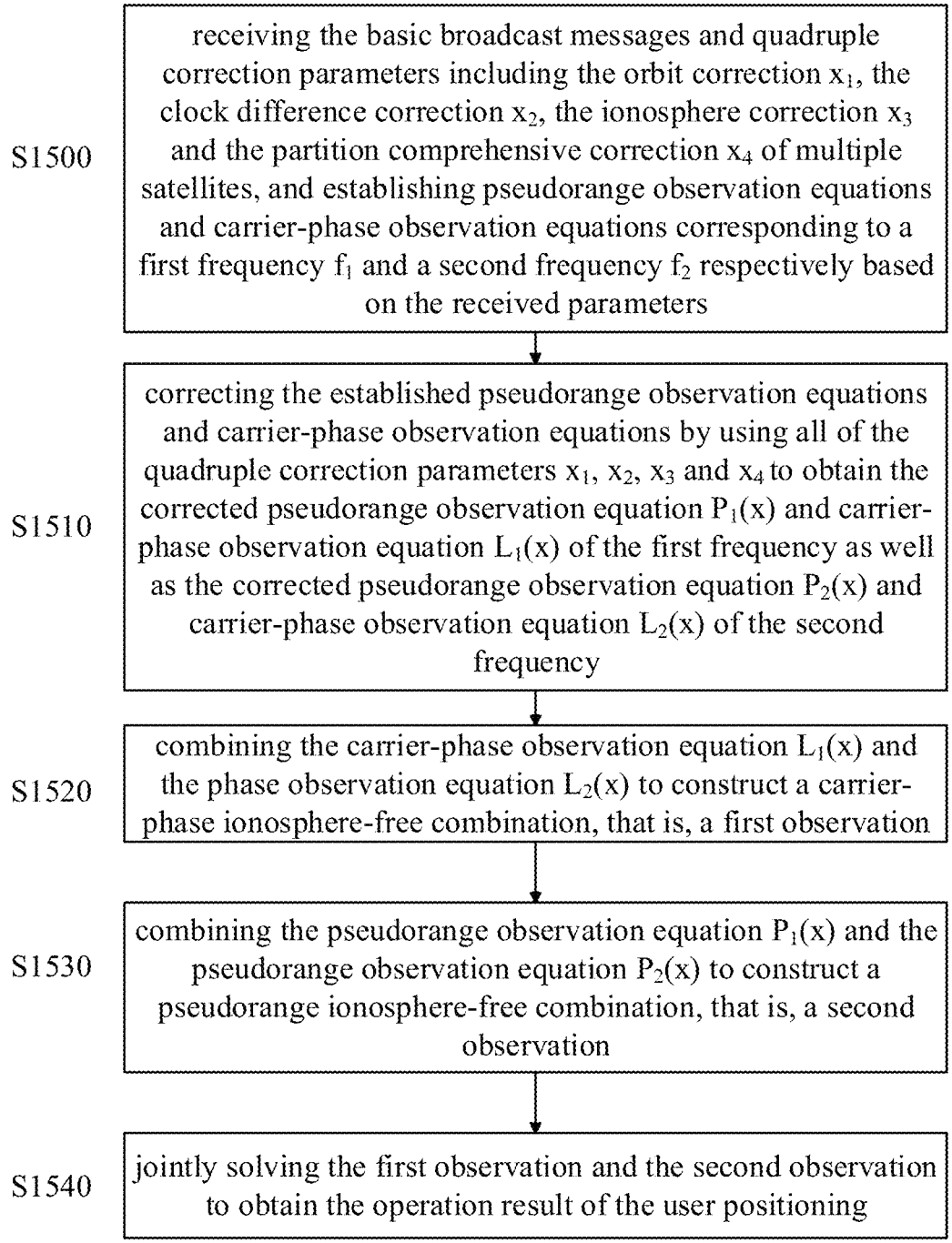
FIG. 15 shows a flowchart of a dual-frequency navigation and positioning method of a dual-frequency receiver using correction parameters including a partition comprehensive correction $x_4$, an orbit correction $x_1$, a clock difference correction $x_2$ and an ionosphere correction $x_3$ according to another embodiment of the present application.

Next, a navigation and positioning method of a dual-frequency receiver using correction parameters including a partition comprehensive correction $x_4$, an orbit correction $x_1$, a clock difference correction $x_2$ and an ionosphere correction $x_3$ according to an embodiment of the present application is described with reference to FIG. 15.

At step S1500, since it is a dual-frequency receiver, the processing module here, in addition to receiving parameters and establishing the pseudo-range observation equation $P_1$ (i.e., equation (1)) and the carrier-phase observation equation $L_1$ (i.e., equation (2)) of the first frequency $f_1$ as described above with reference to FIG. 14:

$$P_1 = \rho + c \cdot \delta t - c \cdot \delta t^s + I_1 + T + \varepsilon_{P_1} \quad (1)$$

$$L_1 = \rho + c \cdot \delta t - c \cdot \delta t^s - I_1 + T + \lambda_1 \cdot N_1 + \frac{c}{f_1}W + \varepsilon_{L_1} \quad (2)$$

further introduces a pseudo-range observation $P_2$ (that is, equation (6)) and a carrier-phase observation $L_2$ (that is, equation (7)) of a second frequency $f_2$ other than the first frequency $$P_2 = \rho + c \cdot \delta t - c \cdot \delta t^s + I_2 + T + \varepsilon_{P_2} \quad (6)$$

$$L_2 = \rho + c \cdot \delta t - c \cdot \delta t^s - I_2 + T + \lambda_2 \cdot N_2 + \frac{c}{f_2}W + \varepsilon_{L_2} \quad (7)$$

The meanings of the variables in the above equations (6) and (7) are the same as those in the equations (1) and (2), except that here it is the second frequency $f_2$ which is different from the first frequency $f_1$:

At step S1510, the established pseudorange observation equations (equation (1) and equation (6)) and carrier-phase observation equations (equations (2) and (7)) are corrected by using the correction parameters (the correction parameters include the partition comprehensive correction $x_4$, the orbit correction $x_1$, the clock difference correction $x_2$ and the ionosphere correction $x_3$), so that the corrected pseudorange observation equation $P_1(x)$ (i.e., equation (3)) and carrier-phase observation equation $L_1(x)$ (i.e., equation (4)) of the first frequency and the corrected pseudorange observation equation $P_2(x)$ (i.e., equation (8)) and carrier-phase observation equation $L_2(x)$ (i.e., equation (9)) of the second frequency may be obtained:

$$P_1(x_1, x_2, x_3, x_4,) = \qquad (3)$$
$$\rho + \Delta\rho(x_1) + c \cdot \delta t - c \cdot (\delta t^s - x_2) + I_1(x_3) + T + x_4 + \varepsilon'_{P_1}$$

$$L_1(x_1, x_2, x_3, x_4,) = \rho + \Delta\rho(x_1) + c \cdot \delta t - \qquad (4)$$
$$c \cdot (\delta t^s - x_2) - I_1(x_3) + T + \lambda_1 \cdot N_1 + \frac{c}{f_1} W + x_4 + \varepsilon'_{L_1}$$

$$P_2(x_1, x_2, x_3, x_4,) = \qquad (8)$$
$$\rho + \Delta\rho(x_1) + c \cdot \delta t - c \cdot (\delta t^s - x_2) + I_2(x_3) + T + x_4 + \varepsilon'_{P_2}$$

$$L_2(x_1, x_2, x_3, x_4,) = \rho + \Delta\rho(x_1) + c \cdot \delta t - \qquad (9)$$
$$c \cdot (\delta t^s - x_2) - I_2(x_3) + T + \lambda_2 \cdot N_2 + \frac{c}{f_2} W + x_4 + \varepsilon'_{L_2}$$

The meanings of the variables in the above equations (8) and (9) are the same as those in the equations (3) and (4).

At step S1520, the carrier-phase observation equation $L_1(x)$ and the carrier-phase observation equation $L_2(x)$ of the above equations (4) and (9) are combined to construct a carrier-phase ionosphere-free combination, that is, a first observation:

$$L_{IF} = \frac{f_1^2 L_1(x_1, x_2, x_3, x_4,) - f_2^2 L_2(x_1, x_2, x_3, x_4,)}{f_1^2 - f_2^2} \qquad (10)$$

At step S1530, the pseudorange observation equation $P_1(x)$ and the pseudorange observation equation $P_2(x)$ of the above equations (3) and (8) are combined to construct a pseudorange ionosphere-free combination, that is, a second observation:

$$P_{IF} = \frac{f_1^2 P_1(x_1, x_2, x_3, x_4,) - f_2^2 P_2(x_1, x_2, x_3, x_4,)}{f_1^2 - f_2^2} \qquad (11)$$

At step S1540, the first observation and the second observation of each of the N satellites are jointly solved by a solution procedure similar to the above, to obtain the operation result of the user positioning, where N is greater than 4. It should be noted that, in the procedure of joint solution, the weighting ratios of the observations are configured by the above weight determination formula similar to that in step S1440, so that it can be obtained that the range of the weighting ratio is from 1:0.01 to 1:0.05, with the optimal weighting ratio being preferred as 1:0.01.

On the other hand, in the use procedure of the user, in order to simplify the processing procedure of the receiver, it is also possible to receive and use only a part of the quadruple correction parameters to correct the operation result. In other words, the receiver can receive or use only the partition comprehensive correction $x_4$ and any combination of the triple correction parameters, the orbit correction $x_1$, the clock difference correction $x_2$ and the ionosphere correction $x_3$, to correct the positioning operation. In the following, the description will be made through an example in which the processing module receives or uses only the triple correction parameters, the partition comprehensive correction $x_4$, the clock difference correction $x_2$ and the ionosphere correction $x_3$. However, it should also be noted that, as will be understood by those skilled in the art, the scheme of the present application is not limited to the following embodiment, but may be applied to the technical schemes using the partition comprehensive correction $x_4$ and one or any two of the other three correction parameters.

Figure 16:
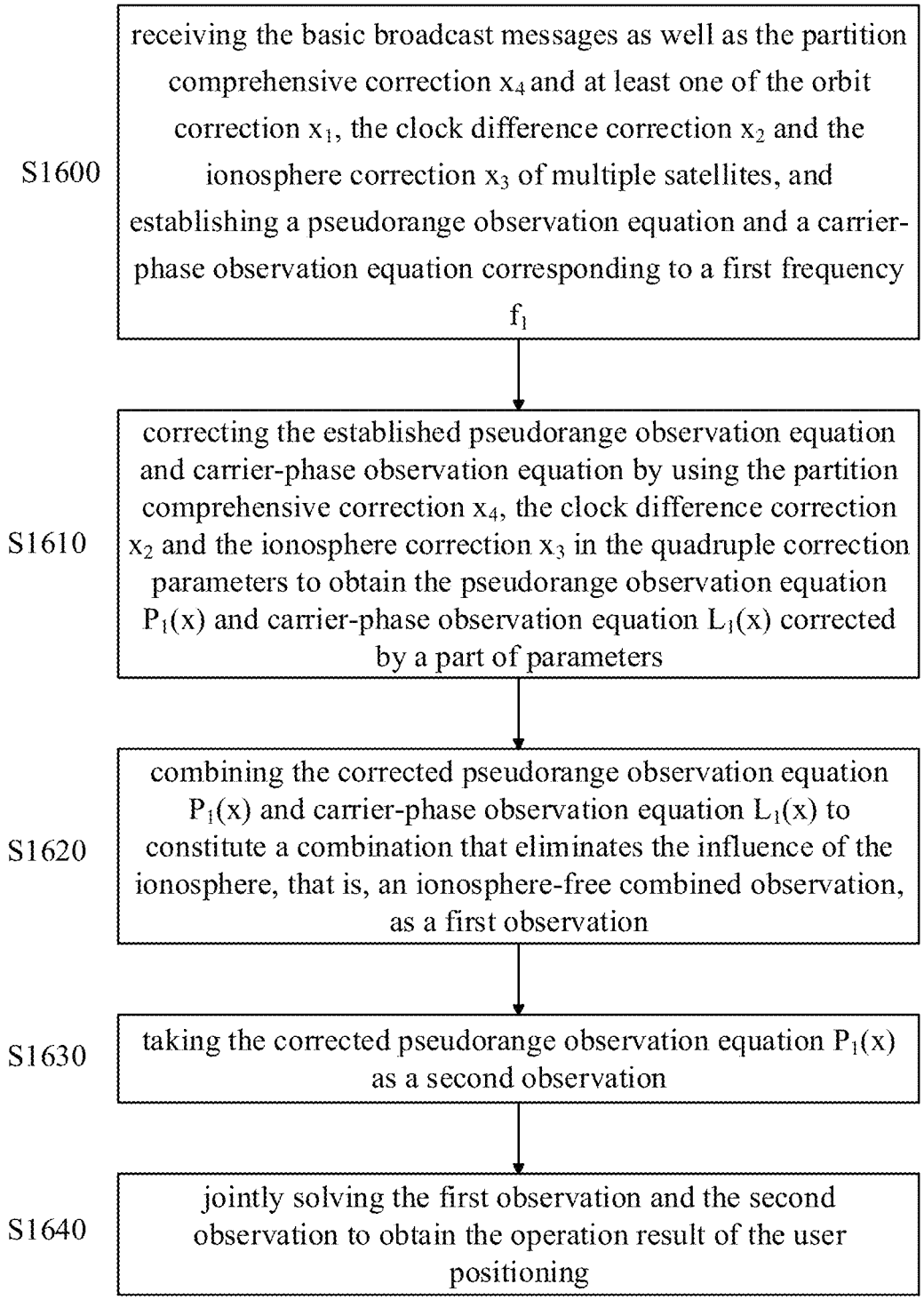
FIG. 16 shows a flowchart of a navigation and positioning method of a single-frequency receiver using correction parameters including a partition comprehensive correction $x_4$, a clock difference correction $x_2$ and an ionosphere correction $x_3$ according to another embodiment of the present application.

FIG. 16 shows a flowchart of a navigation and positioning method of a single-frequency receiver using correction parameters including a partition comprehensive correction $x_4$, a clock difference correction $x_2$ and an ionosphere correction $x_3$ according to an embodiment of the present application.

Referring to FIG. 16, at step S1600, the processing module receives basic broadcast messages, partition comprehensive corrections $x_4$ and at least one of orbit corrections $x_1$, clock difference corrections $x_2$ and ionosphere corrections $x_3$ of N satellites. For example, in this embodiment, the correction parameters received or used include the partition comprehensive corrections $x_4$, the clock difference corrections $x_2$ and the ionosphere corrections $x_3$.

Based on the broadcast ephemeris, the single-frequency pseudorange observation equation $P_1$ and carrier-phase observation equation $L_1$ of each satellite can be, like the above, written as:

$$P_1 = \rho + c \cdot \delta t - c \cdot \delta t^s + I_1 + T + \varepsilon_{P_1} \qquad (1)$$

$$L_1 = \rho + c \cdot \delta t - c \cdot \delta t^s - I_1 + T + \lambda_1 \cdot N_1 + \frac{c}{f_1} W + \varepsilon_{L_1} \qquad (2)$$

The definition of the parameters is as described above, and thus will no longer be described.

At step S1610, the established pseudorange observation equation (equation (1)) and carrier-phase observation equation (equation (2)) are corrected by using correction parameters, with the correction parameters including the partition comprehensive correction $x_4$, the clock error correction $x_2$ and the ionosphere correction $x_3$. In this way, the pseudorange observation equation $P_1(x)$ (equation (13)) and the carrier-phase observation equation $L_1(x)$ (equation (12)) corrected by the correction parameters can be obtained:

$$L_1(x_2, x_3, x_4,) = \qquad (12)$$
$$\rho + c \cdot \delta t - c \cdot (\delta t^s - x_2) - I_1(x_3) + T + \lambda_1 \cdot N_1 + \frac{c}{f_1} W + x_4 + \varepsilon'_{L_1}$$

$$P_1(x_2, x_3, x_4,) = \rho + c \cdot \delta t - c \cdot (\delta t^s - x_2) + I_1(x_3) + T + x_4 + \varepsilon'_{P_1} \qquad (13)$$

The definition of the parameters is as described above, and thus will no longer be described. The partition comprehensive correction may use at least one or both of the GPS partition comprehensive correction and the Beidou partition comprehensive correction. Here, the Beidou partition comprehensive correction is taken as an example.

At step S1620, by combining the above pseudorange observation equation $P_1(x)$ (equation (13)) and carrier-phase observation equation $L_1(x)$ (equation (12)) corrected, i.e., in equations (12), (13), it can constitute a combination that eliminates the influence of the ionosphere, that is, anionosphere-free combined observation, as a first observation (the following equation (14)):

$$\frac{L_1(x_2, x_3, x_4,) + P_1(x_2, x_3, x_4,)}{2} = \rho + c \cdot \delta t - c \cdot (\delta t^s - x_2) + T + \frac{\lambda_1 \cdot N_1}{2} = \frac{c}{2f_1}W + x_4 + \frac{\varepsilon'_{L_1} + \varepsilon'_{P_1}}{2} \quad (14)$$

At step S1630, the corrected pseudorange observation equation P (x), that is, the above equation (13), is taken as a second observation.

At step S1640, the first observation (equation (14)) and the second observation (equation (13)) of each of the N satellites are jointly solved to obtain the operation result of the user positioning, where N is greater than 4. It should be noted that, in the procedure of the joint solution, the weighting ratios of the observations are configured by the above weight determination formula similar to that in step S1440, so that it can be obtained that the weighting ratio of experience here is optimally preferred as 1:0.05 and that the amplitude range of the weighting ratio is from 1:0.01 to 1:0.05.

Figure 17:
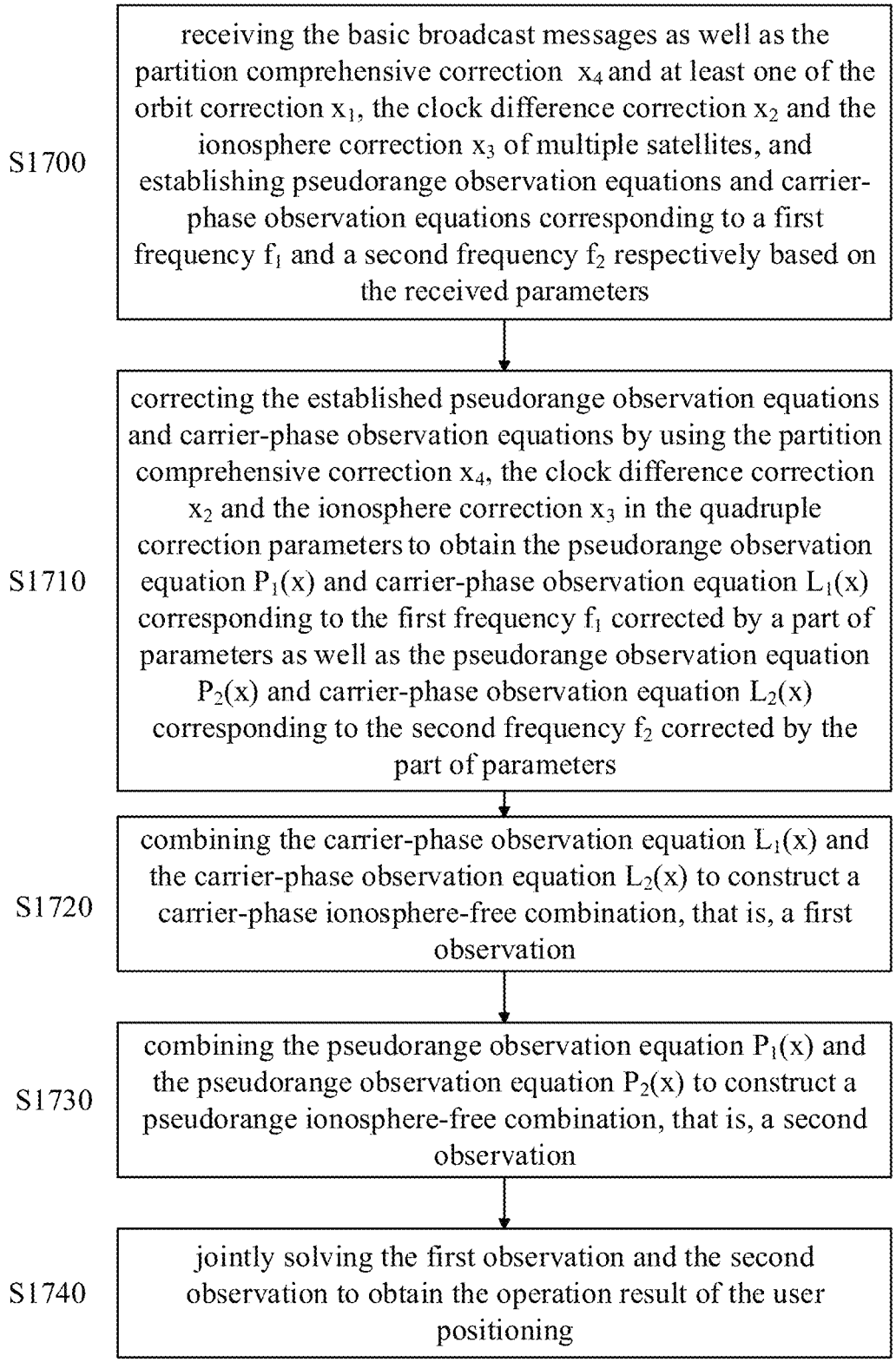
FIG. 17 shows a flowchart of a navigation and positioning method of a dual-frequency receiver using correction parameters including a partition comprehensive correction $x_4$, a clock difference correction $x_2$ and an ionosphere correction $x_3$ according to another embodiment of the present application.

FIG. 17 shows a flowchart of a navigation and positioning method of a dual-frequency receiver using correction parameters including a partition comprehensive correction $x_4$, a clock difference correction $x_2$ and an ionosphere correction $x_3$ according to another embodiment of the present application.

At step S1700, since it is a dual-frequency receiver, the processing module here, in addition to receiving parameters and establishing the pseudo-range observation equation $P_1$ (i.e., equation (1)) and the carrier-phase observation equation $L_1$ (i.e., equation (2)) of the first frequency $f_1$ as described above with reference to FIG. 14:

$$P_1 = \rho + c \cdot \delta t - c \cdot \delta t^s + I_1 + T + \varepsilon_{P_1} \quad (1)$$

$$L_1 = \rho + c \cdot \delta t - c \cdot \delta t^s - I_1 + T + \lambda_1 \cdot N_1 + \frac{c}{f_1}W + \varepsilon_{L_1} \quad (2)$$

further introduces a pseudo-range observation $P_2$ (i.e., equation (15)) and a carrier-phase observation $L_2$ (i.e., equation (16)) of a second frequency $f_2$ other than the first frequency $$P_2 = \rho + c \cdot \delta t - c \cdot \delta t^s + I_2 + T + \varepsilon_{P_2} \quad (15)$$

$$L_2 = \rho + c \cdot \delta t - c \cdot \delta t^s - I_2 + T + \lambda_2 \cdot N_2 + \frac{c}{f_2}W + \varepsilon_{L_2} \quad (16)$$

The definition of the parameters is as described above, and thus will no longer be described.

The meanings of the variables in the above equations (15) and (16) are the same as those in the equations (1) and (2), only except that the second frequency $f_2$ is different from the first frequency $f_1$.

At step S1710, the established pseudorange observation equations (equation (1) and equation (15)) and carrier-phase observation equations (equation (2) and equation (16)) are corrected by using the correction parameters (including the partition comprehensive correction $x_4$, the clock difference correction $x_2$ and the ionosphere correction $x_3$), so that the corrected pseudorange observation equation $P_1(x)$ (equation (17)) and carrier-phase observation equation $L_1(x)$ (equation (18)) of the first frequency $f_1$ and the corrected pseudorange observation equation $P_2(x)$ (equation (19)) and carrier-phase observation equation $L_2(x)$ (equation (20)) of the second frequency $f_2$ may be obtained:

$$P_1(x_2, x_3, x_4,) = \rho + c \cdot \delta t - c \cdot (\delta t^s - x_2) + I_1(x_3) + T + x_4 + \varepsilon'_{P_1} \quad (17)$$

$$L_1(x_2, x_3, x_4,) = \rho + c \cdot \delta t - c \cdot (\delta t^s - x_2) - I_1(x_3) + T + \lambda_1 \cdot N_1 + \frac{c}{f_1}W + x_4 + \varepsilon'_{L_1} \quad (18)$$

$$P_2(x_2, x_3, x_4,) = \rho + c \cdot \delta t - c \cdot (\delta t^s - x_2) + I_2(x_3) + T + x_4 + \varepsilon'_{P_2} \quad (19)$$

$$L_2(x_2, x_3, x_4,) = \rho + c \cdot \delta t - c \cdot (\delta t^s - x_2) - I_2(x_3) + T + \lambda_2 \cdot N_2 + \frac{c}{f_2}W + x_4 + \varepsilon'_{L_2} \quad (20)$$

The meanings of the variables in the above equations (19) and (20) are the same as those in the equations (17) and (18).

At step S1720, the carrier-phase observation equation $L_1(x)$ and the carrier-phase observation equation $L_2(x)$ of the above equations (18) and (20) are combined to construct a carrier-phase ionosphere-free combination, that is, a first observation:

$$L_{IF} = \frac{f_1^2 L_1(x_2, x_3, x_4,) - f_2^2 L_2(x_2, x_3, x_4,)}{f_1^2 - f_2^2} \quad (21)$$

At step S1730, the pseudorange observation equation $P_1(x)$ and the pseudorange observation equation $P_2(x)$ of the above equations (17) and (19) are combined to construct a pseudorange ionosphere-free combination, that is, a second observation:

$$P_{IF} = \frac{f_1^2 P_1(x_2, x_3, x_4) - f_2^2 P_2(x_2, x_3, x_4)}{f_1^2 - f_2^2} \quad (22)$$

At step S1740, the first observation (equation (21)) and the second observation (equation (22)) of each of the N satellites are jointly solved to obtain the operation result of the user positioning, where N is greater than 4. It should be noted that, in the procedure of joint solution, the weighting ratios of the observations are configured by the above weight determination formula similar to that in step S1440, so that it can be obtained that the weighting ratio is optimally preferred as 1:0.01 and that the amplitude range of the weighting ratio is from 1:0.01 to 1:0.05.

With the above description, those skilled in the art have already understood the principles and operation modes of the single-frequency and dual-frequency receivers implemented according to the embodiments of the present invention. It can be understood that the operation principle of the tri-frequency receiver implemented according to an embodiment of the present invention is also similar to the content described above. In the following, various implementations of a tri-frequency receiver and its navigation and positioning method according to embodiments of the present application will be explained by way of example with reference to FIGS. 18-21, with the description of the principle same with those of the single-frequency and dual-frequency receiver sections being omitted to avoid unnecessary confusion.

Figure 18:
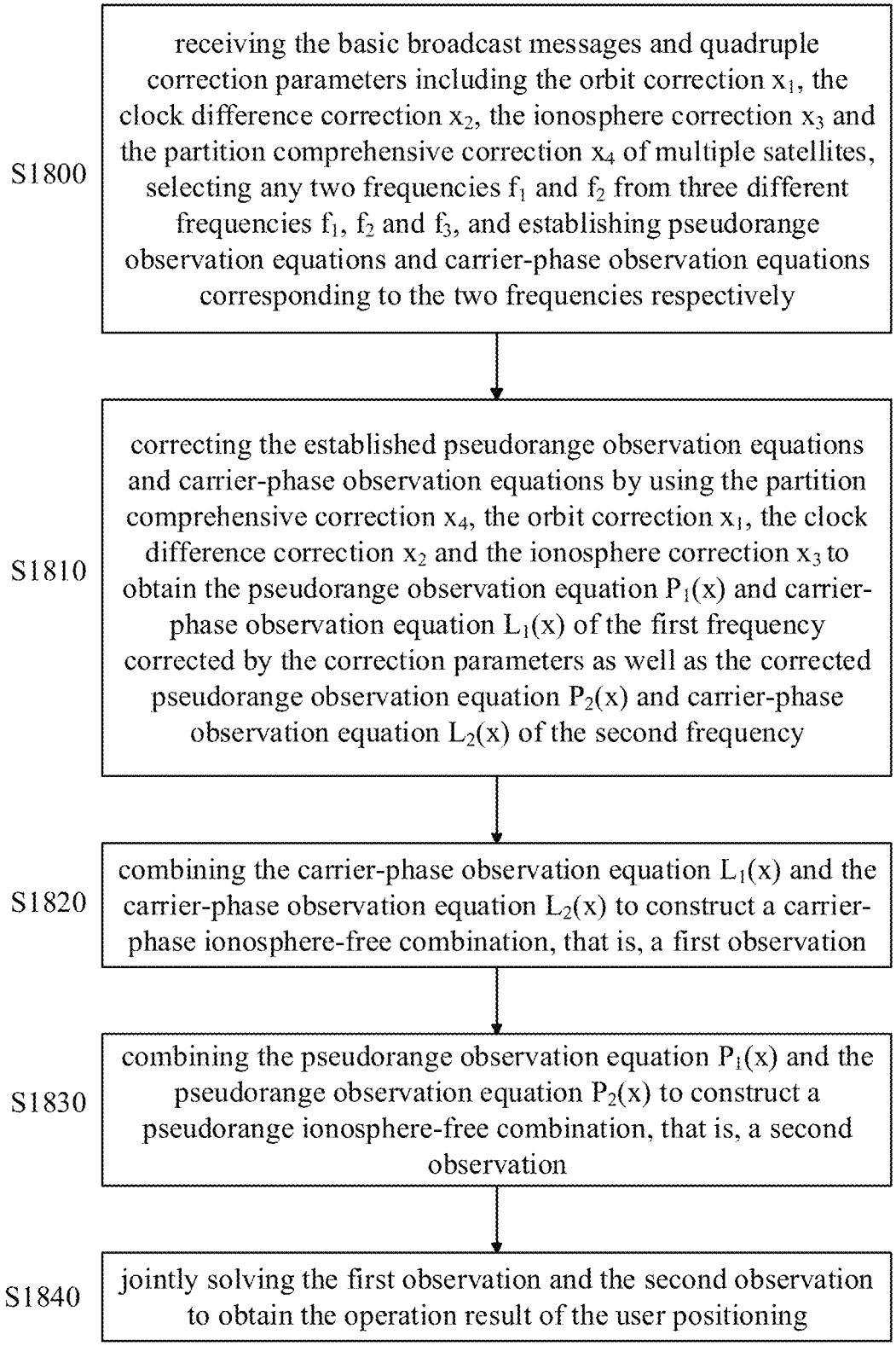
FIG. 18 shows a flowchart of a navigation and positioning method of a tri-frequency receiver using correction parameters including a partition comprehensive correction $x_4$, an orbit correction $x_1$, a clock difference correction $x_2$ and an ionosphere correction $x_3$ according to another embodiment of the present application.
Figure 19:
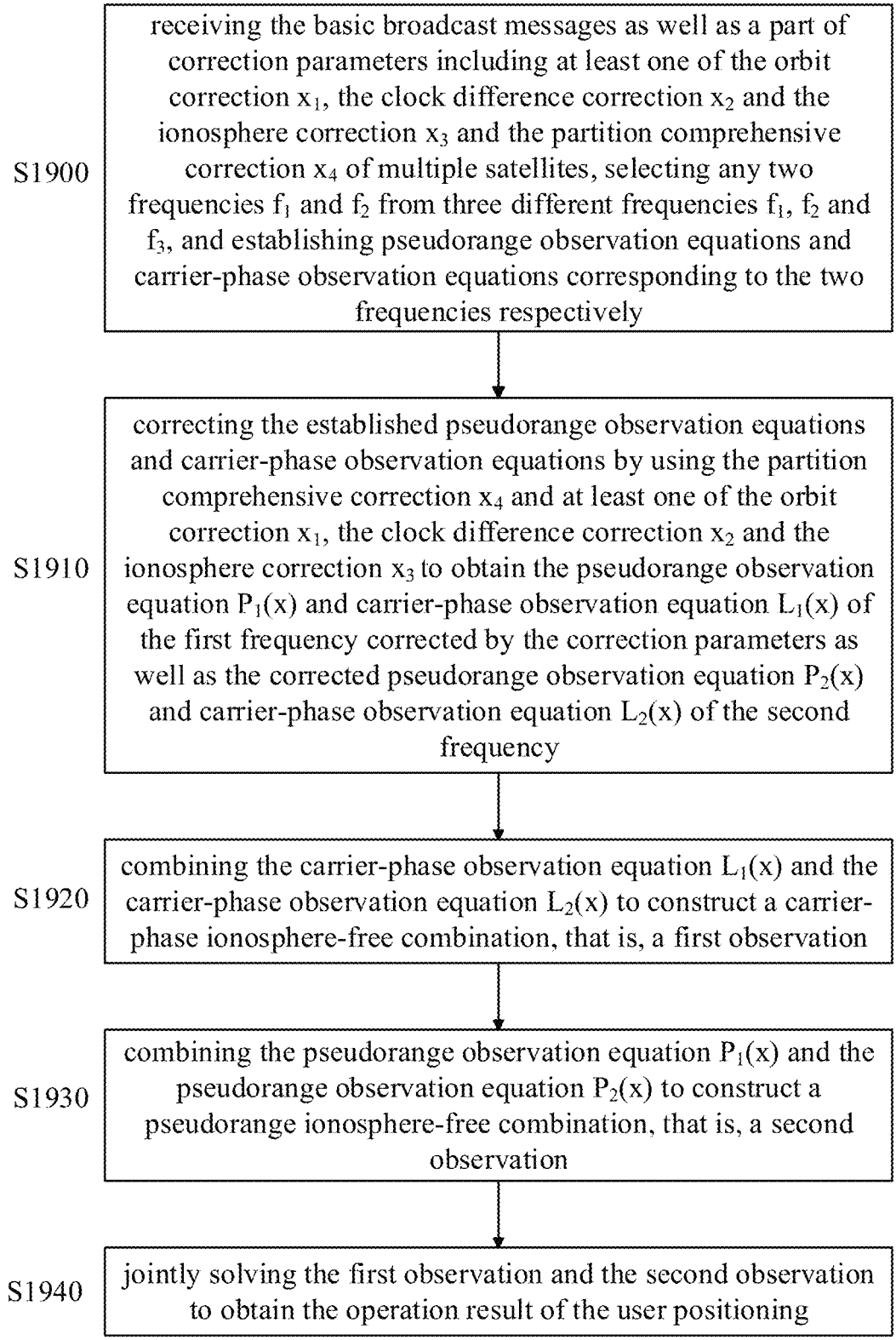
FIG. 19 shows a flowchart of a navigation and positioning method of a tri-frequency receiver using correction parameters including a partition comprehensive correction $x_4$, a clock difference correction $x_2$ and an ionosphere correction $x_3$ according to another embodiment of the present application.

Firstly, referring to FIG. 18, which shows a flowchart of a navigation and positioning method of a tri-frequency receiver using correction parameters including a partition comprehensive correction $x_4$, an orbit correction $x_1$, a clock difference correction $x_2$ and an ionosphere correction $x_3$ according to an embodiment of the present application. In one implementation, the processing module of the tri-frequency receiver can make a choice for the received observation data of three different frequencies.

For example, at step S1800, the processing module here receives the observation parameters corresponding to three frequencies $f_1$, $f_2$, $f_3$ respectively, and the processing module can select any two frequencies thereof (for example, the processing module can select frequencies $f_1$ and $f_2$, or select frequencies $f_1$ and $f_3$, or select frequencies $f_2$ and $f_3$) and establish pseudorange observation equations and carrier-phase observation equations for the selected two frequencies.

For example, assuming that the frequencies selected by the processing module are $f_1$ and $f_2$, a pseudorange observation equation $P_1$ and a carrier-phase observation equation $L_1$ corresponding to the first frequency $f_1$ and a pseudo observation equation $P_2$ and a carrier-phase observation equation $L_2$ corresponding to the second frequency $f_2$ are respectively established for the two frequencies:

$$L_1 = \rho + c \cdot \delta t - c \cdot \delta t^s - I_1 + T + \lambda_1 \cdot N_1 + \frac{c}{f_1} W + \varepsilon_{L_1} \quad (1)$$

$$L_1 = \rho + c \cdot \delta t - c \cdot \delta t^s - I_1 + T + \lambda_1 \cdot N_1 + \frac{c}{f_1} W + \varepsilon_{L_1} \quad (2)$$

$$P_2 = \rho + c \cdot \delta t - c \cdot \delta t^s + I_2 + T + \varepsilon_{P_2} \quad (3)$$

$$L_2 = \rho + c \cdot \delta t - c \cdot \delta t^s - I_2 + T + \lambda_2 \cdot N_2 + \frac{c}{f_2} W + \varepsilon_{L_2} \quad (4)$$

Here, the above observation equations are the same as the equations at step S1500, and the meanings of their variables are also the same, and therefore will no longer be described here.

At step S1810, the established pseudorange observation equations (equation (1) and equation (6)) and carrier-phase observation equations (equations (2) and (7)) are corrected by using the correction parameters (the correction parameters include the partition comprehensive correction $x_4$, the orbit correction $x_1$, the clock difference correction $x_2$ and the ionosphere correction $x_3$), so that the pseudorange observation equation $P_1(x)$ (i.e., equation (3)) and carrier-phase observation equation $L_1(x)$ (i.e., equation (4)) of the first frequency corrected by the correction parameters and the corrected pseudorange observation equation $P_2(x)$ (i.e., equation (8)) and carrier-phase observation equation $L_2(x)$ (i.e., equation (9)) of the second frequency may be obtained. The observation equations corrected by the correction parameters are the same as the equations (3), (4), (8) and (9) at step S1510, and therefore will no longer be described here.

At step S1820, similar to step S1520, the carrier-phase observation equation $L_1(x)$ and the carrier-phase observation equation $L_2(x)$ of the equations (4) and (9) are combined to construct a carrier-phase ionosphere-free combination, that is, a first observation:

$$L_{IF} = \frac{f_1^2 L_1(x_1, x_2, x_3, x_4) - f_2^2 L_2(x_1, x_2, x_3, x_4)}{f_1^2 - f_2^2} \quad (10)$$

At step S1830, similar to S1530, the pseudorange observation equation $P_1(x)$ and the pseudorange observation equation $P_2(x)$ of the equations (3) and (8) are combined to construct a pseudorange ionosphere-free combination, that is, a second observation:

$$P_{IF} = \frac{f_1^2 P_1(x_1, x_2, x_3, x_4) - f_2^2 P_2(x_1, x_2, x_3, x_4)}{f_1^2 - f_2^2} \quad (11)$$

At step S1840, the first observation and the second observation of each of the N satellites are jointly solved by a solution procedure similar to the above, to obtain the operation result of the user positioning, where N is greater than 4. It should be noted that, in the procedure of joint solution, the weighting ratios of the observations are configured by the above weight determination formula similar to that in step S1440, so that it can be obtained that the range of the weighting ratio is from 1:0.01 to 1:0.05, with the optimal weighting ratio being preferred as 1:0.01.

Similarly, in the use procedure of the user, the correction parameters used may further include at least one of the orbit correction $x_1$, the clock difference correction $x_2$ and the ionosphere correction $x_3$ on the basis of including the partition comprehensive correction $x_4$. For example, refer to FIG. 19, which shows a flowchart of a navigation and positioning method of a tri-frequency receiver using correction parameters including a partition comprehensive correction $x_4$, a clock difference correction $x_2$ and an ionosphere correction $x_3$ according to another embodiment of the present application.

At step S1900, the processing module here receives the observation parameters corresponding to three frequencies $f_1$, $f_2$, $f_3$ respectively, and the processing module can select any two frequencies thereof (for example, the processing module can select frequencies $f_1$ and $f_2$, or select frequencies $f_1$ and $f_3$, or select frequencies $f_2$ and $f_3$) and establish pseudorange observation equations and carrier-phase observation equations for the selected two frequencies.

For example, assuming that the frequencies selected by the processing module are $f_1$ and $f_2$, a pseudorange observation equation $P_1$ and a carrier-phase observation equation $L_1$ corresponding to the first frequency $f_1$ and a pseudo observation equation $P_2$ and a carrier-phase observation equation $L_2$ corresponding to the second frequency $f_2$ are respectively established for the two frequencies:

$$P_1 = \rho + c \cdot \delta t - c \cdot \delta t^s + I_1 + T + \varepsilon_{P_1} \quad (1)$$

$$L_1 = \rho + c \cdot \delta t - c \cdot \delta t^s - I_1 + T + \lambda_1 \cdot N_1 + \frac{c}{f_1} W + \varepsilon_{L_1} \quad (2)$$

$$P_2 = \rho + c \cdot \delta t - c \cdot \delta t^s + I_2 + T + \varepsilon_{P_2} \quad (15)$$

$$L_2 = \rho + c \cdot \delta t - c \cdot \delta t^s - I_2 + T + \lambda_2 \cdot N_2 + \frac{c}{f_2} W + \varepsilon_{L_2} \quad (16)$$

The definition of the parameters is as described above, and thus will no longer be described.

At step S1910, the established pseudorange observation equations and carrier-phase observation equations are corrected by using the correction parameters (the correction parameters include the partition comprehensive correction $x_4$, the clock difference correction $x_2$ and the ionosphere correction $x_3$), so that the corrected pseudorange observation equation $P_1(x)$ (equation (17)) and carrier-phase observation equation $L_1(x)$ (equation (18)) of the first frequency $f_1$ and the corrected pseudorange observation equation $P_2(x)$ (equation (19)) and carrier-phase observation equation $L_2(x)$ (equation (20)) of the second frequency $f_2$ may be obtained:

$$P_1(x_2, x_3, x_4) = \rho + c \cdot \delta t - c \cdot (\delta t^s - x_2) + I_1(x_3) + T + x_4 + \varepsilon'_{P_1} \quad (17)$$

$$L_1(x_2, x_3, x_4) = \quad (18)$$
$$\rho + c \cdot \delta t - c \cdot (\delta t^s - x_2) - I_1(x_3) + T + \lambda_1 \cdot N_1 + \frac{c}{f_1} W + x_4 + \varepsilon'_{L_1}$$

$$P_2(x_2, x_3, x_4) = \rho + c \cdot \delta t - c \cdot (\delta t^s - x_2) + I_2(x_3) + T + x_4 + \varepsilon'_{P_2} \quad (19)$$

$$L_2(x_2, x_3, x_4) = \quad (20)$$
$$\rho + c \cdot \delta t - c \cdot (\delta t^s - x_2) - I_2(x_3) + T + \lambda_2 \cdot N_2 + \frac{c}{f_2} W + x_4 + \varepsilon'_{L_2}$$

The meanings of the variables in the above equations (19) and (20) are the same as those in the equations (17) and (18).

At step S1920, the carrier-phase observation equation $L_1(x)$ and the carrier-phase observation equation $L_2(x)$ of the above equations (18) and (20) are combined to construct a carrier-phase ionosphere-free combination, that is, a first observation:

$$L_{IF} = \frac{f_1^2 L_1(x_2, x_3, x_4) - f_2^2 L_2(x_2, x_3, x_4)}{f_1^2 - f_2^2} \quad (21)$$

At step S1930, the pseudorange observation equation $P_1(x)$ and the pseudorange observation equation $P_2(x)$ of the above equations (17) and (19) are combined to construct a pseudorange ionosphere-free combination, that is, a second observation:

$$P_{IF} = \frac{f_1^2 P_1(x_2, x_3, x_4) - f_2^2 P_2(x_2, x_3, x_4)}{f_1^2 - f_2^2} \quad (22)$$

At step S1940, the first observation (equation (21)) and the second observation (equation (22)) of each of the N satellites are jointly solved to obtain the operation result of the user positioning, where N is greater than 4. Similarly, it should be noted that, in the procedure of joint solution, the weighting ratios of the observations are configured by the above weight determination formula similar to that in step S1440, so that it can be obtained that the weighting ratio is optimally preferred as 1:0.01 and that the amplitude range of the weighting ratio is from 1:0.01 to 1:0.05.

In addition, the navigation and positioning method using tri-frequency is not limited to the above implementation of selecting two frequencies thereof; instead, a method of simultaneously using three frequencies to perform navigation and positioning operation can be realized. For example, FIGS. 20-21 show flowcharts of navigation and positioning methods for another tri-frequency receiver using correction parameters according to embodiments of the present application.

Figure 20:
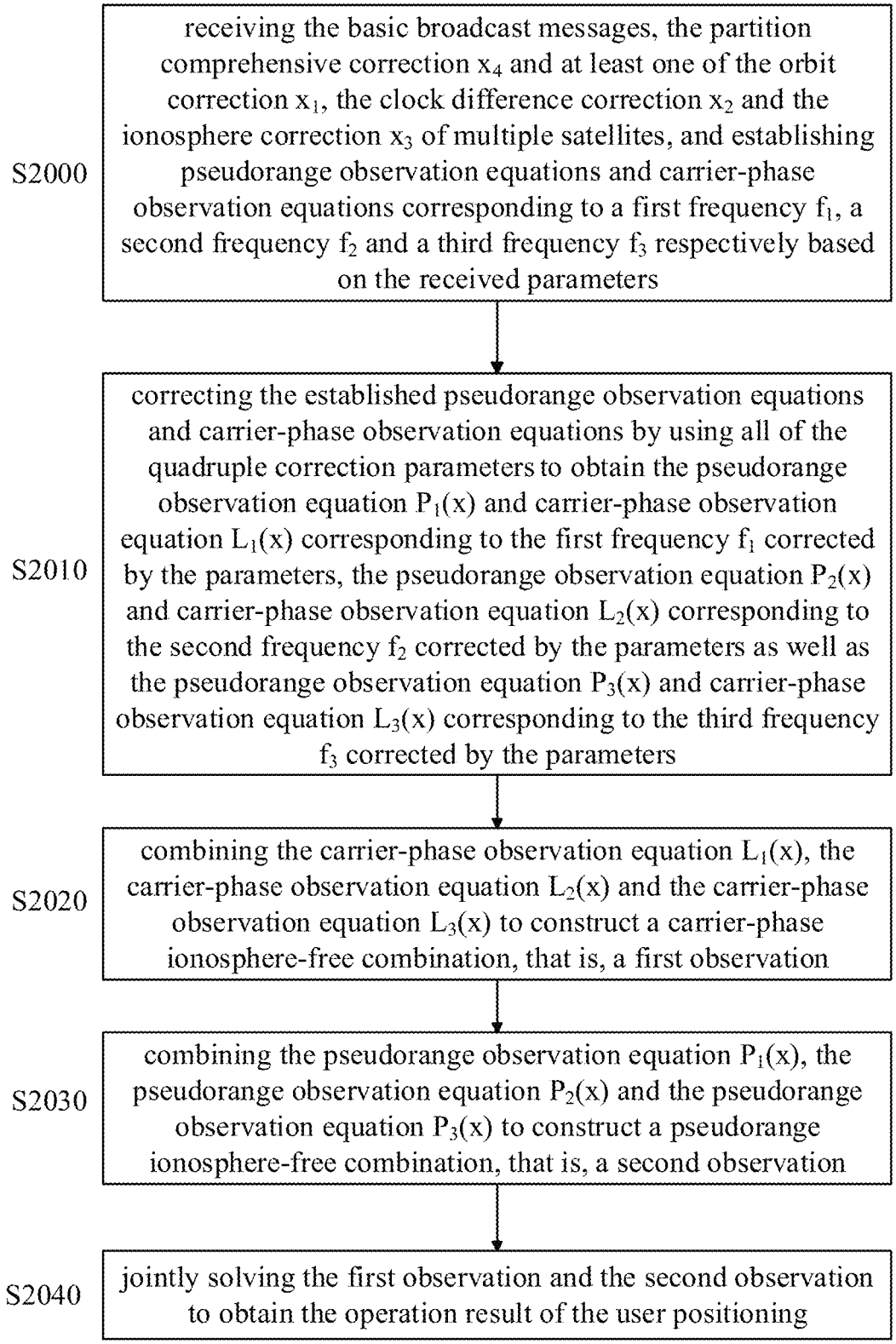
FIG. 20 shows a flowchart of a navigation and positioning method of a tri-frequency receiver using correction parameters including a partition comprehensive correction $x_4$, an orbit correction $x_1$, a clock difference correction $x_2$ and an ionosphere correction $x_3$ according to another embodiment of the present application.
Figure 21:
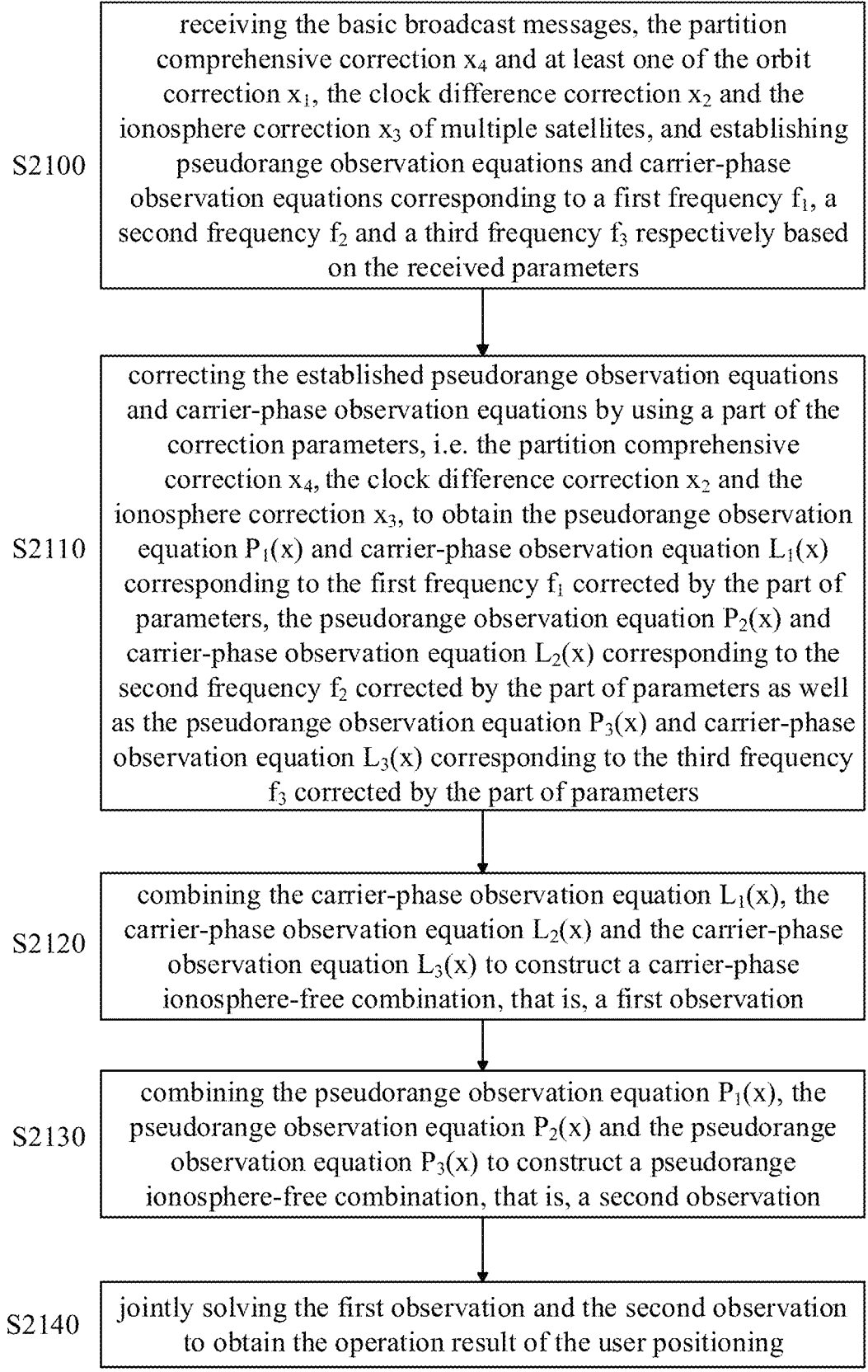
FIG. 21 shows a flowchart of a navigation and positioning method of a tri-frequency receiver using correction parameters including a partition comprehensive correction $x_4$, a clock difference correction $x_2$ and an ionosphere correction $x_3$ according to another embodiment of the present application.

Refer to FIG. 20, which shows a flowchart of a navigation and positioning method of a tri-frequency receiver using correction parameters including a partition comprehensive correction $x_4$, an orbit correction $x_1$, a clock difference correction $x_2$ and an ionosphere correction $x_3$ according to an embodiment of the present application.

At step S2000, since it is a tri-frequency receiver, the processing module here receives observation parameters corresponding to three frequencies $f_1$, $f_2$, $f_3$ respectively, and the processing module respectively establishes three pseudorange observations $P_1$ (equation (1)), $P_2$ (equation (15)), $P_3$ (equation (23)) and three carrier-phase observations $L_1$ (equation (2)), $L_2$ (equation (16)), $L_3$ (equation (24)) corresponding to $f_1$, $f_2$ and $f_3$:

$$P_1 = \rho + c \cdot \delta t - c \cdot \delta t^s + I_1 + T + \varepsilon_{P_1} \quad (1)$$

$$L_1 = \rho + c \cdot \delta t - c \cdot \delta t^s - I_1 + T + \lambda_1 \cdot N_1 + \frac{c}{f_1} W + \varepsilon_{L_1} \quad (2)$$

$$P_2 = \rho + c \cdot \delta t - c \cdot \delta t^s + I_2 + T + \varepsilon_{P_2} \quad (15)$$

$$L_2 = \rho + c \cdot \delta t - c \cdot \delta t^s - I_2 + T + \lambda_2 \cdot N_2 + \frac{c}{f_2} W + \varepsilon_{L_2} \quad (16)$$

$$P_3 = \rho + c \cdot \delta t - c \cdot \delta t^s + I_3 + T + \varepsilon_{P_3} \quad (23)$$

$$L_3 = \rho + c \cdot \delta t - c \cdot \delta t^s - I_3 + T + \lambda_3 \cdot N_3 + \frac{c}{f_3} W + \varepsilon_{L_3} \quad (24)$$

The definition of the parameters is as described above, and thus will no longer be described.

At step S2010, the established three groups of pseudorange observation equations (equation (1), equation (15) and equation (23)) and carrier-phase observation equations (equation (2), equation (6) and equation (24)) are corrected by using the correction parameters (the correction parameters include the partition comprehensive correction $x_4$, the orbit correction $x_1$, the clock difference correction $x_2$ and the ionosphere correction $x_3$), so that the corrected pseudorange observation equation $P_1(x)$ (equation (3)) and carrier-phase observation equation $L_1(x)$ (equation (4)) of the first frequency $f_1$, the corrected pseudorange observation equation $P_2(x)$ (equation (8)) and carrier-phase observation equation $L_2(x)$ (equation (9)) of the second frequency $f_2$, and the corrected pseudorange observation equation $P_3(x)$ (equation (25)) and carrier-phase observation equation $L_3(x)$ (equation (26)) of the second frequency $f_3$ may be obtained:

$$P_1(x_1, x_2, x_3, x_4) = \quad (3)$$
$$\rho + \Delta\rho(x_1) + c \cdot \delta t - c \cdot (\delta t^s - x_2) + I_1(x_3) + T + x_4 + \varepsilon'_{P_1}$$

$$L_1(x_1, x_2, x_3, x_4) = \rho + \Delta\rho(x_1) + c \cdot \delta t - \quad (4)$$
$$c \cdot (\delta t^s - x_2) - I_1(x_3) + T + \lambda_1 \cdot N_1 + \frac{c}{f_1} W + x_4 + \varepsilon'_{L_1}$$

$$P_2(x_1, x_2, x_3, x_4) = \quad (8)$$
$$\rho + \Delta\rho(x_1) + c \cdot \delta t - c \cdot (\delta t^s - x_2) + I_2(x_3) + T + x_4 + \varepsilon'_{P_2}$$

$$L_2(x_1, x_2, x_3, x_4) = \rho + \Delta\rho(x_1) + c \cdot \delta t - \quad (9)$$
$$c \cdot (\delta t^s - x_2) - I_2(x_3) + T + \lambda_2 \cdot N_2 + \frac{c}{f_2} W + x_4 + \varepsilon'_{L_2}$$

-continued $$P_3(x_1, x_2, x_3, x_4) = \rho + \Delta\rho(x_1) + c \cdot \delta t - c \cdot (\delta t^s - x_2) + I_3(x_3) + T + x_4 + \varepsilon'_{P_3} \quad (25)$$

$$L_3(x_1, x_2, x_3, x_4) = \rho + \Delta\rho(x_1) + c \cdot \delta t - c \cdot (\delta t^s - x_2) - I_3(x_3) + T + \lambda_3 \cdot N_3 + \frac{c}{f_3} W + x_4 + \varepsilon'_{L_3} \quad (26)$$

At step S2020, the above carrier-phase observation equations $L_1(x_1-x_4)$–$L_3(x_1-x_4)$ corrected by the correction parameters are combined to construct a carrier-phase ionosphere-free combination, that is, a first observation (equation (29)):

$$(\alpha L_1(x_1,x_2,x_3,x_4)+\beta L_2(x_1,x_2,x_3,x_4)+\gamma L_3(x_1,x_2,x_3,x_4))/F(\alpha,\beta,\gamma) \quad (29)$$

$\alpha$, $\beta$, $\gamma$ are the corresponding coefficients of three frequency observations respectively, $F(\alpha, \beta, \gamma)$ are the combination of coefficients, the selection of $\alpha$, $\beta$, $\gamma$ and $F(\alpha, \beta, \gamma)$ are applicable to a combination commonly used by a tri-frequency receiver currently, and the ionosphere is eliminated by the above combination.

At step S2030, the above pseudorange observation equations $P_1(x_1-x_4)$–$P_3(x_1-x_4)$ corrected by the correction parameters are combined to construct a pseudorange ionosphere-free combination, that is, a second observation (equation (30)):

$$(\alpha P_1(x_1,x_2,x_3,x_4)+\beta P_2(x_1,x_2,x_3,x_4)+\gamma P_3(x_1,x_2,x_3,x_4))/F(\alpha,\beta,\gamma) \quad (30)$$

$\alpha$, $\beta$, $\gamma$ are the corresponding coefficients of three frequency observations respectively, $F(\alpha, \beta, \gamma)$ are the combination of coefficients, the selection of $\alpha$, $\beta$, $\gamma$ and $F(\alpha, \beta, \gamma)$ are applicable to a combination commonly used by a tri-frequency receiver currently, and the ionosphere is eliminated by the above combination.

At step S2040, the first observation and the second observation of each of the N satellites are jointly solved by a solution procedure similar to the above, to obtain the operation result of the user positioning, where N is greater than 4. It should be noted that, in the procedure of joint solution, the weighting ratios of the observations are configured by the above weight determination formula similar to that in step S1440, so that it can be obtained that the range of the weighting ratio is from 1:0.01 to 1:0.05, with the optimal weighting ratio being preferred as 1:0.01.

In addition, in the use procedure of the user, in order to simplify the processing procedure of the receiver, it is also possible to receive and use only a part of the quadruple correction parameters to correct the operation result. For example, refer to FIG. 21, which shows a flowchart of a navigation and positioning method of a tri-frequency receiver using correction parameters including a partition comprehensive correction $x_4$, a clock difference correction $x_2$ and an ionosphere correction $x_3$ according to an embodiment of the present application.

At step S2100, since it is a tri-frequency receiver, the processing module here receives observation parameters corresponding to three frequencies $f_1$, $f_2$, $f_3$ respectively, and the processing module respectively establishes three pseudorange observations $P_1$ (equation (1)), $P_2$ (equation (15)), $P_3$ (equation (23)) and three carrier-phase observations $L_1$ (equation (2)), $L_2$ (equation (16)), $L_3$ (equation (24)) corresponding to $f_1$, $f_2$ and $f_3$:

$$P_1 = \rho + c \cdot \delta t - c \cdot \delta t^s + I_1 + T + \varepsilon_{P_1} \quad (1)$$

$$L_1 = \rho + c \cdot \delta t - c \cdot \delta t^s - I_1 + T + \lambda_1 \cdot N_1 + \frac{c}{f_1} W + \varepsilon_{L_1} \quad (2)$$

$$P_2 = \rho + c \cdot \delta t - c \cdot \delta t^s + I_2 + T + \varepsilon_{P_2} \quad (15)$$

$$L_2 = \rho + c \cdot \delta t - c \cdot \delta t^s - I_2 + T + \lambda_2 \cdot N_2 + \frac{c}{f_2} W + \varepsilon_{L_2} \quad (16)$$

$$P_3 = \rho + c \cdot \delta t - c \cdot \delta t^s + I_3 + T + \varepsilon_{P_3} \quad (23)$$

$$L_3 = \rho + c \cdot \delta t - c \cdot \delta t^s - I_3 + T + \lambda_3 \cdot N_3 + \frac{c}{f_3} W + \varepsilon_{L_3} \quad (24)$$

The definition of the parameters is as described above, and thus will no longer be described.

At step S2110, the processing module may correct the above-described observation equations using only the partition comprehensive correction $x_4$ and the correction parameters including at least one of the orbit corrections $x_1$, the clock difference correction $x_2$ and the ionosphere correction $x_3$. For example, in this embodiment, the above-describe observation equations are corrected using only the partition comprehensive correction $x_4$, the clock difference correction $x_2$ and the ionosphere correction $x_3$.

For example, the established pseudorange observation equations $P_1$ (equation (1)), $P_2$ (equation (15)) and $P_3$ (equation (23)) and carrier-phase observation equations $L_1$ (equation (2)), $L_2$ (equation (16)) and $L_3$ (equation (24)) are corrected by using the partition comprehensive correction $x_4$, the clock difference correction $x_2$ and the ionosphere correction $x_3$ in the correction parameters, so that the corrected pseudorange observation equation $P_1(x)$ (equation (17)) and carrier-phase observation equation $L_1(x)$ (equation (18)) of the first frequency $f_1$, the corrected pseudorange observation equation $P_2(x)$ (equation (19)) and carrier-phase observation equation $L_2(x)$ (equation (20)) of the second frequency $f_2$, and the corrected pseudorange observation equation $P_3(x)$ (equation (27)) and carrier-phase observation equation $L_3(x)$ (equation (28)) of the second frequency $f_3$ may be obtained:

$$P_1(x_2, x_3, x_4) = \rho + c \cdot \delta t - c \cdot (\delta t^s - x_2) + I_1(x_3) + T + x_4 + \varepsilon'_{P_1} \quad (17)$$

$$L_1(x_2, x_3, x_4) = \rho + c \cdot \delta t - c \cdot (\delta t^s - x_2) - I_1(x_3) + T + \lambda_1 \cdot N_1 + \frac{c}{f_1} W + x_4 + \varepsilon'_{L_1} \quad (18)$$

$$P_2(x_2, x_3, x_4) = \rho + c \cdot \delta t - c \cdot (\delta t^s - x_2) + I_2(x_3) + T + x_4 + \varepsilon'_{P_2} \quad (19)$$

$$L_2(x_2, x_3, x_4) = \rho + c \cdot \delta t - c \cdot (\delta t^s - x_2) - I_2(x_3) + T + \lambda_2 \cdot N_2 + \frac{c}{f_2} W + x_4 + \varepsilon'_{L_2} \quad (20)$$

$$P_3(x_2, x_3, x_4) = \rho + c \cdot \delta t - c \cdot (\delta t^s - x_2) + I_3(x_3) + T + x_4 + \varepsilon'_{P_3} \quad (27)$$

$$L_3(x_2, x_3, x_4) = \rho + c \cdot \delta t - c \cdot (\delta t^s - x_2) - I_3(x_3) + T + \lambda_3 \cdot N_3 + \frac{c}{f_3} W + x_4 + \varepsilon'_{L_3} \quad (28)$$

At step S2120, the above carrier-phase observations $L_1(x_2-x_4)$–$L_3(x_2-x_4)$ corrected by the correction parameters are combined to construct a carrier-phase ionosphere-free combination, that is, a first observation (equation (31)):

$$(\alpha L_1(x_2,x_3,x_4)+\beta L_2(x_2,x_3,x_4)+\gamma L_3(x_2,x_3,x_4))/F(\alpha,\beta,\gamma) \quad (31)$$

α, β, γ are the corresponding coefficients of three frequency observations respectively, F(α, β, γ) are the combination of coefficients, the selection of α, β, γ and F(α, β, γ) are applicable to a combination commonly used by a tri-frequency receiver currently, and the ionosphere is eliminated by the above combination.

At step S2130, the above corrected/enhanced pseudorange observations $P_1(x_2-x_4)-P_3(x_2-x_4)$ are combined to construct a pseudorange ionosphere-free combination, that is, a second observation (equation (32)):

$$(\alpha P_1(x_2,x_3,x_4)+\beta P_2(x_2,x_3,x_4)+\gamma P_3(x_2,x_3,x_4))/F(\alpha,\beta,\gamma) \qquad (32)$$

α, β, γ are the corresponding coefficients of three frequency observations respectively, F(α, β, γ) are the combination of coefficients, the selection of α, β, γ and F(α, β, γ) are applicable to a combination commonly used by a tri-frequency receiver currently, and the ionosphere is eliminated by the above combination.

At step S2140, the first observation and the second observation of each of the N satellites are jointly solved by a solution procedure similar to the above, to obtain the operation result of the user positioning, where N is greater than 4. It should be noted that, in the procedure of joint solution, the weighting ratios of the observations are configured by the above weight determination formula similar to that in step S1440, so that it can be obtained that the range of the weighting ratio is from 1:0.01 to 1:0.05, with the optimal weighting ratio being preferred as 1:0.01.

In addition to the above implementations, embodiments of the present application may also receive and use only the partition comprehensive correction $x_4$ to correct the observation equations. In the following, description will be made by implementations of the single-frequency, dual-frequency and tri-frequency receivers using the partition comprehensive correction $x_4$.

Figure 22:
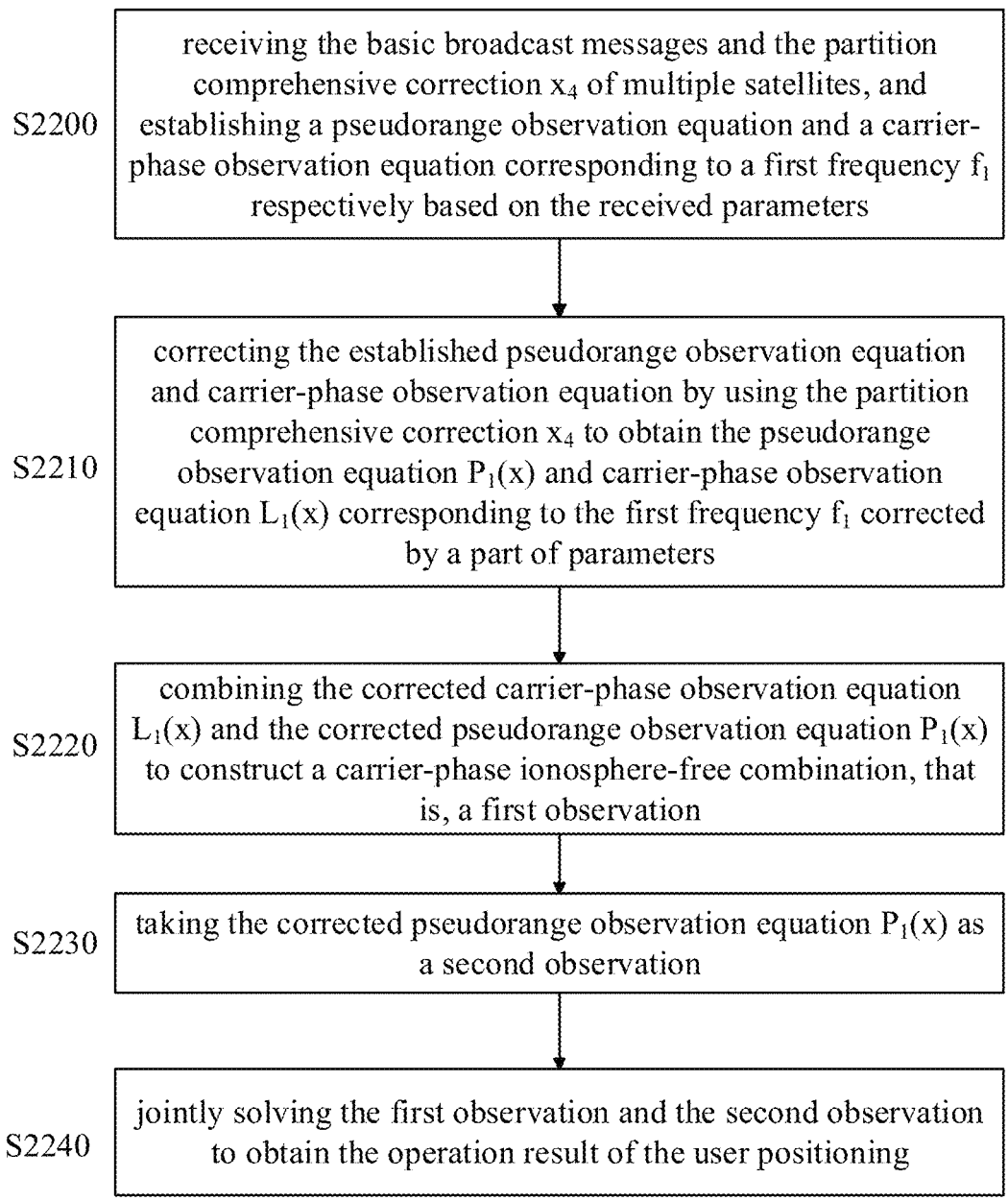
FIG. 22 shows a flowchart of a navigation and positioning method of a single-frequency receiver using correction parameters including a partition comprehensive correction $x_4$ according to another embodiment of the present application.

FIG. 22 shows a flowchart of a navigation and positioning method of a single-frequency receiver using correction parameters including a partition comprehensive correction $x_4$ according to an embodiment of the present application.

Referring to FIG. 22, at step S2200, the processing module receives the basic broadcast messages and the partition comprehensive corrections $x_4$ of N satellites. Based on the broadcast ephemeris, the pseudorange observation equation $P_1$ and the carrier-phase observation equation $L_1$ of a single frequency of each satellite may be written, as above, as:

$$P_1 = \rho + c \cdot \delta t - c \cdot \delta t^s + I_1 + T + \varepsilon_{P_1} \qquad (1)$$

$$L_1 = \rho + c \cdot \delta t - c \cdot \delta t^s - I_1 + T + \lambda_1 \cdot N_1 + \frac{c}{f_1}W + \varepsilon_{L_1} \qquad (2)$$

The definition of the parameters is as described above, and thus will no longer be described.

At step S2210, the established pseudorange observation equation (equation (1)) and carrier-phase observation equation (equation (2)) are corrected by using the correction parameters including the partition comprehensive correction $x_4$, so that the pseudorange observation equation $P_1(x)$ (equation (34)) and the carrier-phase observation equation $L_1(x)$ (equation (33)) corrected by the correction parameters may be obtained:

$$L_1(x_4) = \rho + c \cdot \delta t - c \cdot \delta t^s + T + \lambda_1 \cdot N_1 + \frac{c}{f_1}W + x_4 + \varepsilon'_{L_1} \qquad (33)$$

$$P_1(x_4) = \rho + c \cdot \delta t - c \cdot \delta t^s + T + x_4 + \varepsilon'_{P_1} \qquad (34)$$

wherein, $\varepsilon_{L_1}'$ and $\varepsilon_{P_1}'$ are the parameter-corrected observation noises after combing pseudorange and carrier-phase, and the definition of other parameters is as described above, and thus will no longer be described. The partition comprehensive correction may also be at least one or both of the GPS partition comprehensive correction and the Beidou partition comprehensive correction. Here, the Beidou partition comprehensive correction is taken as an example.

At step S2220, by combining the above pseudorange observation equation $P_1(x)$ and carrier-phase observation equation $L_1(x)$ corrected, i.e., in equations (33), (34), it can constitute a combination that eliminates the influence of the ionosphere, that is, an ionosphere-free combined observation, as a first observation (the following equation (35)):

$$\frac{L_1(x_4) + P_1(x_4)}{2} = \qquad (35)$$
$$\rho + c \cdot \delta t - c\delta t^s + T + \frac{\lambda_1 \cdot N_1}{2} + \frac{c}{2f_1}W + x_4 + \frac{\varepsilon'_{L_1} + \varepsilon'_{P_1}}{2}$$

At step S2230, the corrected pseudorange observation equation $P_1(x)$, that is, the above equation (34), is taken as a second observation.

At step S2240, the first observation (equation (35)) and the second observation (equation (34)) of each of the N satellites are jointly solved to obtain the operation result of the user positioning, where N is greater than 4. Specifically, the above equations (35) and (34) are combined to form the observation equation of the navigation and positioning of the single-frequency receiver. The corresponding observation equation is as follows:

$$\begin{bmatrix} \frac{L_1(x_4)+P_1(x_4)}{2} - \rho_1 - D_{\frac{L_1+P_1}{2}} \\ P_1(x_4) - \rho_1 - D_{P_1} \\ \vdots \\ \frac{L_n(x_4)+P_n(x_4)}{2} - \rho_n - D_{\frac{L_n+P_n}{2}} \\ P_n(x_4) - \rho_n - D_{P_n} \end{bmatrix} =$$

$$\begin{bmatrix} \frac{X_0-X^1}{\rho} & \frac{Y_0-Y^1}{\rho} & \frac{Z_0-Z^1}{\rho} & 1 & M_{wet}^1 & 0 & \cdots & 0 \\ \frac{X_0-X^1}{\rho} & \frac{Y_0-Y^1}{\rho} & \frac{Z_0-Z^1}{\rho} & 1 & M_{wet}^1 & 1 & \cdots & 0 \\ & & & \vdots & & & & \\ \frac{X_0-X^n}{\rho} & \frac{Y_0-Y^n}{\rho} & \frac{Z_0-Z^n}{\rho} & 1 & M_{wet}^n & 0 & \cdots & 0 \\ \frac{X_0-X^n}{\rho} & \frac{Y_0-Y^n}{\rho} & \frac{Z_0-Z^n}{\rho} & 1 & M_{wet}^n & 0 & \cdots & 1 \end{bmatrix} \begin{bmatrix} dX \\ dY \\ dZ \\ c \cdot \delta t \\ dZTD_W \\ B_1 \\ \vdots \\ B_n \end{bmatrix}$$

wherein $$D_{\frac{L_n+P_n}{2}} = -c\delta t^s + T + \frac{c}{2f_1}W + x_4$$

$$D_P = -c \cdot \delta t^s + T + x_4$$

In the equation, $[X_0, Y_0, Z_0]$ is the approximate coordinate of the observation station; $[X^1, Y^1, Z^1 \ldots X^n, Y^n, Z^n]$ is the coordinate of a satellite; $[dX, dY, dZ]$ is the coordinate correction parameters of the observation station; $M_{wet}$ is the troposphere wet delay mapping function; $dZTD_W$ is the troposphere wet zenith delay correction parameters; w is the carrier-phase winding correction; B is the carrier-phase ambiguity parameter in units of distance. According to the above observation equation, those skilled in the art can solve the final operation result of the user positioning.

In addition, because the accuracies of different observation equations are not uniform, it is necessary to perform weight determination on the observation equations (that is, configure the corresponding weighting ratios for the observations) and establish a stochastic model thereof. The observation equation noise is mainly composed of the errors of respective models:

$$\sigma^2 = \sigma_{eph}^2 + \sigma_{clk}^2 + \sigma_{ion}^2 + \sigma_{trop}^2 + \sigma_{mp}^2 + \sigma_{noise}^2$$

In the above equation, $\sigma$ is the observation equation noise, and $\sigma_{eph}, \sigma_{clk}, \sigma_{ion}, \sigma_{trop}, \sigma_{mp}, \sigma_{noise}$ indicate the satellite orbit accuracy, the satellite clock difference accuracy, the ionosphere model accuracy, the troposphere model accuracy, the multipath model accuracy, and the observation noise accuracy respectively. Further, in order to simplify the models, the above observation equation can be divided into components ($\sigma_{eph}, \sigma_{clk}$) that are independent of the elevation angle, and other parts are classified as components related to the elevation angle ($\sigma^2(ele)$), as follows:

$$\sigma^2 = \sigma_{eph}^2 + \sigma_{clk}^2 + \sigma^2(ele)$$

In the above equation, the weight of $\sigma^2(ele)$ is generally determined according to the elevation angle:

$$\begin{cases} \sigma(ele) = \sigma_0, \ ele > 30° \\ \sigma(ele) = \frac{\sigma_0}{2\sin(ele)}, \ ele \leq 30° \end{cases}$$

Therefore, the stochastic model is as follows:

$$Q = R^{-1} = \begin{bmatrix} \frac{1}{\sigma_1^2} & & \\ & \ddots & \\ & & \frac{1}{\sigma_n^2} \end{bmatrix}$$

In the above equation, Q is the weight matrix of the observation, R is the covariance matrix of the observation. Through the solution of the above-mentioned weight matrix of the observation, it can be obtained that the empirical weighting ratio here is optimally preferred as 1:0.05 and that the amplitude range of the weighting ratio is from 1:0.01 to 1:0.05.

Figure 23:
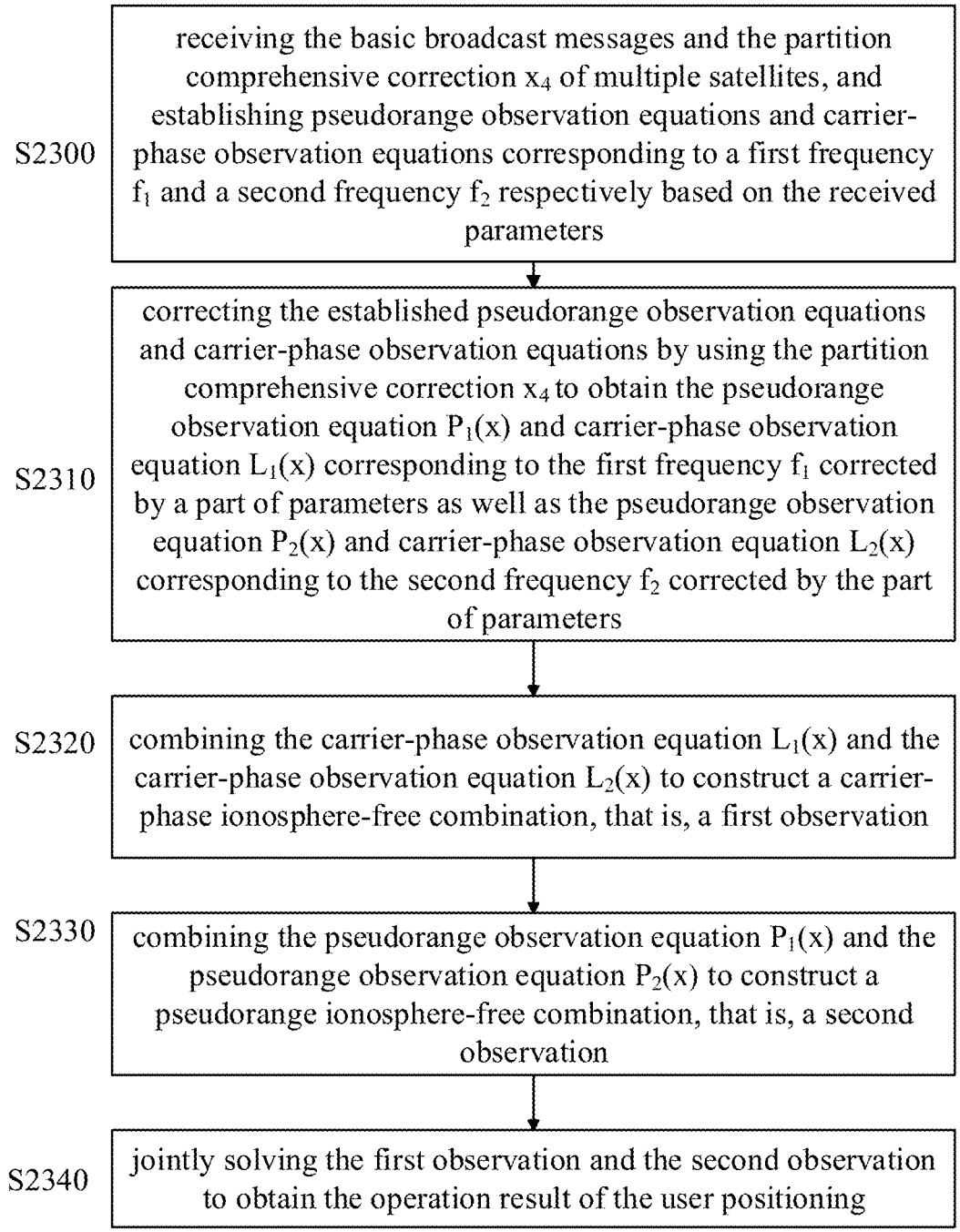
FIG. 23 shows a flowchart of a navigation and positioning method of a dual-frequency receiver using correction parameters including a partition comprehensive correction $x_4$ according to another embodiment of the present application.

FIG. 23 shows a flowchart of a navigation and positioning method of a dual-frequency receiver using correction parameters including a partition comprehensive correction $x_4$ according to another embodiment of the present application.

At step S2300, since it is a dual-frequency receiver, the processing module here, in addition to receiving parameters and establishing the pseudo-range observation equation $P_1$ (equation (1)) and the carrier-phase observation equation $L_1$ (equation (2)) of the first frequency $f_1$ as described above with reference to FIG. 22:

$$P_1 = \rho + c \cdot \delta t - c \cdot \delta t^s + I_1 + T + \varepsilon_{P_1} \quad (1)$$

$$L_1 = \rho + c \cdot \delta t - c \cdot \delta t^s - I_1 + T + \lambda_1 \cdot N_1 + \frac{c}{f_1}W + \varepsilon_{L_1} \quad (2)$$

further introduces a pseudo-range observation $P_2$ (equation (15)) and a carrier-phase observation $L_2$ (equation (16)) of a second frequency $f_2$ other than the first frequency $f_1$:

$$P_2 = \rho + c \cdot \delta t - c \cdot \delta t^s + I_2 + T + \varepsilon_{P_2} \quad (15)$$

$$L_2 + \rho + c \cdot \delta t - c \cdot \delta t^s - I_2 + T + \lambda_2 \cdot N_2 + \frac{c}{f_2}W + \varepsilon_{L_2} \quad (16)$$

The definition of the parameters is as described above, and thus will no longer be described.

The meanings of the variables in the above equations (15) and (16) are the same as those in the equations (1) and (2), except only that the second frequency $f_2$ is different from the first frequency $f_1$.

At step S2310, the established pseudorange observation equations (equation (1) and equation (15)) and carrier-phase observation equations (equations (2) and (16)) are corrected by using the correction parameters (the correction parameters include the partition comprehensive correction $x_4$), so that the corrected pseudorange observation equation $P_1(x)$ (equation (34)) and carrier-phase observation equation $L_1(x)$ (equation (33)) of the first frequency $f_1$ and the corrected pseudorange observation equation $P_2(x)$ (equation (36)) and carrier-phase observation equation $L_2(x)$ (equation (37)) of the second frequency $f_2$ may be obtained:

$$P_1(x_4) = \rho + c \cdot \delta t - c \cdot \delta t^s + T + x_4 + \varepsilon'_{P_1} \quad (34)$$

$$L_1(x_4) = \rho + c \cdot \delta t - c \cdot \delta t^s + T + \lambda_1 \cdot N_1 + \frac{c}{f_1}W + x_4 + \varepsilon'_{L_1} \quad (33)$$

$$P_2(x_4) = \rho + c \cdot \delta t - c \cdot \delta t^s + T + x_4 + \varepsilon'_{P_2} \quad (36)$$

$$L_2(x_4) = \rho + c \cdot \delta t - c \cdot \delta t^s + T + \lambda_2 \cdot N_2 + \frac{c}{f_2}W + x_4 + \varepsilon'_{L_2} \quad (37)$$

The meanings of the variables in the above equations (36) and (37) are the same as those in the equations (34) and (33).

At step S2320, the carrier-phase observation equation $L_1(x)$ and the carrier-phase observation equation $L_2(x)$ of the above equations (33) and (37) are combined to construct a carrier-phase ionosphere-free combination, that is, a first observation:

$$L_{IF} = \frac{f_1^2 L_1(x_4) - f_2^2 L_2(x_4)}{f_1^2 - f_2^2} \quad (38)$$

At step S23~30, the pseudorange observation equation $P_1(x)$ and the pseudorange observation equation $P_2(x)$ of the above equations (34) and (36) are combined to construct a pseudorange ionosphere-free combination, that is, a second observation:

$$P_{IF} = \frac{f_1^2 P_1(x_4) - f_2^2 P_2(x_4)}{f_1^2 - f_2^2} \qquad (39)$$

At step S2340, the first observation (equation (38)) and the second observation (equation (39)) of each of the N satellites are jointly solved to obtain the operation result of the user positioning, where N is greater than 4. It should be noted that, in the procedure of joint solution, the weighting ratios of the observations are configured by the above weight determination formula similar to that in step S2240, so that it can be obtained that the weighting ratio is optimally preferred as 1:0.01, and the amplitude range of the weighting ratio is from 1:0.01 to 1:0.05.

Refer to FIG. 24, which shows a flowchart of a navigation and positioning method of a tri-frequency receiver using correction parameters including a partition comprehensive correction $x_4$ according to another embodiment of the present application.

At step S2400, the processing module here receives the observation parameters corresponding to three frequencies $f_1$, $f_2$, $f_3$ respectively, and the processing module can select any two frequencies thereof (for example, the processing module can select frequencies $f_1$ and $f_2$, or select frequencies $f_1$ and $f_3$, or select frequencies $f_2$ and $f_3$) and establish pseudorange observation equations and carrier-phase observation equations for the selected two frequencies.

For example, assuming that the frequencies selected by the processing module are $f_1$ and $f_2$, a pseudorange observation equation $P_1$ and a carrier-phase observation equation $L_1$ corresponding to the first frequency $f_1$ and a pseudo observation equation $P_2$ and a carrier-phase observation equation $L_2$ corresponding to the second frequency $f_2$ are respectively established for the two frequencies:

$$P_1 = \rho + c \cdot \delta t - c \cdot \delta t^s + I_1 + T + \varepsilon_{P_1} \qquad (1)$$

$$L_1 = \rho + c \cdot \delta t - c \cdot \delta t^s - I_1 + T + \lambda_1 \cdot N_1 + \frac{c}{f_1} W + \varepsilon_{L_1} \qquad (2)$$

$$P_2 = \rho + c \cdot \delta t - c \cdot \delta t^s + I_2 + T + \varepsilon_{P_2} \qquad (15)$$

$$L_2 + \rho + c \cdot \delta t - c \cdot \delta t^s - I_2 + T + \lambda_2 \cdot N_2 + \frac{c}{f_2} W + \varepsilon_{L_2} \qquad (16)$$

The definition of the parameters is as described above, and thus will no longer be described.

The meanings of the variables in the above equations (15) and (16) are the same as those in the equations (1) and (2), except only that the second frequency $f_2$ is different from the first frequency $f_1$.

At step S2410, the established pseudorange observation equations (equation (1) and equation (15)) and carrier-phase observation equations (equations (2) and (16)) are corrected by using the correction parameters (including the partition comprehensive correction $x_4$), so that the corrected pseudorange observation equation $P_1(x)$ (equation (34)) and carrier-phase observation equation $L_1(x)$ (equation (33)) of the first frequency $f_1$ and the corrected pseudorange observation equation $P_2(x)$ (equation (36)) and carrier-phase observation equation $L_2(x)$ (equation (37)) of the second frequency $f_2$ may be obtained:

$$P_1(x_4) = \rho + c \cdot \delta t - c \cdot \delta t^s + T + x_4 + \varepsilon'_{P_1} \qquad (34)$$

$$L_1(x_4) = \rho + c \cdot \delta t - c \cdot \delta t^s + T + \lambda_1 \cdot N_1 + \frac{c}{f_1} W + x_4 + \varepsilon'_{L_1} \qquad (33)$$

$$P_2(x_4) = \rho + c \cdot \delta t - c \cdot \delta t^s + T + x_4 + \varepsilon'_{P_2} \qquad (36)$$

$$L_2(x_4) = \rho + c \cdot \delta t - c \cdot \delta t^s + T + \lambda_2 \cdot N_2 + \frac{c}{f_2} W + x_4 + \varepsilon'_{L_2} \qquad (37)$$

The meanings of the variables in the above equations (36) and (37) are the same as those in the equations (34) and (33).

At step S2420, the carrier-phase observation equation $L_1(x)$ and the carrier-phase observation equation $L_2(x)$ of the above equations (33) and (37) are combined to construct a carrier-phase ionosphere-free combination, that is, a first observation:

$$L_{IF} = \frac{f_1^2 L_1(x_4) - f_2^2 L_2(x_4)}{f_1^2 - f_2^2} \qquad (38)$$

At step S2430, the pseudorange observation equation $P_1(x)$ and the pseudorange observation equation $P_2(x)$ of the above equations (34) and (36) are combined to construct a pseudorange ionosphere-free combination, that is, a second observation:

$$P_{IF} = \frac{f_1^2 P_1(x_4) - f_2^2 P_2(x_4)}{f_1^2 - f_2^2} \qquad (39)$$

At step S2440, the first observation (equation (38)) and the second observation (equation (39)) of each of the N satellites are jointly solved to obtain the operation result of the user positioning, where N is greater than 4. It should be noted that, in the procedure of joint solution, the weighting ratios of the observations are configured by the above weight determination formula similar to that in step S2240, so that it can be obtained that the weighting ratio is optimally preferred as 1:0.01, and the amplitude range of the weighting ratio is from 1:0.01 to 1:0.05.

In addition, the navigation and positioning method using tri-frequency is not limited to the above implementation of selecting two frequencies thereof; instead, a method of simultaneously using three frequencies to perform navigation and positioning operation can be realized.

For example, FIG. 25 shows a flowchart of another navigation and positioning method of a tri-frequency receiver using correction parameters (the correction parameters include a partition comprehensive correction $x_4$) according to an embodiment of the present application.

Referring to FIG. 25, at step S2500, since it is a tri-frequency receiver, the processing module here receives observation parameters corresponding to three frequencies $f_1$, $f_2$, $f_3$ respectively, and the processing module respectively establishes three pseudorange observations $P_1$ (equation (1)), $P_2$ (equation (15)), $P_3$ (equation (23)) and three carrier-phase observations $L_1$ (equation (2)), $L_2$ (equation (16)), $L_3$ (equation (24)) corresponding to $f_1$, $f_2$ and $f_3$:

$$P_1 = \rho + c \cdot \delta t - c \cdot \delta t^s + I_1 + T + \varepsilon_{P_1} \quad (1)$$

$$L_1 = \rho + c \cdot \delta t - c \cdot \delta t^s - I_1 + T + \lambda_1 \cdot N_1 + \frac{c}{f_1} W + \varepsilon_{L_1} \quad (2)$$

$$P_2 = \rho + c \cdot \delta t - c \cdot \delta t^s + I_2 + T + \varepsilon_{P_2} \quad (15)$$

$$L_2 + \rho + c \cdot \delta t - c \cdot \delta t^s - I_2 + T + \lambda_2 \cdot N_2 + \frac{c}{f_2} W + \varepsilon_{L_2} \quad (16)$$

$$P_3 = \rho + c \cdot \delta t - c \cdot \delta t^s + I_3 + T + \varepsilon_{P_3} \quad (23)$$

$$L_3 = \rho + c \cdot \delta t - c \cdot \delta t^s - I_3 + T + \lambda_3 \cdot N_3 + \frac{c}{f_3} W + \varepsilon_{L_3} \quad (24)$$

The definition of the parameters is as described above, and thus will no longer be described.

At step S2110, the established three groups of pseudorange observation equations (equation (1), equation (15) and equation (23)) and carrier-phase observation equations (equation (2), equation (16) and equation (24)) are corrected by using the correction parameters (the correction parameters include the partition comprehensive correction $x_4$), so that the corrected pseudorange observation equation $P_1(x)$ (equation (34)) and carrier-phase observation equation $L_1(x)$ (equation (33)) of the first frequency $f_1$, the corrected pseudorange observation equation $P_2(x)$ (equation (36)) and carrier-phase observation equation $L_2(x)$ (equation (37)) of the second frequency $f_2$, and the corrected pseudorange observation equation $P_3(x)$ (equation (40)) and carrier-phase observation equation $L_3(x)$ (equation (41)) of the second frequency $f_3$ may be obtained:

$$P_1(x_4) = \rho + c \cdot \delta t - c \cdot \delta t^s + T + x_4 + \varepsilon'_{P_1} \quad (34)$$

$$L_1(x_4) = \rho + c \cdot \delta t - c \cdot \delta t^s + T + \lambda_1 \cdot N_1 + \frac{c}{f_1} W + x_4 + \varepsilon'_{L_1} \quad (33)$$

$$P_2(x_4) = \rho + c \cdot \delta t - c \cdot \delta t^s + T + x_4 + \varepsilon'_{P_2} \quad (36)$$

$$L_2(x_4) = \rho + c \cdot \delta t - c \cdot \delta t^s + T + \lambda_2 \cdot N_2 + \frac{c}{f_2} W + x_4 + \varepsilon'_{L_2} \quad (37)$$

$$P_3(x_4) = \rho + c \cdot \delta t - c \cdot \delta t^s + T + x_4 + \varepsilon'_{P_3} \quad (40)$$

$$L_3(x_4) = \rho + c \cdot \delta t - c \cdot \delta t^s + T + \lambda_3 \cdot N_3 + \frac{c}{f_3} W + x_4 + \varepsilon'_{L_3} \quad (41)$$

At step S2520, the above carrier-phase observation equations $L_1(x_4)$–$L_3(x_4)$ corrected by the correction parameters are combined to construct a carrier-phase ionosphere-free combination, that is, a first observation (equation (42)):

$$(\alpha L_1(x_4) + \beta L_2(x_4) + \gamma L_3(x_4))/F(\alpha, \beta, \gamma) \quad (42)$$

α, β, γ are the corresponding coefficients of three frequency observations respectively, F(α, β, γ) are the combination of coefficients, the selection of α, β, γ and F(α, β, γ) are applicable to a combination commonly used by trifrequency currently, and the ionosphere is eliminated by the above combination.

At step S2530, the above pseudorange observation equations $P_1(x_4)$–$P_3(x_4)$ corrected by the correction parameters are combined to construct a pseudorange ionosphere-free combination, that is, a second observation (equation (43)):

$$(\alpha P_1(x_4) + \beta P_2(x_4) + \gamma P_3(x_4))/F(\alpha, \beta, \gamma) \quad (43)$$

α, β, γ are the corresponding coefficients of three frequency observations respectively, F(α, β, γ) are the combination of coefficients, the selection of α, β, γ and F(α, β, γ) are applicable to a combination commonly used by trifrequency currently, and the ionosphere is eliminated by the above combination.

At step S2540, the first observation and the second observation of each of the N satellites are jointly solved by a solution procedure similar to the above, to obtain the operation result of the user positioning, where N is greater than 4. It should be noted that, in the procedure of joint solution, the weighting ratios of the observations are configured by the above weight determination formula similar to that in step S2240, so that it can be obtained that the range of the weighting ratio is from 1:0.01 to 1:0.05, with the optimal weighting ratio being preferred as 1:0.01.

Embodiments of the present invention have at least one of the following beneficial effects:

The embodiments of the invention improve the accuracy of positioning (achieve at least the decimeter-level accuracy of positioning) through the superimposition of the correction parameters (protocol superimposition) and the cooperation of the updating of the correction parameters with the protocol superposition, thereby meeting the requirements of high-accuracy positioning of different industries including, but not limited to, measurement, mechanical control, precision agriculture, intelligent transportation, logistics and asset tracking, engineering management, engineering construction, navigation for the blind, early warning monitoring, emergency rescue, etc. Furthermore, the embodiments of the present invention further reduce the hardware complexity of the user end and can also realize real-time high-accuracy navigation and positioning, and/or the embodiments of the invention further improve the convergence speed and achieve fast convergence, thereby shortening the initialization time of the receiver, so that the receiver is quickly brought into a substantial high-accuracy positioning working state.

It should be noted that, in this specification, the terms "include", "comprise" or any other variations thereof are intended to cover non-exclusive inclusions so that a procedure, method, article or device that includes a series of elements includes not only those elements, but also includes other elements that are not explicitly listed, or elements that are inherent to such a procedure, method, article or device. With no more limitation, the element defined by the sentence "include one . . . " does not exclude that there is another same element in the procedure, method, article, or device including the element.

Finally, it should also be noted that the above-described series of processes includes not only processes performed chronologically in the order described herein but also processes performed in parallel or individually rather than chronologically.

With the above description of the embodiments, those skilled in the art can clearly understand that the present invention can be implemented by means of software plus a necessary hardware platform, and of course can also be implemented entirely by hardware. Based on such understanding, all or part of the contribution of the technical scheme of the present invention to the background can be embodied in the form of a software product which can be stored in a storage medium such as a ROM/RAM, a magnetic disk, an optical disk, etc. and includes several instructions for causing a computer device (which may be a personal computer, a server, or a network device, etc.) to perform the methods described in various embodiments of the present invention or certain portions of the embodiments.

In embodiments of the present invention, units/modules may be implemented in software for execution by various types of processors. For example, an identified executable code module may include one or more physical or logical blocks of computer instructions, which may be constructed as objects, procedures, or functions, for example. Nevertheless, the executable codes of the identified modules need not be physically located together, but may include different instructions stored in different bits. When these instructions are logically combined together, they constitute a unit/module and implement the specified purpose of the unit/module.

When the unit/module can be implemented by means of software, taking into account the level of the existing hardware process, for the unit/module can be implemented in software, the corresponding hardware circuit can be built by those skilled in the art to achieve the corresponding function without considering the cost, the hardware circuit including conventional Very Large Scale Integration (VLSI) circuits or gate arrays and existing semiconductors such as logic chips, transistors or the like, or other discrete components. The module can also be implemented with programmable hardware devices such as field programmable gate arrays, programmable array logic, programmable logic devices, and the like.

The present invention has been described in detail above, and the principles and implementations of the present invention are elaborated using specific examples herein. The above explanation of embodiments is only used for helping to understand the methods of the present invention and the core ideas thereof; meanwhile, for the ordinary skill in the art, in light of the ideas of the present invention, there will be changes in specific implementations and application scopes. In summary, the contents of this specification should not be construed as the limiting of the present invention.

What is claimed is:

1. A message broadcast apparatus for an enhanced parameter in a satellite navigation system, comprising:
a processor, which determines an insertion position of the enhanced parameter in a reserved space in a navigation message frame structure model according to the byte size and the broadcast frequency of the enhanced parameter that needs to be broadcast, so as to perform the message arrangement of the enhanced parameter; and
a transmitter, which uploads the arranged message to a broadcast satellite for broadcasting the message,
wherein the navigation message frame structure model is defined by a superframe, a main frame and a sub-frame, with each of superframes containing 120 main frames, each of main frames containing 5 sub-frames, each of sub-frames containing 10 words and each of words containing 30 bits and lasting 0.06 second, and
wherein among the 5 sub-frames, sub-frame 1 is used to broadcast the present satellite's basic navigation information of the satellite navigation system and transmitted by 10 pages in a time division manner, sub-frame 2 to sub-frame 4 are used to broadcast the integrity and differential information of the satellite navigation system and transmitted respectively by 6 pages in a time division manner, and sub-frame 5 is used to broadcast all the satellite almanacs, ionosphere information and time synchronization information with other systems of the satellite navigation system and transmitted by 120 pages in a time division manner.

2. The message broadcast apparatus according to claim 1, wherein the enhanced parameter comprises satellite clock difference correction parameters and partition comprehensive correction parameters, and the processor inserts the satellite clock difference correction parameters into a first group of predetermined positions in the reserved space of sub-frame 2 and sub-frame 3 and transmits the satellite clock difference correction parameters by 6 pages in a time division manner, and inserts the partition comprehensive correction parameters into a second group of predetermined positions in the reserved space of sub-frame 2 to sub-frame 4 and transmits the partition comprehensive correction parameters by the 12 pages in a time division manner.

3. The message broadcast apparatus according to claim 1, wherein the enhanced parameter comprises partition comprehensive correction parameters, and the partition comprehensive correction parameters comprise partition comprehensive corrections, area identifiers and satellite identifiers, and
wherein the area identifiers are used for, for each of areas in the satellite navigation system, employing a 1-bit information bit respectively to identify whether there is a partition comprehensive correction that needs to be broadcast, and the processor inserts the area identifiers into a third group of predetermined positions in the reserved space of page 1 of sub-frame 2, and
wherein the satellite identifiers are used for, for each of satellites in the satellite navigation system, employing a 1-bit information bit respectively to identify whether there is a partition comprehensive correction that needs to be broadcast, and the processor inserts the satellite identifiers into a fourth group of predetermined positions in the reserved space of page 2 to page 4 of sub-frame 2, and
wherein the processor inserts partition comprehensive corrections, which correspond to different areas and different satellites respectively and need to be broadcast, into a fifth group of predetermined positions in the reserved space of page 1 to page 6 of sub-frame 3 and sub-frame 4 sequentially, and
wherein the broadcast period of the partition comprehensive correction parameters is 30 seconds to 3 minutes.

4. The message broadcast apparatus according to claim 3, wherein an area index i and a satellite index j corresponding to each of the broadcast partition comprehensive corrections are respectively defined as follows:

$i=\text{INT}(n,x)+1;$ $j=\text{MOD}(n,x),$ wherein n denotes the number of the broadcast partition comprehensive correction, and x denotes the total number of satellites that needs to broadcast partition comprehensive corrections.

5. The message broadcast apparatus according to claim 1, wherein the enhanced parameter comprises satellite clock difference correction parameters, and the satellite clock difference correction parameters comprise satellite identifiers and satellite clock difference correction residues, and
wherein the satellite identifiers are used for, for each of satellites in the satellite navigation system, employing a 1-bit information bit respectively to identify whether there is a satellite clock difference correction residue that needs to be broadcast, and the processor inserts the satellite identifiers into a third group of predetermined positions in the reserved space of page 1 of sub-frame 2, and
wherein the processor inserts the satellite clock difference correction residues, which correspond to different satellites respectively and need to be broadcast, into a sixth group of predetermined positions in the reserved space of page 5 and page 6 of sub-frame 4 sequentially, and wherein the broadcast period of the satellite clock difference correction parameters is 18 seconds to 2 minutes.

6. The message broadcast apparatus according to claim 5, the processor inserts a broadcast information category identifier into a predetermined 1-bit information bit in the reserved space of page 4 of sub-frame 2, and the satellite clock difference correction residues are broadcast in the sixth group of predetermined positions when the broadcast information category identifier is one of 1 and 0, and GPS satellite differential fast change information is broadcast in the sixth group of predetermined positions when the broadcast information category identifier is the other of 1 and 0.

7. The message broadcast apparatus according to claim 1, wherein the enhanced parameter comprises GPS partition comprehensive correction parameters, and the GPS partition comprehensive correction parameters comprise GPS partition comprehensive corrections, GPS area identifiers and GPS satellite identifiers, and wherein the GPS area identifiers are used for, for each of GPS areas, employing a 1-bit information bit respectively to identify whether there is a GPS partition comprehensive correction that needs to be broadcast, and the processor inserts the GPS area identifiers into a seventh group of predetermined positions in the reserved space of page 23 and page 83 of sub-frame 5, and wherein the GPS satellite identifiers are used for, for each of GPS satellites, employing a 1-bit information bit respectively to identify whether there is a GPS partition comprehensive correction that needs to be broadcast, and the processor inserts the GPS satellite identifiers into an eighth group of predetermined positions in the reserved space of page 23 and page 83 of sub-frame 5, and wherein the processor inserts the GPS partition comprehensive corrections, which correspond to different GPS areas and different GPS satellites respectively and need to be broadcast, into a ninth group of predetermined positions in the reserved space of page 23 to page 30 and page 83 to page 90 of sub-frame 5 sequentially, and wherein the broadcast period of the GPS partition comprehensive correction parameters is 30 seconds to 3 minutes.

8. The message broadcast apparatus according to claim 1, the enhanced parameter comprises satellite orbit correction parameters, and the satellite orbit correction parameters comprise satellite identifiers, satellite broadcast ephemeris corrections and equivalent distance error status identifiers of satellite ephemeris corrections, and wherein the satellite identifiers are used for, for each of satellites in the satellite navigation system, employing a 1-bit information bit respectively to identify whether there are a satellite broadcast ephemeris correction and an equivalent distance error status identifier of the satellite ephemeris correction that need to be broadcast, and the processor inserts the satellite identifiers into a tenth group of predetermined positions in the reserved space of page 23 of sub-frame 5, and wherein the processor inserts the satellite broadcast ephemeris corrections and the equivalent distance error status identifiers of satellite ephemeris corrections, which correspond to different satellites respectively and need to be broadcast, into a eleventh group of predetermined positions in the reserved space of page 117 to page 120, page 31 and page 91 of sub-frame 5, and wherein the broadcast period of the satellite orbit correction parameters is 3-6 minutes.

9. The message broadcast apparatus according to claim 1, wherein the processor determines the byte size and the broadcast frequency of the enhanced parameter according to the quantization range and the quantization accuracy of the enhanced parameter respectively.

10. The message broadcast apparatus according to claim 1, wherein the satellite navigation system is Beidou satellite navigation system.

11. A message broadcast method for an enhanced parameter in a satellite navigation system, comprising:

determining an insertion position of the enhanced parameter in a reserved space in a navigation message frame structure model according to the byte size and the broadcast frequency of the enhanced parameter that needs to be broadcast, so as to perform the message arrangement of the enhanced parameter; and uploading, by a ground base station, the arranged message to a broadcast satellite for broadcasting the message, wherein the navigation message frame structure model is defined by a superframe, a main frame and a sub-frame, with each of superframes containing 120 main frames, each of main frames containing 5 sub-frames, each of sub-frames containing 10 words and each of words containing 30 bits and lasting 0.06 second, and wherein among the 5 sub-frames, sub-frame 1 is used to broadcast the present satellite's basic navigation information of the satellite navigation system and transmitted by 10 pages in a time division manner, sub-frame 2 to sub-frame 4 are used to broadcast the integrity and differential information of the satellite navigation system and transmitted respectively by 6 pages in a time division manner, and sub-frame 5 is used to broadcast all the satellite almanacs, ionosphere information and time synchronization information with other systems of the satellite navigation system and transmitted by 120 pages in a time division manner.

12. The message broadcast method according to claim 11, wherein the enhanced parameter comprises satellite clock difference correction parameters and partition comprehensive correction parameters, and the satellite clock difference correction parameters are inserted into a first group of predetermined positions in the reserved space of sub-frame 2 and sub-frame 3 and transmitted by 6 pages in a time division manner, and the partition comprehensive correction parameters are inserted into a second group of predetermined positions in the reserved space of sub-frame 2 to sub-frame 4 and transmitted by the 12 pages in a time division manner.

13. The message broadcast method according to claim 11, wherein the enhanced parameter comprises partition comprehensive correction parameters, and the partition comprehensive correction parameters comprise partition comprehensive corrections, area identifiers and satellite identifiers, and wherein the area identifiers are used for, for each of areas in the satellite navigation system, employing a 1-bit information bit respectively to identify whether there is a partition comprehensive correction that needs to be broadcast, and the area identifiers are inserted into a third group of predetermined positions in the reserved space of page 1 of sub-frame 2, and wherein the satellite identifiers are used for, for each of satellites in the satellite navigation system, employing a 1-bit information bit respectively to identify whether there is a partition comprehensive correction that needs to be broadcast, and the satellite identifiers are inserted into a fourth group of predetermined positions in the reserved space of page 2 to page 4 of sub-frame 2, and wherein partition comprehensive corrections, which correspond to different areas and different satellites respectively and need to be broadcast, are inserted into a fifth group of predetermined positions in the reserved space of page 1 to page 6 of sub-frame 3 and sub-frame 4 sequentially, and wherein the broadcast period of the partition comprehensive correction parameters is 30 seconds to 3 minutes.

14. The message broadcast method according to claim 13, wherein an area index i and a satellite index j corresponding to each of the broadcast partition comprehensive corrections are respectively defined as follows:

$$i=\text{INT}(n,x)+1;$$

$$j=\text{MOD}(n,x),$$

wherein n denotes the number of the broadcast partition comprehensive correction, and x denotes the total number of satellites that needs to broadcast partition comprehensive corrections.

15. The message broadcast method according to claim 11, wherein the enhanced parameter comprises satellite clock difference correction parameters, and the satellite clock difference correction parameters comprise satellite identifiers and satellite clock difference correction residues, and wherein the satellite identifiers are used for, for each of satellites in the satellite navigation system, employing a 1-bit information bit respectively to identify whether there is a satellite clock difference correction residue that needs to be broadcast, and the satellite identifiers are inserted into a third group of predetermined positions in the reserved space of page 1 of sub-frame 2, and wherein the satellite clock difference correction residues, which correspond to different satellites respectively and need to be broadcast, are inserted into a sixth group of predetermined positions in the reserved space of page 5 and page 6 of sub-frame 4 sequentially, and wherein the broadcast period of the satellite clock difference correction parameters is 18 seconds to 2 minutes.

16. The message broadcast method according to claim 15, a broadcast information category identifier is inserted into a predetermined 1-bit information bit in the reserved space of page 4 of sub-frame 2, and the satellite clock difference correction residues are broadcast in the sixth group of predetermined positions when the broadcast information category identifier is one of 1 and 0, and GPS satellite differential fast change information is broadcast in the sixth group of predetermined positions when the broadcast information category identifier is the other of 1 and 0.

17. The message broadcast method according to claim 11, wherein the enhanced parameter comprises GPS partition comprehensive correction parameters, and the GPS partition comprehensive correction parameters comprise GPS partition comprehensive corrections, GPS area identifiers and GPS satellite identifiers, and wherein the GPS area identifiers are used for, for each of GPS areas, employing a 1-bit information bit respectively to identify whether there is a GPS partition comprehensive correction that needs to be broadcast, and the GPS area identifiers are inserted into a seventh group of predetermined positions in the reserved space of page 23 and page 83 of sub-frame 5, and wherein the GPS satellite identifiers are used for, for each of GPS satellites, employing a 1-bit information bit respectively to identify whether there is a GPS partition comprehensive correction that needs to be broadcast, and the GPS satellite identifiers are inserted into an eighth group of predetermined positions in the reserved space of page 23 and page 83 of sub-frame 5, and wherein the GPS partition comprehensive corrections, which correspond to different GPS areas and different GPS satellites respectively and need to be broadcast, are inserted into a ninth group of predetermined positions in the reserved space of page 23 to page 30 and page 83 to page 90 of sub-frame 5 sequentially, and wherein the broadcast period of the GPS partition comprehensive correction parameters is 30 seconds to 3 minutes.

18. The message broadcast method according to claim 11, the enhanced parameter comprises satellite orbit correction parameters, and the satellite orbit correction parameters comprise satellite identifiers, satellite broadcast ephemeris corrections and equivalent distance error status identifiers of satellite ephemeris corrections, and wherein the satellite identifiers are used for, for each of satellites in the satellite navigation system, employing a 1-bit information bit respectively to identify whether there are a satellite broadcast ephemeris correction and an equivalent distance error status identifier of the satellite ephemeris correction that need to be broadcast, and the satellite identifiers are inserted into a tenth group of predetermined positions in the reserved space of page 23 of sub-frame 5, and wherein the satellite broadcast ephemeris corrections and the equivalent distance error status identifiers of satellite ephemeris corrections, which correspond to different satellites respectively and need to be broadcast, are inserted into a eleventh group of predetermined positions in the reserved space of page 117 to page 120, page 31 and page 91 of sub-frame 5, and wherein the broadcast period of the satellite orbit correction parameters is 3-6 minutes.

19. The message broadcast method according to claim 11, wherein the byte size and the broadcast frequency of the enhanced parameter are determined according to the quantization range and the quantization accuracy of the enhanced parameter respectively.

20. The message broadcast method according to claim 11, wherein the satellite navigation system is Beidou satellite navigation system.

* * * * *